United States Patent [19]
Branigin

[11] Patent Number: 5,471,593
[45] Date of Patent: Nov. 28, 1995

[54] COMPUTER PROCESSOR WITH AN EFFICIENT MEANS OF EXECUTING MANY INSTRUCTIONS SIMULTANEOUSLY

[76] Inventor: Michael H. Branigin, 151 Ivy Hills Rd., Southbury, Conn. 06488

[21] Appl. No.: 184,355

[22] Filed: Jan. 21, 1994

Related U.S. Application Data

[63] Continuation of Ser. No. 448,720, Dec. 11, 1989, abandoned.

[51] Int. Cl.[6] ........................................... G06F 9/38
[52] U.S. Cl. ................ 395/375; 364/231.8; 364/261.3; 364/261.4; 364/261.5; 364/DIG. 1
[58] Field of Search ............................................. 395/375

[56] References Cited

U.S. PATENT DOCUMENTS

| | | | |
|---|---|---|---|
| H1291 | 2/1994 | Hinton et al. ........................... | 395/800 |
| 3,234,519 | 2/1966 | Scholten et al. ....................... | 340/172.5 |
| 3,287,702 | 11/1966 | Borck et al. ........................... | 340/172.5 |
| 3,308,436 | 3/1967 | Borck et al. ........................... | 340/172.5 |
| 3,346,852 | 10/1967 | Thornton et al. ....................... | 340/172.5 |
| 3,408,630 | 10/1968 | Packard et al. ......................... | 340/172.5 |
| 3,462,744 | 8/1969 | Tomasulo et al. ....................... | 340/172.5 |
| 3,553,655 | 1/1971 | Anderson et al. ....................... | 340/172.5 |
| 3,577,190 | 5/1971 | Cocke et al. ............................ | 340/172.5 |
| 3,940,741 | 2/1976 | Horikoshi et al. ....................... | 340/172.5 |
| 3,990,052 | 11/1976 | Gruner .................................... | 340/172.5 |
| 4,078,260 | 3/1978 | Chen et al. ............................. | 364/900 |
| 4,099,230 | 7/1978 | Mead ..................................... | 340/200 |
| 4,101,960 | 7/1978 | Stokes et al. ........................... | 364/200 |
| 4,128,880 | 12/1978 | Cray, Jr. ................................ | 364/200 |
| 4,155,120 | 5/1979 | Keefer et al. ........................... | 364/200 |
| 4,172,287 | 10/1979 | Kawabe et al. .......................... | 364/736 |
| 4,179,737 | 12/1979 | Kim ....................................... | 364/200 |
| 4,200,927 | 4/1980 | Hughes et al. .......................... | 364/200 |
| 4,210,960 | 7/1980 | Borgerson et al. ....................... | 364/200 |
| 4,212,060 | 7/1980 | Prey ....................................... | 364/200 |
| 4,245,327 | 1/1981 | Moriya et al. ........................... | 364/768 |
| 4,270,181 | 5/1981 | Tanakura et al. ........................ | 364/736 |
| 4,298,933 | 11/1981 | Shimokawa et al. ..................... | 364/200 |
| 4,301,443 | 11/1981 | Sternberg et al. ....................... | 340/146.3 |
| 4,373,180 | 2/1983 | Linde ...................................... | 364/200 |

(List continued on next page.)

OTHER PUBLICATIONS

Anderson, D. et al, "The IBM System/360 Model 91: Floating-Point Execution Unit", *IBM Journal*, Jan., 1967, pp. 34–53.

Birman, M. et al. "Design of a High-Speed Arithmetic Datapath," *Proceedings, 1988 ICCD*, pp. 214–216, Oct. 1988.

(List continued on next page.)

*Primary Examiner*—Parshotam S. Lall
*Assistant Examiner*—Ayni Mohamed

[57] ABSTRACT

To increase the performance of a pipelined processor executing instructions, conditional instruction execution issues and executes instructions, including but not limited to branches, before the controlling conditions may be available and makes the decision to update the destination as late as possible in the pipeline. Conditional instruction execution is further improved by a condition code mask field in instructions to choose those condition code bits to be involved in the decision; by a set condition code flag to enable or disable the setting of a condition code; by stale condition code handling to determine if the logically previous conditionally executing instruction was successful or unsuccessful in setting the condition code and to conditionally execute accordingly; by multiple condition codes so that independent instruction sequences can use condition codes in parallel; and by condition code reservation stations to capture a needed condition code as soon as it becomes available and hold that captured value until needed, thus freeing the condition code as soon as possible for use by other instructions. Moving the conditional decision from the point of instruction issue to the point of instruction completion permits branch instructions to be eliminated in many cases; permits conditionally executing instructions directly in line; permits filling the branch umbra following a delayed branch with conditionally executing instructions; and reduces the latency from condition code generation to condition code use.

12 Claims, 62 Drawing Sheets

U.S. PATENT DOCUMENTS

| | | | |
|---|---|---|---|
| 4,435,758 | 3/1984 | Lorie et al. | 364/200 |
| 4,514,804 | 4/1985 | Kimoto et al. | 364/200 |
| 4,553,203 | 11/1985 | Rau et al. | 364/200 |
| 4,589,087 | 5/1986 | Auslander et al. | 364/768 |
| 4,594,655 | 6/1986 | Hao et al. | 364/200 |
| 4,594,660 | 6/1986 | Guenthner et al. | 364/200 |
| 4,608,660 | 8/1986 | Hasebe | 364/768 |
| 4,633,386 | 12/1986 | Terepin | 364/200 |
| 4,701,842 | 10/1987 | Olnowich et al. | 364/200 |
| 4,750,112 | 6/1988 | Jones et al. | 364/200 |
| 4,773,002 | 9/1988 | Iwasaki et al. | 364/200 |
| 4,783,738 | 11/1988 | Li et al. | 364/200 |
| 4,792,893 | 12/1988 | Nakagawa et al. | 364/200 |
| 4,792,894 | 12/1988 | Artz et al. | 364/200 |
| 4,890,227 | 12/1989 | Watanabe et al. | 364/200 |
| 4,991,080 | 2/1991 | Emma et al. | 395/375 |
| 5,034,880 | 7/1991 | Fong et al. | 395/375 |
| 5,067,069 | 11/1991 | Fite et al. | 395/375 |
| 5,073,864 | 12/1991 | Methvin et al. | 364/715.11 |
| 5,081,574 | 1/1992 | Larsen et al. | 395/375 |
| 5,142,634 | 8/1992 | Fite et al. | 395/375 |

OTHER PUBLICATIONS

Censier, L. Feautrier, P. "A New Solution to Coherency Problems in Multicache Systems," *IEEE Trans. on Computers*, Dec. 1978, pp. 1112–1118.

Charlesworth, A. "An Approach to Scientific Array Processing: The Architectural Design of the AP–120B/FPS–164 Family", *Computer* Sep. 1981 pp. 18–27.

DeRosa, J. Levy, H. "An Evaluation of Branch Architectures", *Proceedings of the 14th Annual Symposium on Computer Architecture*, Aug. 1986 pp. 10–16.

Dubois, M. Scheurich, C. Briggs, F. "Synchronization, Coherence, and Event Ordering in Multiprocessors", *Computer*, Mar. 1988, pp. 9–21.

Gilder, G. *Microcosm: The Quantum Revolution in Economics and Technology*, "Excerpt From," *Electronics Business*, Sep. 4, 1989, pp. 44–48.

Hwang, K. Xu, Z. "Multipipelined Networking for Fast Execution of Compound Functions", *Proc. of the 1986 Int'l Conf on Parallel Proc.* Aug. 1986, pp. 495–502.

Jegou, Y. Seznec, A. "Data Synchronized Pipelined Architecture: Pipelining in Multi–Processor Environments", *Proceedings of the 1986 Int'l conf. on Parallel Processing*, Aug. 1986, pp. 487–494.

Katevenis, M. *Reduced Instruction Set Computer Architectures for VLSI*, Report No. UCB/CSD 83/141, Univ. of California, Berkeley, Calif. Oct. 1983.

Lee, J. Smith, A. J. "Branch Prediction Strategies and Branch Target Buffer Design", *Computer*, Jan. 1984, pp. 6–22.

MacDougall, M. "Instruction–Level Program and Processor Modeling", *Computer*, Jul., 1984, pp. 14–24.

McFarling, S. Hennessy, J. "Reducing the Cost of Branches", *Proc. of the 13th Int'l Sympos. on Computer Architecture*, Tokyo, Japan, Jun. 1986 pp. 396–403.

McNamara, M. Schlanker, M. "The Cydra 5 Computer System Architecture", *Proceedings of the 1988 Int'l Conf. on Computer Design (ICCD)*, Oct., 1988, pp. 302–306.

*Technical Summary*, Multiflow Computer Inc., 1987.

Pleszkun, A. et al. "WISQ: A Restartable Architecture Using Queues" *Proceedings of the 14th Annual Int'l Symposium on Computer Architecture*, Jun. 1987, pp. 290–299.

Pleszkun, A. Sohi, G. "The Performance Potential of Multiple Functional Unit Processors", *Proceedings of the 15th Int'l Symposium on Computer Architecture*, May, 1988, pp. 37–44.

Ramarakrishna, R. et al. "The Cydra 5 Departmental Supercomputer: Design, Philosophies, Decisions and Trade–offs", *Computer*, Jan. 1989, pp. 12–35.

Serlin, O. "The Serlin Report on Parallel Processing", Issue No. 7, Dec. 4, 1987, pp. 1–9.

Smith, J. E. "Dynamic Instruction Scheduling and the Astronautics ZS–1", *Computer*, Jul. 1989, pp. 21–35.

Sohi, G. Vajapeyam, S. "Instruction Issue Logic for High Peformance Interruptable Pipeline Processors", *Proceedings of the 14th Int'l Symposium on Computer Architecture*, Jun. 1988, pp. 27–34.

Uht, A. Wedig, R. "Hardware Extraction of Low–Level Concurrency From Serial Instruction Streams", *Proceedings of the 1986 Conf. on Parallel Processing*, Aug. 1986, pp. 729–736.

Weiss, S. Smith, J. E. "Instruction Issue Logic in Pipelined Supercomputers", *IEEE Transactions on Computers*, vol. C–33, No. 11, Nov. 1984, pp. 1013–1022.

Young, H. "Evaluation of a Decoupled Computer Architecture and the Design of a Vector Extension", Ph.D. Thesis, University of Wisconsin–Madison, May 1985.

Young, H. Goodman, J. "The Design of a Queue–Based Vector Supercomputer", *Proceedings of the 1986 Int'l Conf. on Parallel Processing*, Aug. 1986, pp. 483–486.

Dijkstra, E. "Guarded Commands, Nondeterminacy and Formal Derivation of Programs", *Communications of the ACM*, vol. 18, Aug. 1975, pp. 453–457.

Hsu, P. Davidson, E. "Highly Concurrent Scalar Processing", *Proceedings of the 13th Annual Symposium on Computer Architecture*, pp. 386–395.

Labrousse, J. Slavenburg, G. "Create–Life: A Design System for High Performance VLSI Circuits", *Proceedings of the 1988 IEEE Int'l Conference on Computer Design*, Oct. 1988, pp. 356–360.

IBM System/370 Extended Architecture, Principles of Operation, Pub. No. SA22–7085–0, Mar. 1983.

Amdahl, G. "The Validity of the Single–Processor Approach to Achieving Large–Scale Computing Capabilities", *Proceedings, AFIPS Spring Joint Computer Conference*, Apr. 1967, pp. 483–485.

PERFORMANCE CAPACITY, THE GOAL

Perf = N·I·C

Perf = Performance Capacity,
OPERATIONS/SECOND

BASIC MULTI-FUNCTIONAL UNIT PROCESSOR

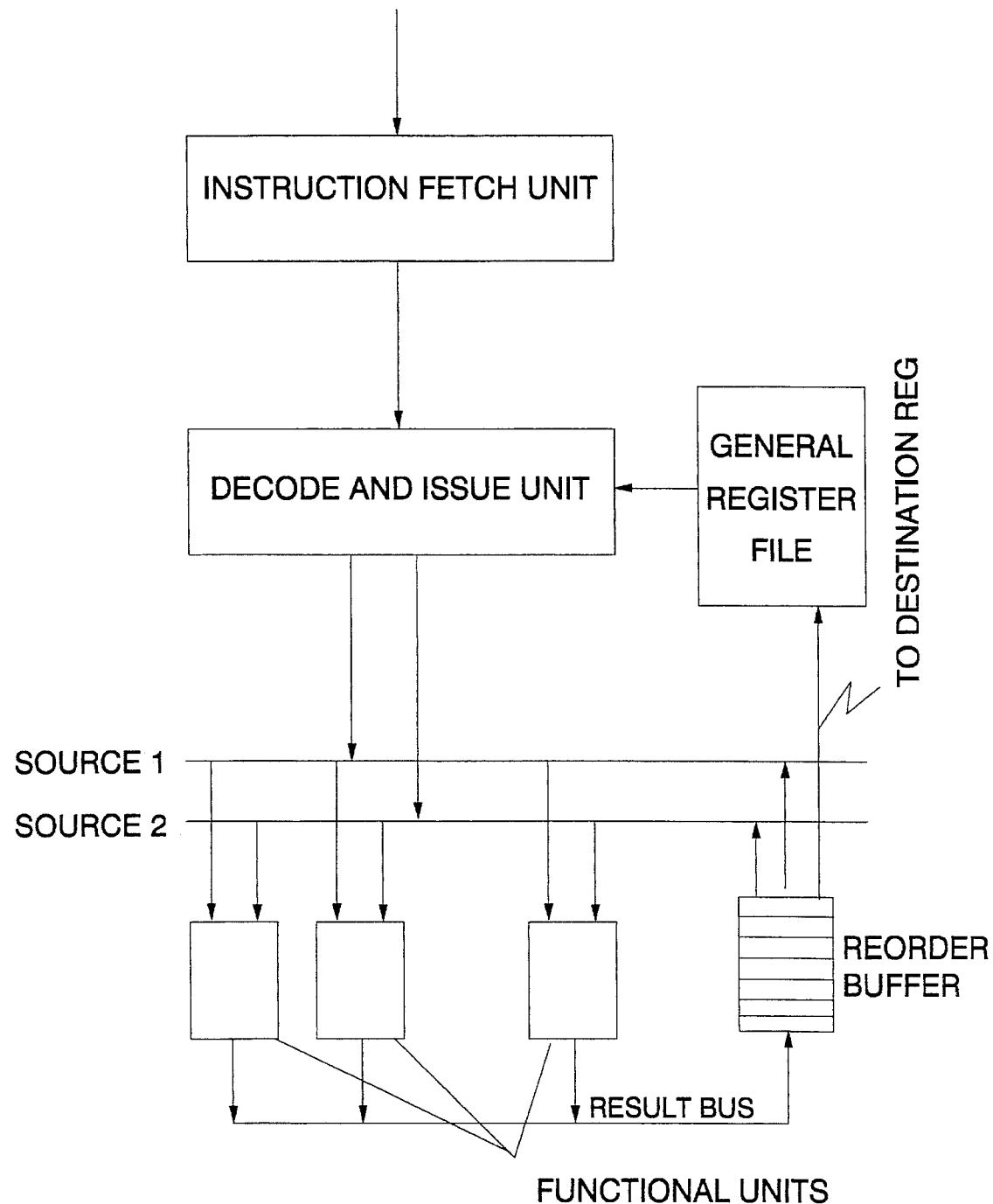
Figure 3. Prior Art,
WISQ PROCESSOR ARCHITECTURE

Figure 4. Prior Art,
PROCESSOR WITH SCOREBOARDING
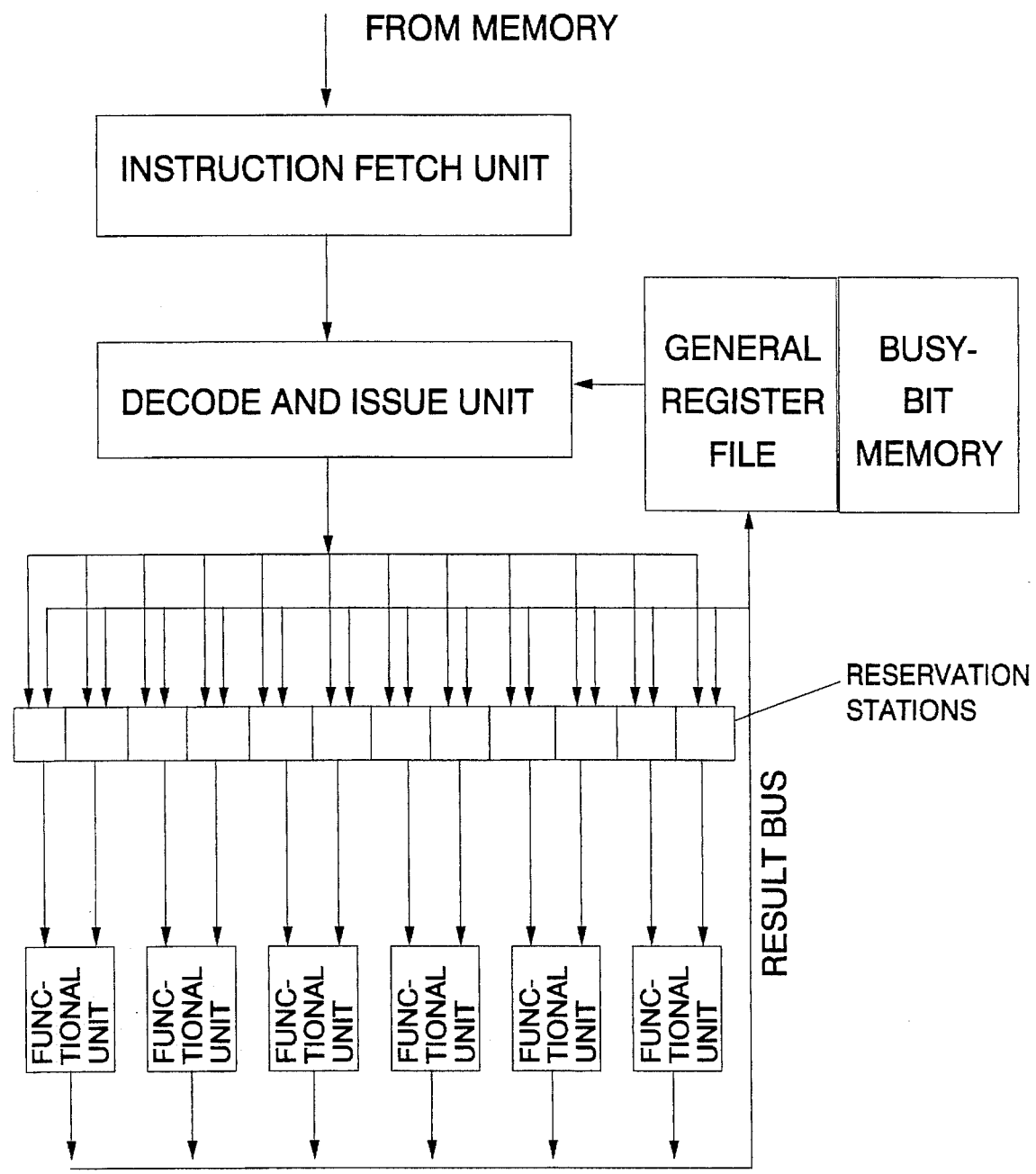

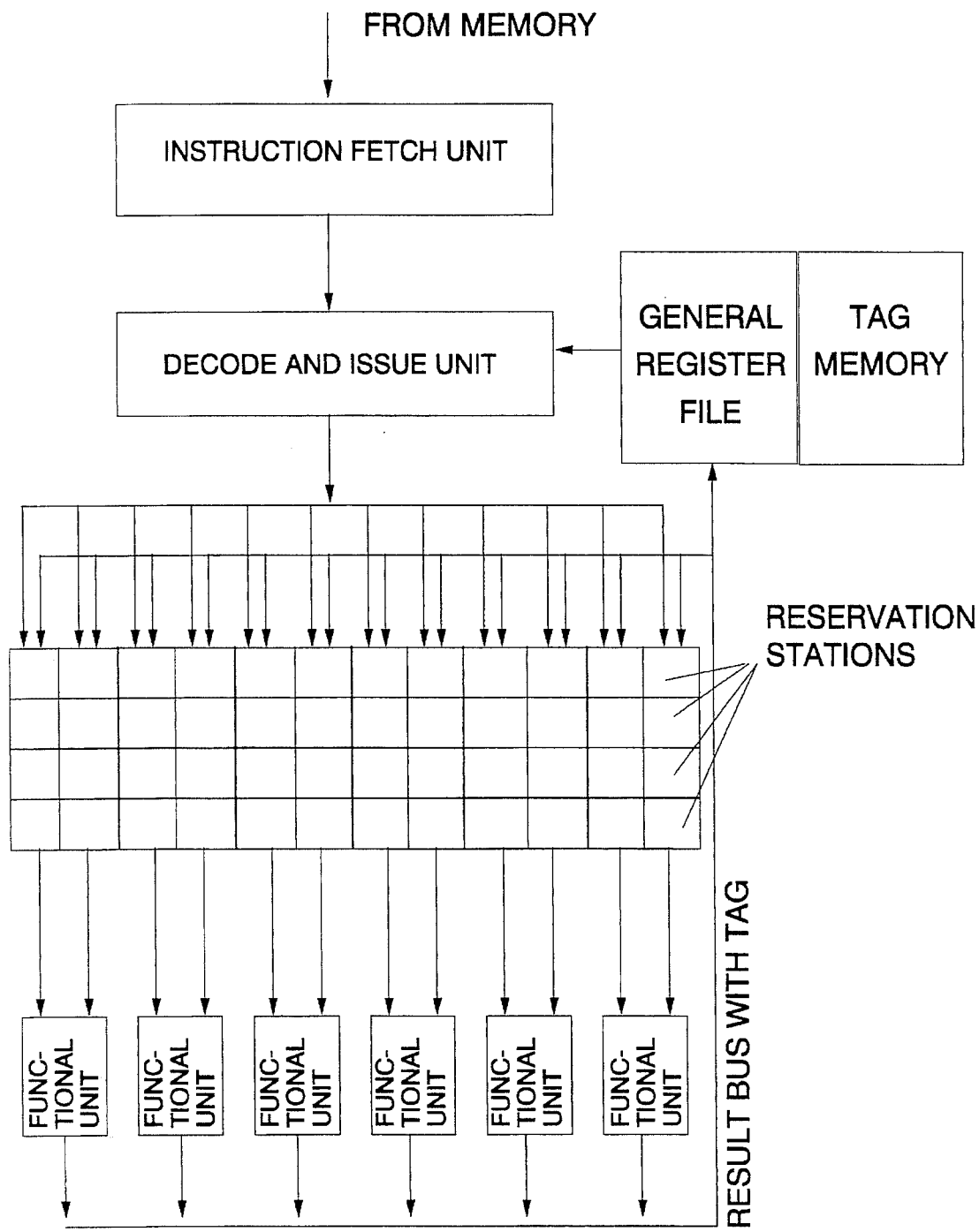

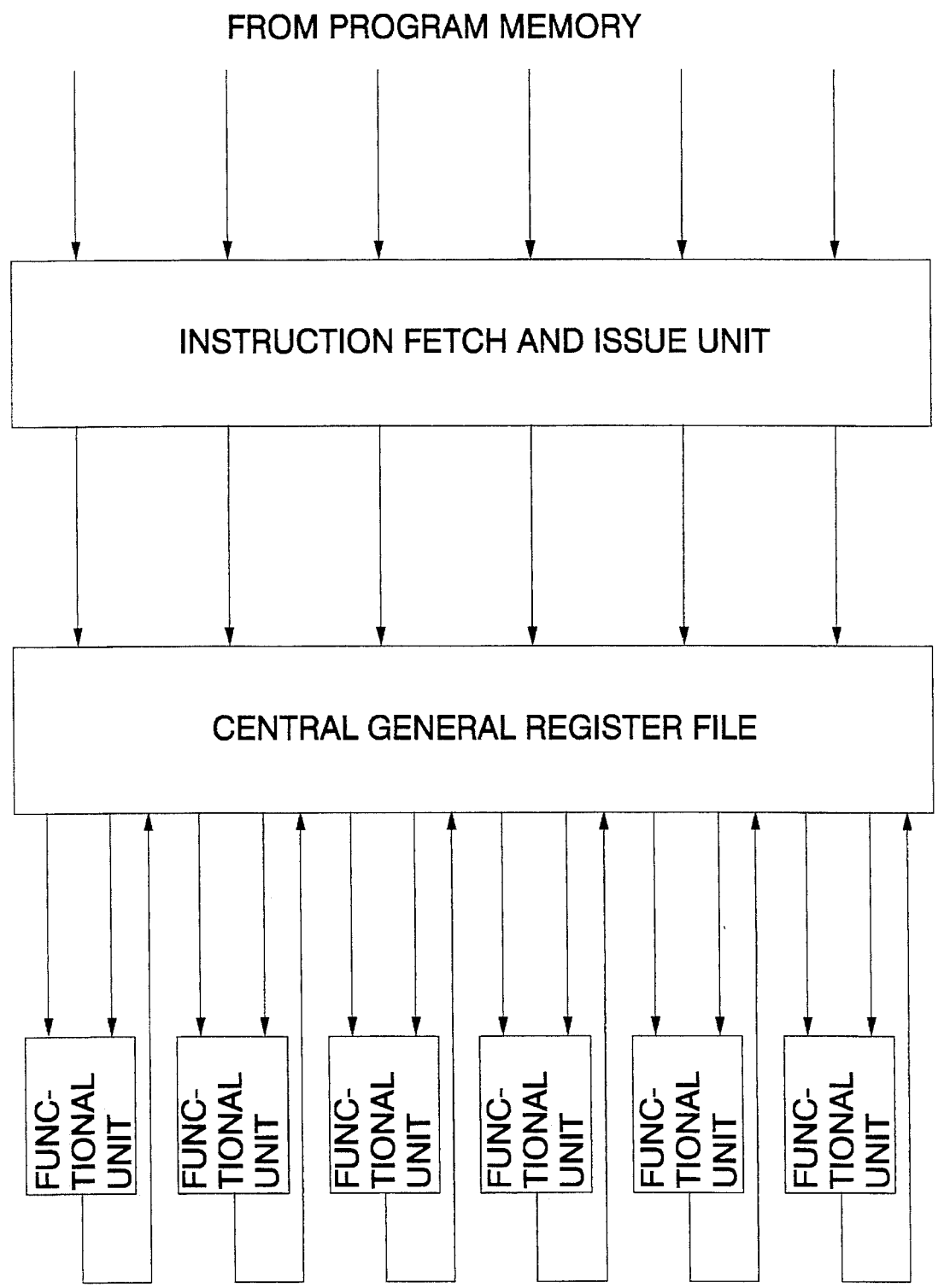
Figure 6a. Prior Art,
CENTRAL REGISTER VLIW PROCESSOR

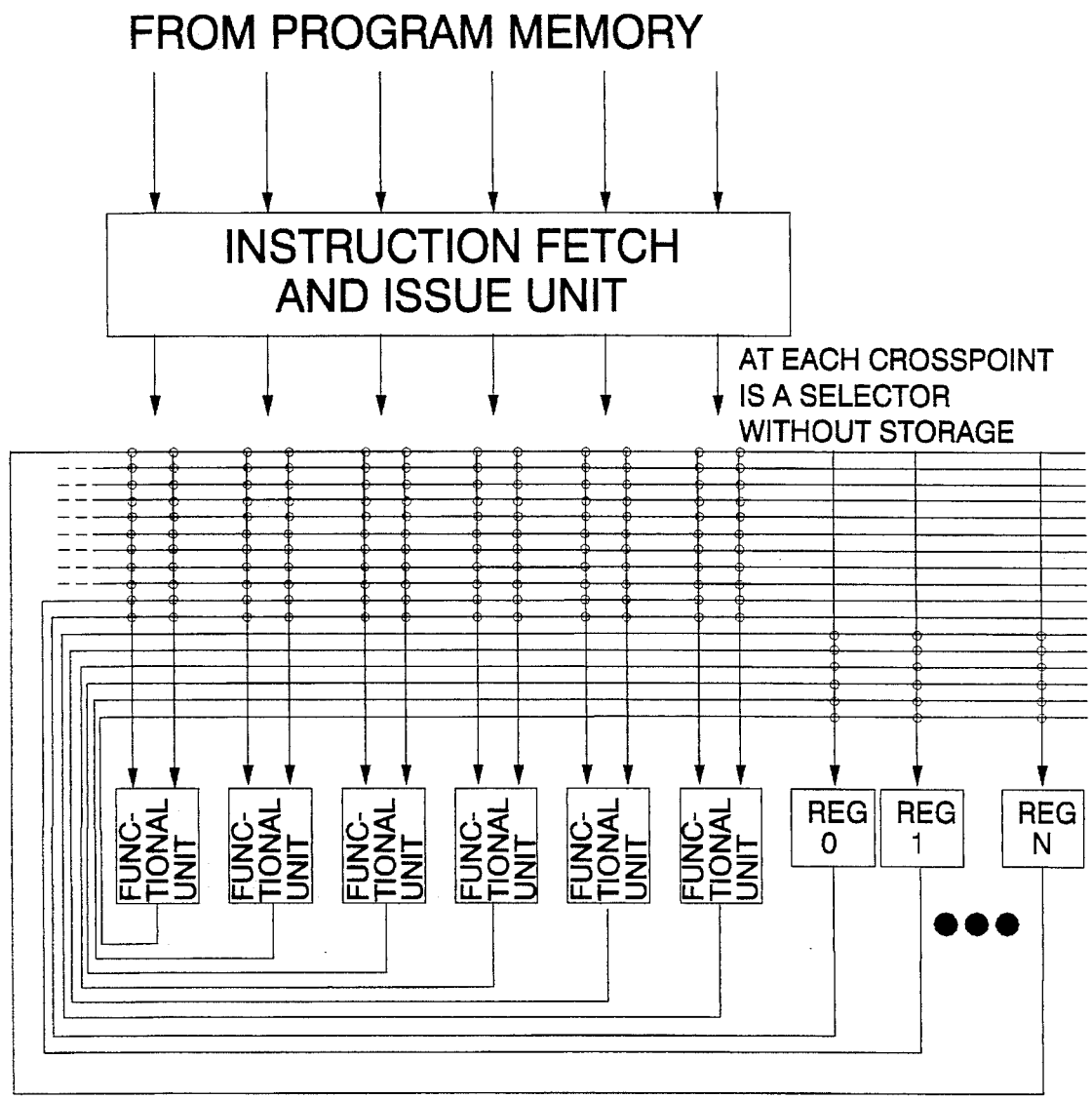
Figure 6b. Prior Art, CENTRAL REGISTER VLIW PROCESSOR

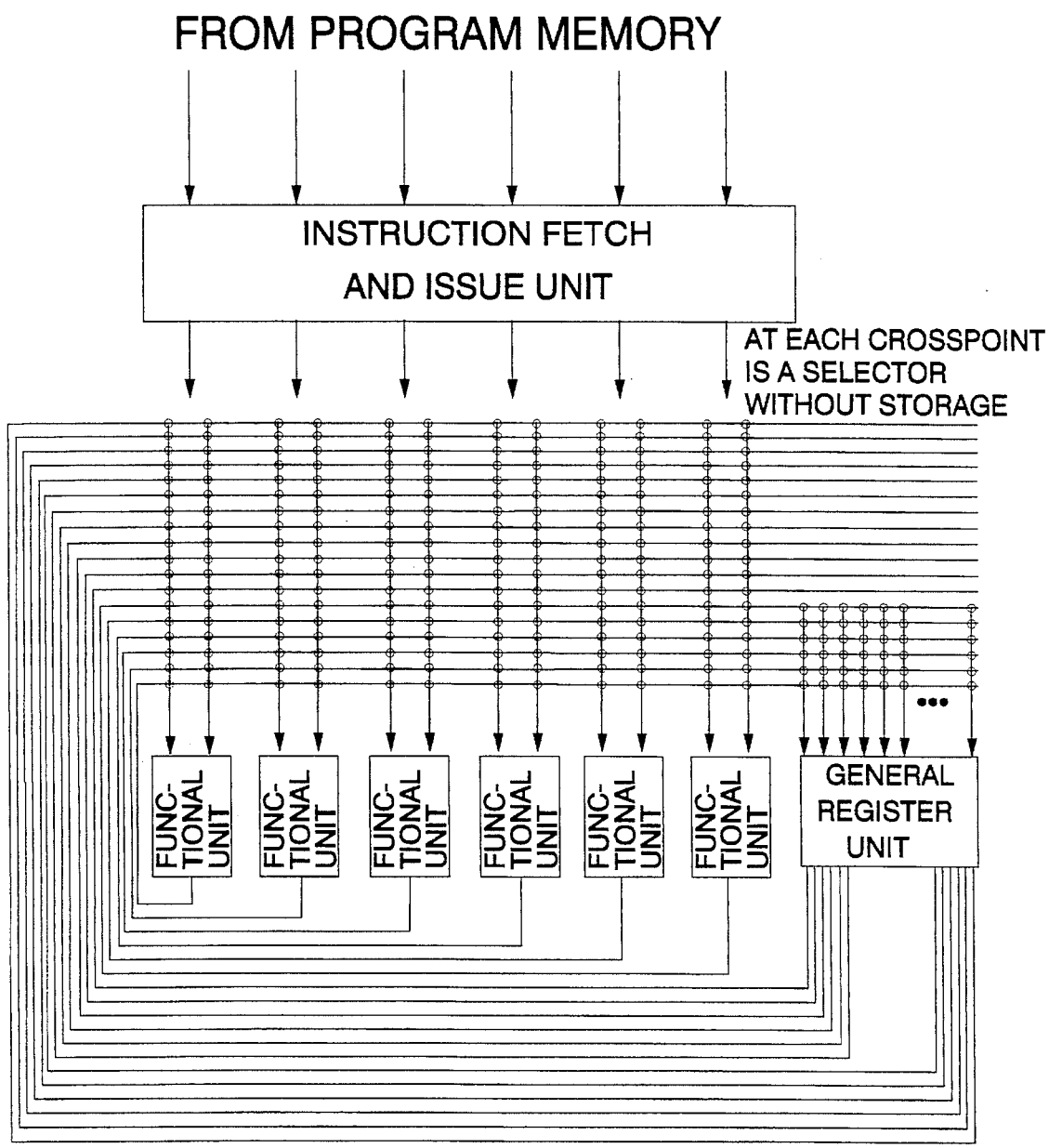
Figure 7. Prior Art, CROSSBAR NETWORK PROCESSOR

Figure 8a. Prior Art,
REGISTERED CROSSBAR NETWORK PROCESSOR
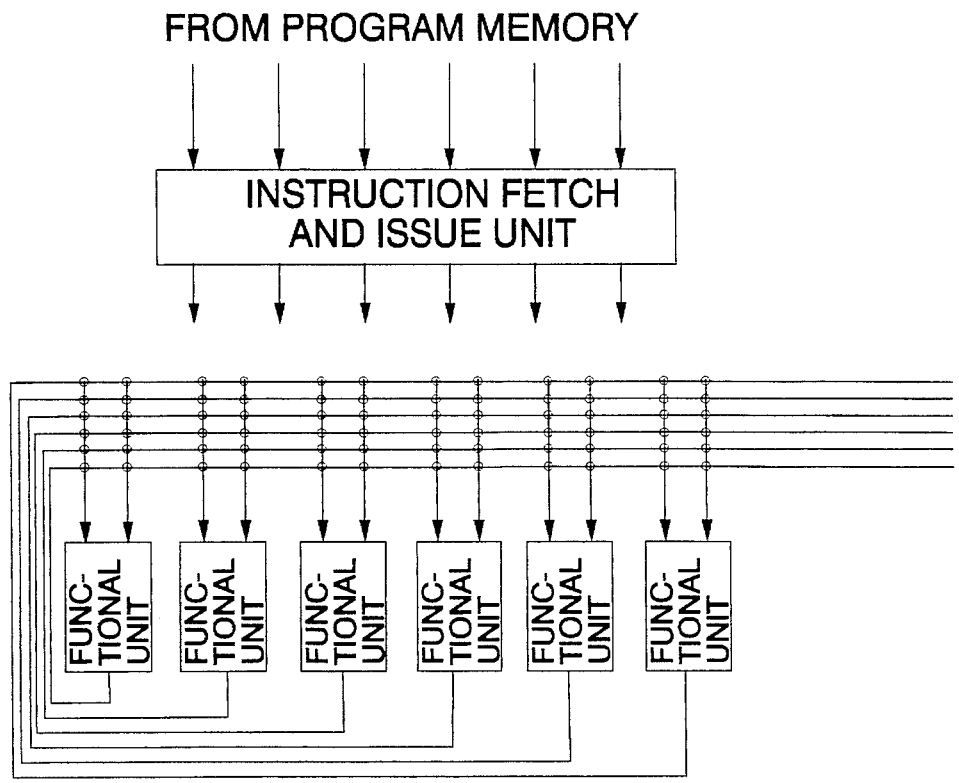
Figure 8b. Prior Art,
EACH CROSSPOINT OF A
REGISTERED CROSSBAR NETWORK PROCESSOR
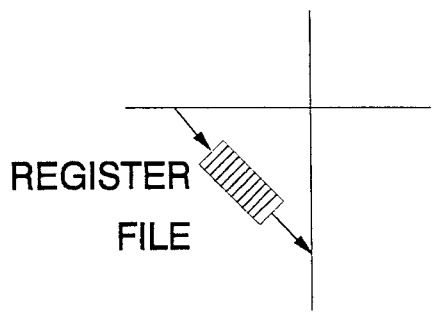

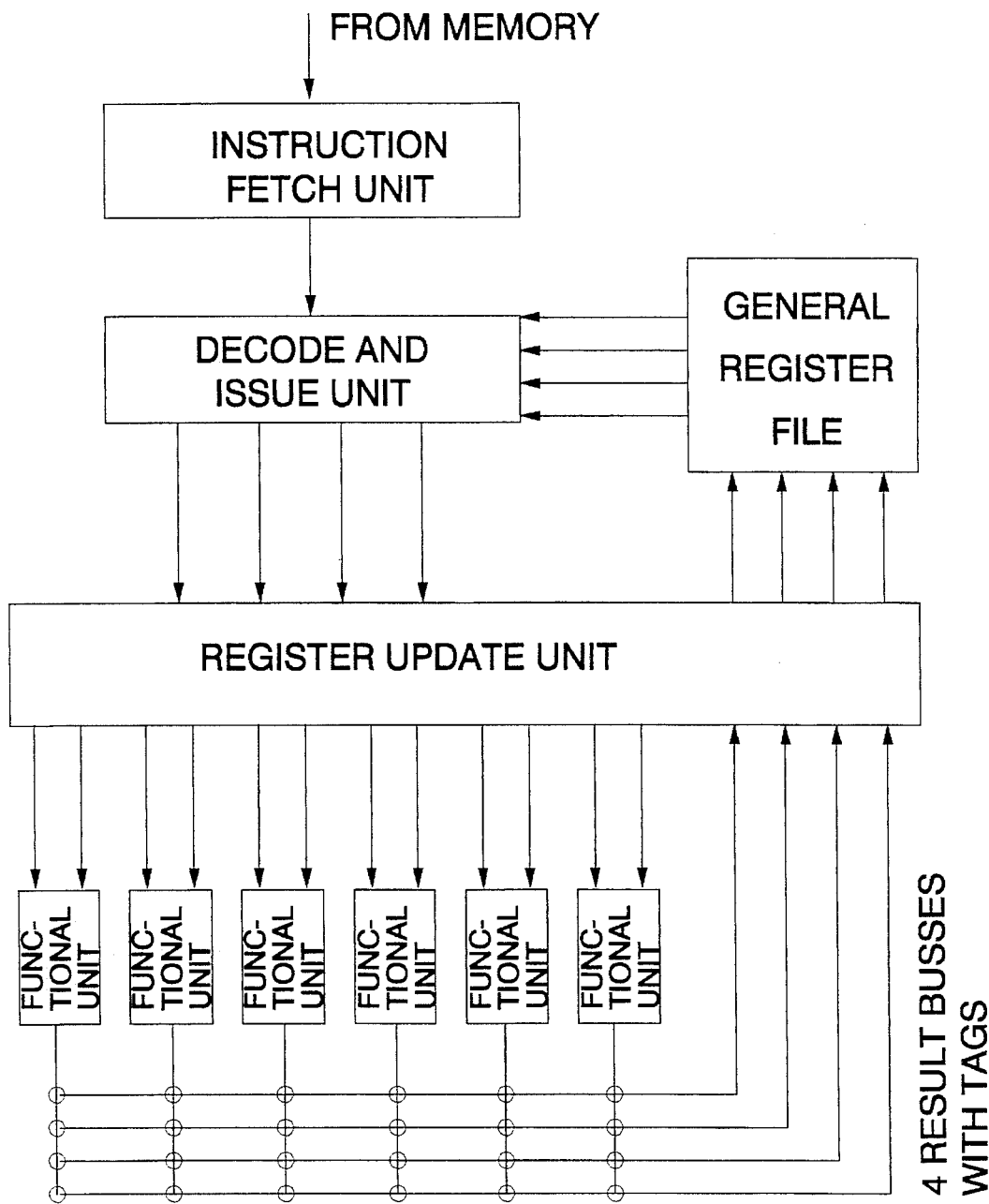
Figure 9a. Prior Art,
PROCESSOR WITH REGISTER UPDATE UNIT

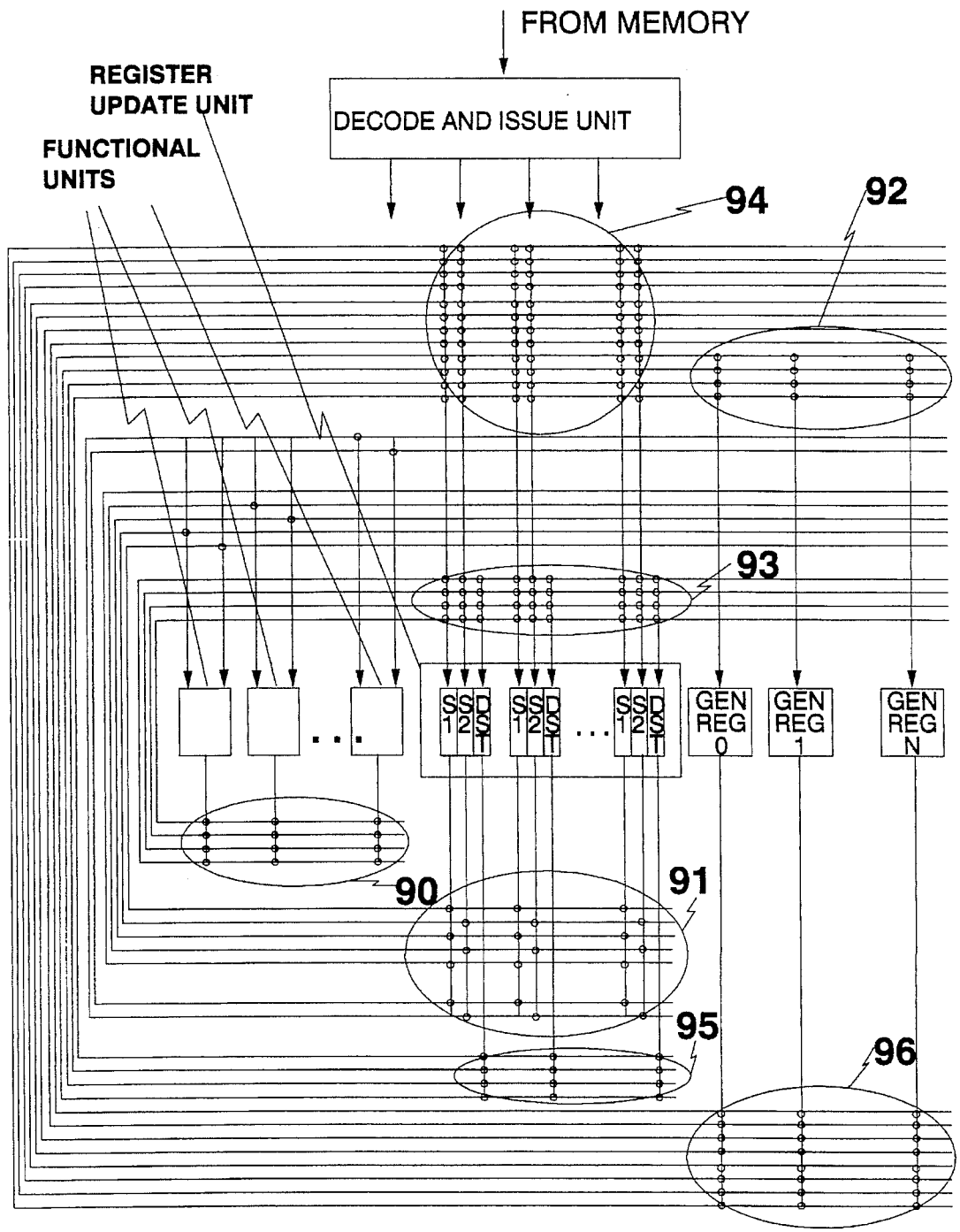
Figure 9b. Prior Art,
Processor with Register Update Unit

Data Synchronized Pipelined Architecture

Each Crosspoint of Figure 10a

FIFO FILE

Figure 11a. Prior Art, QVC Processor Architecture
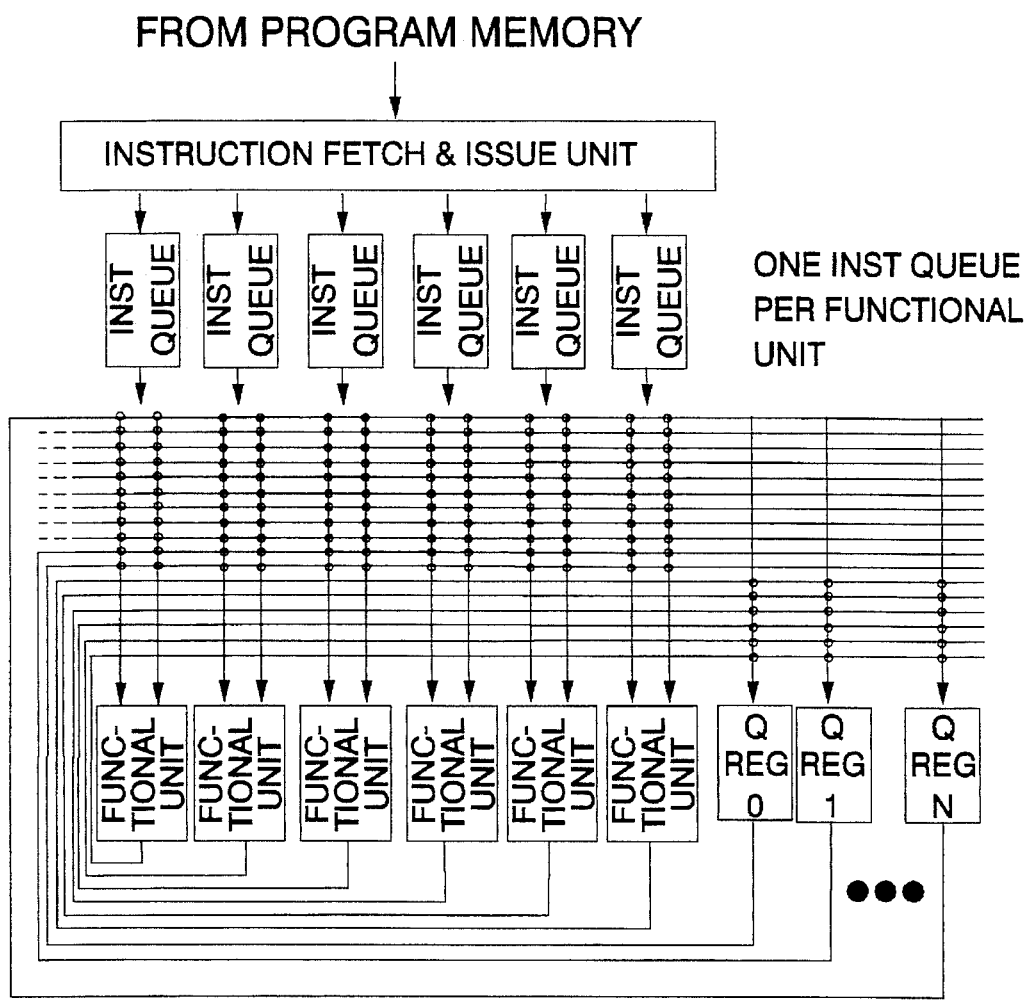
Figure 11b. Prior Art, Queue Register of Figure 11a
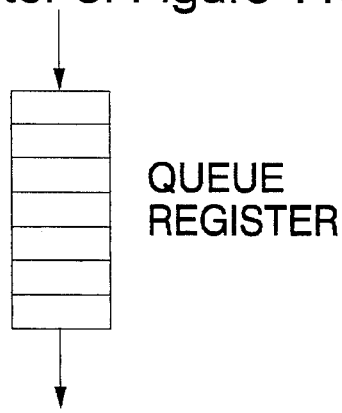

Figure 12. Prior Art, Mapping to Systolic Pipeline
Program
```
DO 10  k = 1, Loop, 2
    X(i) = X(k) - V(k)*X(k-1) - V(k+1)*X(k+1)
       i = i + 1
10 CONTINUE
```
Program Graph
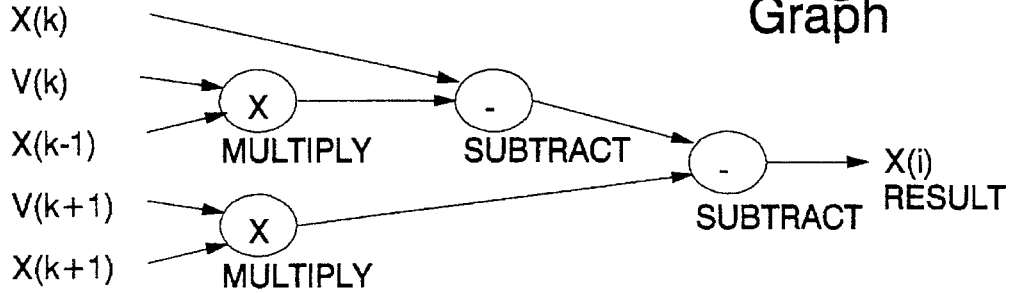
Systolic Pipeline Network
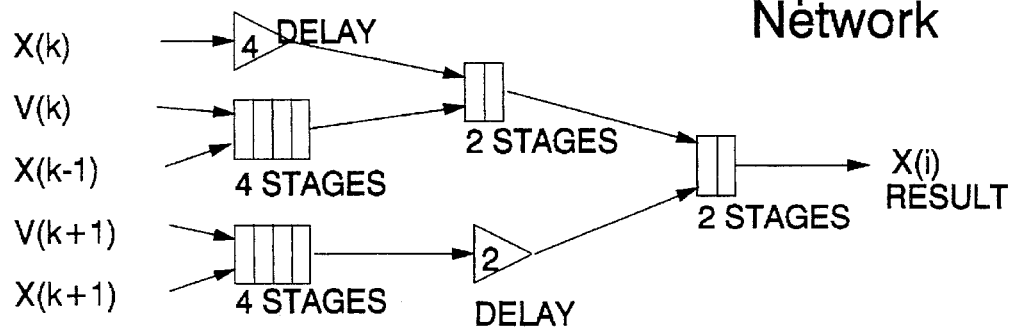
Network Implementation
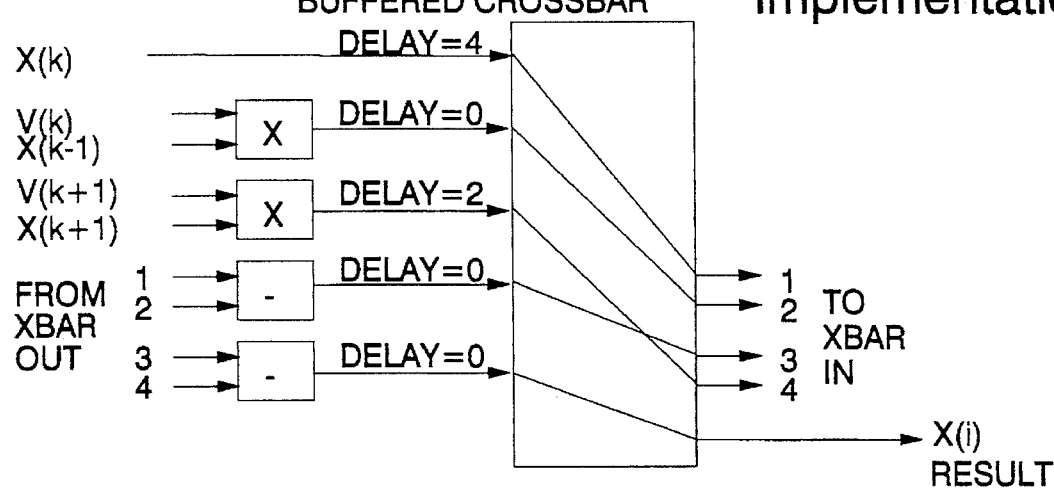

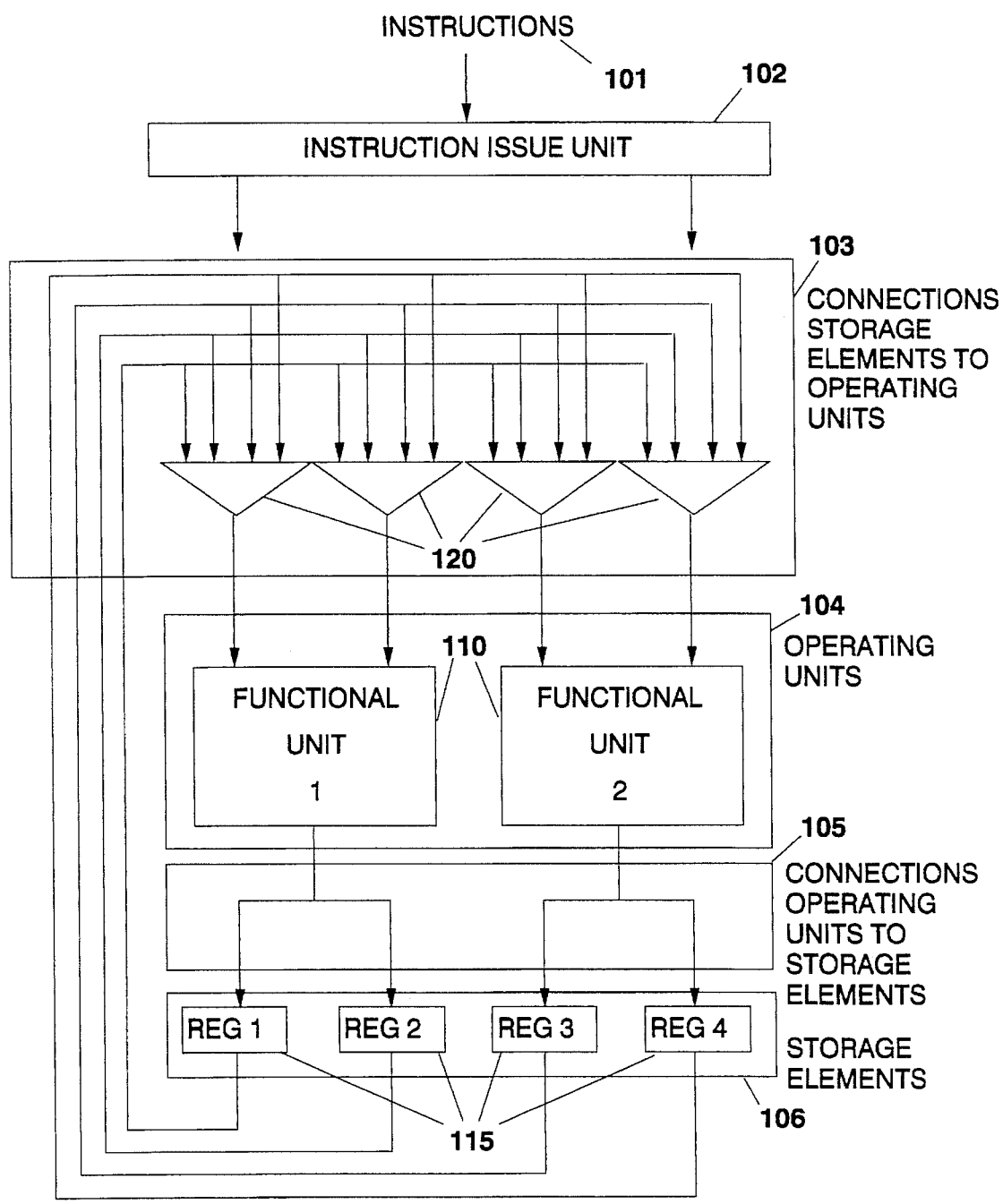
Figure 13a. Invention, Dedicated Result Storage

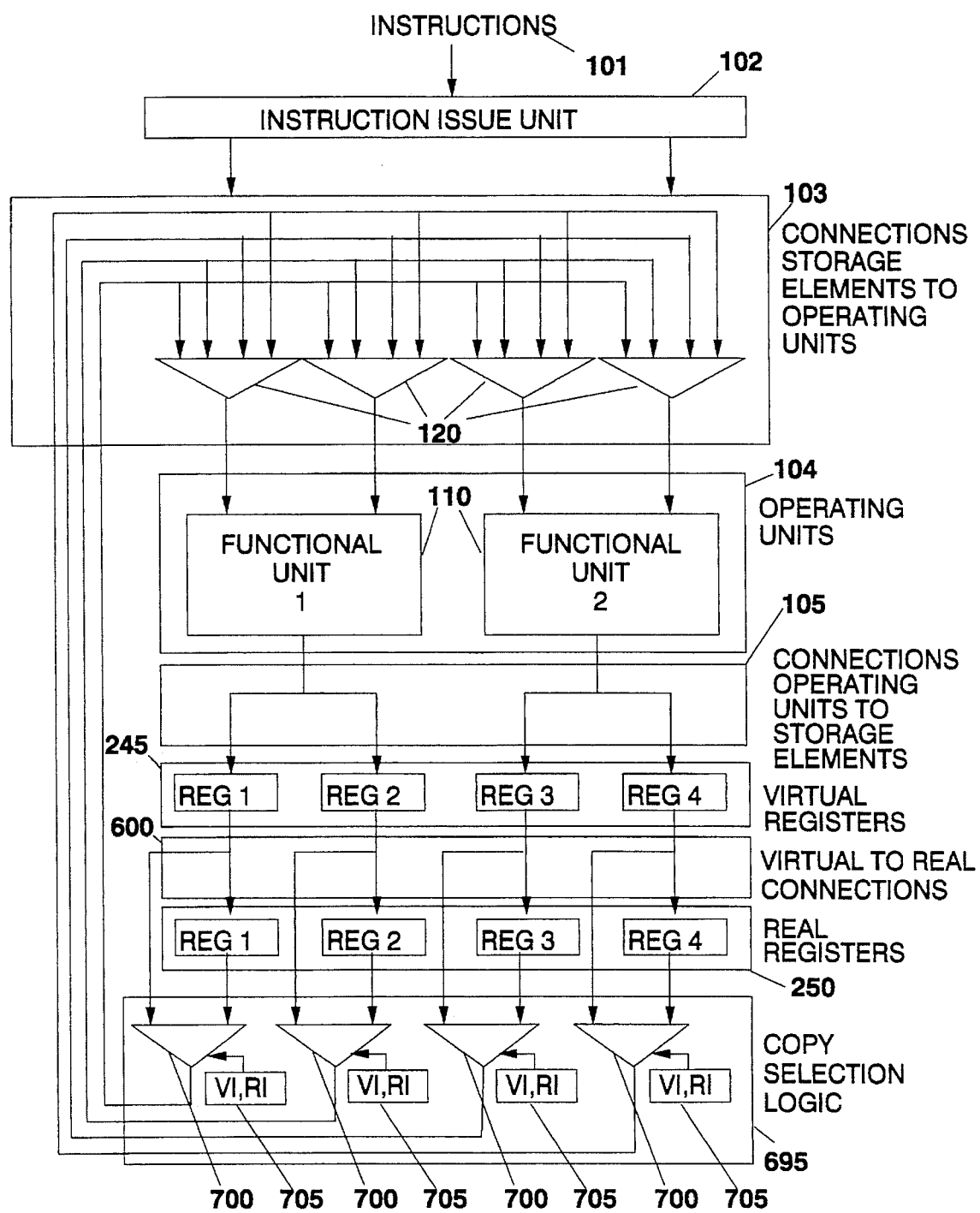
Figure 13b. Invention, Storage Copy Selection

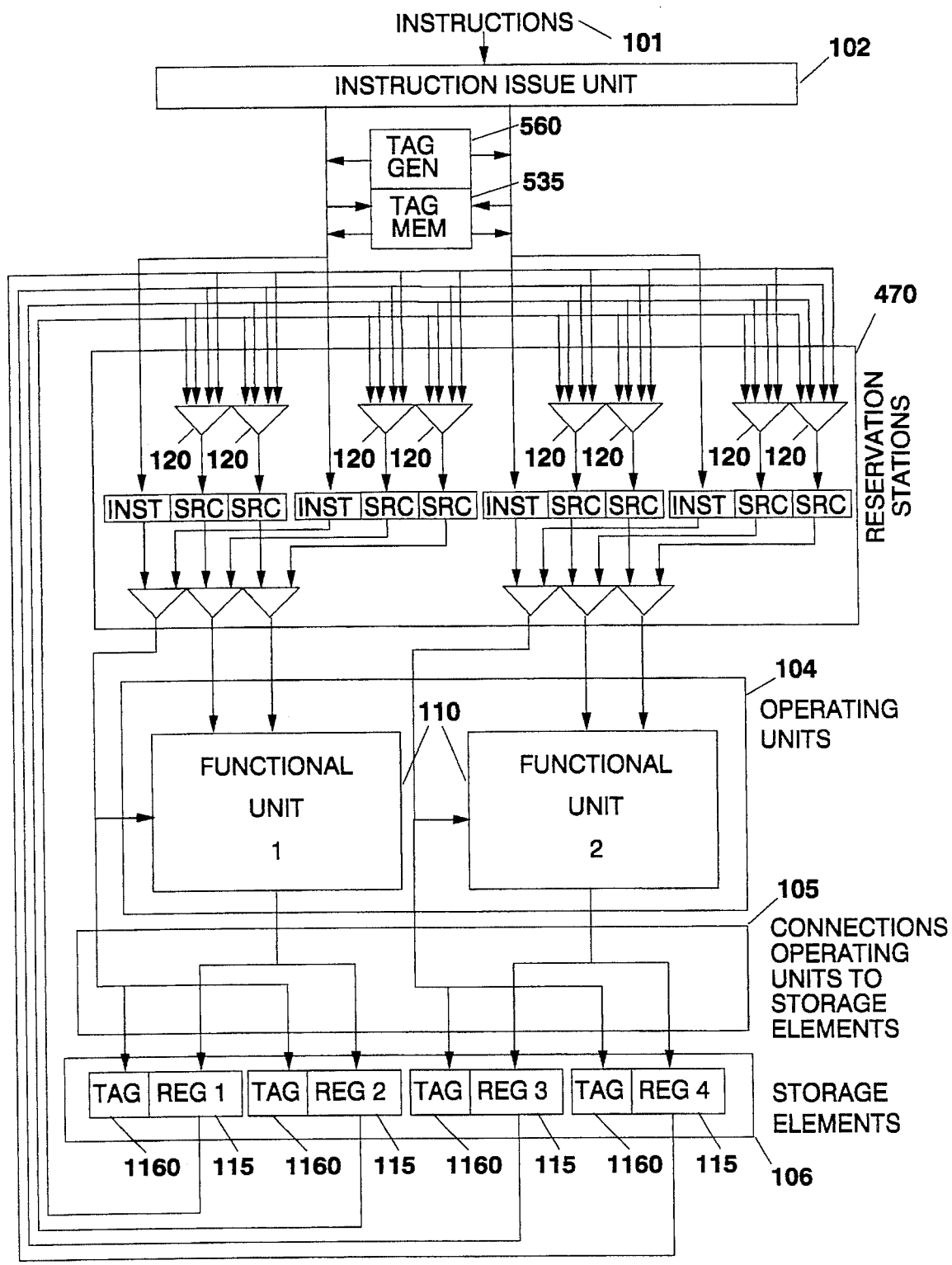
Figure 13c. Invention, Reservation Station Scheduling

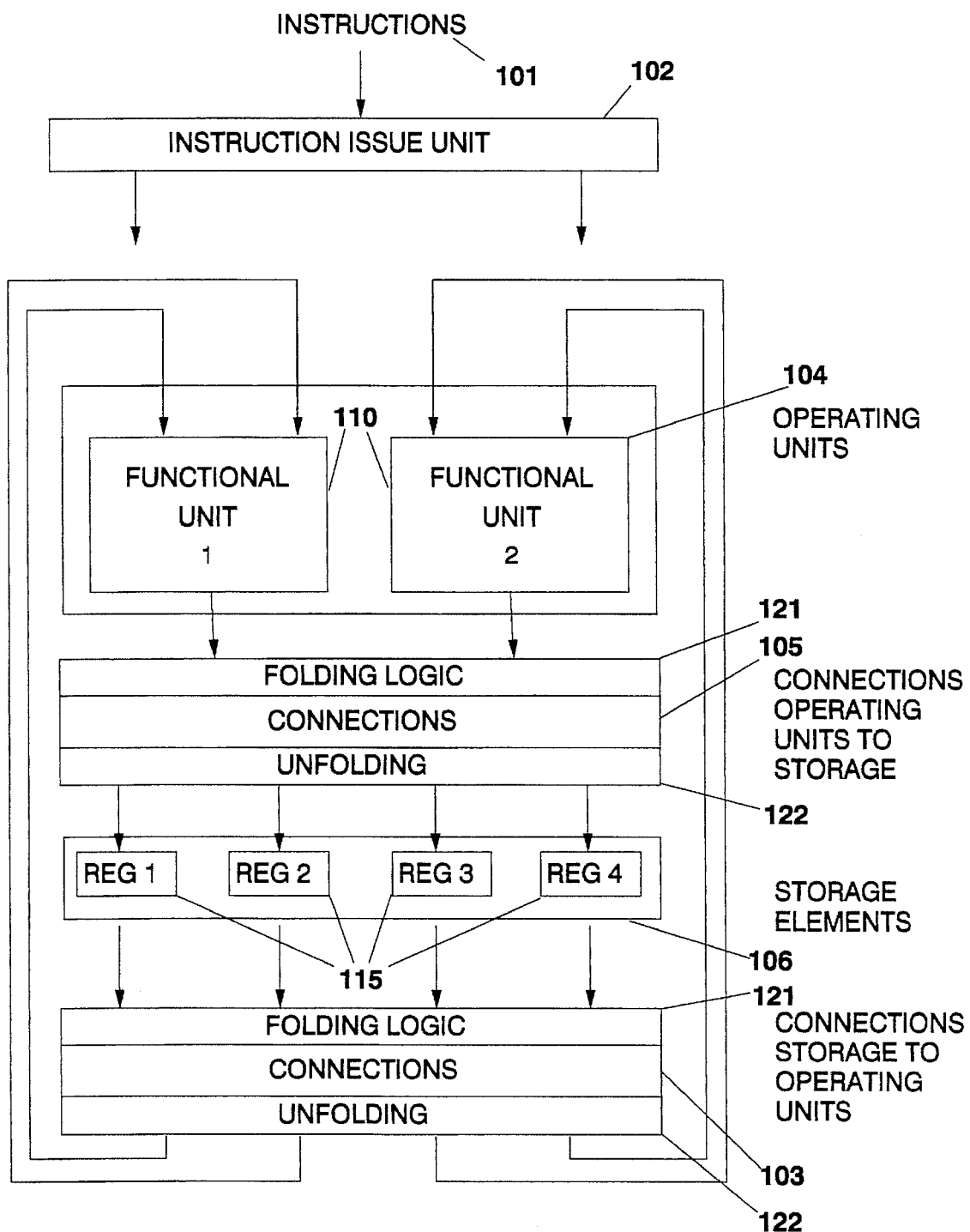
Figure 14a. Invention, Folded Connections

Figure 14b. Invention, FOLDED CONNECTIONS DETAILS
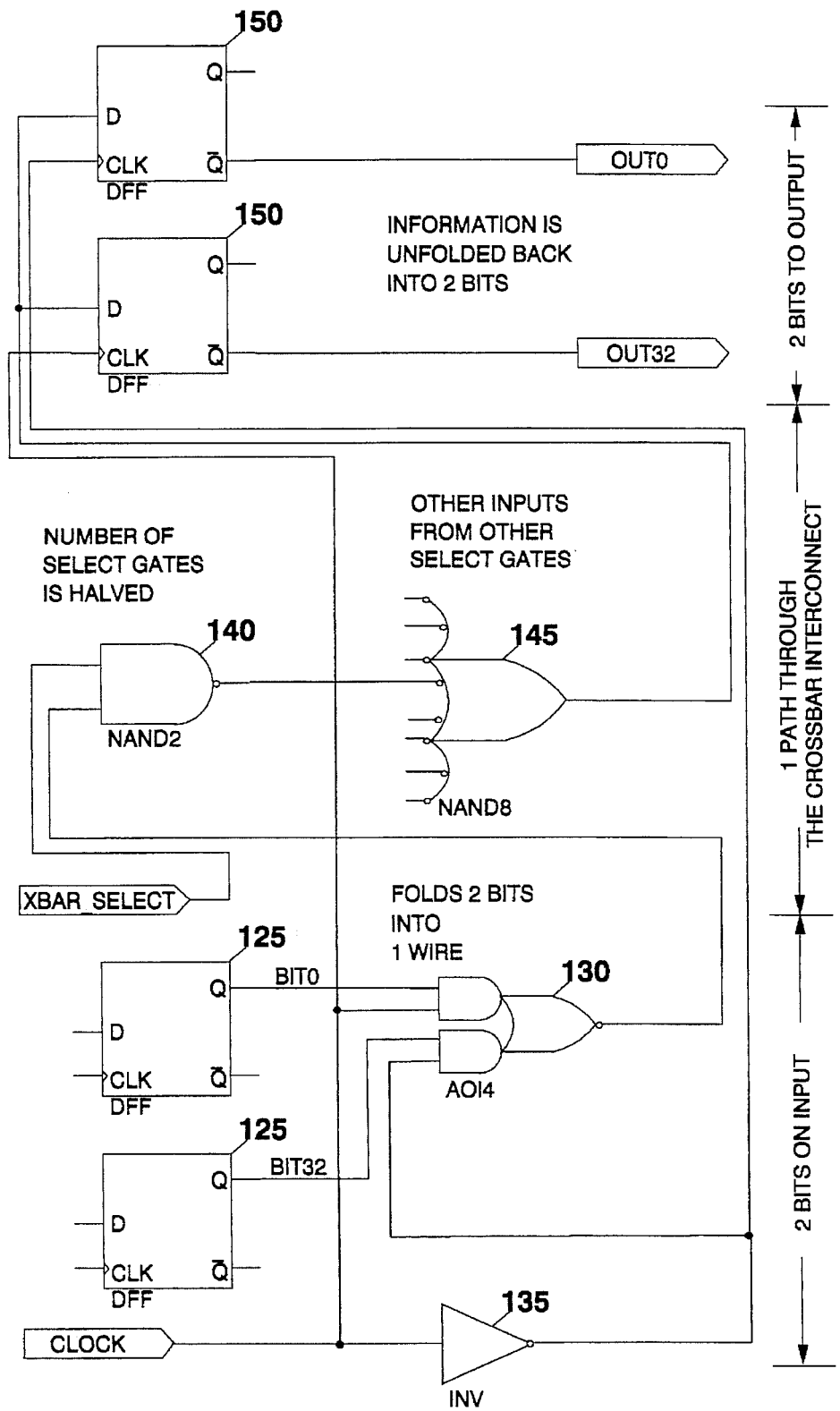

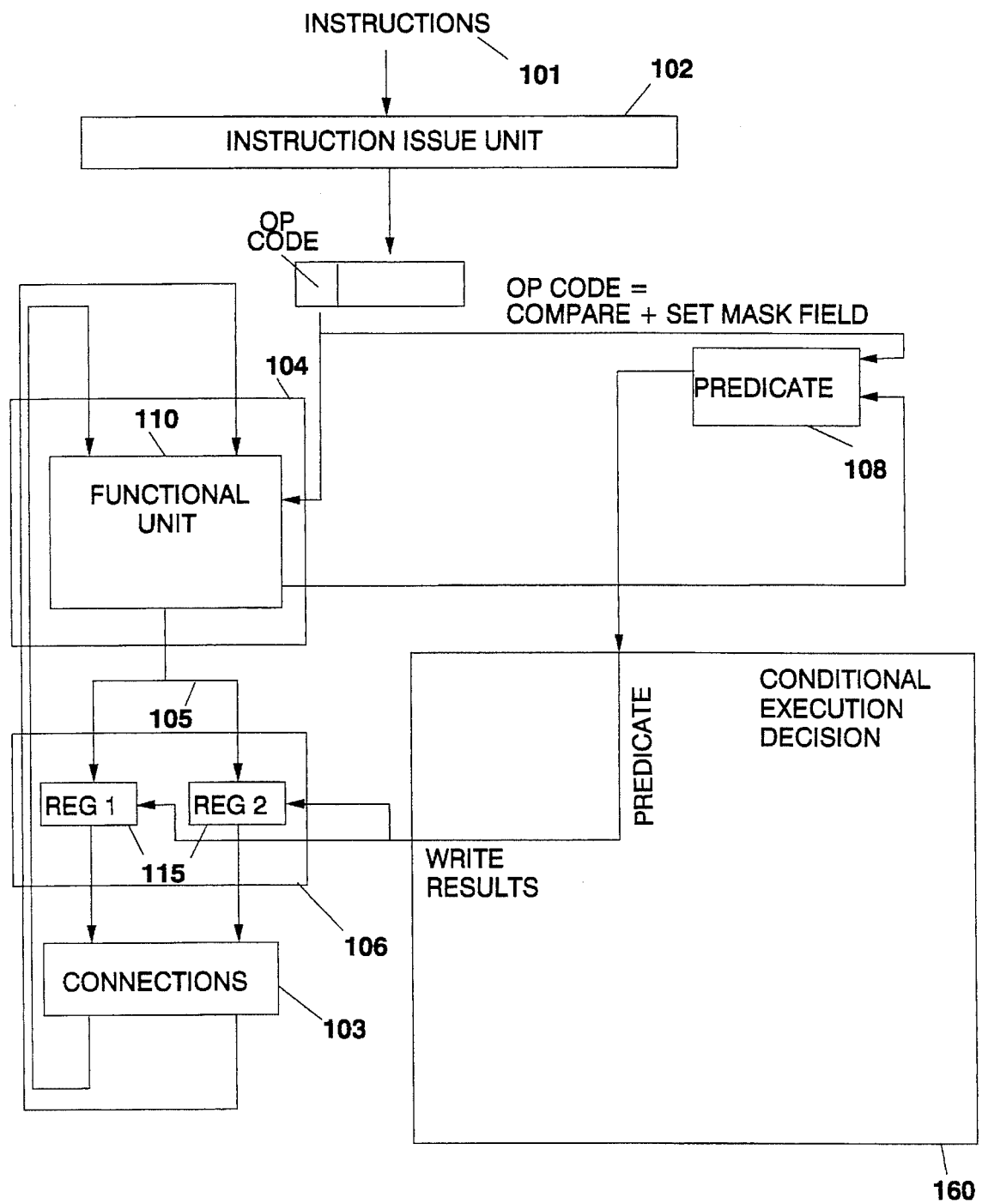
Figure 15a. Invention, Conditional Execution

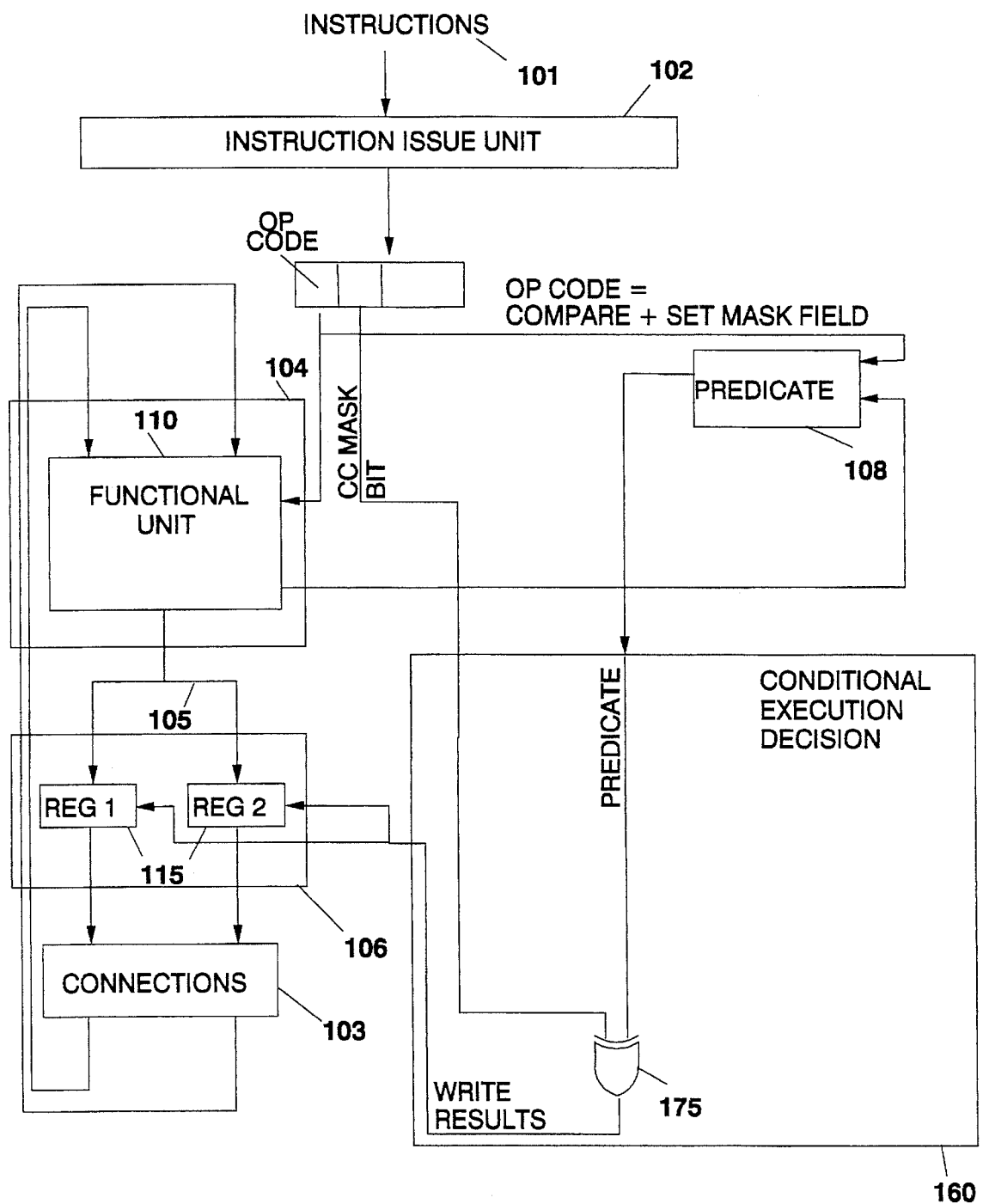
Figure 15b. Invention, CC Mask Field

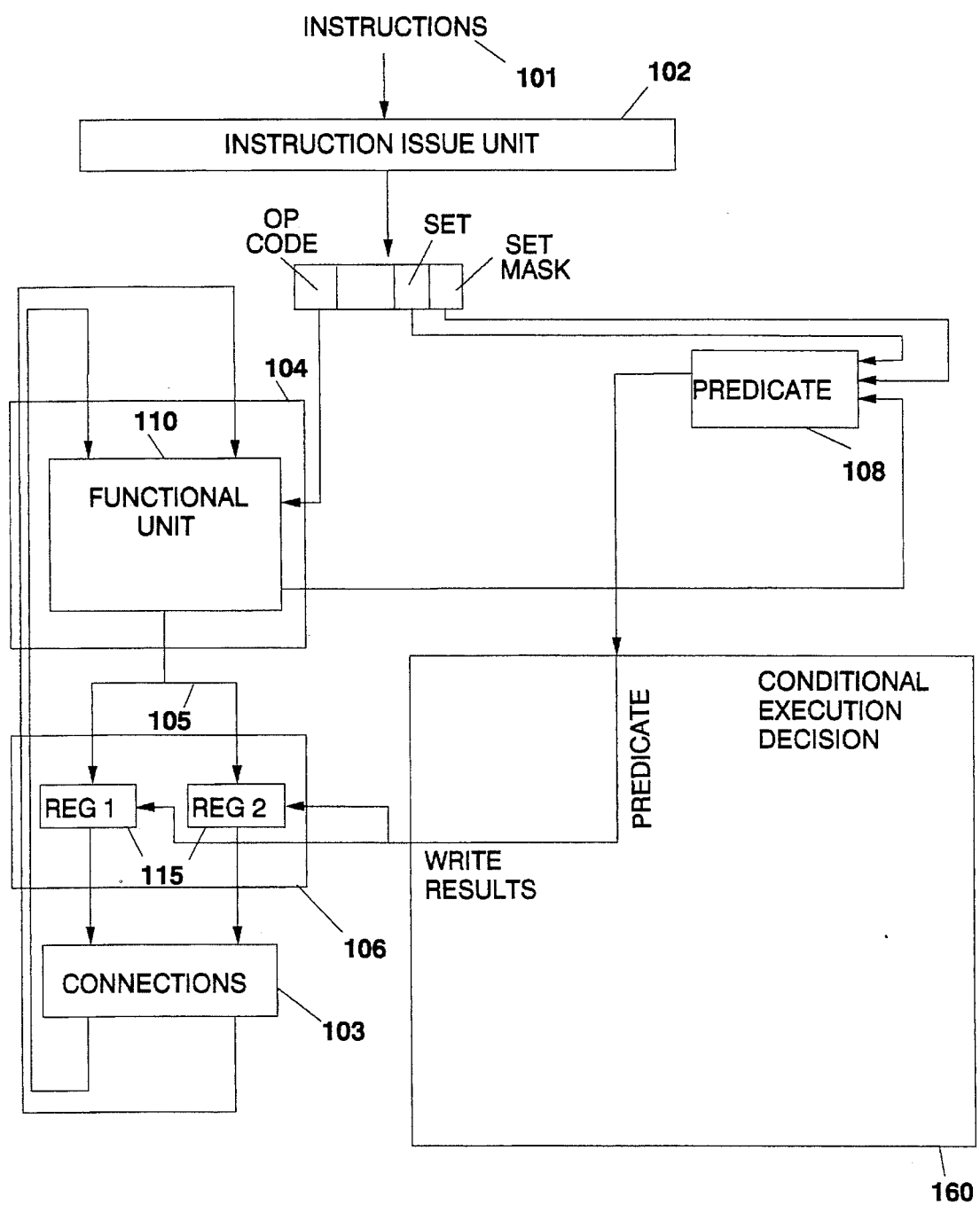
Figure 15c. Invention, Set CC Field

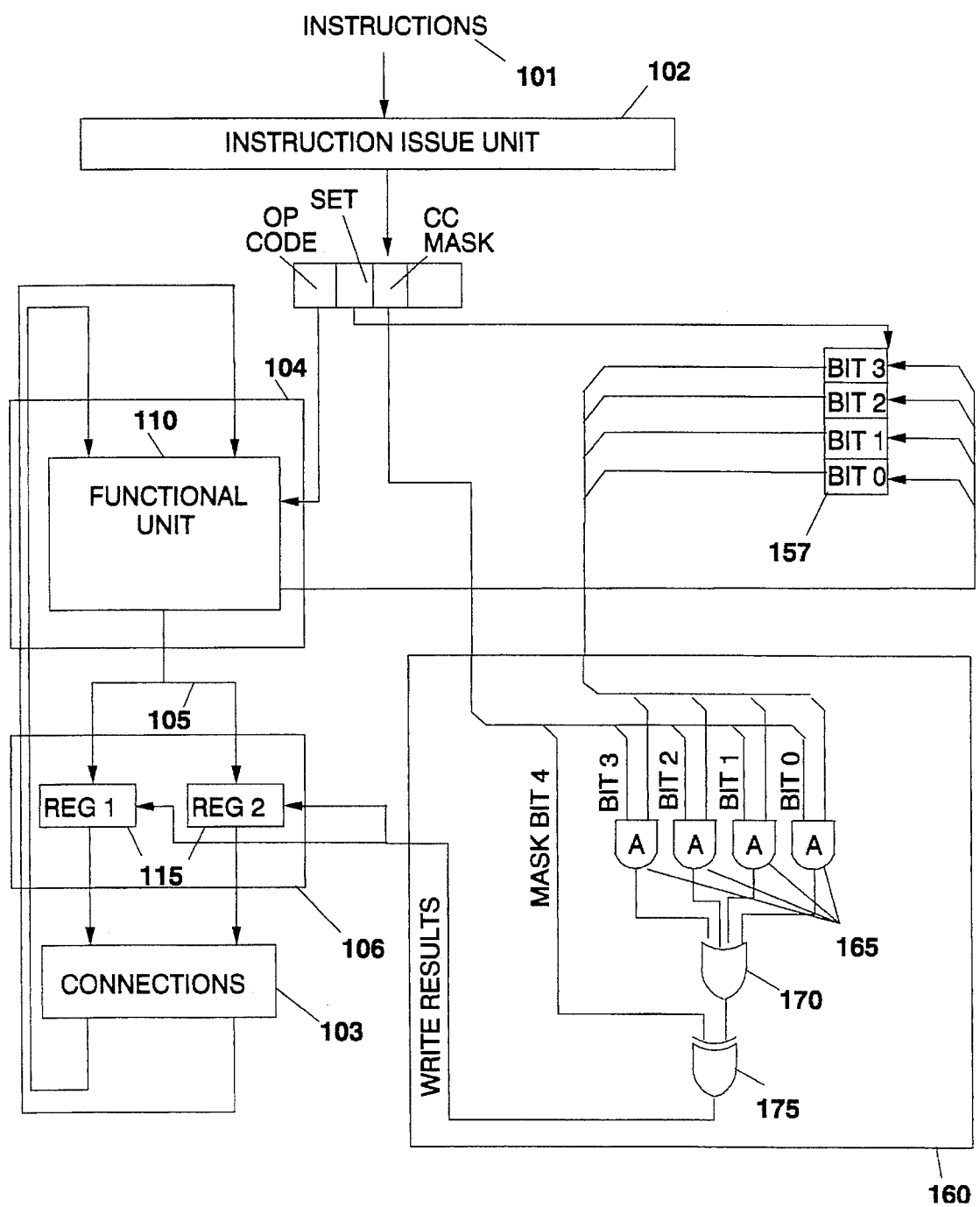
Figure 15d. Invention, Conditional Execution with CC Mask Field & Set CC Field

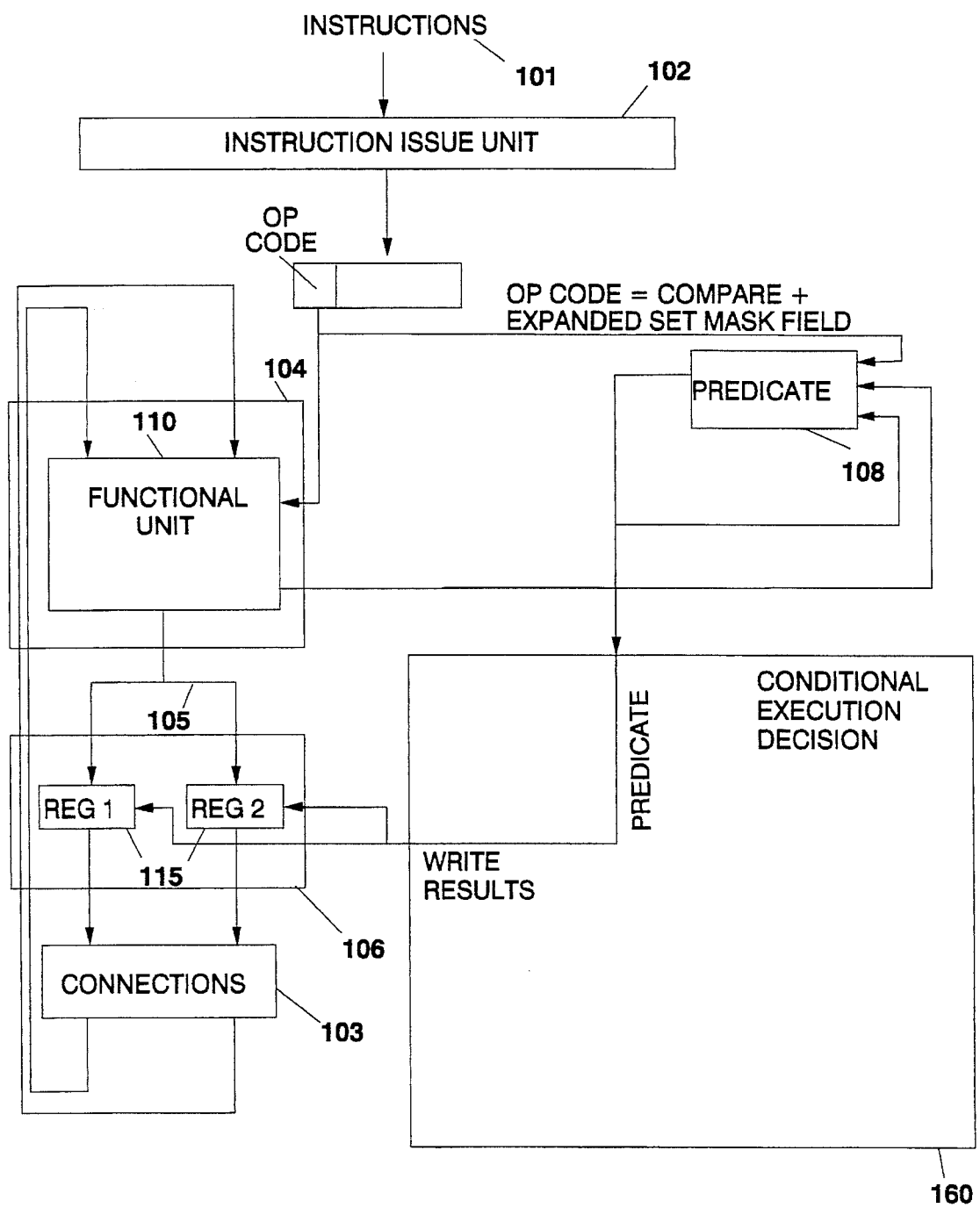
Figure 15e. Invention, Stale Condition Code Handling

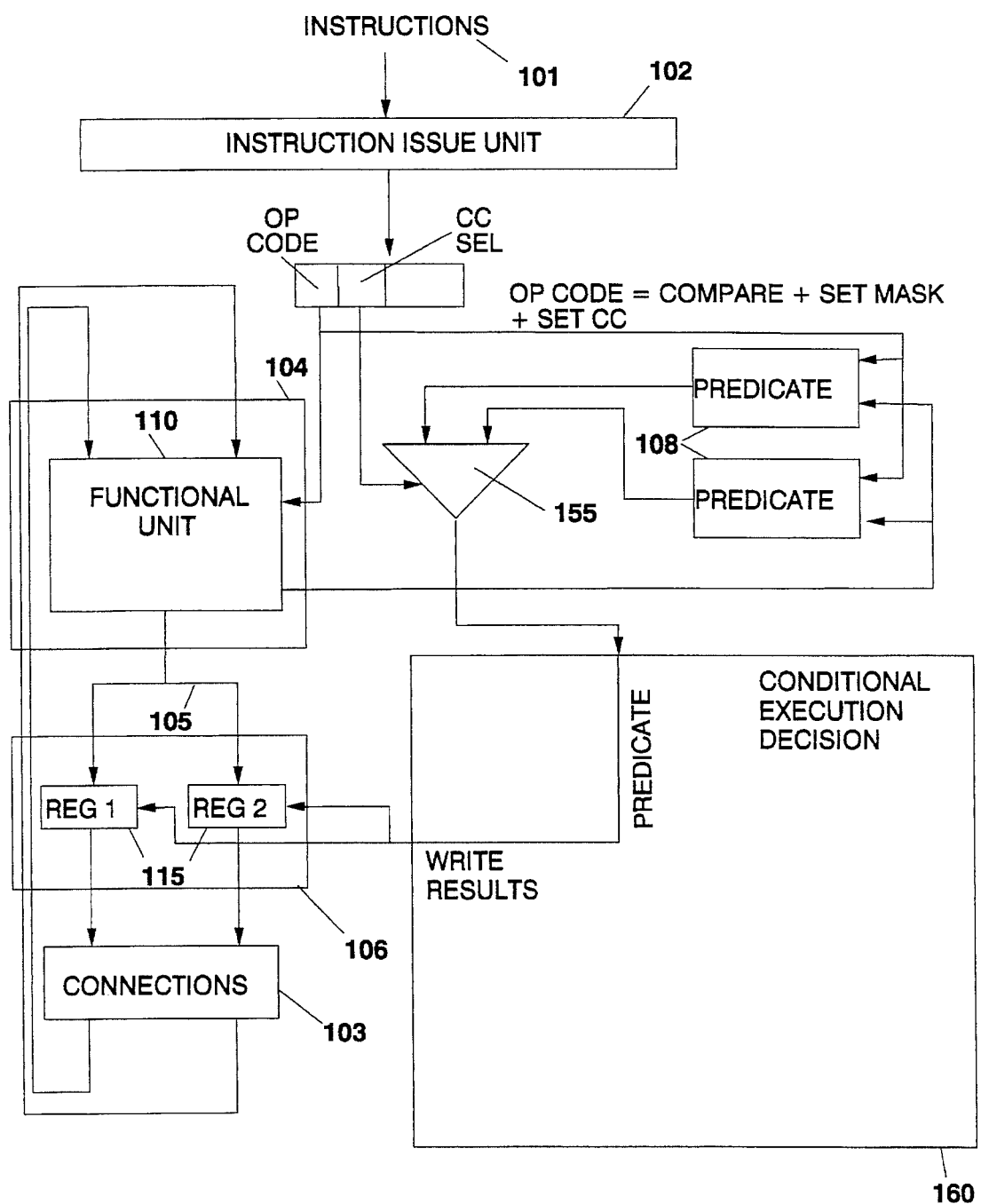
Figure 15f. Invention, Multiple CCs

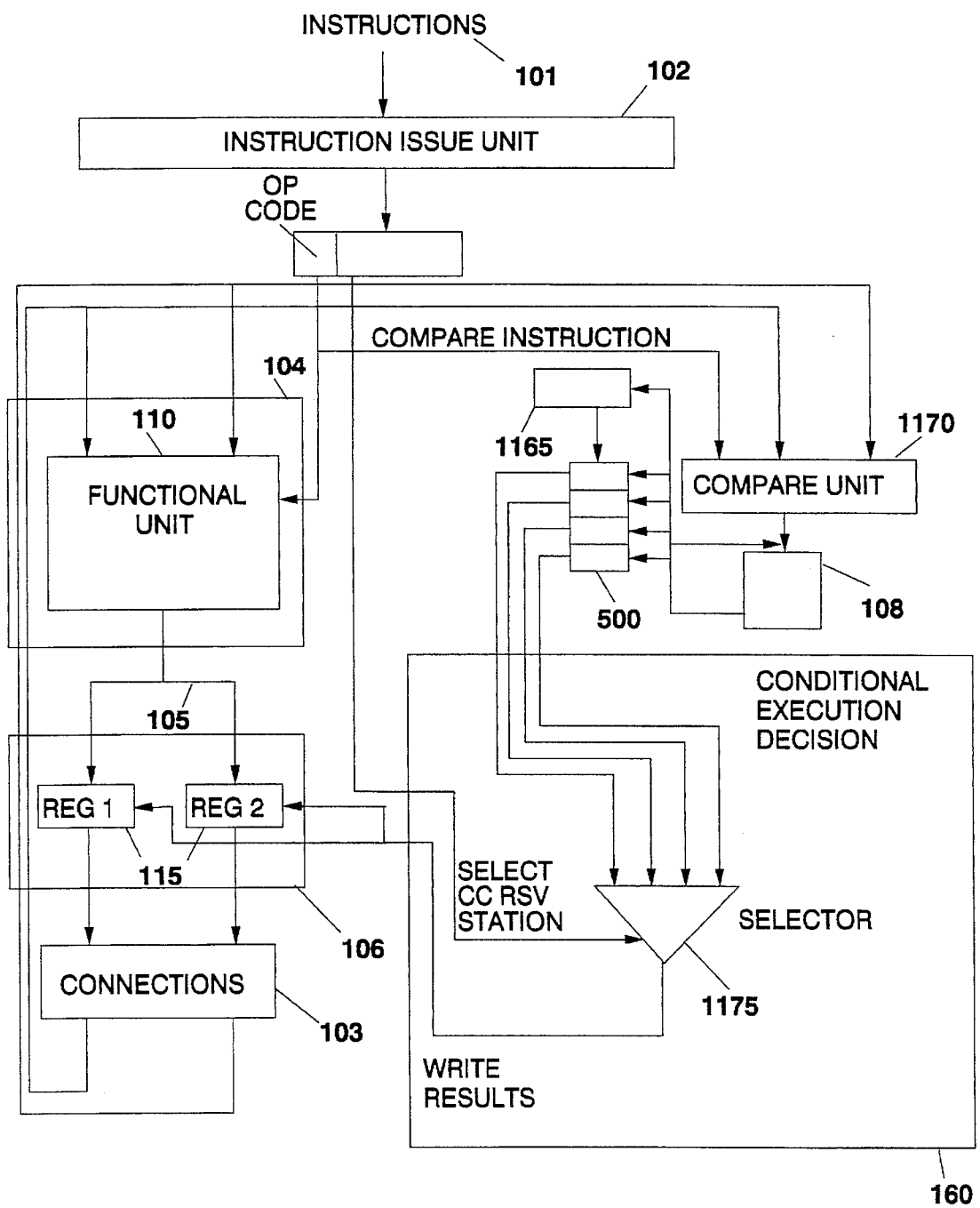
Figure 15g. Invention, CC Reservation Stations

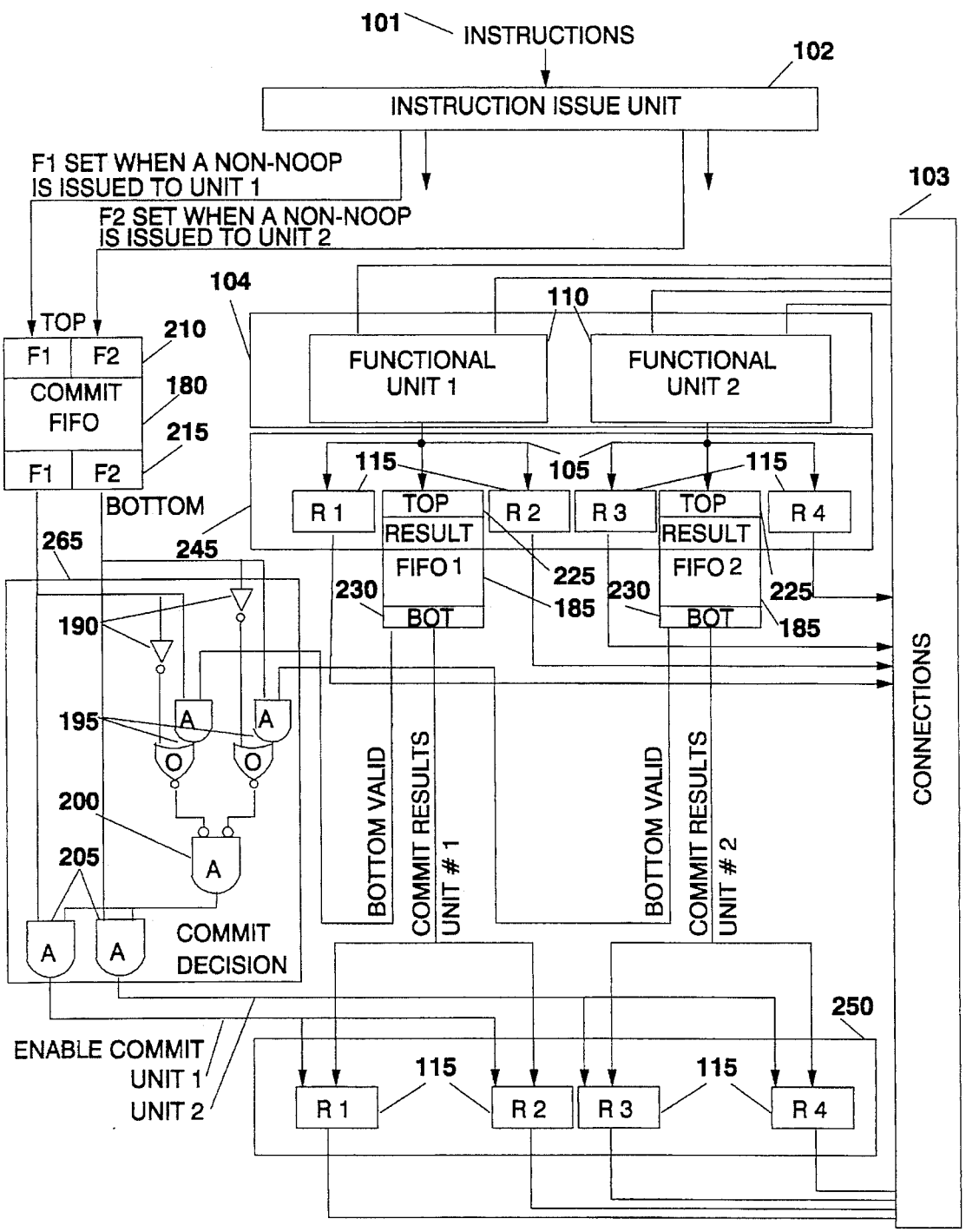
Figure 16. Invention, Indicator Based Commit

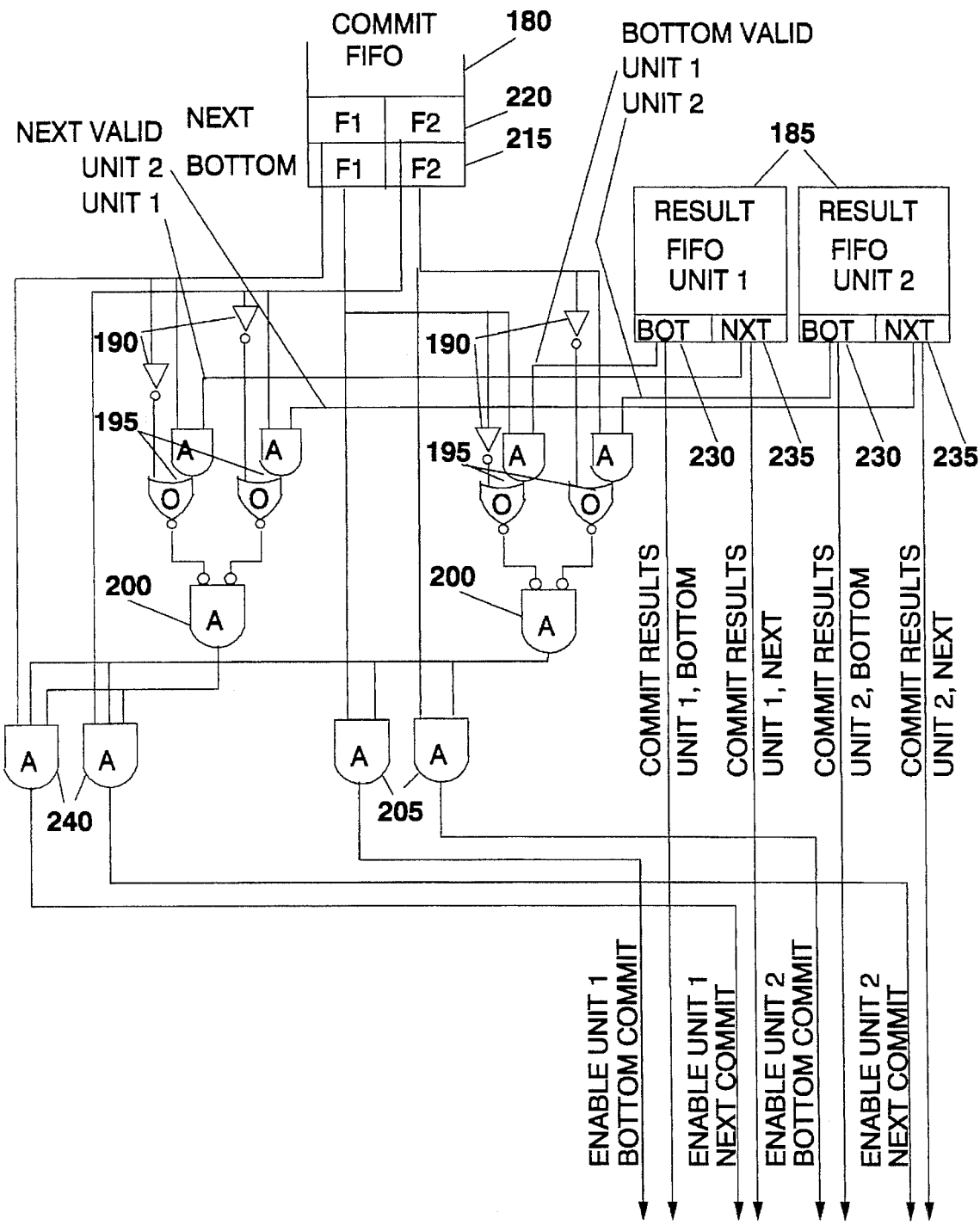
Figure 17. Invention, High Bandpass Commit

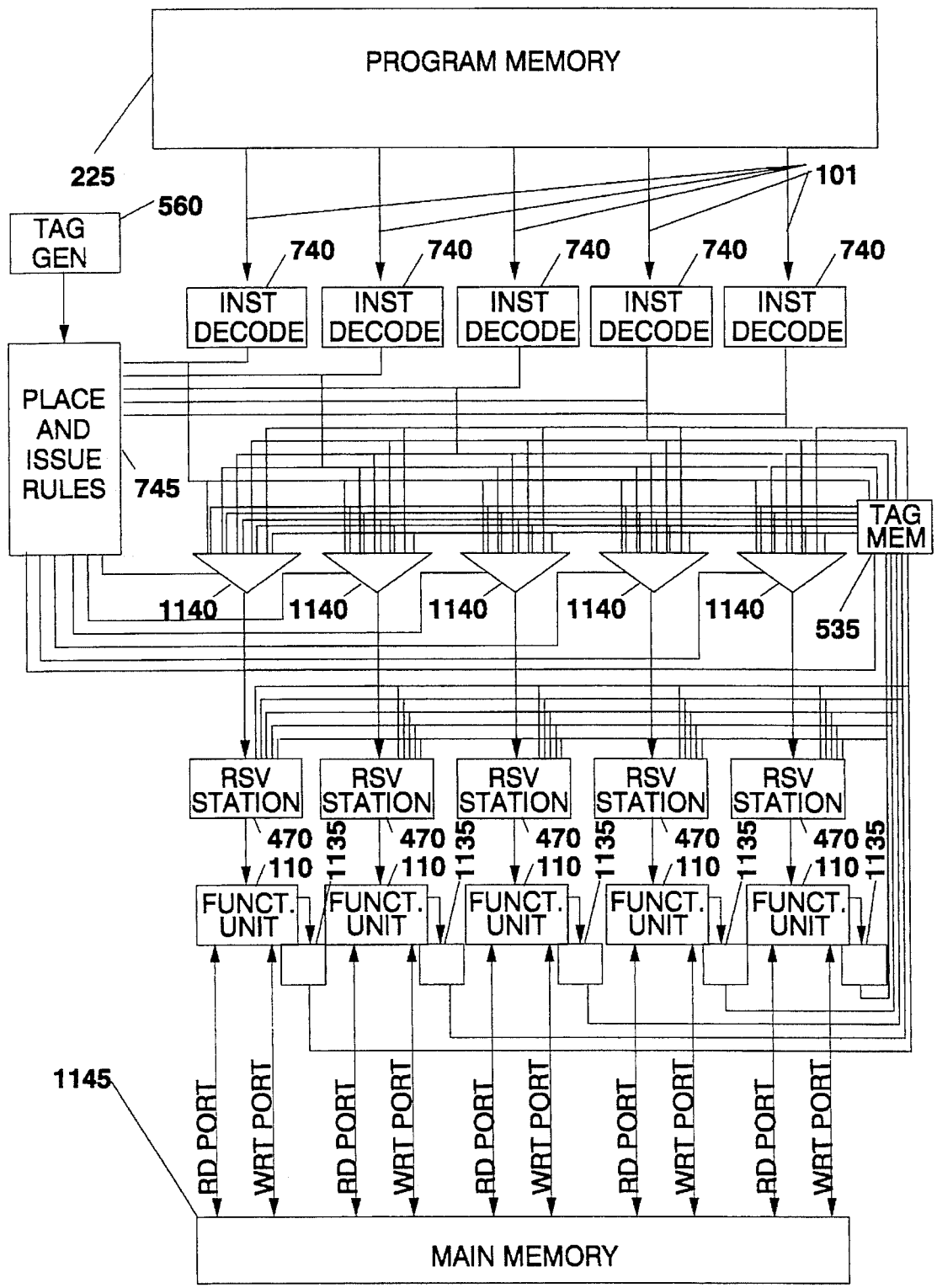
Figure 18. Invention, Sequential Coherency Memory Tagging

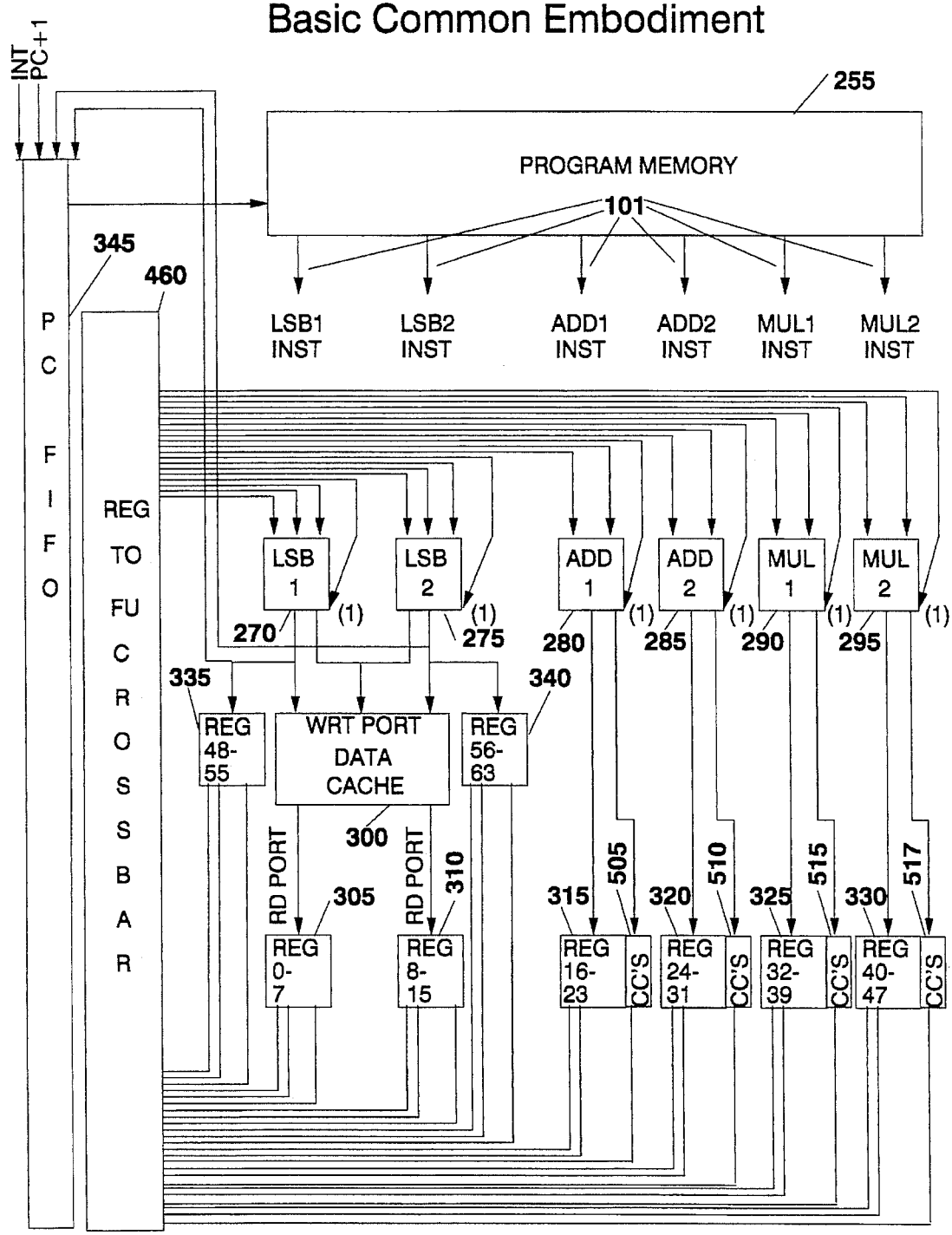
Figure 19. Invention, Basic Common Embodiment
NOTE:
(1) CONDITION CODES CONTROL RESULTS

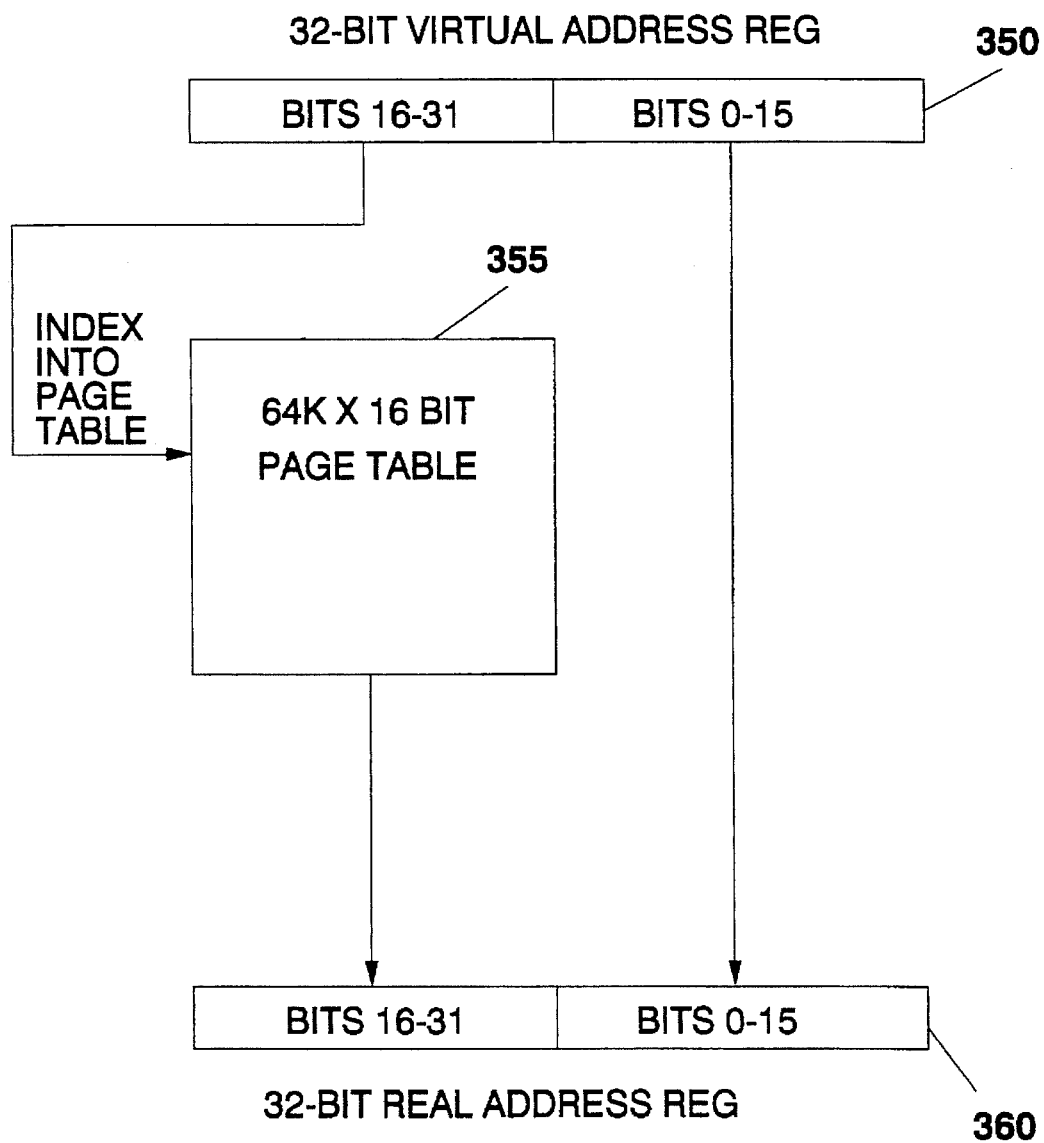
Figure 20. Invention, Virtual-to-Real Address Translation of Basic Common Embodiment

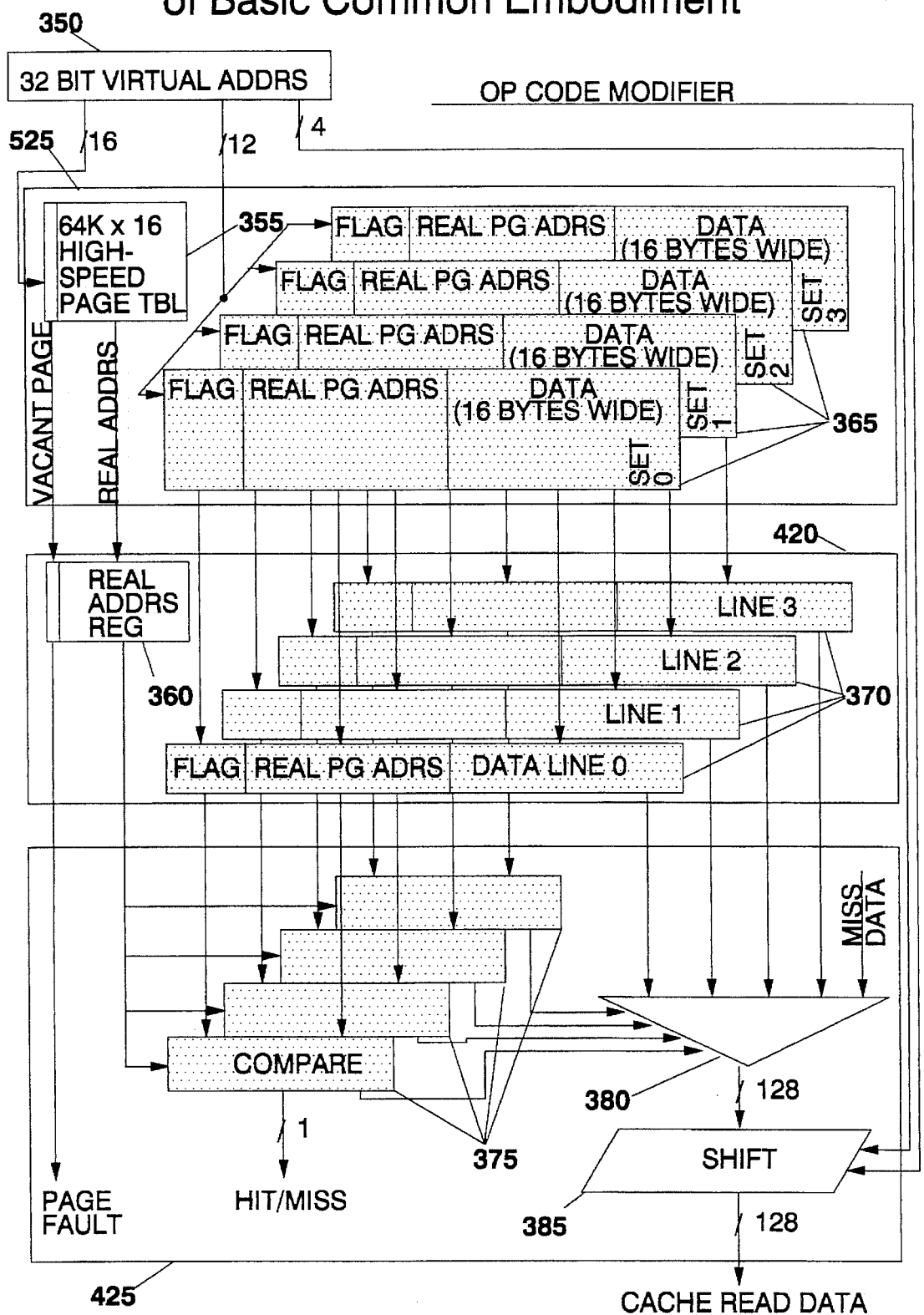
Figure 21. Invention, Data Cache Organization of Basic Common Embodiment

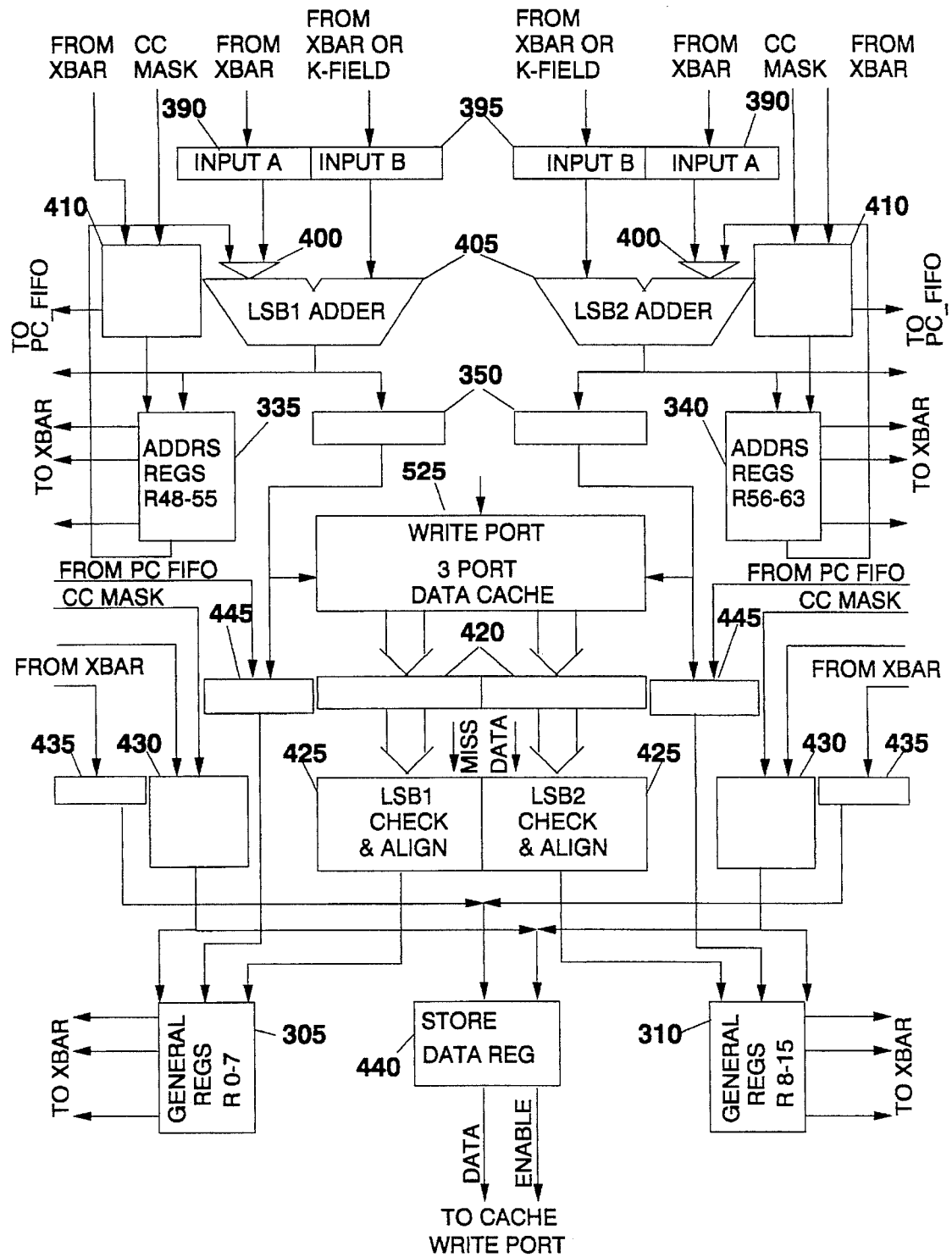
Figure 22. Invention, LOAD/STORE/BRANCH UNITS of Basic Common Embodiment

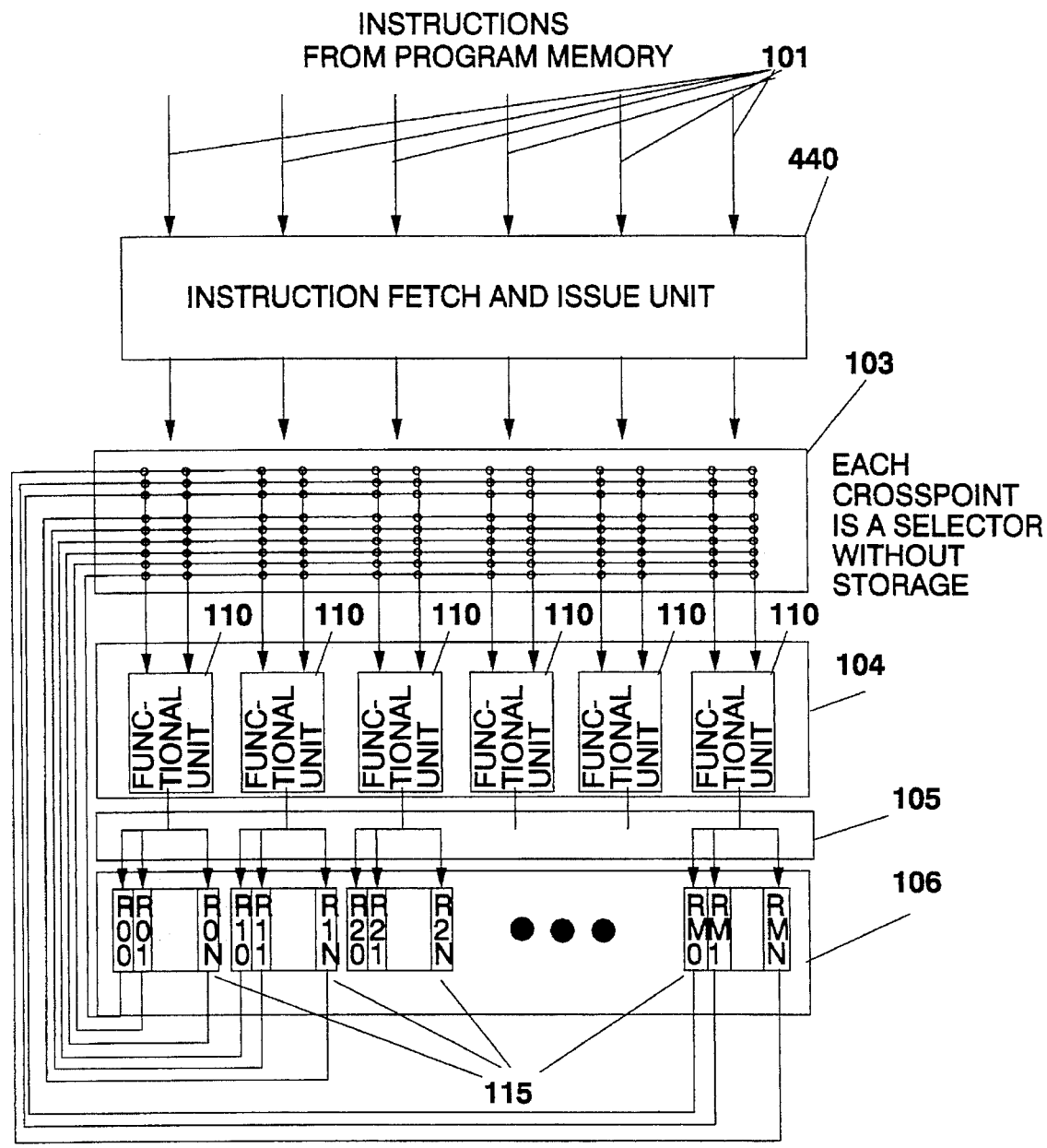
Figure 23a. Invention,
Improved Parallel Issue, Static Scheduling

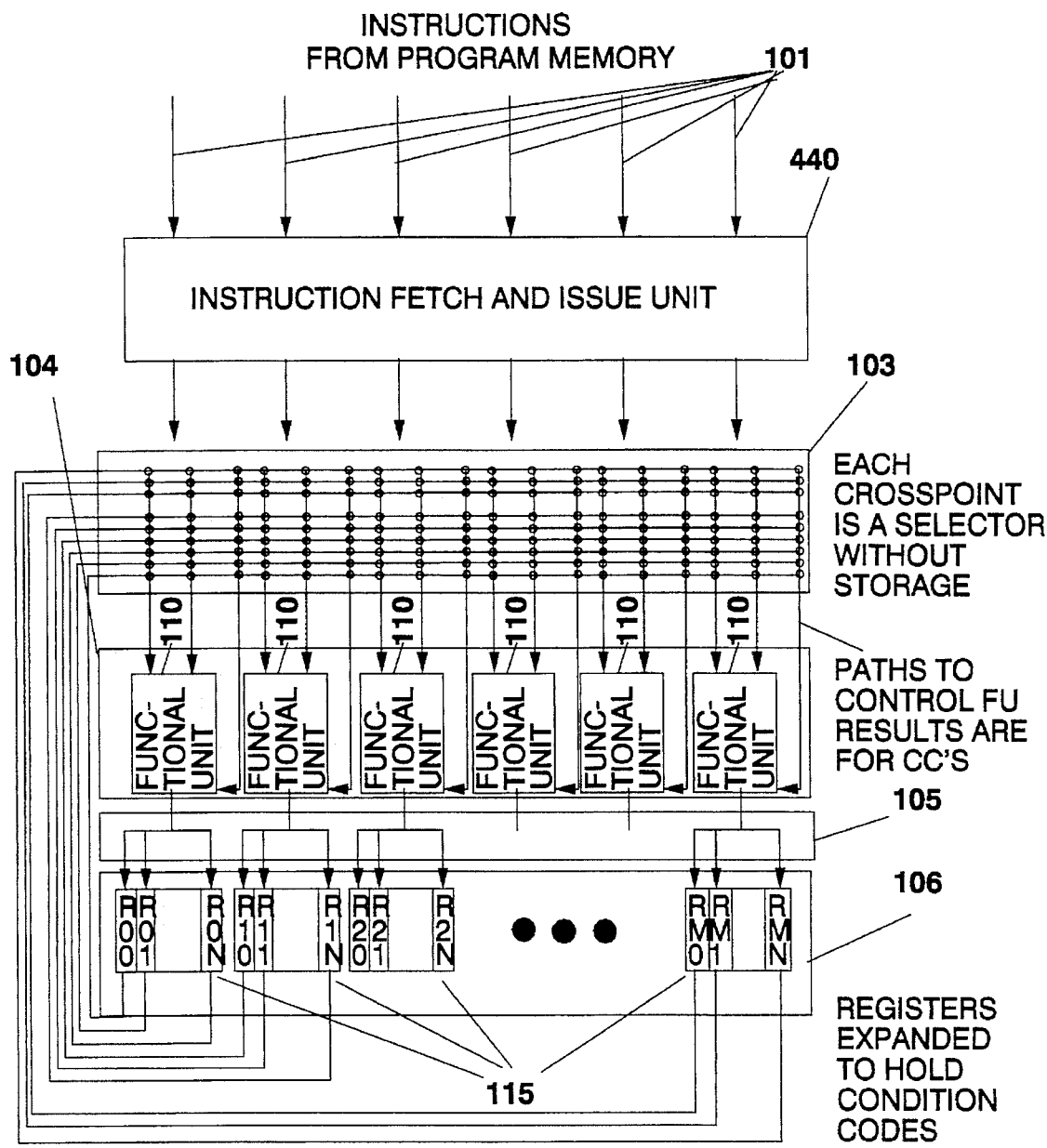
Figure 23b. Invention, Improved Figure 23a

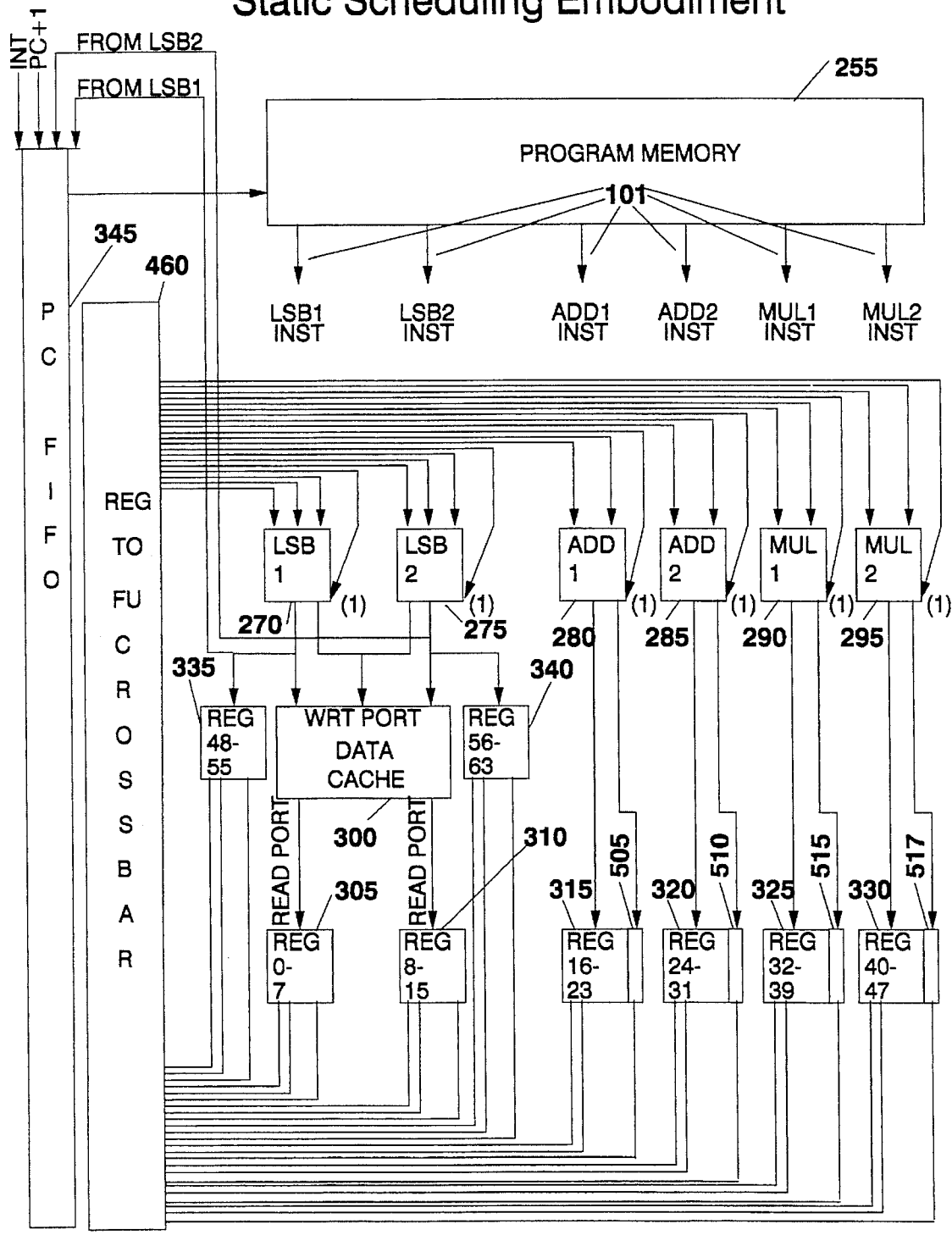
Figure 23c. Invention, Static Scheduling Embodiment
NOTE:
(1) CC'S CONTROL RESULTS

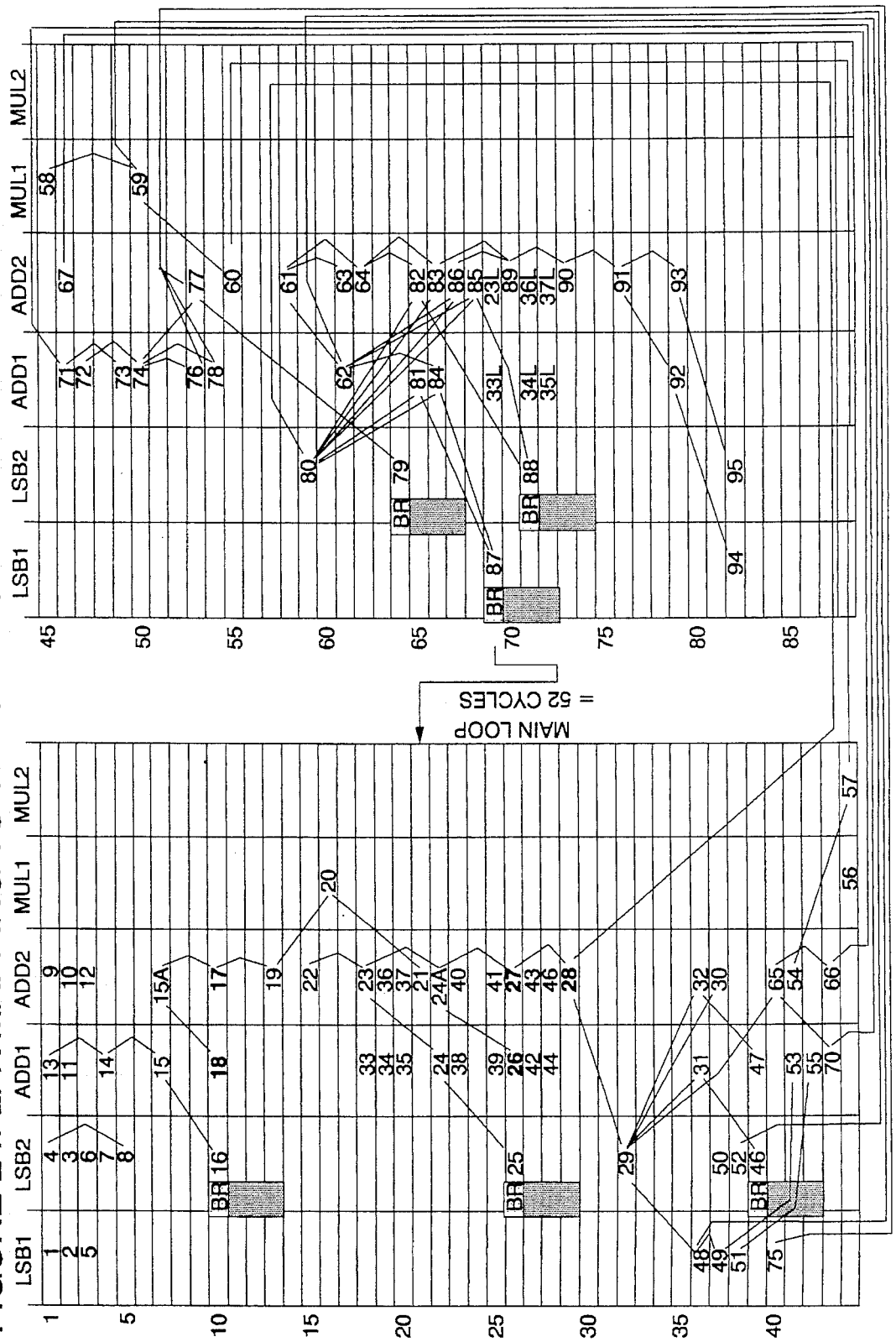

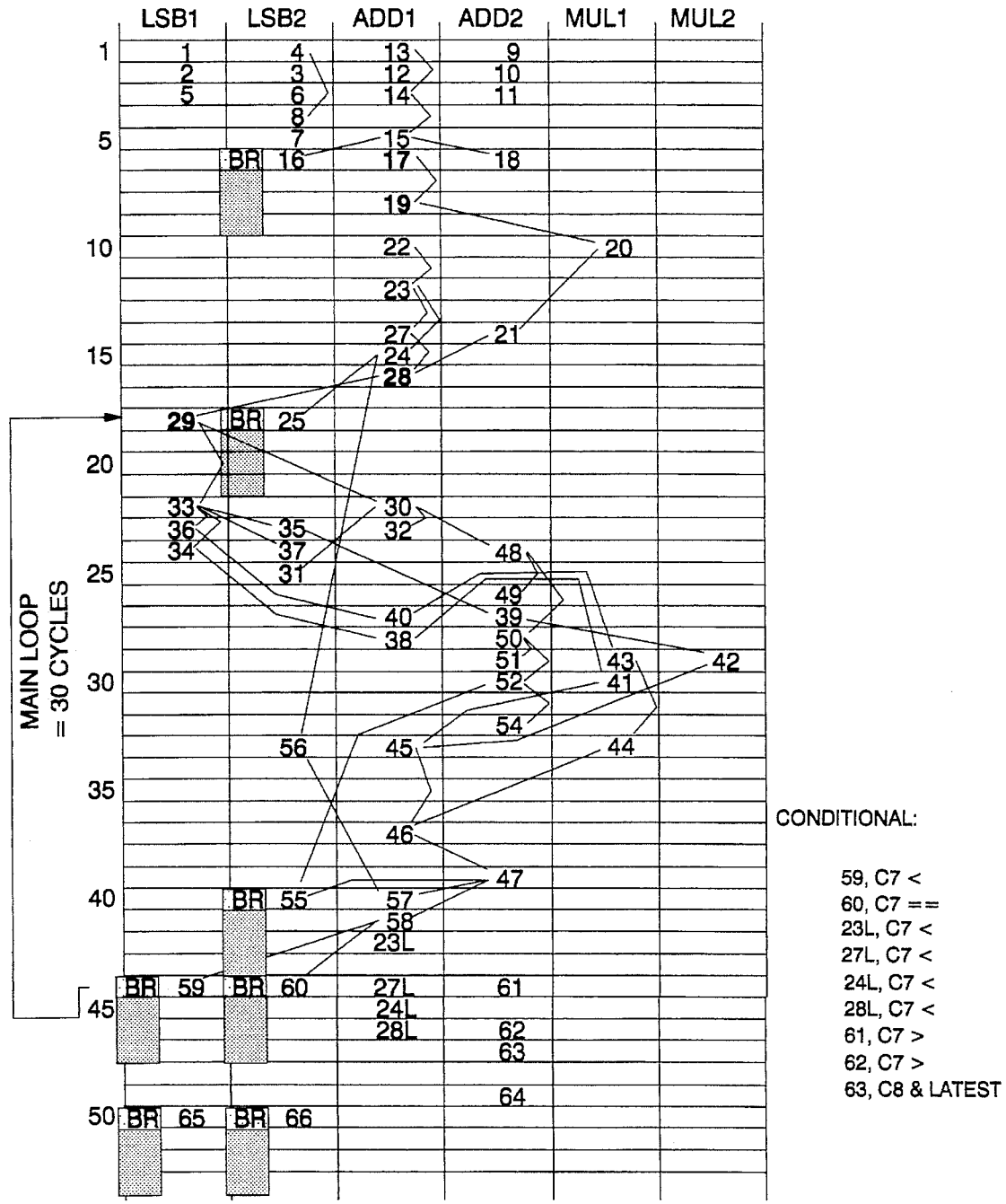
Figure 25. Invention, LFK16 Mapping, Static Scheduling Embodiment

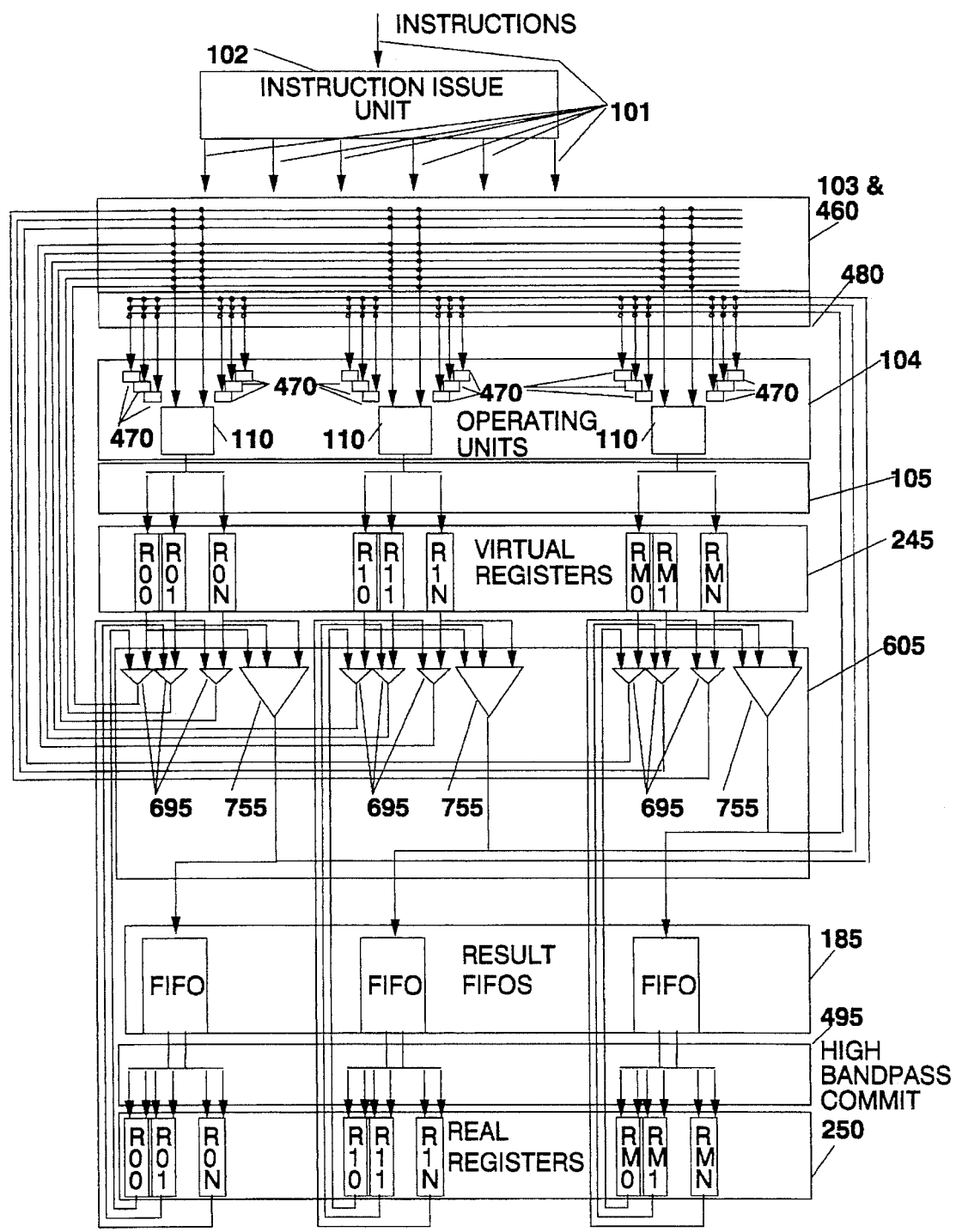
Figure 26a. Invention, Generalized Dynamic Scheduling Embodiment

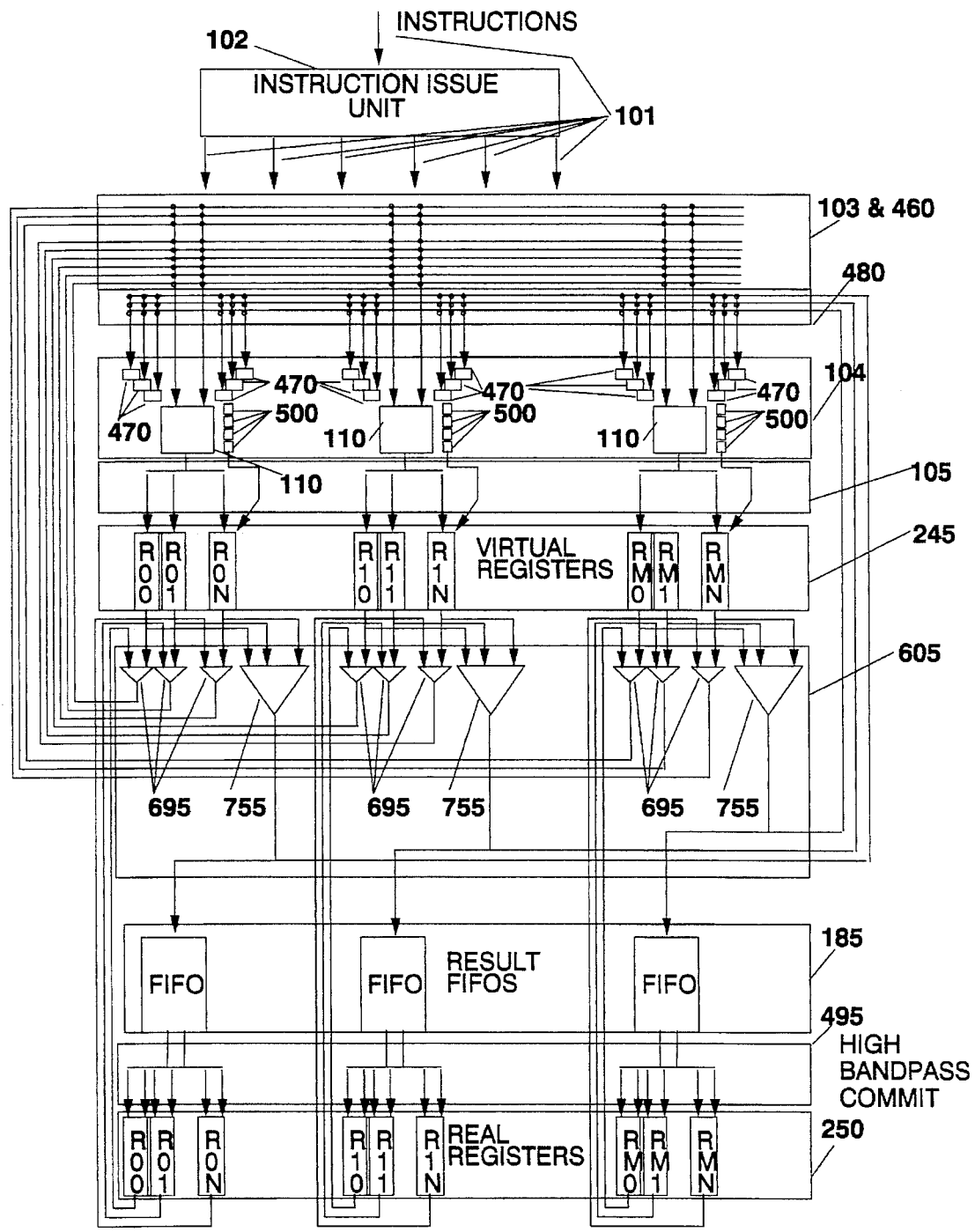
Figure 26b. Invention,
Figure 26a Improved with Conditional Execution

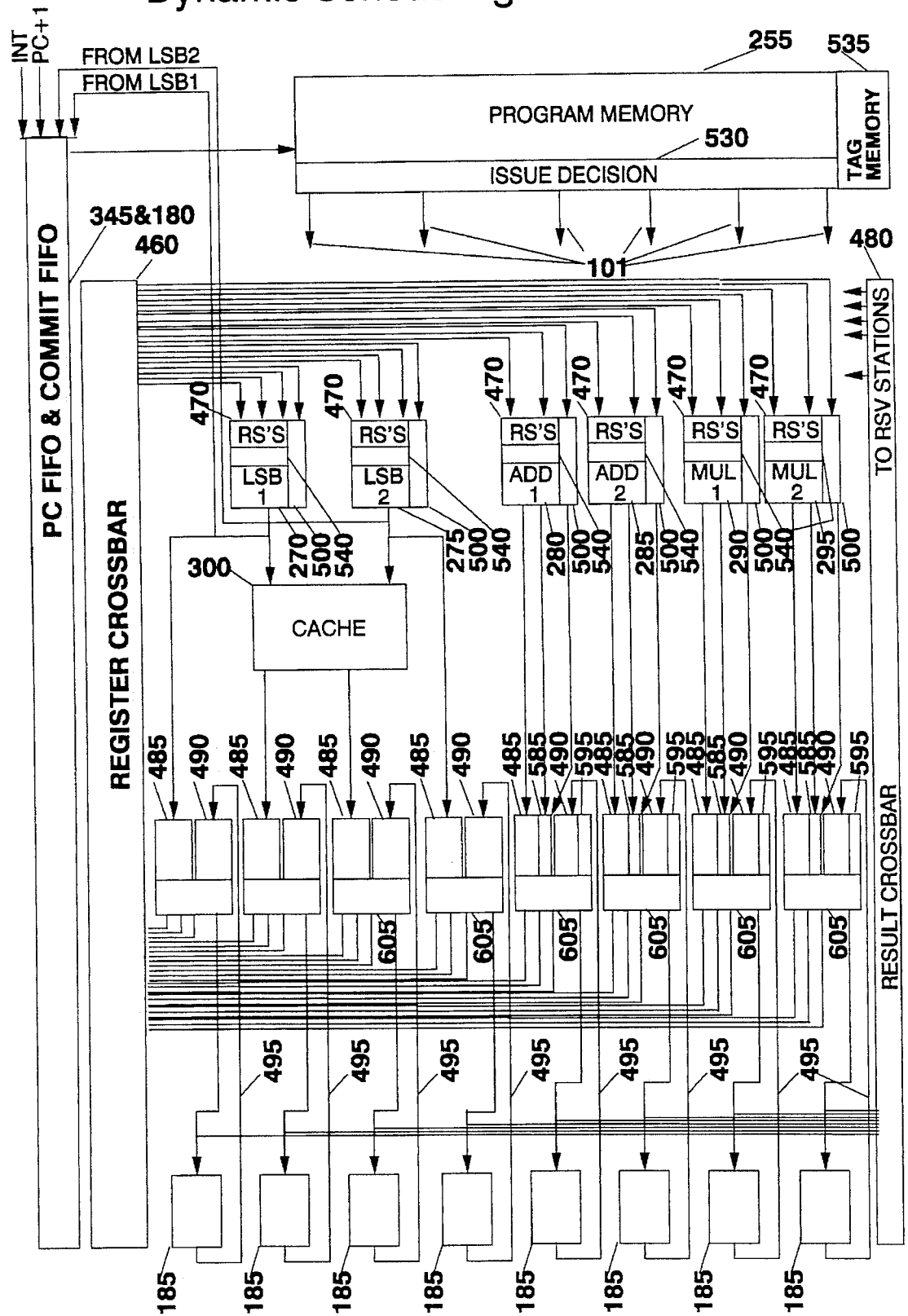
Figure 27a. Invention, Dynamic Scheduling Embodiment

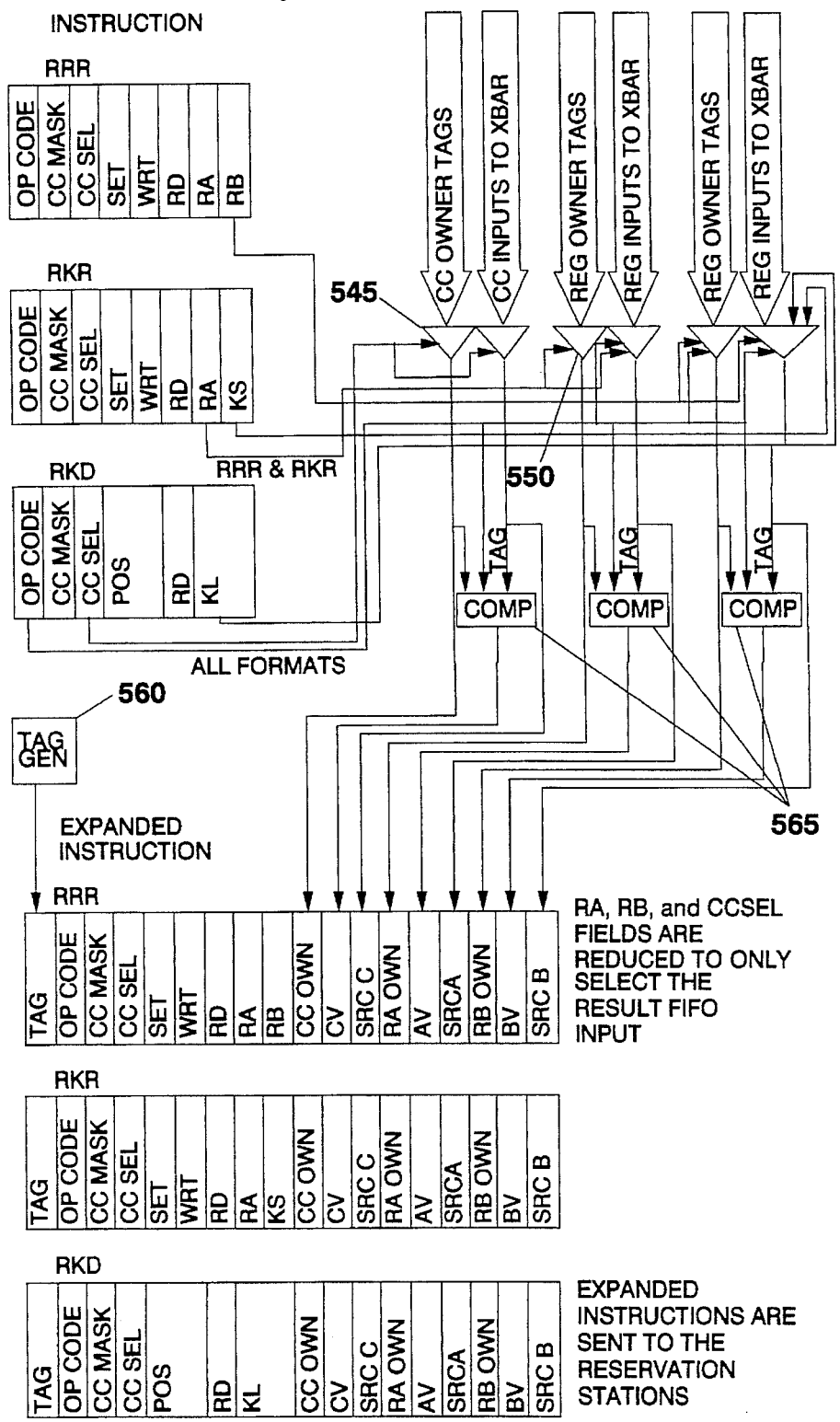
Figure 27b. Invention, Instruction Issue, Dynamic Scheduling Embodiment

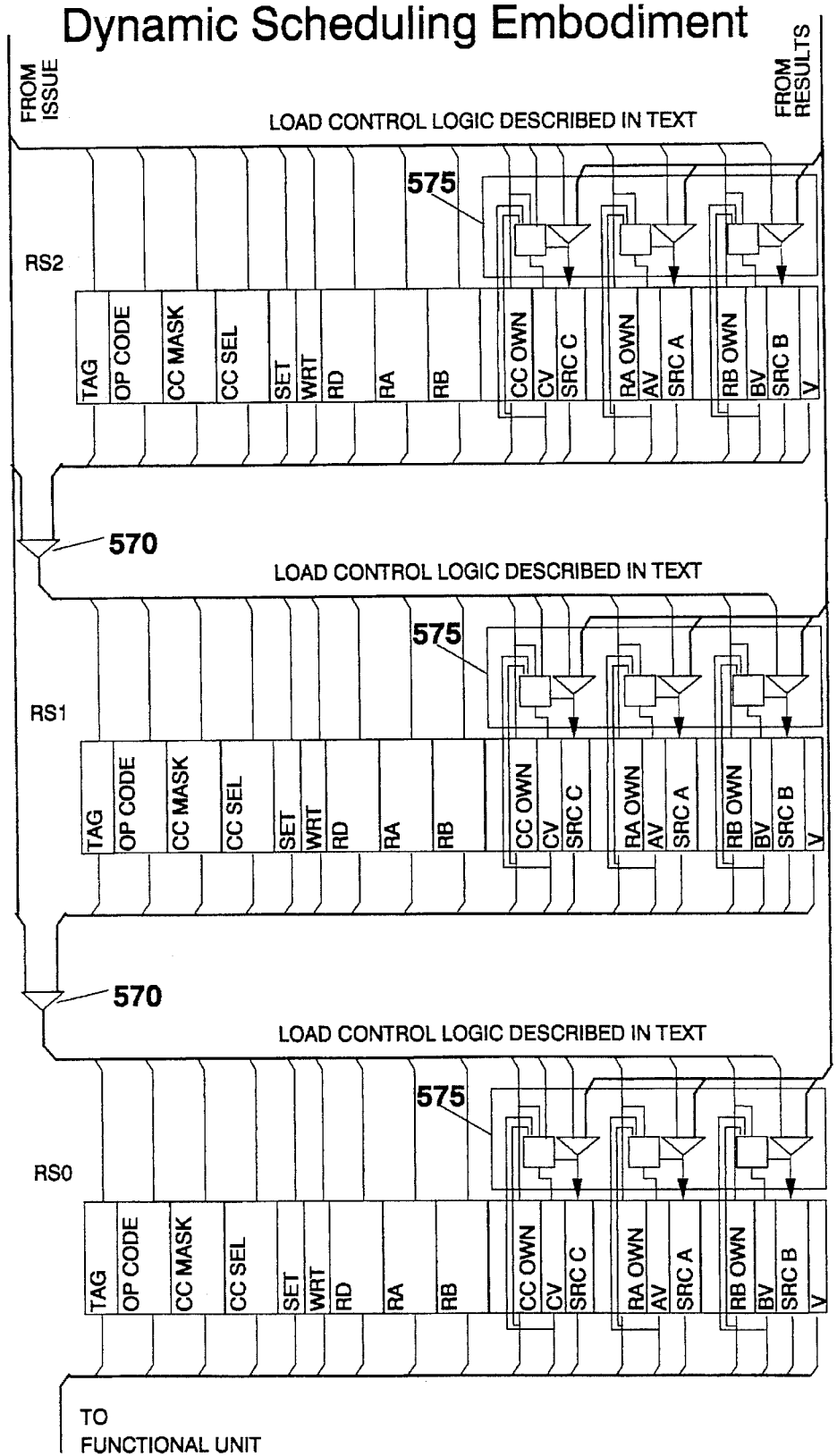
Figure 27c. Invention, Reservation Stations, Dynamic Scheduling Embodiment

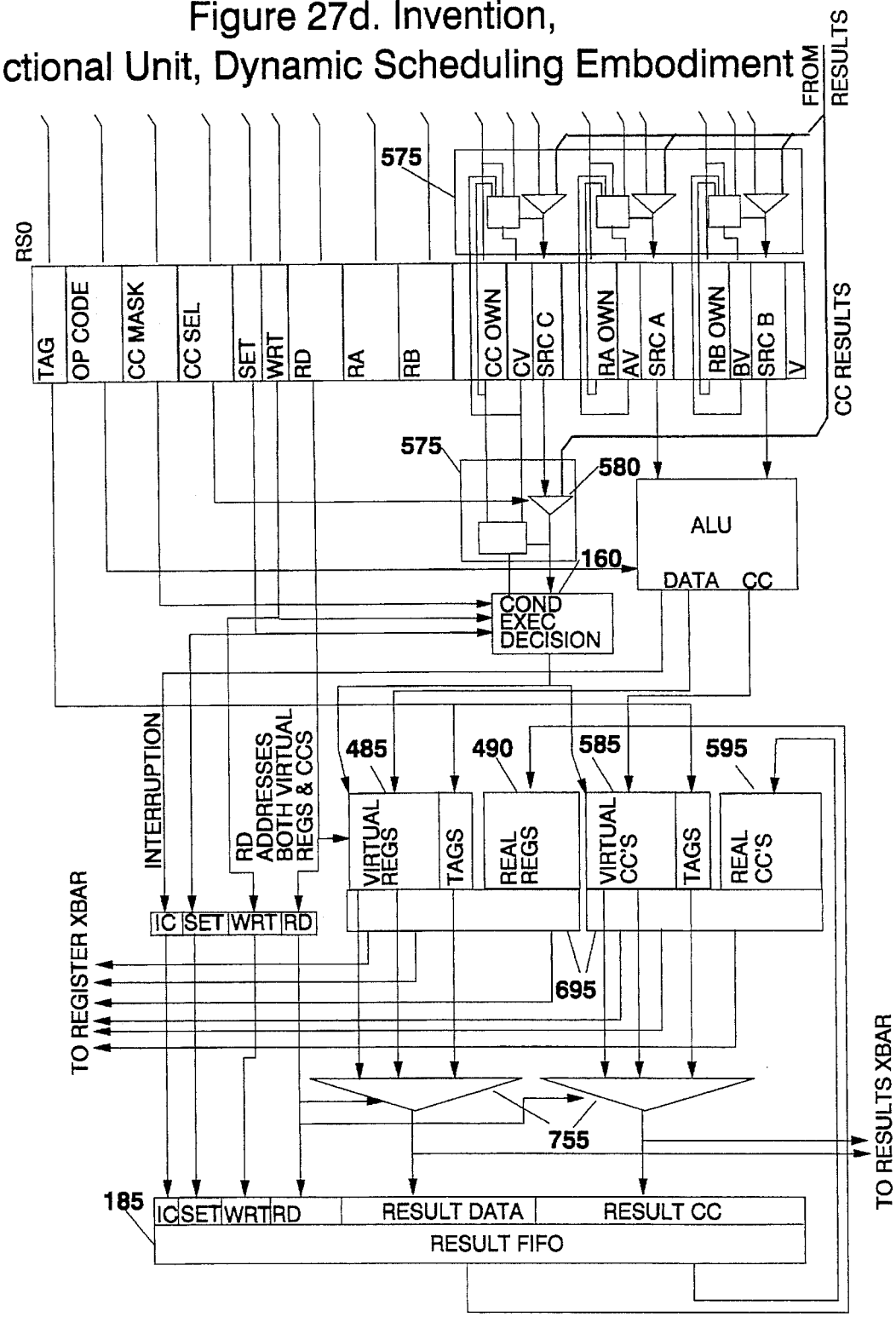
Figure 27d. Invention, Functional Unit, Dynamic Scheduling Embodiment

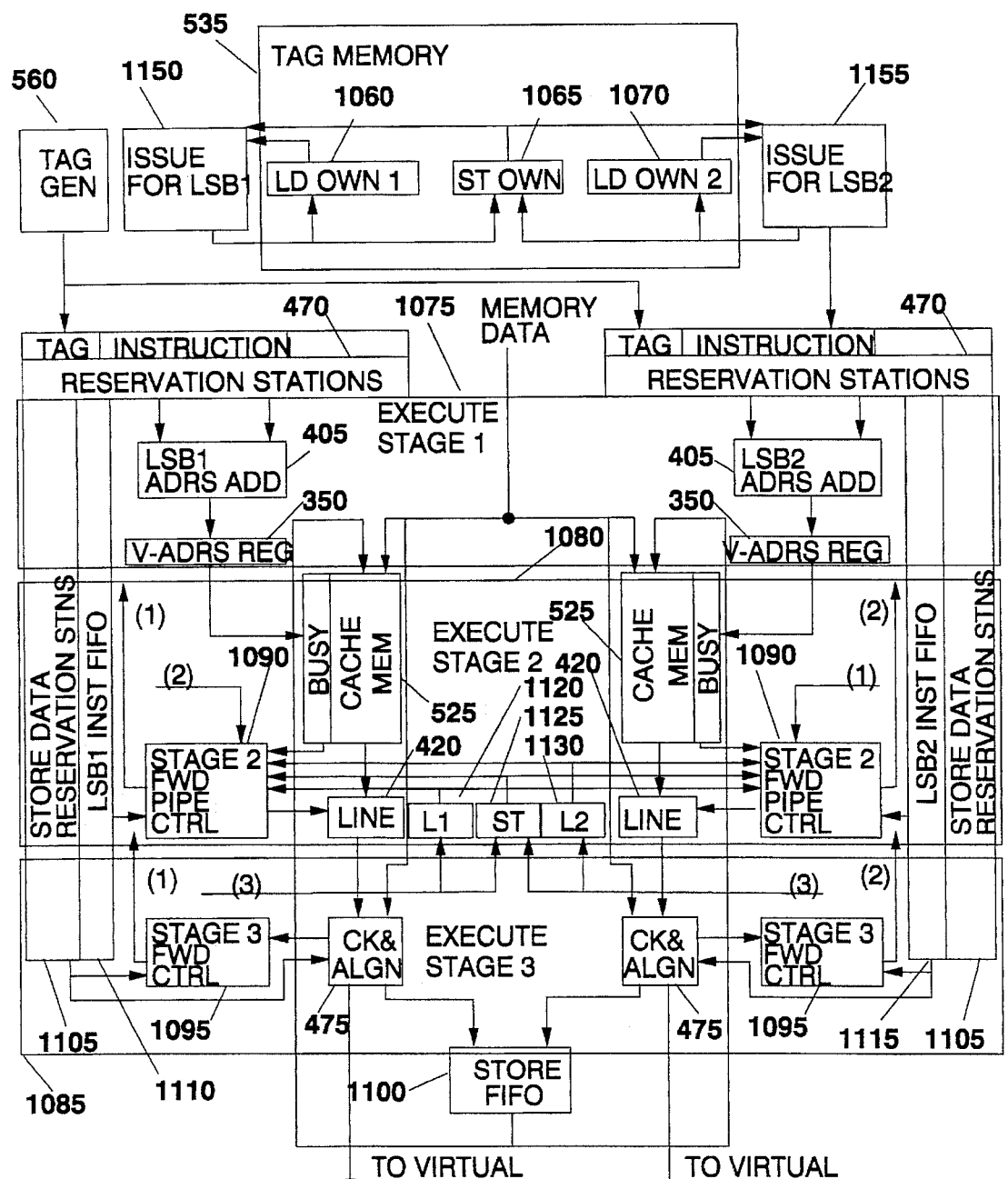
Figure 27e. Invention, Dynamic Scheduling Embodiment, Main Memory Tagging
NOTES:
(1) GENERATE & PROPAGATE
(2) PREVIOUS OWNER TAG(S) FROM INST
(3) TAG FROM THE INSTRUCTION

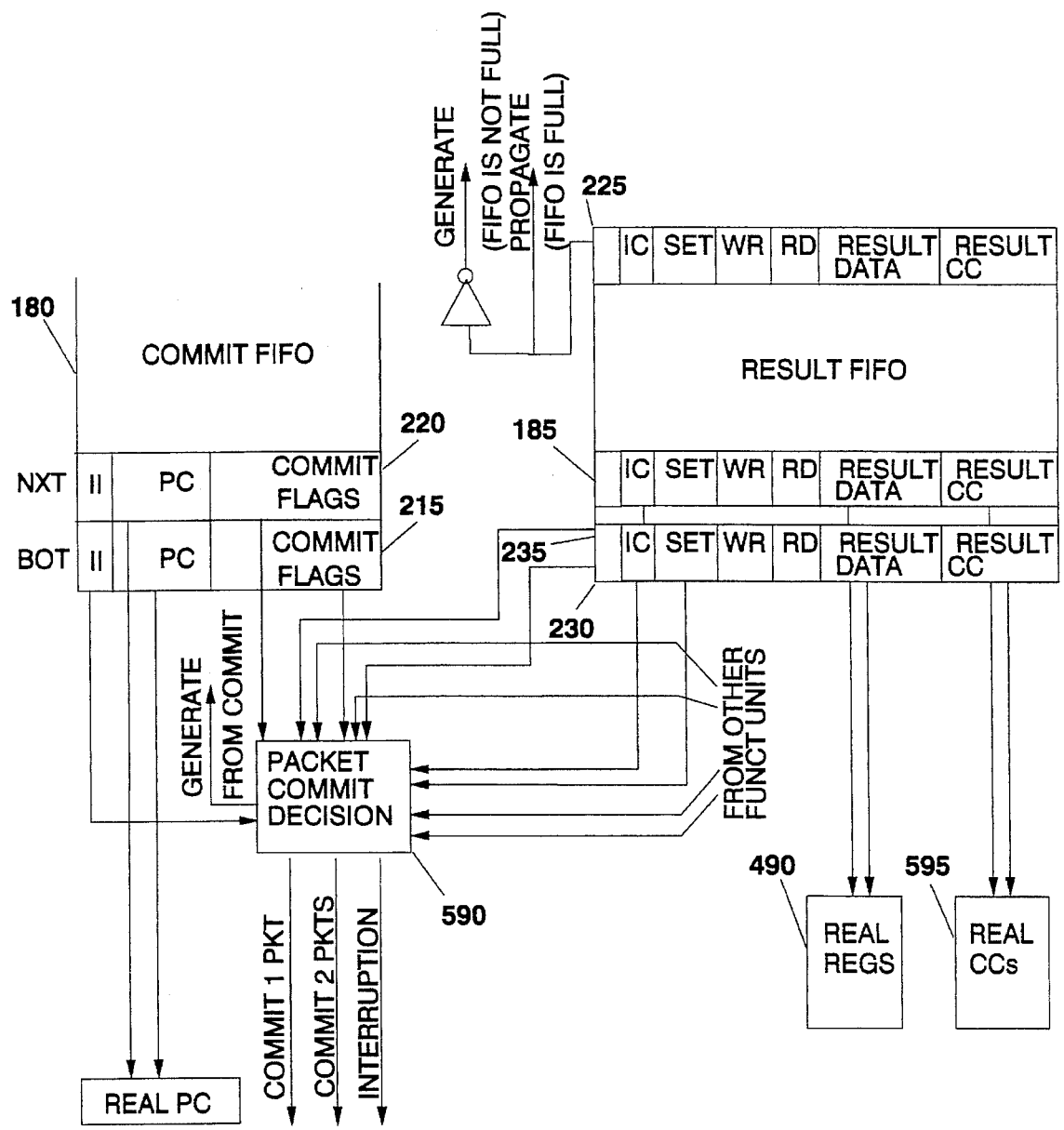
Figure 27f. Invention,
Real Registers and CCs,
Dynamic Scheduling Embodiment

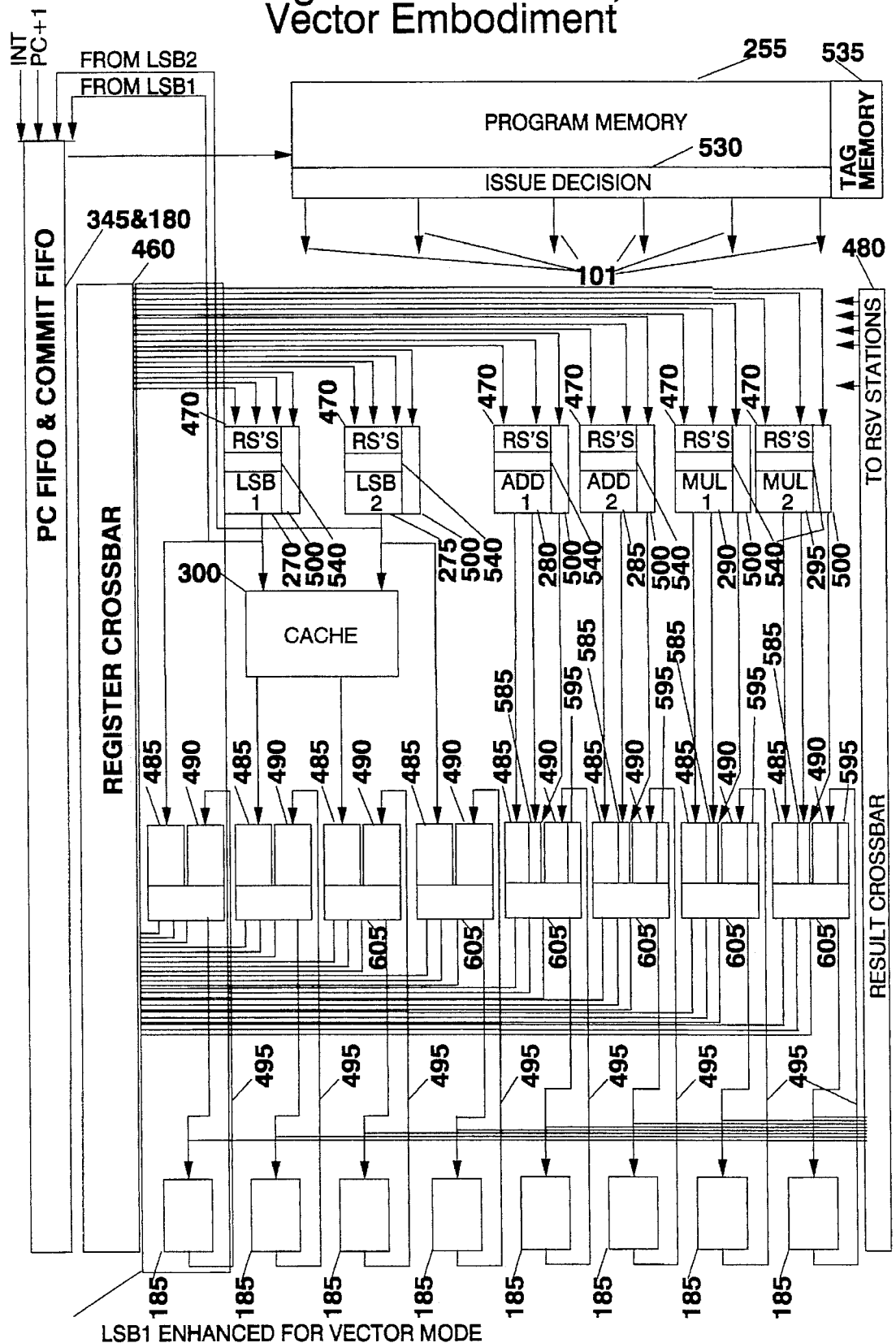
Figure 28. Invention, Vector Embodiment

Figure 29. Invention, One-Packet Vector Loop Example

R48 = 6-3    R49 = 104    R50 = 104

| ADDRS | LSB1 INST | LSB2 INST | |
|---|---|---|---|
| 100 | LOOP 104 | STORE RK,RA,1,IRA | ⎫ |
| 101 | ANY | STORE RK,RA,1,IRA | ⎬ STORE TO 4 LOCATIONS |
| 102 | ANY | STORE RK,RA,1,IRA | ⎬ (OUTSIDE THE LOOP) |
| 103 | ANY | STORE RK,RA,1,IRA | ⎭ |
| 104 | DEC/SET | STORE RK,RA,1,IRA | STORE TO 6 LOCATIONS |
| 105 | ANY | ANY | (INSIDE THE LOOP) |
| 106 | ANY | ANY | TOTAL OF 10 LOCATIONS |
| 107 | ANY | ANY | |

⟵——————— Pipeline ———————⟶                AFTER EXECUTE

| CYC | FETCH INST | ISSUE INST | SELECT INPUTS | EXECUTE STAGE 1 | R48 | CC48 | VECTOR MODE |
|---|---|---|---|---|---|---|---|
| 1 | 103 | 102 | 101 | 100 | 3 | ? | ON |
| | PC = 104 FROM LOOP 104 @ 100 | | | | | | |
| 2 | 104(1) | 103 | 102 | 101 | 3 | ? | ON |
| | PC = 104 FROM R50 | | | | | | |
| 3 | 104(2) | 104(1) | 103 | 102 | 3 | ? | ON |
| | PC = 104 FROM R50 | | | | | | |
| 4 | 104(3) | 104(2) | 104(1) | 103 | 3 | ? | ON |
| | PC = 104 FROM R50 | | | | | | |
| 5 | 104(4) | 104(3) | 104(2) | 104(1) | 2 | POS | ON |
| | PC = 104 FROM R50 | | | | | | |
| 6 | 104(5) | 104(4) | 104(3) | 104(2) | 1 | POS | ON |
| | PC = 104 FROM R50 | | | | | | |
| 7 | 104(6) | 104(5) | 104(4) | 104(3) | 0 | ZERO | OFF |
| | PC = 104+1 (R48=0) | | | | | | |
| 8 | 105 | 104(6) | 104(5) | 104(4) | 0 | ZERO | OFF |
| | PC = 105+1 | | | | | | |
| 9 | 106 | 105 | 104(6) | 104(5) | 0 | ZERO | OFF |
| | PC = 106+1 | | | | | | |
| 10 | 107 | 106 | 105 | 104(6) | 0 | ZERO | OFF |
| | PC = 107+1 | | | | | | |
| 11 | 108 | 107 | 106 | 105 | 0 | ZERO | OFF |

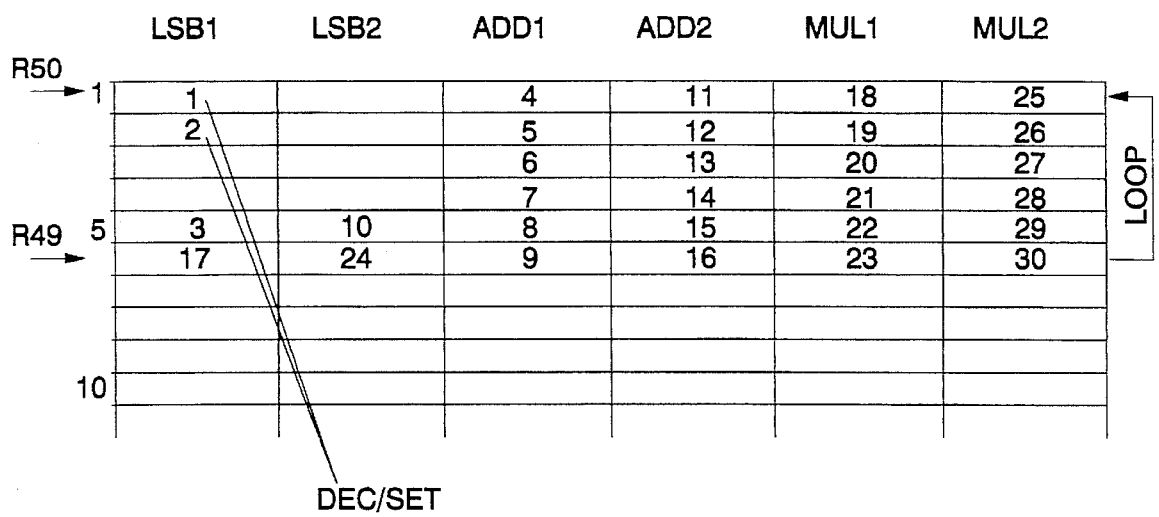
Figure 30. Invention,
LFK24 Main Loop Mapping,
Vector Embodiment

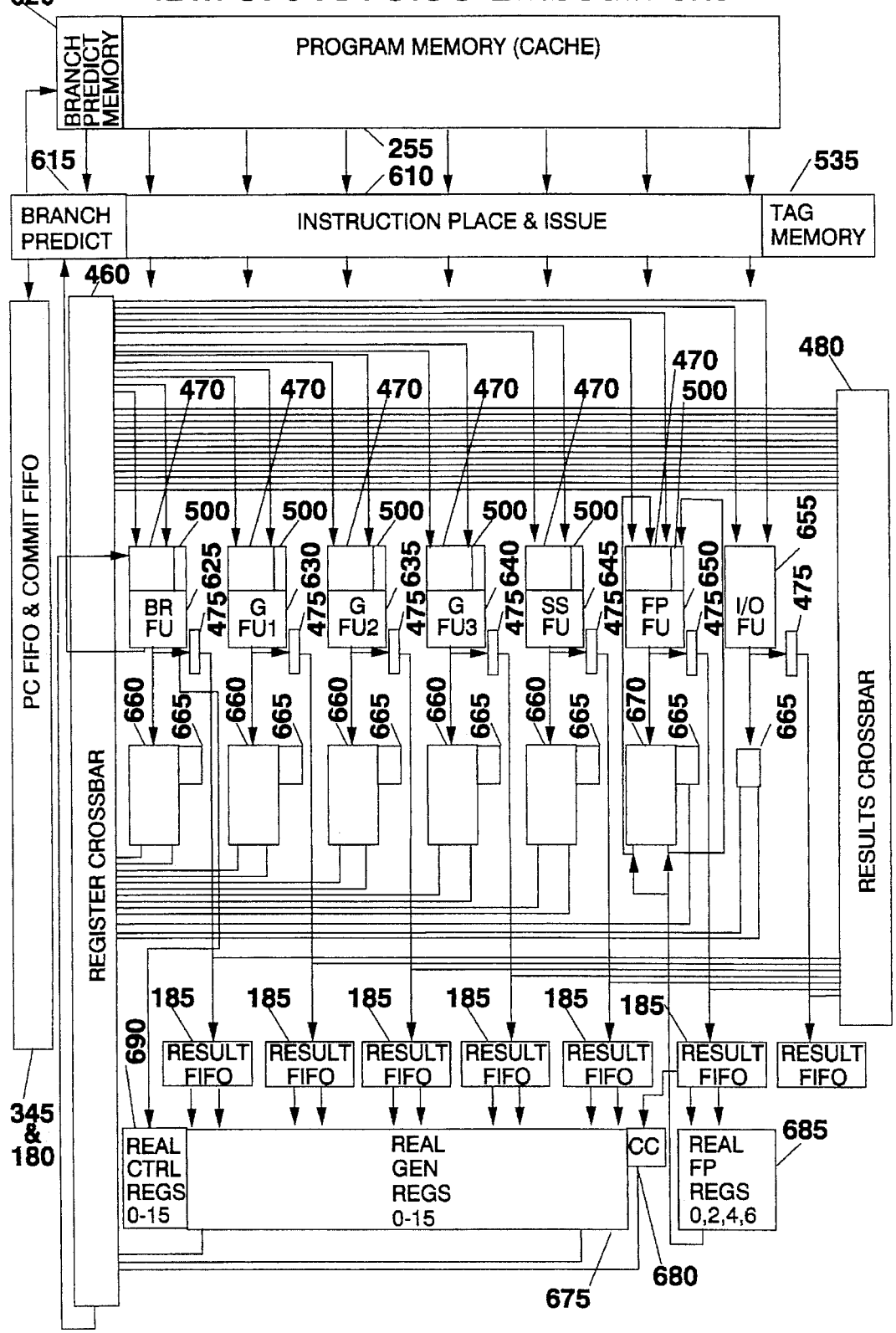
Figure 31a. Invention, IBM 370-XA CISC Embodiment

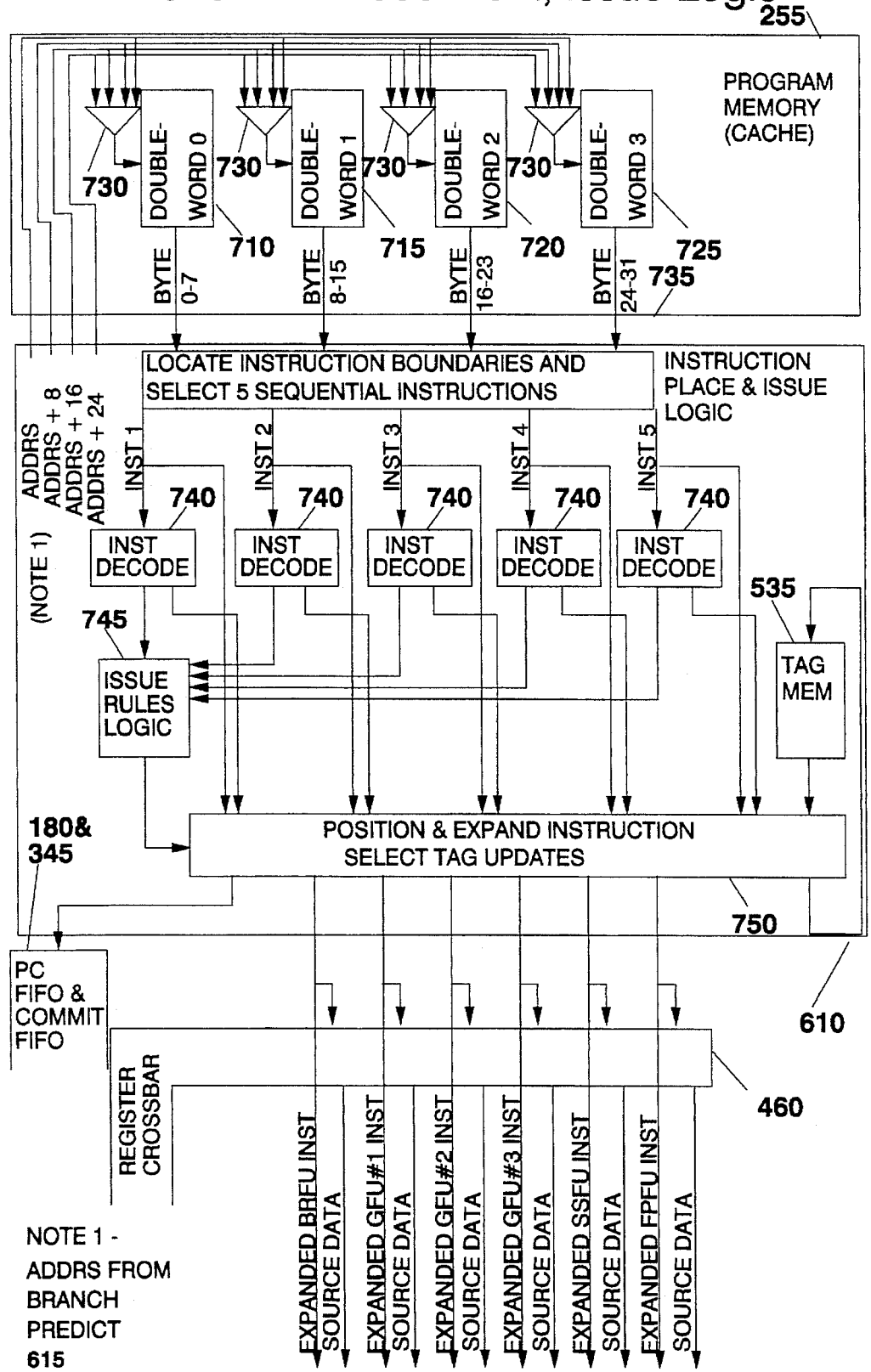
Figure 31b. Invention, IBM 370-XA Embodiment, Issue Logic

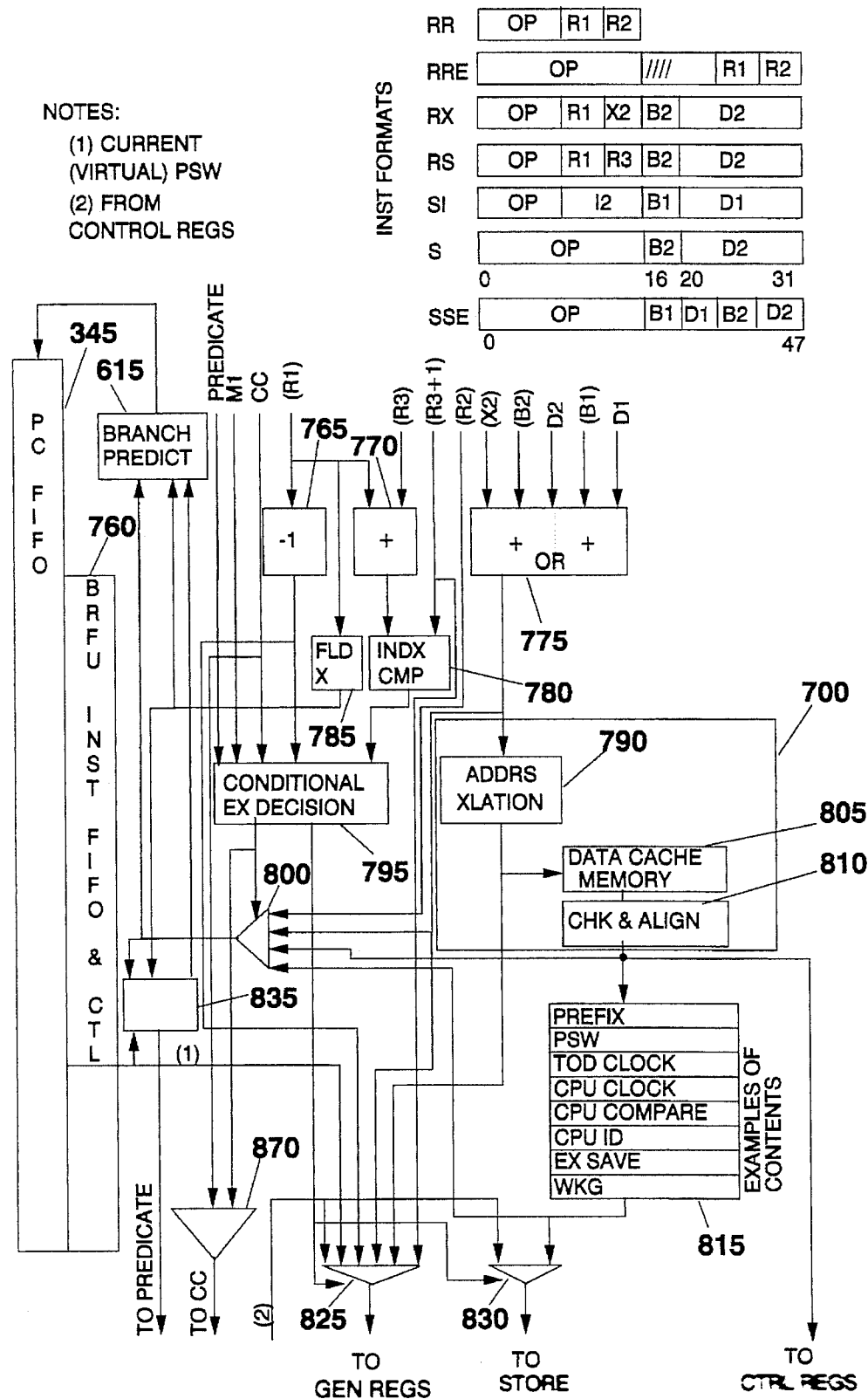
Figure 31c. Invention, IBM 370-XA Branch Functional Unit

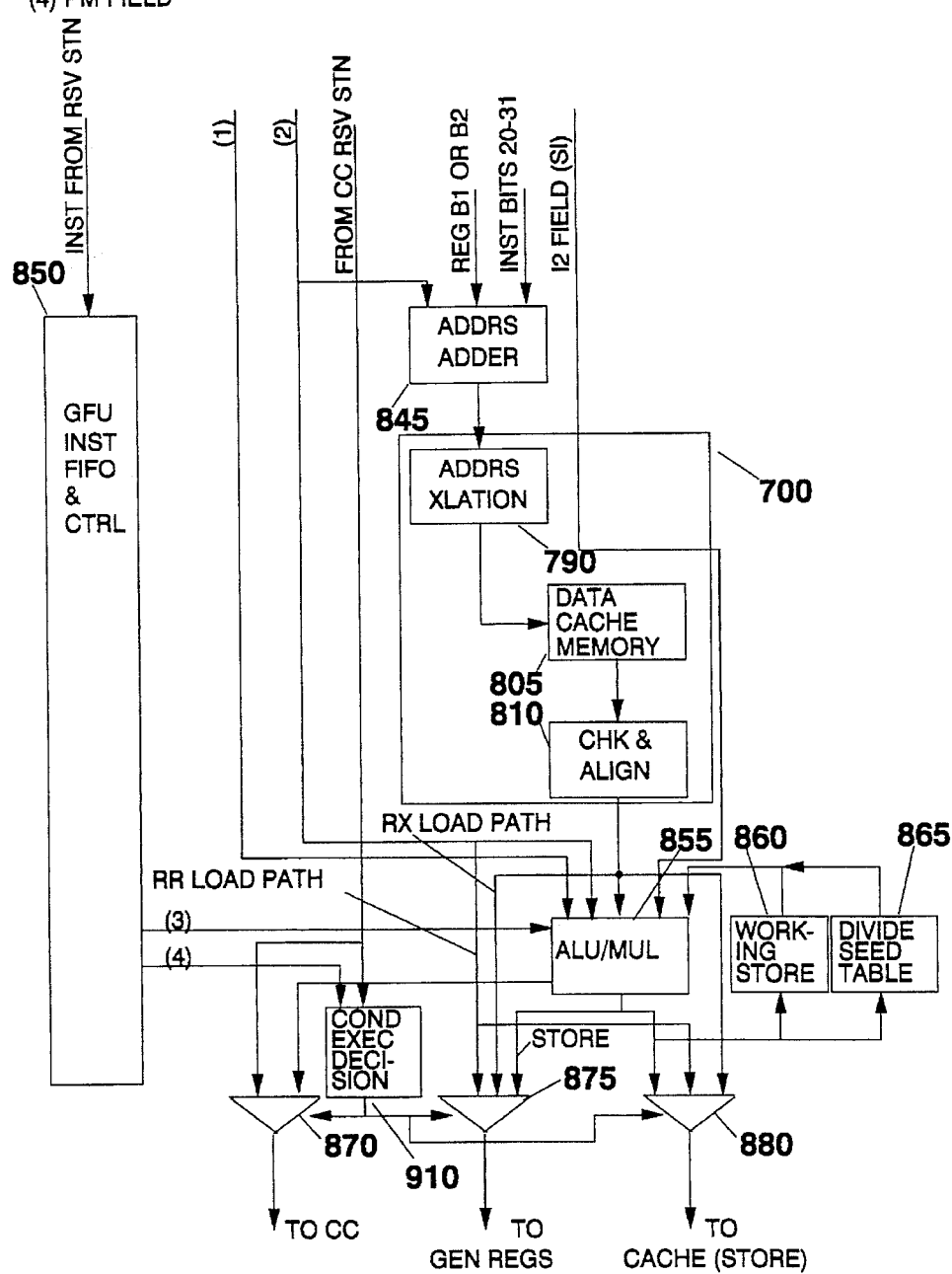
Figure 31d. Invention, IBM 370-XA General Functional Unit

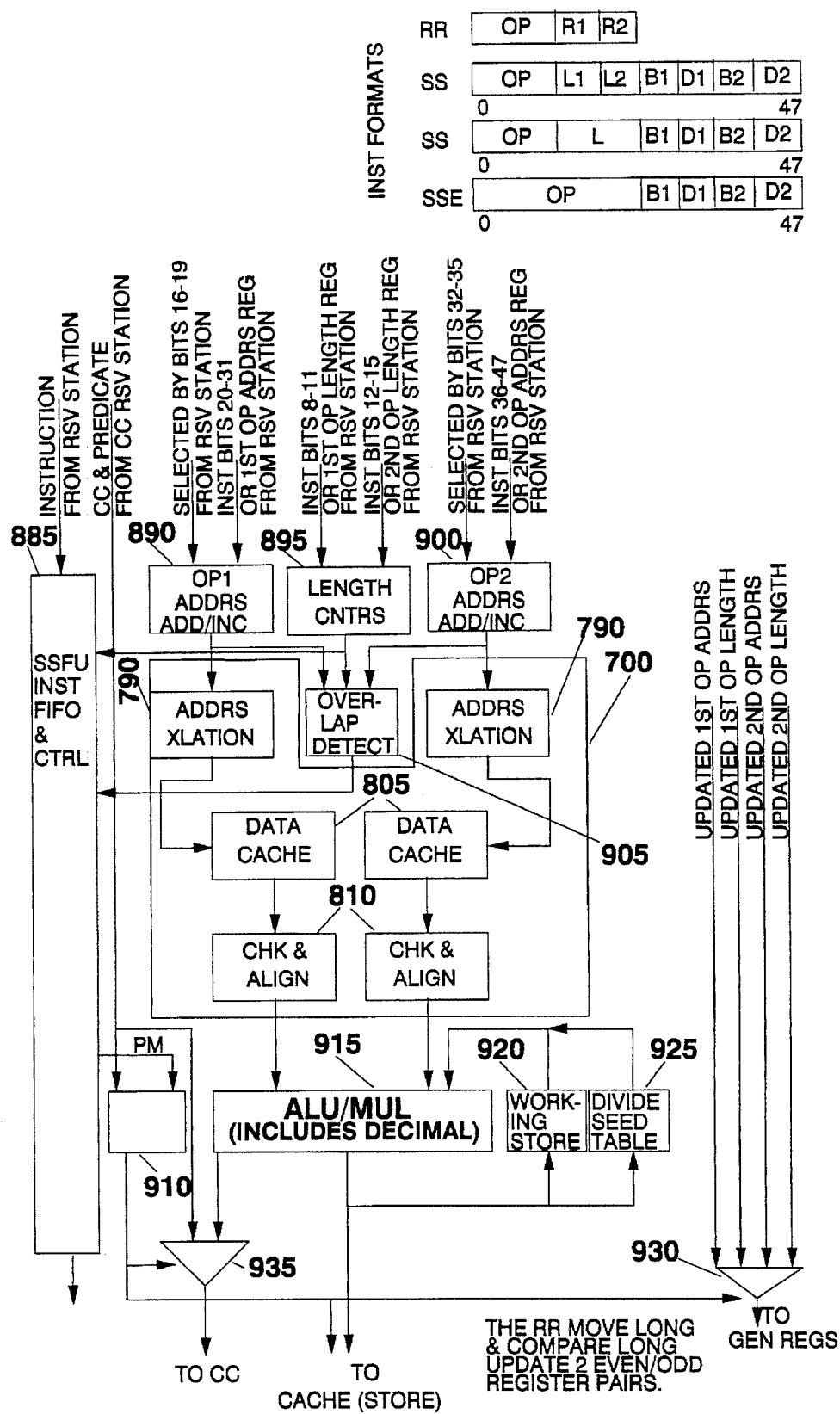
Figure 31e. Invention, IBM 370-XA SS Functional Unit

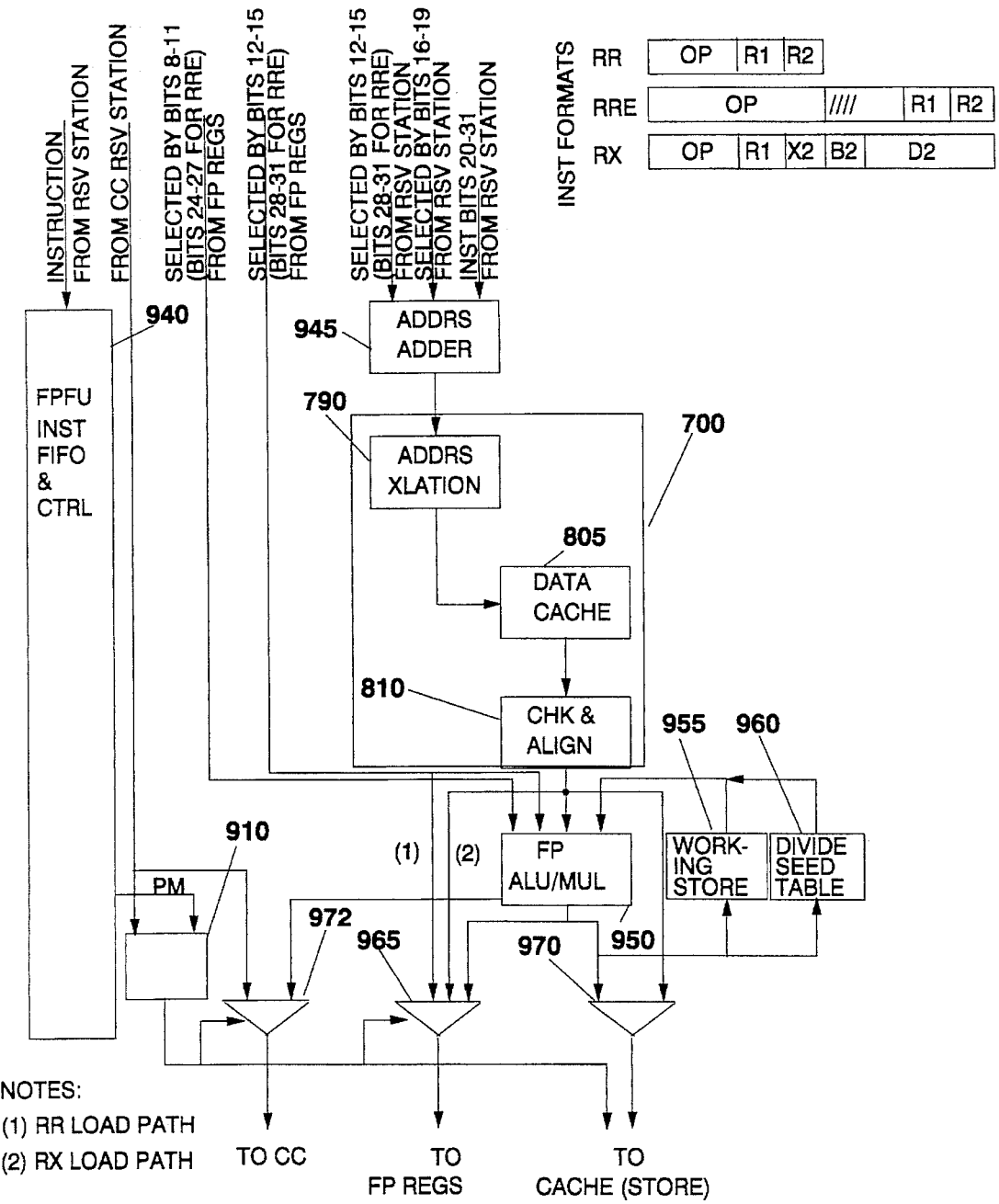
Figure 31f. Invention, IBM 370-XA Floating-Point Functional Unit

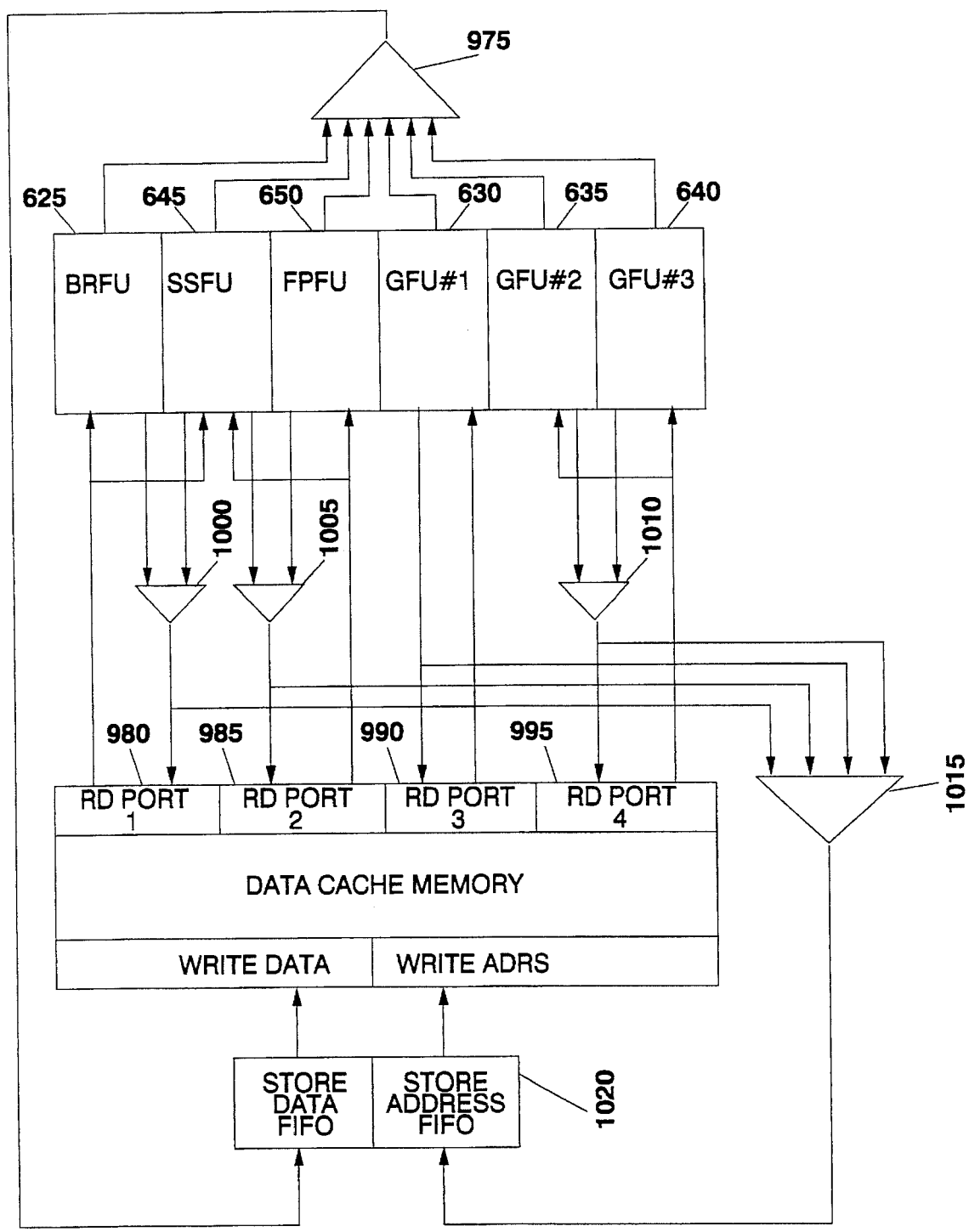
Figure 31g. Invention, IBM 370-XA Embodiment, Data Cache Ports

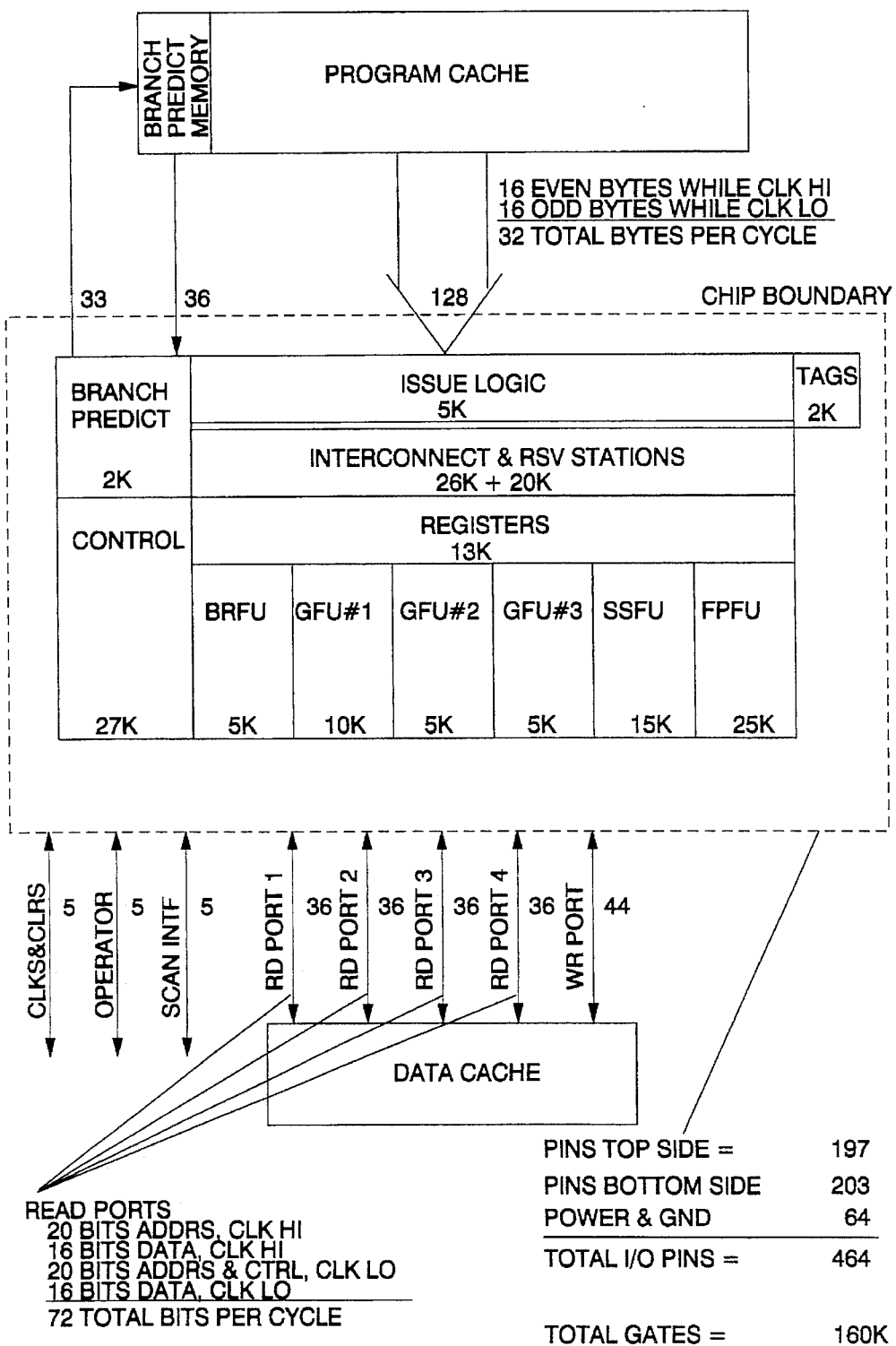
Figure 31h. Invention, IBM 370-XA Embodiment, VLSI Chip Gates and Pins

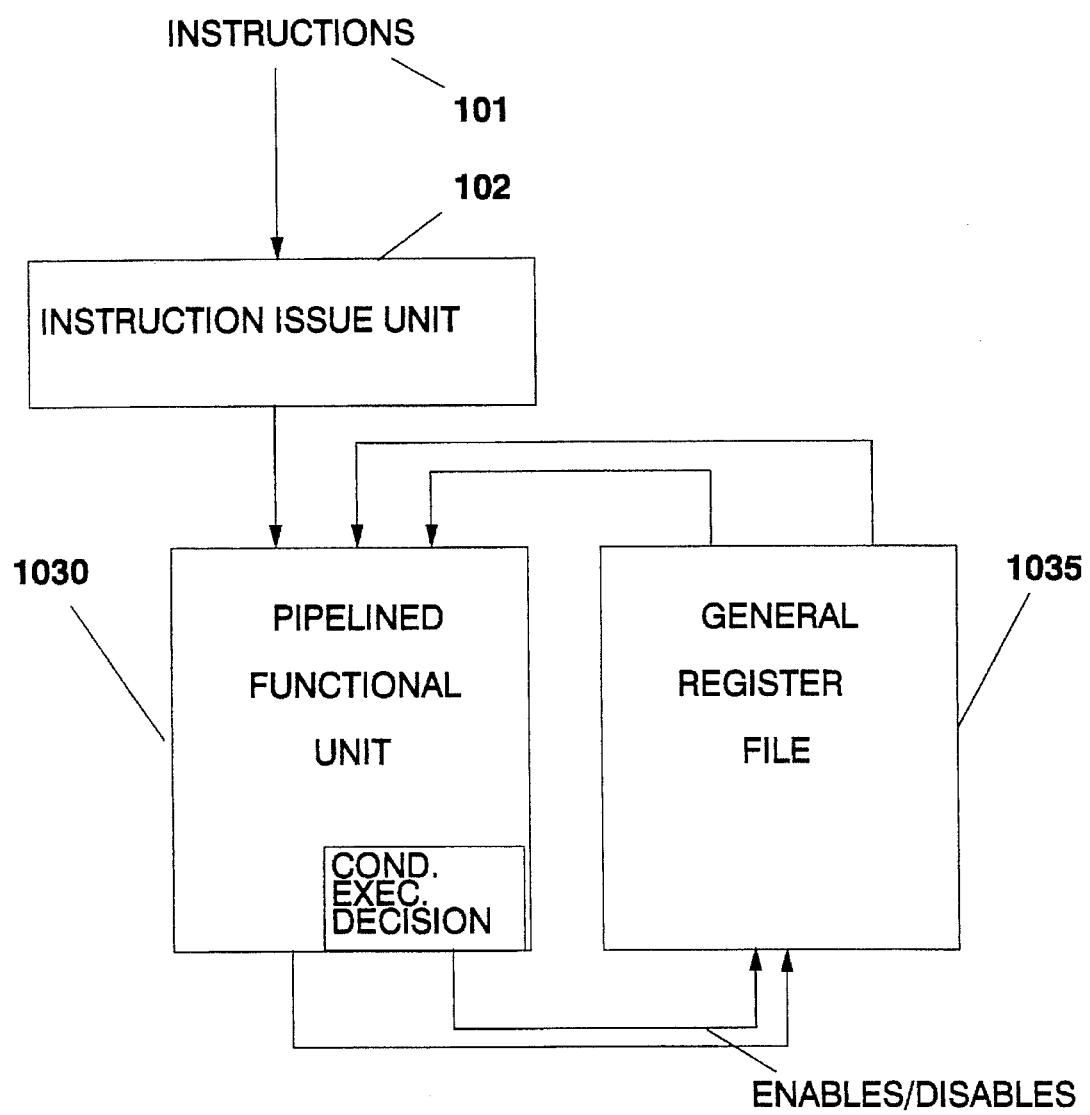
Figure 32. Invention,
Simple RISC Processor Embodiment

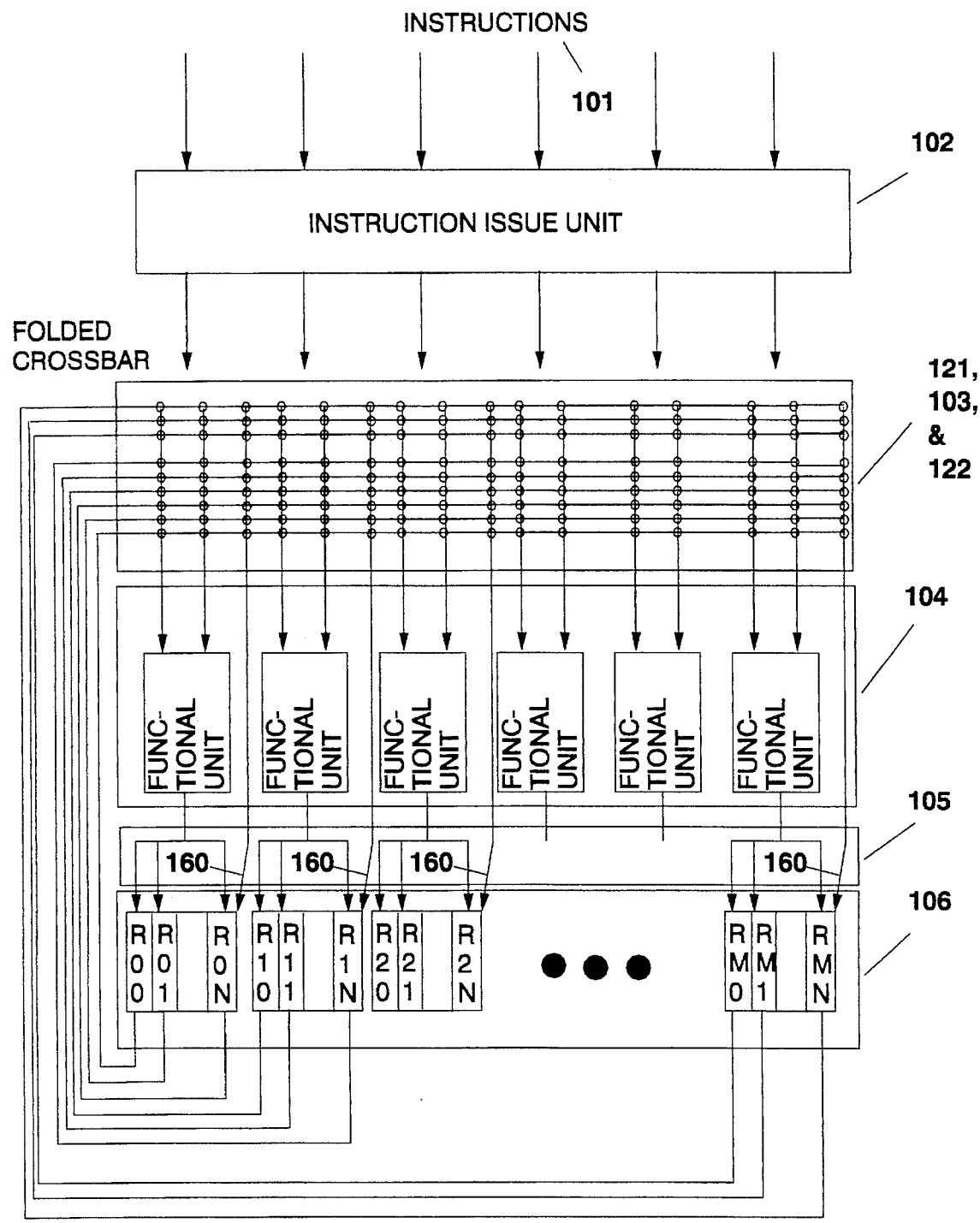
Figure 33. Invention, Improved Registered Crossbar Processor

Figure 34a. Invention,
Improved DSPA
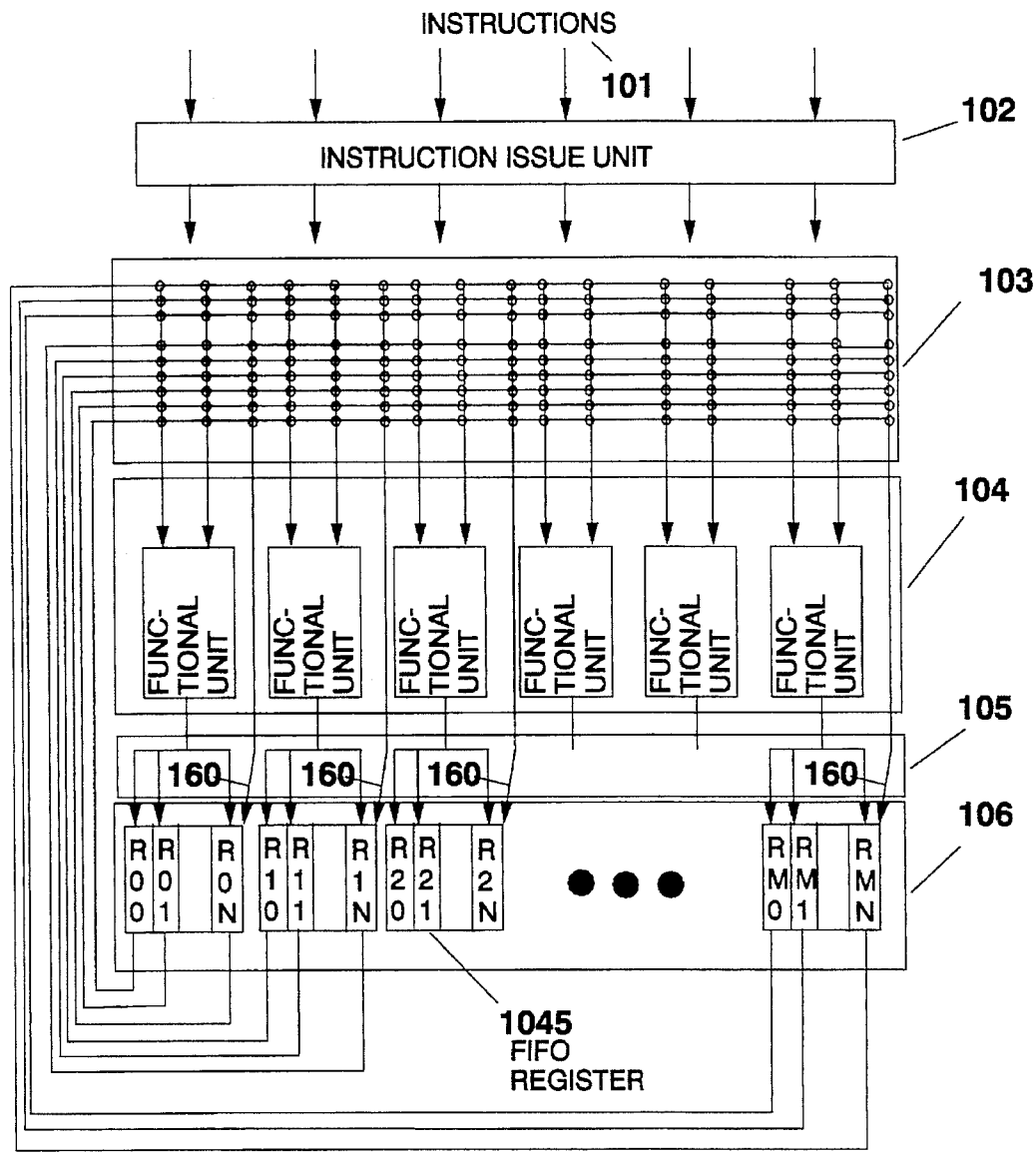
Figure 34b. Invention,
FIFO Register File of Fig. 34a.
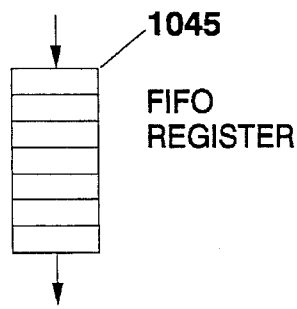

Figure 35a. Invention, Improved Queue Based Vector Processor
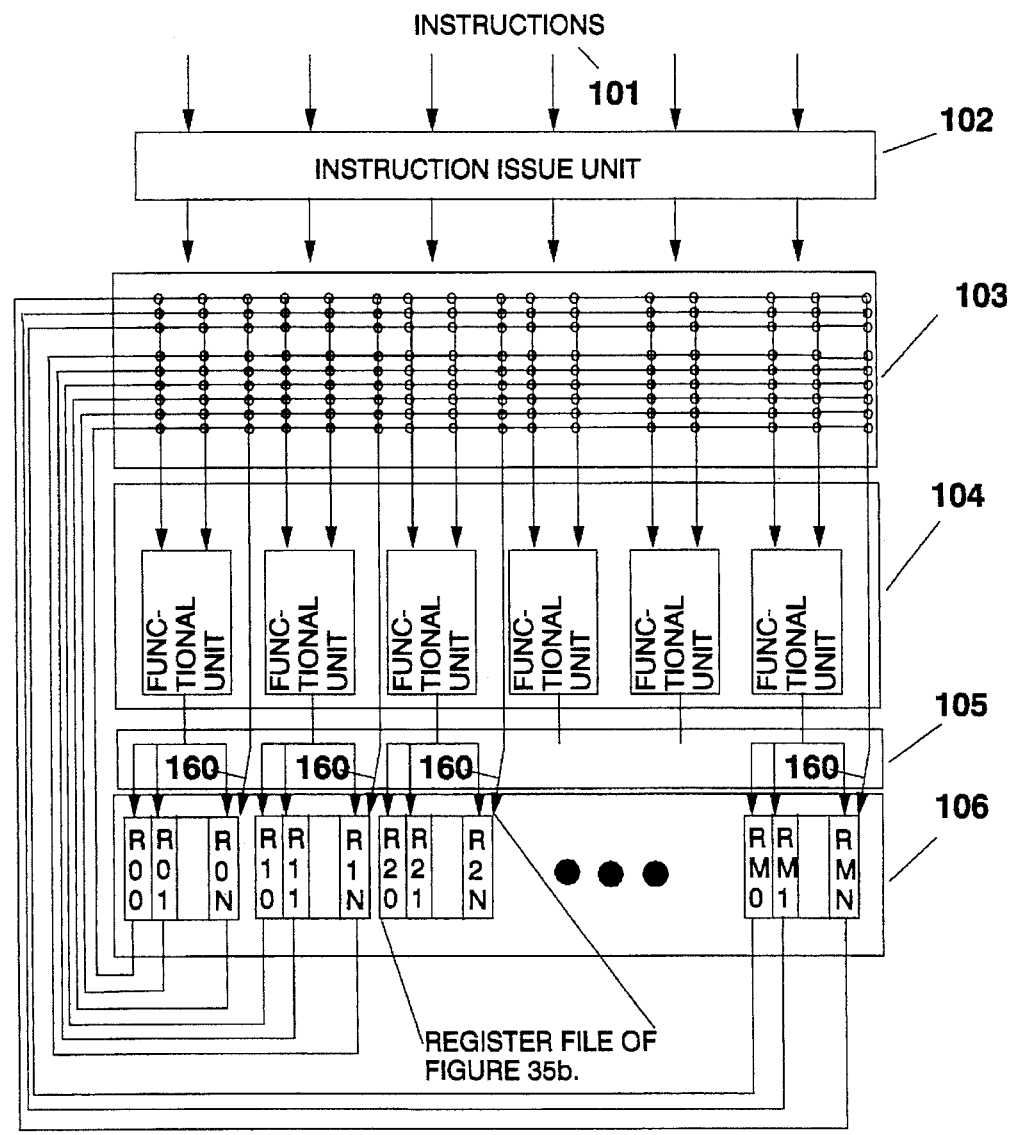
Figure 35b. Invention, Register File of Fig. 35a.
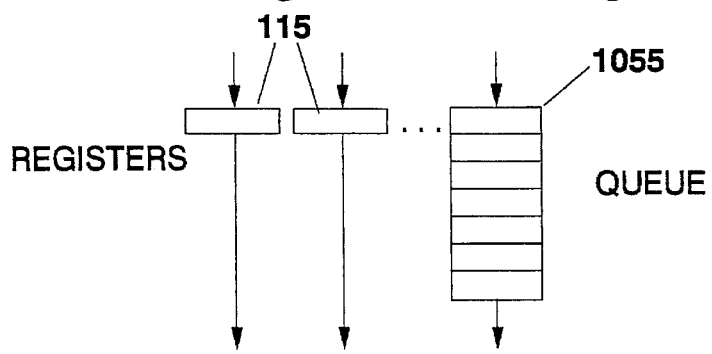

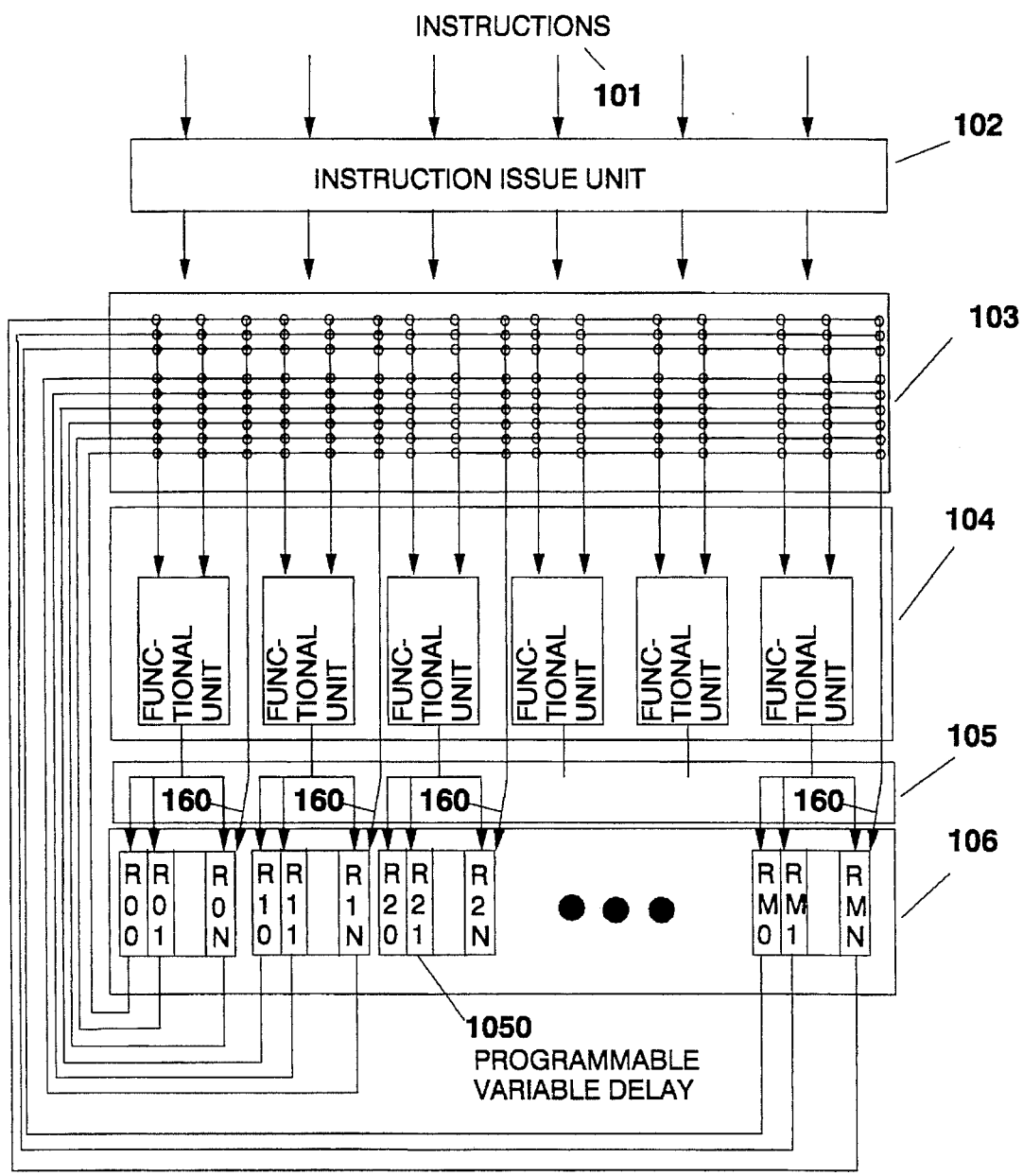
Figure 36a. Invention, Improved Systolic Pipeline
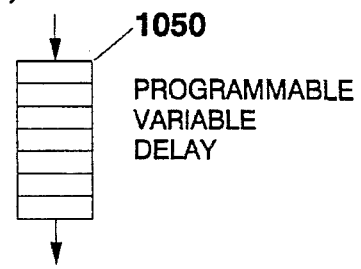
Figure 36b. Invention, Register of Fig. 36a.

5,471,593

COMPUTER PROCESSOR WITH AN EFFICIENT MEANS OF EXECUTING MANY INSTRUCTIONS SIMULTANEOUSLY

CROSS-REFERENCES TO RELATED APPLICATIONS

This application is a continuation application of U.S. patent application Ser. No. 07/448,720, filed on Dec. 11, 1989, and now abandoned.

BACKGROUND FIELD OF INVENTION

The present invention relates generally to the resolution of control dependencies in computer-executable instruction streams and, more particularly, to the conditional execution of instructions, including branches, before the controlling condition code may be available in order to reduce delays in execution of a stream of instructions.

BACKGROUND—LIST OF PRIOR ART FIGURES

To fully explain the prior art and the significant benefits and advantages of the present invention, several aspects of prior art are discussed. FIGS. 1–12 aid in understanding that discussion.

REGISTERED TRADEMARKS

Within this document references are made to the following registered trademarks:

AMD 29000 is a registered trademark of Advanced Micro Devices, Inc.

CDC, CDC 6600, and CDC 7600 are registered trademarks of Control Data Corp.

CRAY, CRAY-1, CRAY-2, CRAY-3, CRAY-XMP, AND CRAY-YMP are registered trademarks of Cray Research, Inc.

CYDRA AND CYDRA-5 are registered trademarks of Cydrome, Inc.

DEC and VAX are registered trademarks of Digital Equipment Corp.

IBM, IBM 360, IBM 370, IBM 370-XA, AND IBM SYSTEM 36 are registered trademarks of International Business Machines Corporation.

INTEL AND INTEL 80386/486 are registered trademarks of Intel Corporation.

INTERGRAPH CLIPPER is a registered trademark of Intergraph, Inc.

MIPS R2000/R3000 is a registered trademark of MIPS Computer Systems.

MOTOROLA, 680XX, AND 88000 are registered trademarks of Motorola, Inc.

MULTIFLOW AND MULTIFLOW TRACE are registered trademarks of Multiflow Computer, Inc.

NEC and NEC SX-2 are registered trademarks of Nippon Electric Corp.

SUN and SPARC are registered trademarks of Sun Microsystems, Inc.

WEITEC is a registered trademark of Weitec Corp.

ZS-1 is a registered trademark of Astronautics Corporation of America.

BACKGROUND DESCRIPTION OF RELATED ART

The performance capacity of a processor is the measure of its ability to do work, measured in OPERATIONS/SECOND. For mainframes the measure is TRANSACTIONS/SECOND and for scientific operations the measure is MFLOPS, Millions of Floating Point Operations Per Second. The achieved OPERATIONS/SECOND is the product of N—the number of OPERATIONS per Instruction, I—the number of Instructions per Cycle, and C—the number of Clock cycles per SECOND.

Maximizing the performance capacity, which can be visualized as the volume of the box shown in FIG. 1, is the goal of high performance computers.

Basic Architecture—A conventional high performance computer processor architecture, shown in FIG. 2, consists of multiple Functional Units connected to a common Result Bus. Any Functional Unit can output a result onto the Result Bus, but simultaneous results from multiple Functional Units must be placed one at a time onto the Result Bus. Instructions are fetched by the Instruction Fetch Unit and decoded and issued by the Decode and Issue Unit one at a time to the appropriate Functional Unit.

When one instruction can be issued every cycle, pipelined processors operate at their peak rate. However, in typical instruction sequences, actual performance falls far short of the peak rate; because, holes instead of instructions are necessarily inserted in the pipeline due to conflicts called "dependencies." A dependency exists when one or more of the following situations occurs:

(1) An instruction cannot be executed until the result of a logically previous conditional branch is known; these cases are termed control dependencies.

(2) An instruction needs data produced by a logically previous instruction; termed a data dependency.

(3) A variable (e.g. register) cannot be updated by an instruction to a new value until a logically previous instruction has used the current value; another form of a data dependency.

Conditional Branching and Conditional Operations

The performance degradation associated with Conditional Branching in programs is severe enough to have generated many studies of architectural alternatives. These include not fetching the entire branch instruction when unsuccessful, [Pack1], the use of delayed branches, the use of one- or two-instruction branches,[Scho1] the use of condition codes [DeRo1], the use of static and dynamic branch prediction[Hori1,Hugh1,Lee_1], the use of fast compares, the use of Profiled (by the compiler) Branches, and the use of Squashed Branches[McFa1]. Linde's patent[Lind1] describes a method of extending the clock when a branch is encountered. Others insert NOOPs when a branch or bad guess occurs. [Iwas1,Jone1,Keef1,Kim_1,Mori1,Olno1].

These techniques decrease the time to execute a branch toward one cycle; however, in architectures where multiple instructions can be issued in parallel, none of these offers a satisfactory solution for high performance execution of Branch-intensive code.

Many general purpose processors have used variations of the SKIP instruction, where one or more instructions following the SKIP instruction are conditionally skipped over or converted to NOOPs.

[Ande1, Cock1, Grun1, Kimo1, Mead1, Prey1, Shim1]. This addresses those uses of the Branch instruction for programmed structures like IF/ELSEIF (a non-diverging path), but does not address the common Branch statements (e.g. diverging paths) and especially not the multi-way Branch statements of high level languages like FORTRAN. In FORTRAN the arithmetic IF statement

IF (A–B) 200, 300, 400 indicates that if the result of A minus B is negative, zero, or positive the next statement to be executed is 200, 300, or 400, respectively.

Another conditional flow handling technique is to eliminate the Branch by having the conditions selectively affect some operations in a single code path rather than branching to different code paths. This has been necessary in the highly specialized Single Instruction Multiple Data architectures [Artz1,Borc1, Borc2,Lori1,Ster1,Stok1], where the internal state of a Processing Element can modify or augment the controls from the central control unit. This has also been necessary in SIMD machines because there is only a single instruction stream from the central control unit controlling all Processing Elements, with no way to send different instructions to different Processing Elements. The typical control is called a conditional activate/deactivate scheme, where those Processing Elements that have the specified internal status state perform the instruction and those that do not have the specified internal status state perform a NOOP instruction. As Artz explains it[Artz1], "Only the Arithmetic Units that are active will interpret the instruction provided by the Arithmetic Control Unit and act upon them, whereas an inactive Arithmetic Unit will not act upon the instruction provided by the Arithmetic Control Unit." The primary deficiency of this technique is that the activate/inactivate decision condition must be available when the instruction is issued by the Arithmetic Control Unit.

Li's patent[Li–1] describes an array of Processing Elements where the instruction Op Code is modified by a test bit in each PE, e.g. an ADD instruction or a SUBTRACT instruction is executed based on a test bit. He further suggests a supercomputer with dual operation instructions called OPA/OPB (operation A or operation B) where one of the operations is selected by an agreement bit. The primary deficiency of Li's technique is that the start of execution of the selected operation is delayed until the agreement bit is available. In the typical branch intensive code, the holes introduced while waiting for the agreement bit to be available degrade performance. Additionally, the compound instructions suggested can improve performance when the set of compound instructions included in the machine matches the problem to be executed, but it is generally impractical to implement all possibly needed combinations; therefore, only some problems benefit.

Using conditions to affect operations, other than branches and skip instructions, has been done in general purpose computers only for very special cases. In primitive instruction set machines additional condition register bits have been used to enhance the performance of Binary Coded Decimal operations[Aus1]. In graphics applications selected carry flags and sign flags are saved in a shift register for use as an address[Hase1].

Borgerson et al[Borg1] describe a more general use of conditional control intended to allow conditional branches to be performed each cycle, in an unbroken rhythm. Each microinstruction contains two next address fields, two function control fields, and two deferred action fields. Three decision control signals select one field from each pair of fields. Their use of conditional control is limited by their claims to instructions that each contain the two function control fields and the two next address fields. Selection of the proper function field requires that the decision control signal be available before the function is issued to the Functional Unit (called a Local Processor by Borgerson et al).

Borgerson et al's deferred action fields control the storing of results generated by the Functional Units and, therefore, can use decision control signals that are available later. Deferred action is only provided in their invention along with function selection and next address selection, all requiring two fields each in the instruction. The combination is not performance limiting in the three-way overlap (fetch, execute, store) very wide microinstruction microarchitecture they describe. However, next address selection and function selection, as described, limit the pipeline depth and, therefore, severely limit the clock rate. The described 10 MHz clock rate is much slower (about ¼ the rate) than 1976 air cooled ECL could support.

As detailed in the following discussion, the use of conditions to affect operations has been used in the vector mode of vector machines where the conditions can be generated significantly in advance of their use and organized into a regular array or register. Additionally (as discussed later), in the Cydra architecture, ICR bits set by earlier COMPARE instructions can be used to control the issuing of instructions. None of these techniques apply to the typical branch-intensive code.

Terminology Defined

The two extremes of dependency resolution are

* Software Dependency Resolution or Static Scheduling— The compiler or programmer are totally responsible for statically managing dependencies among the multiple Functional Units; no hardware interlocks are provided.

* Hardware Dependency Resolution or Dynamic Scheduling—The hardware dynamically manages dependencies; the programmer or compiler need only place the instructions in their natural logical order.

The three principal alternatives for overcoming dependencies are:

* Serial Instruction Issue—There is only one unit that can issue instructions and it is limited to one instruction per cycle.

* Parallel Instruction Issue permits more than one instruction to be issued during each cycle if dependency checking allows.

* Vector Chaining, overcomes the one instruction per cycle bottleneck for repetitive operations on arrays of data. Since the operations are repetitive, the instruction for each functional unit is issued once and then repetitively executed by the functional unit. Parallel issue and vector chaining are not mutually exclusive.

The following is a discussion of prior art architectures that strive to improve performance through various dependency resolution schemes and through increases in parallelism.

Serial Instruction Issue

Serial Instruction Issue, Software Dependency Resolution (Static Scheduling)—Improvements in compiler technology have led to computer architectures which provide no hardware to detect and resolve dependencies. These architectures, of which the Berkeley MIPS RISC[Kate1] design is a good example, are termed "pipelined without hardware interlocks". The compiler generated code is responsible for placing instructions in their proper timing relationship to resolve dependencies.

For example, if an ADD instruction requires three cycles to complete, any subsequent instruction that is to use the ADD's result must be placed three instruction "slots" after the ADD. If there are not other useful instructions available to fill the intervening slots, NOOPs (do nothing) instructions must fill those slots.

Control dependencies, those that occur due to conditional BRANCHs in the instruction sequence, are difficult for the prior art to handle because the result of the BRANCH is unknown for several cycles. During this time, which instructions should be issued is unknown. A typical Software Dependency Resolution solution is to always execute some fixed number (usually 3 or less) of instructions following the BRANCH. The "delayed branch" technique also requires the compiler to reorder the instructions so that the BRANCH is placed earlier in the sequence, because it is known that the instructions immediately following the BRANCH will be executed before the BRANCH is resolved. If the compiler cannot find other useful instructions to fill the slots in the BRANCH "umbra", NOOPs must fill the slots.

The WISQ architecture[Ples1], shown in FIG. 3, attempts to improve the ability of the compiler to schedule code into all slots by (1) Providing a reorder buffer for results, which can be out-of-order because the Functional Units can have a variable number of pipeline stages. This buffer provides a fixed number of delay stages between the Result Bus and the register file. Entries in the reorder buffer can be specified as sources in subsequent instructions. This improves the ability of the compiler to fill slots by (a) allowing the current contents of a register to continue to be used for a predictable number of cycles after an instruction which will change that register has been issued and (b) allowing early access of results from a predetermined reorder buffer location before they are written to the register file.

(2) Providing multiple condition codes, one associated with each register, to be used for branch decisions. Additionally, based on the state of the condition code being tested, each branch can specify that certain instructions in the reorder buffer be discarded, allowing the instructions in the path the compiler believes to be "most likely" to be issued and to start execution before the branch is executed. A good guess achieves improved performance and the damage of a bad guess is easily undone. The technique of discarding certain already begun or executed instructions when the branch takes the unexpected path is called "Branch Squashing."

WISQ also uses the reorder buffer to achieve precise interruptions by storing results in their original program order, even though instructions may complete out-of-order (see details below). Until the contents of the reorder buffer are written to the General Registers, the permanent state of the machine has not been altered by the result; therefore, when an interruption occurs the state of the General Registers precisely represents the state immediately following the instruction associated with the last write to the General Registers. Restarting after an interruption involves starting execution with the next instruction in order.

Architectures that do not reorder out-of-order results do not handle interruptions well, because the interrupted task cannot be easily restarted after the interruption is handled. A virtual memory page fault that occurs when a virtual memory page is not resident in memory is a kind of interruption that is difficult (or impossible) for architectures that fail to reorder instructions. Virtual memory is required to efficiently handle multiple interactive users and multiple tasks.

The WISQ manages the reorder buffer as a fixed length queue where issuing an instruction is effectively adding one element to the tail of the reorder buffer and committing an instruction removes one. An instruction knows where to place its results in the reorder buffer based on the index established at issue.

The major deficiencies of WISQ and the other Static Scheduling serial instruction issue architectures discussed above are:

(1) Variable delays, like those associated with cache misses and with memory conflicts in multiprocessor systems, cannot be handled, due to the need for the software to explicitly place instructions in predetermined slots. The only alternative is to have hardware stall all pipelines if an unanticipated delay is encountered.

(2) Performance is limited by the one instruction at a time issue strategy.

(3) About 25 to 30% of a typical program's instructions are BRANCH's, further reducing the issue rate of instructions that perform calculations.

Serial Instruction Issue, Hardware Dependency Resolution (Dynamic Scheduling)—In the simplest Hardware Resolution Architectures of the form shown in FIG. 2, instructions are typically issued to a functional unit for execution by the Decode and Issue Unit strictly in program order. If an operand needed by the instruction is not yet available, the instruction and all instructions following it must wait. During the several cycles needed to complete a Branch, execution pauses. Register dependencies are typically flagged by a "Busy-bit" in each register. The Busy-bit is set whenever an instruction is issued which specifies that register as a destination and cleared when the result is written. Any subsequent instruction, that sources that register and encounters the Busy-bit, waits until the Busy-bit is cleared. The Cray-1 scalar processor[Cray1], representative of this architecture, has been shown by Weiss and Smith[Weis1] to benchmark at 0.42 instructions/cycle, i.e. each instruction takes about 2½ cycles.

Scoreboarding, developed by Thornton[Thor1] for the CDC 6600 and now used in the Motorola 88000, also uses a "Busy-bit" in each register. However, subsequent instructions that need to source that register wait in what is termed a "Busy-Wait" state. Busy-Wait state instructions are placed in a "reservation station," as shown in FIG. 4, at the input to the target Functional Unit where the instruction waits until the needed register is no longer Busy, i.e. until the needed data is seen being written via the result bus. Subsequent instructions that do not encounter a "Busy-Wait" and which are targeted at Functional Units with an empty Reservation Station can go ahead and execute "out-of-order". When an instruction specifies a destination register that is already Busy, all instruction issue halts to ensure that waiting instructions get the correct data copy.

Scoreboarding has been shown by Weiss and Smith[Weis1] to improve benchmark performance to 0.54 instructions/cycle.

Tomasulo's algorithm[Toma1], FIG. 5, improves on scoreboarding in two ways:

(1) Multiple Reservation Stations are dedicated to the inputs of each functional unit.

(2) Instruction issue does not halt if the destination of an instruction is a register that is already Busy.

Continuing instruction issue when the destination of an instruction is a Busy-register is possible because the result of every instruction is identified by a "tag" that is the address of the Reservation Station used. Subsequent instructions are provided with information about which tag is associated with that instruction's needed source data. Instructions wait in a reservation station until the proper tagged result is available on the Common Data Bus. An instruction can be executed from its Reservation Station as soon as all its needed operands are available, i.e. instructions within the same Functional Unit can execute out-of-order. Out-of-order execution, without reordering, was permissible in the targeted IBM 360 architecture, because virtual memory was not supported. As more instructions are available in reservation stations for execution, the chance of finding something useful to do increases so the performance improves to 0.66 instructions/cycle.

Sohi and Vajapeyam[Sohi1] extended the out-of-order execution concept via a mechanism called the Register Update Unit (RUU) in an architecture that issues, at most, one instruction per cycle. The RUU is really a consolidation of Tomasulo's algorithm into a single unit. RUU entries are managed as a list, i.e. no RUU entry is permanently assigned to a particular Functional Unit. This technique allows more instructions to be actively waiting in the Reservation Stations (RUU entries); therefore, there is a better chance of finding something useful to do. Benchmark performance of 0.75 instructions/cycle has been demonstrated.

The RUU reorders the instructions that were executed out-of-order, but while an instruction waits to be committed its "virtual results" are usable by subsequent instructions. As previously discussed, in-order commit supports precise interruptions and greatly simplifies virtual memory support.

The reordering is accomplished through the allocation of RUU entries from the pool of free entries via a linked list mechanism, i.e. the first allocated RUU entry points to the next, etc; therefore, the entries at the head of the list are those that are next to commit, when they have the needed results.

RUU Deficiencies—The organization of the RUU's into a shared list has theoretical advantages, but its cost is very high. Each RUU entry represents an instruction with two sources, one destination, and a program counter. For 64-bit operands, with tags and flags, each entry needs about 240 bits of storage. Twenty-four RUU entries are equivalent to the 48 Reservation Stations of Tomasulo's algorithm in FIG. 5.

It is important to note that even with the complexity of the RUU design, the average instruction still takes 1.3 cycles to complete. This limitation is the primary motivation of architectures that issue multiple instructions in parallel.

Parallel Instruction Issue

Parallel Instruction Issue, Software Dependency Resolution (Static Scheduling—A variation of the conventional serial instruction issue architecture of FIG. 2 is the central register architecture of FIG. 6a which improves performance by issuing multiple instructions simultaneously. Very Long Instruction Word (VLIW) machines like the Multiflow Trace[Mult1] models use this general architecture. The compiler is responsible for all dependency resolution. Multiple instructions, grouped together by the compiler into a VLIW, operate on data contained in the central register file.

A slightly different architecture, the Crossbar Network Processor of FIG. 7, is generally used inside the Long Instruction Word (LIW) computers[Char1]. The added crosspoints in the crossbar network allow any result to be routed to any unit (functional unit or general register) without blocking other results from going to other units.

If the timing of the code is just right, the result of a functional unit can be directly used as an input to a subsequent operation. These quicker paths are called "bypass" paths, because they bypass the added delay of writing to the general register.

The real machines of this type may not implement the full crossbar, i.e. some connections are eliminated to reduce complexity. As crosspoints are eliminated the architecture becomes progressively less capable. Eliminating bypass crosspoints causes operations that would have used those eliminated paths to take longer and eliminating register ports causes the available register ports to become a potential bottleneck.

The general form of FIG. 7 has been extended by Rau et al[Rau1] to the form of FIG. 8a, Registered Crossbar Network Processor, by placing register files at each cross-point of the cross-bar matrix, as shown in FIG. 8b. This is the basis of the Cydra-5[McNa1,Rama1] computer. The availability of many registers does make the compiler easier in some respects and each register file is simple, since it has only one write port and one read port; however, there are many register files. This structure uses registers very inefficiently, since they are duplicated across each functional unit. A write to a register number changes all copies of that register number in the row corresponding to the source Functional Unit, so the best case number of registers needed for the Registered Crossbar occurs when the General Registers of FIG. 7 can be evenly distributed across the rows, i.e. at each of the $2F^2$ crosspoints there are R/F registers and an R/F-input selector to gate one of those registers to the connected Functional Unit input.

The real machines of this type actually have many more registers than are allocated in the above formula. Also, note that providing the General Registers of FIG. 7 in addition to the replicated crosspoint register files can dramatically increase the number of crosspoints and, therefore, the total number of crosspoint register files.

The Cydra-5 includes a hardware facility, called the Iteration Control Register (ICR), managed by the compiler to control the issuance of operations. Bits in the ICR are set as the result of compare operations. Subsequent instructions can specify the ICR bit location as a predicate. Only if the predicate is true, is the instruction issued.

This prior art predicate mechanism is used in a theoretical prior art VLIW machine that is compared to the present invention later in this disclosure. In that discussion it becomes more apparent that the predicate mechanism requires many more compare operations and predicate bits than is initially obvious, for three reasons:

(1) The inability to issue based on the predicate being false, means that when executing two threads of control (e.g. one for a branch taken and one for that branch not taken) two predicate bits must be available from two compare operations.

(2) Three way arithmetic GOTO's, which are common in FORTRAN, need three predicate bits set by three compares.

(3) Compound decisions, which involve setting predicate bits based on the state of predicate bits set by previous compare operations, require that the predicate bits used be pre-cleared by an additional compare operation.

In addition to these particular deficiencies and the requirement for a large number of gates, the prior art parallel instruction, software dependency resolution architectures have several other deficiencies:

(1) Variable delays like those associated with cache misses and with memory conflicts in multiprocessor systems cannot be handled, due to the need for the software to explicitly place instructions in predetermined slots. The only alternative is to have hardware stall all pipelines if an unanticipated delay is encountered.

(2) As more pipeline stages are added to improve the clock rate, the percentage of instruction slots that can be filled decreases rapidly. These designs, therefore, typically have very slow clock rates. The Cydra-5, implemented in 1985 ECL logic, achieves a clock rate of only 25 MHz, while the Multiflow Trace X/200, implemented in 1986 CMOS/High-Speed-TTL, achieves a clock rate of only 7.7 MHz. In aggressively segmented pipelined machines, more typical clock rates for these technologies are 50 MHz and 20 MHz, respectively.

(3) Even with their slow clock rates, only about 20% of the available instruction slots can typically be filled with non-NOOP instructions, i.e 80% of the instruction slots are empty.

(4) Exploiting the Cydra's conditional issue strategy requires the COMPARE which sets the ICR to fully complete before an instruction issue can depend on that ICR value. This only fits code with few widely spaced BRANCH's, not code sequences with many closely spaced decisions. Since BRANCH's constitute 25 to 30% of typical code, Cydra's efficiency is poor.

(5) Multiflow's BRANCH strategy is to go ahead and execute code from the most probable path before the BRANCH is executed and to provide code to undo the damage when the other path is actually taken. Again this is not suited to the typical BRANCH intensive code.

Parallel Instruction Issue, Hardware, Dependency Resolution (Dynamic Scheduling)—Pleszkun and Sohi[Ples2], discussed previously, have recently expanded on the work of Sohi and Vajapeyam[Sohi1] while investigating the theoretical performance limits of Multiple Functional Unit Processors capable of issuing more than 1 instruction per cycle. FIG. 9a illustrates the RUU (Register Update Unit) architecture with an issue unit which can issue up to 4 instructions at a time and 4 Result Busses. This is a 1-to-many architecture, i.e. any one Functional Unit can modify many (all) of the Registers. The RUU's are injected into the architecture between the General Registers and the Functional Units, with crossbar interconnects as shown in FIG. 9b. In their studies a 50 RUU version of this configuration achieved an issue rate of 1.2 instructions/cycle.

Another parallel issue, hardware resolution architecture, the Data Synchronized Pipelined Architecture (DSPA)[Jego1] of FIG. 10a, is organized like a Registered Crossbar Pipelined Processor (FIG. 8a), but places a First-In-First-Out (FIFO) register file at each cross-point, as shown in FIG. 10b. This is a 1-to-1 architecture, i.e. any FIFO Register File can be written by only one Functional Unit. It differs from the Cydra-5 in two ways: (1) a result is written to only one FIFO in the crossbar row, not to all in the row and (2) the hardware interlocks operations until the needed data becomes available in the FIFO, allowing instructions to be simply placed in the program in their natural order, thus removing the necessity for the compiler to place instructions in their exact timing slots. Each result is written to a single FIFO, selected by the instruction, and each FIFO read destroys the FIFO copy; thus the architecture has two difficulties that must be overcome by the compiler:

(a) A datum has a one-to-one correspondence between producer and consumer, i.e. if a datum (result) needs to be used three times there must be three unique instructions producing three results. This need ripples—the three instructions needed to produce the three results depend on previous results, which must also be triplicated, etc. The alternative is to place the datum in the General Register Functional Unit and to issue instructions to it specifying writing to the FIFO's that need the replicated data.

(b) The one-to-one correspondence requires all machine code to be organized by the compiler into a "Correct Unbreakable Sequence" (CUS) to prevent the machine from blocking (stalling waiting for data that will never come). The three requirements of a CUS are (1) a jump must be either the first or last instruction in a CUS, (2) every datum produced in a CUS must be consumed in that CUS, and (3) every datum consumed in a CUS must be produced in that CUS.

These restrictions not only increase the total number of instructions, but also effectively prevent the compiler from using many known optimization techniques and severely limit the DSPA's expansion beyond its 2 instructions per cycle maximum issue rate. In fact, the CUS requirements seriously impact the performance of typical branch-intensive code.

The general form of the DSPA architecture is as shown in FIG. 10a, where the required General Register Functional Unit has been added to the configuration of FIG. 8a.

Vector Chaining

Vector chaining extends, for certain repetitive sequences, the concept of pipelining by linking the results of multiple functional units together. Instructions to be executed repetitively are issued by the Instruction Issue Unit to the appropriate Functional Unit(s). Each Functional Unit then repetitively executes its instruction for the specified number of iterations. By linking the result of functional units to the inputs of others an elongated pipeline is created.

The crosspoint architecture of FIG. 7 is generally used inside the vector portion of supercomputers. The crossbar network allows any result to be routed to any unit (functional unit or general register) without blocking other results from going to other units. Actual machines, e.g. Cray[Cray1], typically do not implement the full crossbar.

The limitations of vector architectures are well documented, but the essential point is, as Amdahl[Amda1] pointed out, that vectorization can only improve a certain portion of the computing workload. The true performance in OPERATIONS/SECOND is the harmonic mean of the OPERATIONS/SECOND achieved in the various segments. That is if vectorization speeds up 50% of the code by a factor of 10, the true performance gain is only 1.8, $$1/(0.5/10+0.5/1)=1.82$$

Even when 90% of the code is improved by a factor of 10 the true performance gain is only about 5, $$1/(0.9/10+0.1/1)=5.26.$$

The fact that vector chaining fails to improve non-vectorizable or scalar code is, therefore, its major deficiency.

This deficiency is aggravated by typical branch intensive code.

Vector chaining architectures generally include the ability to conditionally update the result array to allow vectorization of problems that conditionally change only selected array elements. In the Cray architecture[Cray1] the vector merge operation is controlled by the individual bits in a special Mask register. If the corresponding bit is true, Operand A is stored, otherwise Operand B is stored. One operand represents the current data, i.e. the "no change" case.

Tanakura et al[Tana1] improved on the Cray mechanism by allowing a set of conditional data (controlling information) to be fetched from an array in parallel with the fetch of the operands needed for an operation. The operands and conditional data progress in lockstep through the pipeline. At the end of the pipeline the result is determined to be valid or invalid based on the associated conditional data.

Both these approaches require that all conditions to be tested be generated by the compiled code before the vector operation that uses them is begun and, further, that the conditions be organized into a regular array (or register). These requirements severely limit the usefulness of such capabilities and certainly do not fit typical branch intensive sequences.

Recently vector processors have been extended to allow logical products (AND) and logical sums (OR) to be included in vector chains.[Naga1] This extension permits some additional problems in imaging to be handled by vector processors, but still fails to address typical branch intensive sequences.

The Queue-Based Vector Computer (QVc)[Youn1,Youn2], FIG. 11a, begins to solve some of the problems of vector architectures by having both vector and scalar modes share all functional units and registers and by providing a set of Queue Registers. The Queue Registers, FIG. 11b, are FIFO's like the DSPA[Jego1], but three access modes are provided: (a) destructive mode, where a read removes the first element; (b) non-destructive mode, where a read does not modify the contents; and (c) circular mode, where, after all elements of the queue are read, the contents are the original contents. Scalar registers are simply queues of depth one.

The two level issue mechanism ensures that each instruction uses the correct data copy via three control queues for each Queue Register and a valid bit associated with each element of each Queue Register. These controls are managed by the following rules:

(1) The Read_Control_Queue (RCQ) and the Write_Control_Queue (WCQ) are used to maintain logical coherence across Functional Units by ensuring that all reads of a Queue Register are issued in sequential program order and that all writes of a Queue Register are issued in sequential program order.

Issue_1 (the global issue unit) at instruction issue places the target Functional Unit's number (or tag) on the RCQ associated with the source and the WCQ associated with the destination of the instruction.

Issue_2 (local to the Functional Unit) uses the RCQ and WCQ to control issuing an instruction. Issue from Issue_2 occurs when the RCQ and WCQ entries of the sources and destination of the instruction match that Functional Unit's number, when the needed source data is available as indicated by the valid-bit at the head of the Queue Register, and when the destination Queue Register is not busy as indicated by the DAQ (see below).

Issue_2 clears the RCQ and WCQ entries specified by a scalar instruction when it issues that scalar instruction.

For vector instructions the WCQ is cleared when the last write operation is issued and the RCQ is cleared when the last element has been latched elsewhere.

(2) The Data_Available_Queue (DAQ) ensures that a logically subsequent instruction result cannot reach a destination Queue Register before a logically previous instruction's result.

When Issue_2 issues an instruction $I_n$ needing n clocks to write a result to $Q_i$, it sets a Busy-bit in the first n entries of $DAQ_i$.

Each DAQ shift register is forwarded one position during each clock time.

Subsequent attempts to issue (by any Issue_2) an instruction $I_m$ needing m clocks to write a result to $Q_i$ requires that the m-th entry in $DAQ_i$ be non-Busy. This effectively ensures that the result from instruction $I_m$ will follow the result from instruction $I_n$ by at least one cycle.

(3) The valid-bit associated with each Queue entry is set by completion (a write). It is used by Issue_2 as a condition on issuing an instruction. It is cleared when an instruction specifying a destructive read is issued by Issue_2.

The harmonic mean of the published performance improvements indicates that the QVC should improve benchmark performance by a factor of 3 from the 0.42 instructions/cycle reported by Weiss and Smith[Weis1] to 1.26 instructions/cycle.

FIGS. 11a and 11b illustrate the structure of the QVC. In contrast to the Cray architecture, the QVC expects the full crossbar of FIG. 7. Its main deficiencies are:

(1) Scalar mode is limited to serial instruction issue.

(2) Two clocks are required to traverse the two interconnects, impacting critical latency limited code.

(3) When a single Queue, Mask, or Register is to be used as a source by two instructions, those instructions are forced to be fully sequential. The second (dependent) instruction cannot issue until the first instruction has been issued, i.e. until all its needed sources are available and there is no conflict for the destination. This impacts scalar performance somewhat, but can significantly impact vector loops.

(4) Like the DSPA, the QVC can block (stall) if a read of an empty queue is attempted; however, the QVC description does not address the problem.

(5) The handling of Branch intensive code is better than the Cray, but still poor. By changing the Cray-style Mask registers to queues addressable as ordinary (one bit) operands, the QVC solves some Boolean evaluation problems without branching; however, branching is still needed for the typical Branch-intensive code and the need to produce the branch condition far ahead of the branch instruction does not fit those problems.

(6) An acknowledged limitation is the number of Functional Units, but adding more is a problem. The QVC architects are concerned that adding any Functional Units will expand the crossbar interconnect enough to impact the clock rate.

(7) Out-of-order results prevent the inclusion of virtual memory.

An improvement on the typical vector chaining architecture and a variation of the Registered Crossbar architecture (FIG. 8a) is the Systolic Pipelined Network architecture [Hwan1], which can route results to units through a programmable delay provided by a variable number of stages (latches or registers) at each output of the crossbar. "Systolic" means that the pipeline is statically configured, like vector chains, to match the problem to be solved, as illustrated in FIG. 12. "Wavefronts" of data, introduced into the pipeline, flow through the pipeline in a regular manner to produce results. The programmable delays within the interconnect ensure that all needed data arrive at a functional unit simultaneously. The delays and interconnect structure is setup by the compiled code prior to beginning problem execution.

The major advantage over conventional vector architectures is that the Functional Units are not necessarily dedicated to only one function during the execution of a chain. The ability for a Functional Unit to perform more than one function in a chain can permit more problems to be vectorized and result in more efficient execution of complex vector operations. The major deficiency of this architectural type is that it only addresses vectorizable portions of the code and, thus, has limited potential.

SUMMARY OF THE INVENTION

The primary object of this invention is to significantly improve Cost/Performance by simultaneously reducing size and increasing all three axes of performance capacity:

N (OPERATIONS/INSTRUCTION) is larger because many Branch instructions are eliminated and because small size and cost enable spending on more powerful instructions.

I (INST/CYCLE) is larger because control dependencies cause fewer holes in the pipeline.

C ( CYCLES/SECOND ) is larger because improving C through aggressive segmentation has a negligible effect on I, INST/CYCLE.

More particularly the objects of this invention are (1) to significantly improve the performance of branch-intensive programs.

(2) to eliminate many branches by placing conditional code that is conditionally executed in the program flow (3) to significantly improve the use of instructions in the branch umbra, when branches are necessary (4) to permit aggressive segmentation of the pipelines to achieve a maximum clock rate (5) to significantly improve the number of instruction slots filled, even when the pipelines are aggressively segmented for maximum clock rate (6) to permit vector chains to handle recursive control dependencies (7) to significantly improve the extent of vectorization, especially in decision-intensive code In accordance with the present invention, instructions are not conditionally issued, they are conditionally executed. They can be issued and proceed through execution before the controlling status is generated. The controlling status determines if the instruction's destination is updated with the results. To minimize the latency from condition code generation to condition code use, the conditional execution decision is made as late as possible in the pipeline.

The utility of conditional execution is further improved by the following enhancements:

(1) CC Mask Field—Conditional Execution is enhanced when all instructions have a condition code mask field that is used along with the selected condition code for the conditional execution decision.

(2) Set CC Field—Conditional Execution is enhanced when most instructions have a field that enables setting a condition code based on the results of the instruction.

(3) Stale Condition Code Handling—Conditional Execution is enhanced when instructions in a chain of conditionally executing decisions can detect any break in that chain that means some subsequent instructions should not execute. That is, information about any break in the decision chain is forwarded via subsequently set condition codes to control instructions later in the chain.

(4) Multiple CCs—Conditional Execution is enhanced when multiple condition codes are available so that multiple instruction sequences, each needing at least one condition code to control its execution, can be in simultaneous or overlapped execution, without competing for a single shared condition code.

(5) CC Reservation Stations—Conditional Execution is enhanced, in a Dynamic Scheduling architecture, when Condition Code Reservation Stations are provided at all pipeline stages leading to the point where the condition code is used as input to the conditional execution decision. These CC Reservation Stations depend on tagging of CC results to identify and acquire needed CCs as soon as they become available and to allow the conditional execution to proceed as far as possible before the CC is needed to complete the instruction.

BRIEF DESCRIPTION OF THE DRAWINGS

In the drawings, closely related figures have the same number but different suffixes.

FIG. 3 shows the block diagram of a prior art architecture called "WISQ" (see page 8).

FIG. 4 shows the block diagram of a prior art processor with scoreboarding (see page 9).

FIG. 5 shows the block diagram of a prior art processor using Tomasulo's algorithm for instruction scheduling (see page 10).

FIG. 6a shows the block diagram of a prior art Very Long Instruction Word (VLIW) processor (see page 10).

FIG. 6b shows the VLIW processor of FIG. 6a in more detail.

FIG. 7 shows the block diagram of a prior art Crossbar Network processor (see page 11).

FIG. 8a and 8b show the block diagram of a prior art Registered Crossbar Network processor (see page 11).

FIG. 9a shows the block diagram of a prior art processor using a Register Update Unit (RUU) for instruction scheduling (see page 13).

FIG. 9b shows the RUU processor of FIG. 9a in more detail.

FIGS. 11a and 11b show the block diagram of a Queue-Based Vector Computer or QVC (see page 15).

FIG. 12 shows the mapping of a problem onto a Systolic Pipeline Network architecture (see page 17).

FIGS. 13a–13c show dedicated result storage.

FIGS. 14a–14b show folded connection.

FIG. 15a shows the Conditional Execution aspect of the present invention.

FIG. 15b shows Conditional Execution of FIG. 15a improved with the CC Mask Field aspect of the present invention.

FIG. 15c shows Conditional Execution of FIG. 15a improved with the Set CC Field aspect of the present invention.

FIG. 15d shows Conditional Execution of FIG. 15a improved with both the Set CC Field and the CC Mask Field aspects of the present invention.

FIG. 15e shows Conditional Execution of FIG. 15a improved with the Stale CC Handling aspect of the present invention.

FIG. 15f shows Conditional Execution of FIG. 15a improved with the Multiple CC aspect of the present invention.

FIG. 15g shows Conditional Execution of FIG. 15a improved with the CC Reservation Station aspect of the present invention.

FIG. 19 shows the Basic Common Embodiment used as the basic architecture of the Static Scheduling Embodiment, the Dynamic Scheduling Embodiment, the Vector Embodiment, and the Systolic Pipelined Network Embodiment.

FIG. 20 shows the virtual-to-real address translation used by the Basic Common Embodiment of FIG. 19.

FIG. 21 shows the data cache organization of the Basic Common Embodiment of FIG. 19.

FIG. 22 shows the LOAD/STORE/BRANCH unit organization of the Basic Common Embodiment, FIG. 19.

FIG. 23a shows the general form of an architecture employing software dependency resolution and improved by dedicated Result Storage (U.S. patent application Ser. No. SNTBD1, Computer Processor with Improved Storage, filed DATETBD1) and Folded Connections (U.S. patent application Ser. No. SNTBD2, Computer Processor with Folded Connections, filed DATETBD2).

FIG. 23b shows the architecture of FIG. 23a further improved by the Conditional Execution aspect of the present invention.

FIG. 23c shows the Static Scheduling Embodiment of the present invention based on the generalized architecture of FIGS. 23a and 23b and the basic common architecture of FIG. 19.

FIG. 24 shows the mapping of sequential instructions for Livermore FORTRAN Kernel 16 for a theoretical prior art VLIW machine into optimized 6-instruction packets.

FIG. 25 shows the mapping of sequential instructions for Livermore FORTRAN Kernel 16 for the Static Scheduling Embodiment of the present invention into optimized 6-instruction packets.

FIG. 26a shows the general form of an architecture employing hardware dependency resolution and improved by Dedicated Result Storage (U.S. patent application Ser. No. SNTBD1, Computer Processor with Improved Storage, filed DATETBD1) and Indicator Based Commit and the High Bandpass Commit (U.S. patent application Ser. No. SNTBD3, Computer Processor with Improved Commit, filed DATETBD3).

FIG. 26b shows the architecture of FIG. 26a further improved by the Conditional Execution aspect of the present invention.

FIG. 27a shows the Dynamic Scheduling Embodiment of the present invention based on the Basic Common Architecture of FIG. 19.

FIG. 27b shows the Instruction Issue logic for the Dynamic Scheduling Embodiment of FIG. 27a.

FIG. 27c shows the Reservation Station organization for the Dynamic Scheduling Embodiment of FIG. 27a.

FIG. 27d shows the Functional Unit organization for the Dynamic Scheduling Embodiment of FIG. 27a.

FIG. 27e shows the Main Memory Tagging mechanism for the Dynamic Scheduling Embodiment of FIG. 27a.

FIG. 27f shows the logic of the Real Registers and Condition Codes of the Dynamic Scheduling Embodiment of FIG. 27a.

FIG. 28 shows the Vector Embodiment of the present invention based on the Dynamic Scheduling Embodiment of FIG. 27a.

FIG. 29 shows the operation of a one-packet vector loop with the Vector Embodiment of FIG. 28.

FIG. 30 shows the code mapping of the main loop of Livermore FORTRAN Kernel 24 for the Vector Embodiment of FIG. 28.

FIG. 31a shows the IBM 370-XA Embodiment of the present invention.

FIG. 31b shows the Issue Logic for the IBM 370-XA Embodiment of FIG. 31a.

FIG. 31c shows the Branch Functional Unit for the IBM 370-XA Embodiment of FIG. 31a.

FIG. 31d shows the General Functional Unit for the IBM 370-XA Embodiment of FIG. 31a.

FIG. 31e shows the Storage-and-Storage Functional Unit for the IBM 370-XA Embodiment of FIG. 31a.

FIG. 31f shows the Floating-Point Functional Unit for the IBM 370-XA Embodiment of FIG. 31a.

FIG. 31g shows the Data Cache Ports organization for the IBM 370-XA Embodiment of FIG. 31a.

FIG. 31h shows the VLSI Chip Gates and Pins for the IBM 370-XA Embodiment of FIG. 31a.

FIG. 32 shows a simple RISC embodiment of the present invention.

FIG. 33 shows the Improved Registered Crossbar Network architecture embodiment of the present invention.

FIGS. 34a and 34b b show the Improved Data Synchronized Pipeline Architecture embodiment of the present invention.

FIGS. 35a and 35b show the Improved Queue Based Vector Processor embodiment of the present invention.

FIGS. 36a and 36b show the Improved Systolic Pipeline embodiment of the present invention.

Figure 1:
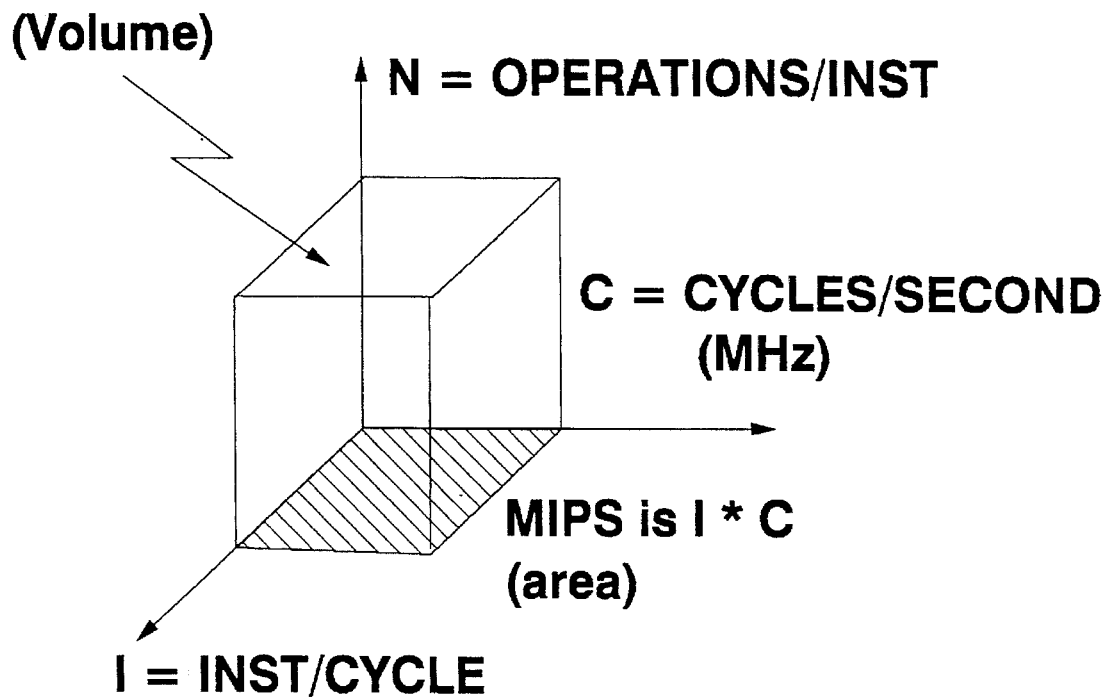
FIG. 1 shows a method of visualizing the goal of improving a computer's performance capacity, OPERATIONS/SECOND, as the volume of a box.
Figure 2:
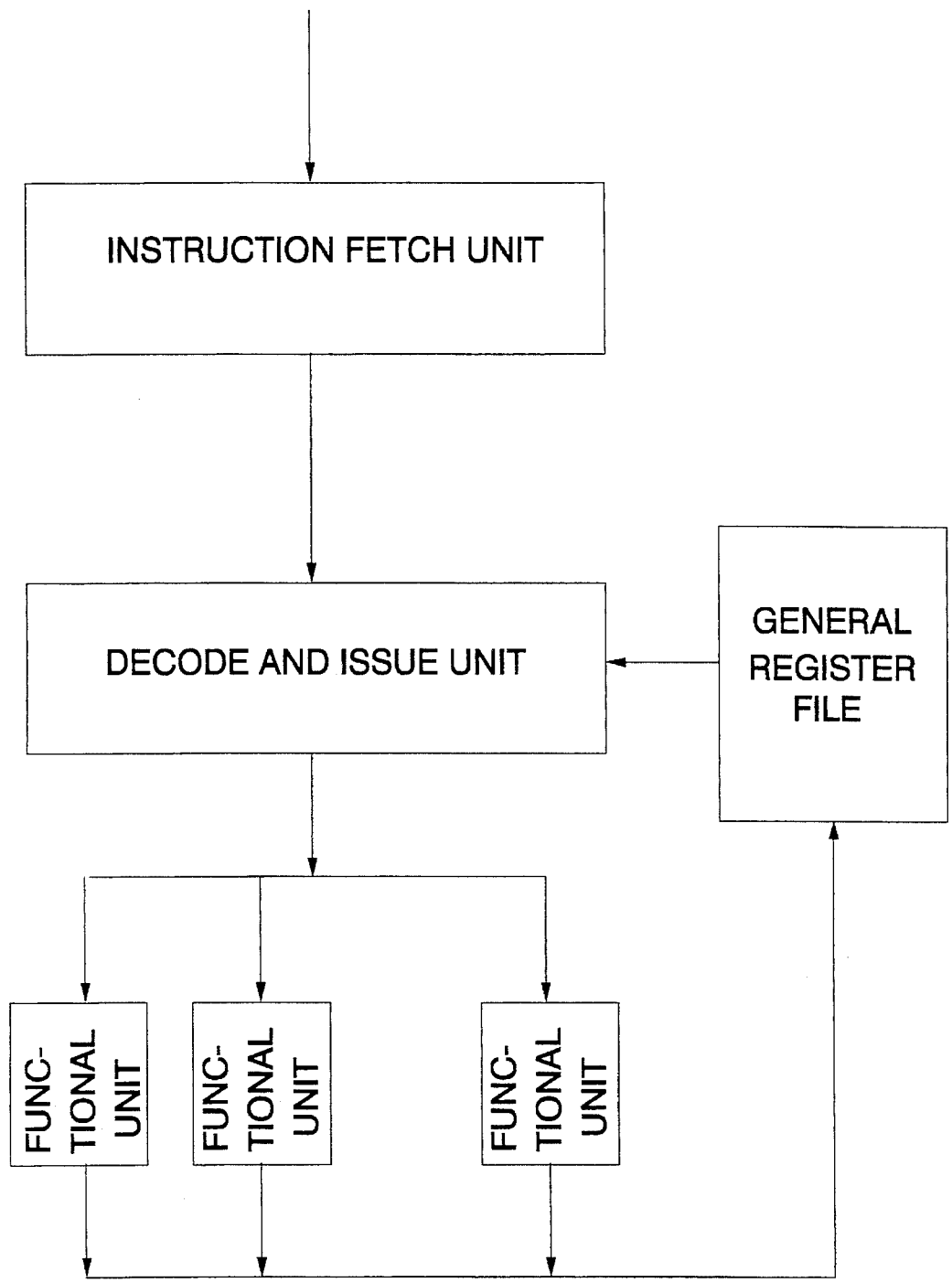
FIG. 2 shows the basic organization of prior art multi-functional unit processors.

| List of Reference Numerals Used on Drawing Figures | |
| --- | --- |
| Number | Name |
| 100 | |
| 101 | Instruction |
| 102 | Instruction Issue Unit |
| 103 | Conn Storage to Op Unit |
| 104 | Operating Unit |
| 105 | Connection Operating Unit to Storage |
| 106 | Storage Element |
| 108 | Predicate |

-continued

List of Reference Numerals Used on Drawing Figures

| Number | Name |
|---|---|
| 110 | Functional Unit |
| 115 | Register |
| 120 | Crossbar Mux |
| 121 | Folding Logic |
| 122 | Unfolding Logic |
| 125 | Xbar input FFs |
| 130 | Folding AOI |
| 135 | Clock Inverter |
| 140 | Xbar Selector NAND |
| 145 | Xbar OR |
| 150 | Xbar Output FFs |
| 155 | CC Select Mux |
| 157 | 4-Bit CC |
| 160 | Conditional Execution Decision |
| 165 | AND Mask/CC |
| 170 | OR all Mask bits |
| 175 | Decision XOR |
| 180 | Commit FIFO |
| 185 | Result FIFO |
| 190 | Flag Inverter |
| 195 | Unit AOI |
| 200 | All Units AND |
| 205 | Enable Commit AND |
| 210 | Commit FIFO Top |
| 215 | Commit FIFO Bottom |
| 220 | Commit FIFO Next |
| 225 | Result FIFO Top |
| 230 | Result FIFO Bottom |
| 235 | Result FIFO Next |
| 240 | Bottom & Next Enable AND |
| 245 | Virtual Results |
| 250 | Real Results |
| 255 | Program Memory |
| 260 | Crossbar |
| 265 | Instruction |
| 270 | LSB1 |
| 275 | LSB2 |
| 280 | ADD1 |
| 285 | ADD2 |
| 290 | MUL1 |
| 295 | MUL2 |
| 300 | Data Cache |
| 305 | Regs 0–7 |
| 310 | Regs 8–15 |
| 315 | Regs 16–23 |
| 320 | Regs 24–31 |
| 325 | Regs 32–39 |
| 330 | Regs 40–47 |
| 335 | Address Registers 48–55 |
| 340 | Address Registers 56–63 |
| 345 | PC FIFO |
| 350 | Virtual Address Register |
| 355 | Page Table |
| 360 | Real Address Reg |
| 365 | Cache Set |
| 370 | Cache Line Reg |
| 375 | Real Page Compare |
| 380 | Line Selector |
| 385 | Line shifter |
| 390 | LSB Input A |
| 395 | LSB Input B |
| 400 | LSB INA Select |
| 405 | LSB Adder |
| 410 | LSB Early Conditional Execution Decision |
| 415 | LSB Cache Address |
| 420 | LSB Line Register |
| 425 | LSB Check & Align |
| 430 | LSB Late Conditional Execution Decision |
| 435 | LSB Store Data Register |
| 440 | Store Data Register |
| 445 | LSB Pipe Register |
| 450 | Instruction Issue Unit |
| 455 | Dedicated Out Regs |

-continued

List of Reference Numerals Used on Drawing Figures

| Number | Name |
|---|---|
| 460 | Register to FU Xbar |
| 465 | CC Xbar to FU Path |
| 470 | Reservation Stations |
| 475 | Result Buffer Regs |
| 480 | Results Crossbar |
| 485 | Virtual Registers |
| 490 | Real Registers |
| 495 | Multiple Commit Paths |
| 500 | CC Rsv'tn Stations |
| 505 | Register Crossbar |
| 510 | CCs 16–23 |
| 515 | CCs 24–31 |
| 520 | CCs 32–39 |
| 525 | Data Cache Memory |
| 530 | Issue Decision |
| 535 | Tag Memory |
| 540 | Execution Decision |
| 545 | CC Owner Tag Selector |
| 550 | Reg Owner Tag Selector |
| 555 | Op Code Format bits |
| 560 | Tag Generator |
| 565 | Tag/Owner Compare |
| 570 | RS Source Selector |
| 575 | RS Source Field Select |
| 580 | Conditional Execution Decision Input Selector |
| 585 | Virtual CCs |
| 590 | Packet Commit Decision |
| 595 | Real CCs |
| 600 | Virtual to Real Connections |
| 605 | Crossbar Input Selector |
| 610 | Instruction Place & Issue |
| 615 | Branch Predict |
| 620 | Branch Predict Memory |
| 625 | BRFU |
| 630 | GFU 1 |
| 635 | GFU 2 |
| 640 | GFU 3 |
| 645 | SSFU |
| 650 | FPFU |
| 655 | IOFU |
| 660 | Virtual GRs 0–15 |
| 665 | Virtual CCs |
| 670 | Virtual FP Regs |
| 675 | Real GRs 0–15 |
| 680 | Real CCs |
| 685 | Real FP Regs |
| 690 | Real Ctrl Regs |
| 695 | Copy Selector |
| 700 | 370-XA Cache |
| 705 | Virtual and Real Instances |
| 710 | PM DW0 |
| 715 | PM DW1 |
| 720 | PM DW2 |
| 725 | PM DW3 |
| 730 | Program Memory Bank Addrs Selector |
| 735 | Instruction Locate & Select |
| 740 | Instruction Decode |
| 745 | Instruction Issue Rules |
| 750 | Instruction Position, Expand & Issue |
| 755 | Last Write Selector |
| 760 | BRFU Inst FIFO |
| 765 | BCT Decrementer |
| 770 | R1 Plus R3 Adder |
| 775 | BR Addrs Calculator |
| 780 | Index Comparator |
| 785 | Field Extractor |
| 790 | Address Translator |
| 795 | BR Conditional Execution Decision |
| 800 | BR Address Selector |
| 805 | Data Cache Memory |
| 810 | Check & Align |

-continued

List of Reference Numerals Used on Drawing Figures

Number  Name

815 BRFU Working Registers
820
825 BRFU GR Input Selector
830 BRFU Store Selector
835 Branch Address Compare
840
845 GFU Address Adder
850 GFU Instruction FIFO
855 GFU ALU/MUL
860 GFU Working Storage
865 GFU Divide Seed Table
870 GFU CC Input Selector
875 GFU GR Input Selector
880 GFU Store Selector
885 SSFU Instruction FIFO
890 SSFU Op1 Address Adder
895 SSFU Length Counters
900 SSFU Op2 Address Adder
905 Overlap Detector
910 Functional Unit 370-XA Conditional Execution Decision
915 SSFU ALU/MUL
920 SSFU Working Registers
925 SSFU Divide Seed Table
930 SSFU GR Input Selector
935 SSFU CC Selector
940 FPFU Instruction FIFO
945 FPFU Address Adder
950 FP ADD/MUL
955 FPFU Working Registers
960 FP Divide Seed Table
965 FP Register Input Selector
970 FPFU Store Selector
972 FPFU CC Selector
975 Store Data Mux
980 Cache Bank 1
985 Cache Bank 2
990 Cache Bank 3
995 Cache Bank 4
1000 BRFU/SSFU Mux
1005 SSFU/FPFU Mux
1010 GFU2/GFU3 Mux
1015 Store Address Mux
1020 Store Address FIFO
1025
1030 Pipelined Functional Unit
1035 General Register File
1040 Register File
1045 FIFO Register File
1050 Programmable Variable Delay
1055 Queue
1060 Load Owner 1 Tag
1065 Store Owner Tag
1070 Load Owner 2 Tag
1075 Execute Stage 1
1080 Execute Stage 2
1085 Execute Stage 3
1090 Stage 2 Forward Pipe Control
1095 Stage 3 Forward Pipe Control
1100 Store FIFO
1105 Store Data Reservation Station
1110 LSB1 Instruction Pipeline
1115 LSB2 Instruction PIpeline
1120 Load 1 Tag
1125 Store Tag
1130 Load 2 Tag
1135 Rd/Wrt Tag
1140 Instruction Selector
1145 Main Memory
1150 Issue for LSB 1
1155 Issue for LSB 2
1160 Tag
1165 Predicate Count
1170 Compare Unit -continued List of Reference Numerals Used on Drawing Figures Number  Name 1175 CC Reservation Station
1180 CYCLE Count

DESCRIPTION OF THE PREFERRED EMBODIMENT

The Preferred Embodiment—Conditional Execution, described here, allows all instructions, including but not limited to branches, to be issued before the controlling condition may be known. The instructions are conditionally executed with the decision controlling the writing of results being made as late as possible, as shown in FIG. 15a.

In FIG. 15a the static scheduling architecture computer processor shown is composed of 8 major elements: (1) Instructions 101; (2) Instruction Issue Unit 102; (3) Connections from the Storage Elements to the Operating Units 103; (4) an Operating Unit 104, called a Functional Unit 110; (5) Connections from the Operating Unit to the Storage Elements 105; (6) Storage Elements 106, which are made up of Registers 115; (7) a single Predicate 108; and (8) Conditional Execution Decision Logic 160.

In FIG. 15a the Functional Unit 110 output is connected to the Registers 115. The Instruction supplies the OP CODE to the Functional Unit 110. The Predicate 108 is directly connected to the Conditional Execution Decision logic 160 and determines if the results from the Functional Unit 110 are written to the Registers 115, i.e. if the Predicate is true the instruction is successful and the results are written, otherwise, the instruction is unsuccessful and the results are not written.

FIG. 15a illustrates a single predicate bit that controls the completion of all non-COMPARE instructions. COMPARE instructions unconditionally update the Predicate 108 to either 0 or 1, based on the results of the compare.

The COMPARE instructions that are used to set the Predicate must contain mask information to specify what COMPARE conditions should set the Predicate, e.g. Equal, Greater Than, Not Equal, etc. The format of the COMPARE is

| COMPARE | SET MASK | Source A | Source B |

During the COMPARE, the operation of subtracting Source B from Source A generates 4 status bits:

Status 3=Zero

Status 2=Negative

Status 1=Carry

Status 0=Valid (a valid number)

Those status bits are evaluated under control of the 5-bit Mask field to generate the single Predicate bit:

Mask Bit 4=Invert the test

Mask Bit 3=Zero

Mask Bit 2=Negative

Mask Bit 1=Carry

Mask Bit 0=Valid

The Predicate value is determined by logically ANDing the Status bits with the corresponding Mask Bits and logically ORing those ANDs to produce TEST. If Mask Bit 4 is a zero, the Predicate is set to the state of TEST. If Mask Bit 4 is a one, the Predicate is set with the inverted state of TEST.

Examples of COMPARE Mask settings to accomplish specific conditional operations are

| $m_4$ | $m_3$ | $m_2$ | $m_1$ | $m_0$ | Predicate |
|---|---|---|---|---|---|
| 1 | 0 | 0 | 0 | 0 | Unconditionally Set |
| 0 | 1 | 0 | 0 | 0 | Set if Equal (Subtract result was zero) Clear if Not Equal |
| 1 | 1 | 0 | 0 | 0 | Set if Not Equal Clear if Equal |
| 1 | 1 | 1 | 0 | 0 | Set if Greater than zero Clear if Less than or equal to zero |
| 0 | 0 | 0 | 0 | 0 | Unconditionally Clear |

In a two instruction sequence where a COMPARE sets a predicate that conditions an ADD, with an adder that takes one cycle to perform the SUBTRACT needed for a COMPARE, or to do an ADD, the machine of FIG. 15a can issue the ADD instruction before the COMPARE instruction has completed and can perform the ADD during the cycle immediately following the COMPARE, so the ADD needs only one cycle:

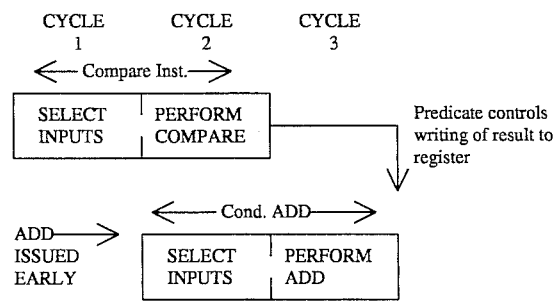

But, if the Conditional Execution Decision is moved back to the issue point (Conditional Issue), the same ADD requires 2 cycles:

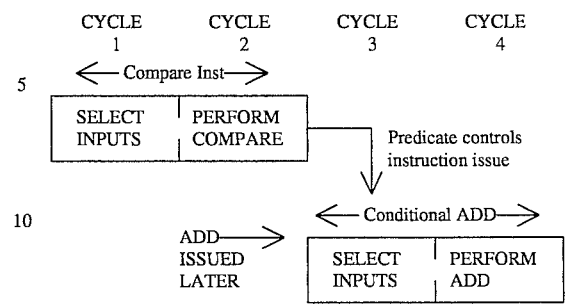

For the FORTRAN program

X=X+Y

IF (X .EQ. 0) THEN

A=A+1

ELSE

A=A−1

ENDIF

IF (X .LT. 0) THEN

A=A+2

ENDIF

The machine code sequence for the machine of FIG. 15a and the number of cycles required dependent on the placement of the conditional decision are:

| Machine code Cond.Issue | | Machine Code Cond.Execution | |
|---|---|---|---|
| ADD | X,X,Y | ADD X,X,Y | |
| NOOP | | NOOP | |
| COMPARE | X,0 SET IF .EQ. | COMPARE | X,0 SET IF .EQ. |
| NOOP | | ADD | A,A,1 (if P=1) |
| ADD | A,A,1 (if P=1) | COMPARE | X,0 SET IF .NE. |
| COMPARE | X,0 SET IF .NE. | SUBTRACT | A,A,1 (if P=1) |
| NOOP | | COMPARE | X,0 SET IF .LT. |
| SUBTRACT | A,A,1 (if P=1) | ADD | A,A,2 (if P=1) |
| COMPARE | X,0 SET IF .LT. | | |
| NOOP | | | |
| ADD | A,A,2 (if P=1) | | |
| TOTAL CYCLES | 11 | | 8 |

Note that NOOPs are inserted as needed for time fill since the architecture of FIG. 15a is Static Scheduling, i.e. no hardware interlocks are provided.

Later sections of this document describe enhancements to the Conditional Execution aspect of the present invention, specifically: the CC Mask Field, the Set CC Field, Stale Condition Code Handling, Multiple CCs, CC Reservation Stations, and combinations of these enhancements.

Those skilled in the art will recognize that this is just one way to produce a conditional execution control and that many other ways, including those shown as dependent elements and those shown in the detailed embodiments, are possible. Any computer that allows instructions to proceed through execution and then directly uses selected condition codes or status (not the results of a branch based on those condition codes) to control the writing of results is within the scope of the present invention.

Each of the architectural types described as prior art can be performance improved, especially for typical branch intensive code, by using the Conditional Execution aspect of the present invention. This technique provides three major benefits:

- Branch instructions can be eliminated in many cases. Rather than branching based on the condition codes, instructions can be conditionally executed directly in line.
- The Branch umbra following a delayed Branch can be efficiently used, because instructions in that umbra can be conditionally executed.
- Using the conditional execution decision to control the writing of results, rather than the issuing of instructions, significantly reduces the latency from condition code generation to condition code use. This permits more aggressive segmentation of the pipeline and, therefore, a higher clock rate.

These advantages will become even more obvious through the enhancements and the additional embodiments, that follow.

Enhancements to Conditional Execution—Details

As previously listed, the following aspects of the present invention enhance Conditional Execution:

(1) CC Mask Field
(2) Set CC Field
(3) Stale Condition Code Handling
(4) Multiple CCs
(5) CC Reservation Stations These aspects are shown here with the condition code being a single bit predicate. In the additional embodiments multi-bit condition codes are used. The advantage that multi-bit condition codes have over single bit predicates is that a predicate can represent only two mutually exclusive states (e.g. LESS THAN or GREATER THAN OR EQUAL) while a multi-bit condition code can represent more states and, with sufficient bits, overlapping states (e.g. EQUAL and GREATER THAN OR EQUAL).

These enhancements to Conditional Execution not only allow problems to be solved more easily by the compiler with fewer instructions needed and improved performance, but also help eliminate Branch instructions. As discussed in the prior art section of this document Branches cause pipeline disruption and, therefore, degrade performance.

In architectures that attempt to execute several threads of control (independent program segments) simultaneously, Branches not only disrupt the flow of the thread that contains the Branch, but also the overlapped threads. The interference of one thread with other threads is a serious impediment to the compiler's ability to successfully schedule multiple threads to simultaneously execute.

The following enhancements to Conditional Execution can eliminate many of the Branches traditionally needed for decision intensive code.

CC Mask Field—Conditional Execution is significantly enhanced when all (or most) instructions have a Condition Code Mask Field that is used along with the selected condition code for the conditional execution decision.

FIG. 15b illustrates the structure of the machine of FIG. 15a enhanced with a CC Mask field in every instruction. In FIG. 15b the computer processor shown is composed of 8 major elements: (1) Instructions 101; (2) Instruction Issue Unit 102; (3) Connections from the Storage Elements to the Operating Units 103; (4) an Operating Unit 104, called a Functional Unit 110; (5) Connections from the Operating Unit to the Storage Elements 105; (6) Storage Elements 106, which are made up of Registers 115; (7) a single Predicate 108; and (8) Conditional Execution Decision Logic 160. The Conditional Execution Decision Logic differs from that of FIG. 15a in that a Decision XOR gate 175 is included and the conditionally executing instruction provides a CC Mask bit input to the decision.

The simple instruction format shown below consists of an Op Code field, a Destination field, two Source fields, and a CC Mask, which is a single bit.

| OP CODE | CC MASK BIT | Destination | Source A | Source B |
|---------|-------------|-------------|----------|----------|

In FIG. 15b, when the CC Mask bit is zero, the state of the Predicate 108 is used to determine if the Functional Unit 110 results are written to the Registers 115, i.e. if the Predicate is true the instruction is successful, otherwise, the instruction is unsuccessful, just like the operation of FIG. 15a. However, when the CC Mask bit is one, the Decision XOR gate 175 inverts the state of the Predicate 108; thus, if the Predicate is true the instruction is unsuccessful, otherwise, the instruction is successful.

Thus for the FORTRAN program used as the example for Conditional Execution

X=X+Y
IF (X .GT. 0) THEN
 A=A+1
ELSE
 A=A−1
ENDIF
IF (X .LT. 0) THEN
 A=A+2
ENDIF

The machine code sequence for the machine of FIG. 15b and the number of cycles required are:

| Machine Code | | Cycles Required CC Mask |
|---|---|---|
| ADD | X,X,Y | 1 |
| NOOP | | 1 |
| COMPARE | X,0 SET IF .EQ. | 1 |
| ADD | A,A,1 if P=1 (CCMASK=0) | 1 |

-continued

| Machine Code | | Cycles Required CC Mask |
|---|---|---|
| SUBTRACT | A,A,1 if P=0 (CCMASK=1) | 1 |
| COMPARE | X,0 SET IF .LT. | 1 |
| ADD | A,A,2 if P=1 (CCMASK=0) | 1 |
| TOTAL CYCLES | | 7 |

The ability to specify the required Predicate state, via a mask in the ADD and SUBTRACT instructions, eliminates the second COMPARE needed in the machine code shown previously for the Conditional Execution.

Those skilled in the art will recognize that Conditional Execution enhanced by a CC Mask field in most instructions provides a significant advantage over the prior art. The single bit predicate used here to illustrate the invention can, of course, be extended to multiple bits (e.g. see Set CC Field, below) and to multiple condition codes.

Set CC Field—Conditional Execution is significantly enhanced when most instructions have a field that enables setting a condition code based on the results of the instruction, rather than (1) confining the setting of condition codes to special instructions like the COMPARE in the previous examples or (2) having all arithmetic and logical instructions always set the condition code.

FIG. 15c illustrates the structure of the machine of FIG. 15a enhanced by having a Set CC field in most instructions. In FIG. 15c the computer processor shown is composed of 8 major elements: (1) Instructions 101; (2) Instruction Issue Unit 102; (3) Connections from the Storage Elements to the Operating Units 103; (4) an Operating Unit 104, called a Functional Unit 110; (5) Connections from the Operating Unit to the Storage Elements 105; (6) Storage Elements 106, which are made up of Registers 115; (7) a single Predicate 108; and (8) Conditional Execution Decision Logic 160 which simply uses the Predicate to determine instruction success.

The simple instruction format shown below consists of an Op Code field, a Destination field, two Source fields, a SET field, which is a single bit, and a SET MASK field as described previously, for the COMPARE instruction in the Conditional Execution description. This format applies to all instructions, including the COMPARE instruction.

| OP CODE | SET | SET MASK | Destination | Source A | Source B |
|---|---|---|---|---|---|

In operation all instructions which have the SET field and a SET MASK field included in their format can set the Predicate, based on the results of the instruction, when the SET bit is a one in the instruction or can have no effect on the Predicate when the SET bit is zero in the instruction.

Thus for the FORTRAN program used as the example for Conditional Execution and for CC Mask:

X=X+Y
IF (X .EQ. 0) THEN
   A=A+1
ELSE
   A=A−1
ENDIF
IF (X .LT. 0) THEN
   A=A+2
ENDIF

The machine code sequence for the machine of FIG. 15c and the number of cycles required are:

| Machine Code | | Cycles Required Set CC |
|---|---|---|
| ADD | X,X,Y SET IF .EQ. | 1 |
| ADD | A,A,1 (if P=1) | 1 |
| COMPARE | X,0 SET IF .NE. | 1 |
| SUBTRACT | A,A,1 (if P=1) | 1 |
| COMPARE | X,0 SET IF .LT. | 1 |
| ADD | X,X,2 (if P=1) | 1 |
| TOTAL CYCLES | | 6 |

The ability to specify the Predicate setting, via a mask in the ADD instruction as well as in the COMPARE instruction, eliminates the first COMPARE needed in the machine code shown previously for the Conditional Execution.

FIG. 15d shows a better use of the instruction bits, where the bits in the instruction used as a SET Mask are more efficiently used as a CC Mask which controls the execution of instructions rather than the setting of a Predicate:

| OP CODE | SET | CC MASK | Destination | Source A | Source B |
|---|---|---|---|---|---|

With this format, every instruction has the ability to set a multi-bit Condition Code (instead of a single bit Predicate) of the form:

Bit 3=Zero
Bit 2=Negative
Bit 1=Carry
Bit 0=Valid (a valid number)

And each instruction has a CC Mask field that controls the interpretation of the bits in that Condition Code for the purposes of the Conditional Execution Decision as follows:

Mask Bit 4=Invert the test
Mask Bit 3=Zero
Mask Bit 2=Negative
Mask Bit 1=Carry
Mask Bit 0=Valid The computer processor of FIG. 15d is that of FIG. 15c, with the Predicate expanded to a 4 bit Condition Code 157 which is set by any instruction containing the SET CC bit and with the Conditional Execution Decision 160 expanded, as shown, to include the AND Mask/CC gates 165, the OR All Masked Bits gate 170, and the XOR gate 175, which selectively inverts the test based on Mask Bit 4 (Invert the Test).

Thus, without adding any additional bits to the instruction, the machine code sequence and number of cycles are reduced further to:

| Machine Code | | Cycles Required CC Mask & Set CC |
|---|---|---|
| ADD | X,X,Y SET CC | 1 |
| ADD | A,A,1 if .EQ.(CCMASK=$08_{16}$) | 1 |
| SUBTRACT | A,A,1 if .NE.(CCMASK=$18_{16}$) | 1 |
| ADD | A,A,2 if .LT.(CCMASK=$04_{16}$) | 1 |
| TOTAL CYCLES | | 4 |

That is, by combining the Conditional Execution aspect of the present invention with the CC Mask Field and the Set CC Field enhancements, the number of cycles required for the example program is reduced from the Conditional Issue's 11 cycles to only 4 cycles.

Stale Condition Code Handling—Conditional Execution is significantly enhanced when instructions in a chain of conditionally executing decisions can detect any break (chain terminating condition code setting) in that chain that means some subsequent instructions, possibly already issued, should not execute. That is, information about any break in the decision chain is forwarded via subsequent conditionally set condition codes to control instructions later in the chain.

FIG. 15e illustrates the structure of the machine of FIG. 15a enhanced with Stale Condition Code Handling. The COMPARE instruction in FIG. 15e has a Mask field that is one bit larger than that of FIG. 15a, as described later. In FIG. 15e the computer processor shown is composed of 8 major elements: (1) Instructions 101; (2) Instruction Issue Unit 102; (3) Connections from the Storage Elements to the Operating Units 103; (4) an Operating Unit 104, called a Functional Unit 110; (5) Connections from the Operating Unit to the Storage Elements 105; (6) Storage Elements 106, which are made up of Registers 115; (7) a single Predicate 108; and (8) Conditional Execution Decision Logic 160 which simply uses the Predicate to determine instruction success. The COMPARE instruction is extended, as described below.

In FIG. 15e the format of the COMPARE is

| COMPARE | SET MASK | Source A | Source B |
|---|---|---|---|

During the COMPARE, the subtract operation generates 4 status bits:

Status 3=Zero
Status 2=Negative
Status 1=Carry
Status 0=Valid (a valid number)

Those status bits are evaluated under control of the 6-bit Mask field to generate the single Predicate bit:

Mask Bit 5=Predicate must be true
Mask Bit 4=Invert the test
Mask Bit 3=Zero
Mask Bit 2=Negative
Mask Bit 1=Carry
Mask Bit 0=Valid The Predicate value is determined by logically ANDing the Status bits with the corresponding Mask Bits and logically ORing those ANDs to produce TEST. The state of TEST, Mask Bit 4, Mask Bit 5, and the current Predicate determine the new Predicate state:

| TEST XOR Mask Bit 4 | Mask Bit 5 (Pred=1) | Predicate State | New Predicate State |
|---|---|---|---|
| 0 | X | X | 0 |
| 1 | 0 | X | 1 |
| 1 | 1 | 0 | 0 |
| 1 | 1 | 1 | 1 |

Examples of COMPARE Mask settings to accomplish specific conditional operations are

| $m_5$ | $m_4$ | $m_3$ | $m_2$ | $m_1$ | $m_0$ | Predicate |
|---|---|---|---|---|---|---|
| 0 | 1 | 0 | 0 | 0 | 0 | Unconditionally Set |
| 0 | 0 | 1 | 0 | 0 | 0 | Equal (Subtract result was zero) |
| 0 | 1 | 1 | 0 | 0 | 0 | Not Equal |
| 0 | 1 | 1 | 1 | 0 | 0 | Greater than zero (not zero & not Neg) |
| 1 | 0 | 1 | 0 | 0 | 0 | Equal & Predicate = 1 |
| 1 | 1 | 1 | 0 | 0 | 0 | Not Equal & Predicate = 1 |
| 1 | 1 | 1 | 1 | 0 | 0 | Greater than zero & Predicate = 1 |
| 0 | 0 | 0 | 0 | 0 | 0 | Unconditionally Clear |

When a program has nested decisions, the Conditional Issue and Conditional Execution strategies, described previously, cannot eliminate some needed branches. For example, in the FORTRAN program shown below, with a nested IF-statement, the update of Y (Y=−Y) can only be done if both X.EQ.0 and Y.LT.0.

IF (X .EQ. 0) THEN
  A=A+1
  IF (Y .LT. 0) THEN
    y=−Y
  ENDIF
ENDIF

The Conditional Execution aspect of FIG. 15a requires the sequence of machine instructions and cycles, shown in the first column of the following table, where the Branch umbra is assumed to be 3 cycles. Only the COMPARE Y,0 can safely be put in the Branch Umbra. The GOTO is required to ensure that when X is not equal zero, that the update of Y does not occur. Thus, when the GOTO is successful, execution requires 7 cycles; otherwise, 8 cycles are needed.

The left column of the table below, show the machine code and cycle count improvement achieved with the Stale CC Handling aspect of the present invention.

| | Machine Code<br>Cond. Execution | | Machine Code<br>Stale CC Handling | |
|---|---|---|---|---|
| | COMPARE | X,0 SET IF .EQ. | COMPARE | X,0 SET IF .EQ. |
| | ADD | A,A,1 (if P=1) | ADD | A,A,1 (if P=1) |
| | COMPARE | X,0 SET IF .NE. | COMPARE | Y,0 SET IF .LT. & P=1 |
| | GOTO | END (if P=1) | SUBTRACT | Y,0,Y (if P=1) |
| | NOOP | | | |
| | NOOP | | | |
| | COMPARE | Y,0 SET IF .LT. | | |
| | SUBTRACT | Y,0,Y (if P=1) | | |
| END | | | | |
| TOTAL CYCLES | | 7/8 | | 4 |

The Stale Condition Code Handling aspect of the present invention is shown here with a one-bit Predicate. In the detailed embodiments this aspect is shown with multiple multi-bit condition codes along with other aspects of the present invention, e.g. CC Mask and Set CC. Those skilled in the art will understand that the determination of a fresh versus a stale condition code can be implicit or explicit and that many modifications and variations are possible within the scope of the present invention.

Multiple CCs—Conditional Execution is significantly enhanced when multiple condition codes are available so that multiple independent instruction sequences can use condition codes in parallel without competing for a single CC resource.

The simple instruction format shown below consists of an Op Code field, a Destination field, two Source fields, and a CC Select field.

| OP CODE | CC Sel | Destination | Source A | Source B |
|---|---|---|---|---|

FIG. 15*f* illustrates the structure of the machine of FIG. 15*a* enhanced to include two predicates. In FIG. 15*f* the computer processor shown is composed of 8 major elements: (1) Instructions 101; (2) Instruction Issue Unit 102; (3) Connections from the Storage Elements to the Operating Units 103; (4) an Operating Unit 104, called a Functional Unit 110; (5) Connections from the Operating Unit to the Storage Elements 105; (6) Storage Elements 106, which are made up of Registers 115; (7) two Predicates 108 and a Condition Code Selector 155; and (8) Conditional Execution Decision Logic 160 which simply uses the selected Predicate to determine instruction success.

The COMPARE instruction is expanded via the addition of a SET CC Field to specify which of the two Predicates it is to select and set or clear.

| COMPARE | SET MASK | SET CC | Source A | Source B |
|---|---|---|---|---|

In operation the non-COMPARE instructions execute and the results are written to the Destination if enabled by the conditional execution decision, which directly uses the Predicate 108 selected by the Condition Code Selector 155. The condition code used is selected from the multiple available condition codes by the CC Select field of the instruction.

When the FORTRAN program used as the example for Conditional Execution has variables in main memory arrays rather than registers, the FORTRAN source becomes:

X=X-Y
IF (X .EQ. 0) THEN
  Z(A)=Z(A+1)
ELSE
  Z(A)=Z(A-1)
ENDIF

Load instructions take three cycles to complete, so the machine code sequence for the machine of FIG. 15*a* and the number of cycles required are:

| Machine Code | | Cycles Required<br>Conditional EX |
|---|---|---|
| SUBTRACT | X,X,Y | 1 |
| NOOP | | 1 |
| COMPARE | X,0 SET IF .EQ. | 1 |
| LOAD | Z(A+1) TO RTEMP1 | 1 |
| NOOP | | 1 |
| NOOP | | 1 |
| STORE | RTEMP1 TO Z(A) (if P=1) | 1 |
| COMPARE | X,0 SET IF .NE. | 1 |
| LOAD | Z(A-1) TO RTEMP1 | 1 |
| NOOP | | 1 |
| NOOP | | 1 |
| STORE | RTEMP1 TO Z(A) (if P=1) | 1 |
| TOTAL CYCLES | | 12 |

But when multiple predicates are available (in this case 2, P1 and P2), the two conditional actions can be overlapped and the code can be compressed as follows:

| Machine Code | | Cycles Required<br>Multiple CCS |
|---|---|---|
| SUBTRACT | X,X,Y | 1 |
| NOOP | | 1 |
| COMPARE | X,0 SET P1 IF .EQ. | 1 |
| LOAD | Z(A+1) TO RTEMP1 IF P1 | 1 |
| COMPARE | X,0 SET P2 IF .NE. | 1 |
| LOAD | Z(A-1) TO RTEMP2 IF P2 | 1 |
| STORE | RTEMP1 TO Z(A) IF P1 | 1 |
| NOOP | | 1 |
| STORE | RTEMP2 TO Z(A) IF P2 | 1 |
| TOTAL CYCLES | | 9 |

The ability to overlap independent actions becomes even more important as the parallelism of the computer processor is increased. Those skilled in the art will recognize that Conditional Execution enhanced by Multiple Condition Codes provides a significant advantage over the prior art. The single bit predicate used here to illustrate the invention can, of course, be extended to multiple bits and this enhancement to the Conditional Execution aspect of the present invention can be combined with the other enhancements, previously discussed.

Note that the addressing of multiple CCs can be explicit, as shown in the Basic Common Embodiment (later in this document) for CC Sources, or implicit, as shown in the Basic Common Embodiment for CC Destinations.

CC Reservation—Conditional Execution is significantly enhanced when, in a Dynamic Scheduling architecture, Condition Code Reservation Stations are provided at all pipeline stages leading to the point where the condition code is used as input to the conditional execution decision. These CC Reservation Stations depend on tagging of CC results to identify and acquire needed CCs as soon as they become available and to allow the conditional execution to proceed as far as possible before requiring (or waiting for) the needed CCs.

The Static Scheduling Conditional Execution architecture of FIG. 15a is modified in FIG. 15g in the following ways:

(a) A Busy-Wait bit is added in each register to provide a simple Dynamic Scheduling architecture.

(b) The Functional Unit executes all instructions except the COMPARE and some instructions take more cycles than others.

(c) A COMPARE Unit is provided to execute COMPARE instructions and set the Predicate.

(d) A Predicate Count that is incremented whenever a COMPARE instruction is issued and is decremented whenever a COMPARE updates the Predicate.

(e) A set of CC Reservation Stations are added in parallel with the Functional Unit to capture the needed Predicate as it becomes available and to retain that Predicate value even if a subsequent COMPARE changes the Predicate before the acquired value is used.

As each instruction that needs a Predicate is issued, the current Predicate Count value is copied into the PCV field of the CC Reservation Station assigned to that instruction. If the PCV field is zero, the current Predicate bit is copied into the CC Reservation Station. If the PCV field is non-zero, the CC Reservation Station decrements the PCV field every time a COMPARE instruction updates the Predicate. When the PCV becomes zero, the Predicate bit is captured by the CC Reservation Station.

Before an instruction can complete, i.e. before its destination register can be updated, its assigned CC Reservation Station must have captured the needed Predicate bit. If the needed Predicate has not been captured and the instruction is otherwise ready to complete, it waits. That captured Predicate bit is used to control the Conditional Execution Decision as described previously, i.e. if the Predicate is a one the instruction is successful, otherwise the instruction is unsuccessful.

Note that, in FIG. 15g, the COMPARE Unit does not need CC Reservation Stations. COMPARE instructions are executed in order and update the Predicate in order; therefore, the current Predicate is the correct Predicate to control the COMPARE instruction.

As will become even more apparent in the detailed embodiments later in this document, using tagging and reservation stations to capture the needed CC input significantly improves the prior art in four ways:

(1) Conditional Execution can be exploited in Dynamic Scheduling architectures.

(2) The needed Condition Code can be captured as soon as it becomes available, so there is no need for subsequent instructions that modify the Condition Code to wait for its previous contents to be used.

(3) When there is more than one copy of the Condition Code (see the 370-XA Embodiment) there is no need to ensure that updates occur in the original program order.

(4) Instruction execution can proceed all the way to the point of storing results before the Condition Code must be available to proceed further.

The term tagging applies to any method of knowing by monitoring events that a particular set of events have occurred. Some tagging methods are:

A unique tag, value, or code that is written to a known place when the event occurs. Actions that are dependent on that event occurring monitor for that unique tag.

A unique tag, value, or code that is written to any one of several places when the event occurs. Actions that are dependent on that event occurring monitor for that unique tag, by searching all places. The search can be associative, for speed.

An instance count of outstanding events. When that number of outstanding events have completed, as known by counting, the dependent action can proceed.

Any method that monitors events to find a known unique detectable condition that means that the dependent operation can proceed is tagging. Those skilled in the art will recognize that many modifications and variations, including those shown later in this document, are possible within the scope of the CC Reservation Stations aspect of the present invention.

Additional Embodiments

The present invention improves many processor architectures. To more completely explain the utility of the present invention the application of the present invention is described in more detail for four embodiments, followed by five embodiments that are shown in less detail:

(1) Software Dependency Resolution (Static Scheduling) Embodiment (2) Hardware Dependency Resolution (Dynamic Scheduling) Embodiment (3) Vector Instruction Embodiment (4) Dynamic Scheduling Embodiment For an Existing Architecture— Application to a Prior Art CISC Machine (5) Simple RISC (Reduced Instruction Set Computer)

(6) Registered Crossbar Network (7) Data Synchronized Pipeline Architecture (DSPA)

(8) Queue Based Vector Processor (QVC)

(9) Systolic Pipelined Network

Each of the first three embodiments described is based on a common configuration of 6 Functional Units, shown in FIG. 19, and a common instruction set, while the fourth embodiment uses functional units tailored to the prior art CISC machine and uses its original instruction set.

The common instruction set described produces a general purpose processor illustrating embodiments of the invention. The instruction set is minimal, except for the Load and Store instructions which are expanded in power over a minimal set to illustrate how N, OPERATIONS/INSTRUCTION can be improved within the present invention and how the aspects of the present invention aid such powerful enhancements. Those skilled in the art will understand that many other variations and extensions are possible within the scope of this invention.

The common set of 6 Functional Units used is (see FIG. 19):

Two LOAD, STORE, BRANCH units (LSB1 270 and LSB2 275)

Two Integer and Floating-Point ALU's (ADD1 280 and ADD2 285)

Two Integer and Floating-Point Multipliers (MUL1 290 and MUL2 295)

Instruction packets, fetched from Program Memory 255 and containing six Instructions 101 each, are issued to control the six Functional Units. The entire packet of 6 instructions occupies a single address in Program Memory 255. The addresses of sequential packets differ by one.

Sixty-four registers are divided into eight groups of eight registers and allocated as follows:

Reg 0–7, LSB1 General Registers 305

Reg 8–15, LSB2 General Registers 310

Reg 16–23, ADD1 General Registers 315

Reg 24–31, ADD2 General Registers 320

Reg 32–39, MUL1 General Registers 325

Reg 40–47, MUL2 General Registers 330

Reg 48–55, LSB1 Address Registers 335

Reg 56–63, LSB2 Address Registers 340

Each register contains 64 bits of information. Any register may be a source to any Functional Unit, selected through the Register to Functional Unit Crossbar 460, but only those registers associated with a Functional Unit can be a destination. The special use of Address Registers 335 and 340 is described in the instruction descriptions.

Each Register in the 16–47 address range 315, 320, 325, and 330, i.e. those associated with the ADD 280 and 285 and MULTIPLY 290 and 295 Functional Units, additionally has a 5-bit condition code associated with it. Like the registers, any of these 32 condition codes can be a source to any Functional Unit, but only those condition codes associated with a Functional Unit can be set by that Functional Unit.

An additional 5 register addresses (64–68, with 69–71 reserved) provide necessary machine state when an interruption occurs. These registers can be sourced only by the LSB units and cannot be the destination of any instruction. The use of these registers is explained in the section, PC Generation and the PC FIFO.

The Data Cache 300 can be accessed for loading or storing data by the LSB Units 270 and 275.

Instruction packets are fetched from Program Memory 255, based on the contents of the PC FIFO 345. When Branch instructions are not present, the entry at the top of the PC FIFO 345 is incremented by one and placed on PC FIFO as the new top entry. Branch instructions can modify the contents of the entry to the PC FIFO 345 as described later.

In all the embodiments described here instruction execution order in each Functional Unit is maintained in the order in which those instructions were issued.

Bit Numbering

In the Basic Common Embodiment lower bit numbers are less significant than higher bit numbers, i.e. bit numbering is right to left starting at bit 0 (least significant).

The Basic Instruction Set

The instruction set is composed of instructions targeted at the various Functional Units in four basic formats with variations for the STORE, STORE INDEXED, and BRANCH & LINK instructions. An all zeros value in a source Register field specifies an all zeros source, while an all zeros value in a Destination Register field specifies a Null destination.

Instruction Formats

RRR Register-Register-Register instructions operate on two registers, $R_a$ and $R_b$, to produce a result which is stored in register $R_d$ if the WRT bit is true and the conditional execution decision enables (see below). These instructions can modify the condition code specified by $R_d$ when the SET bit is true and the conditional execution decision enables. Data length of 32 or 64 bits is specified by the Op Code.

RRR

| OP CODE | CC MASK | CC SEL | SET | WRT | $R_d$ | $R_a$ | $R_b$ |
|---|---|---|---|---|---|---|---|

RKR Register-Constant-Register instructions are like the RRR's in all respects, except the $R_b$ source operand is replaced by the 6-bit K-field from the instruction, sign extended to 32 or 64-bits, as specified by the OP CODE.

RKR

| OP CODE | CC MASK | CC SEL | SET | WRT | $R_d$ | $R_a$ | K |
|---|---|---|---|---|---|---|---|

RKA Register-Constant-A instructions calculate a value by adding the contents of $R_a$ to the 12-bit K-field, sign extended to 32 bits. The GOTO instruction, the only RKA format instruction, modifies the PC-value with the calculated value when the conditional execution decision enables. RKA instructions cannot set condition codes.

RKA

| OP CODE | CC MASK | CC SEL | 0 0 | $R_a$ | K |
|---|---|---|---|---|---|

RKD Register-Constant-D instructions calculate a value by adding zero or the contents of $R_d$ (as specified by the Op Code) to a 16-bit constant (not sign extended) positioned in the 16-bit half-word specified in the POS field. The 64-bit result produced is stored in register $R_d$, when enabled by the conditional execution decision. The 16-bit constant is composed of 12-bits from the K-field plus 4 bits from the OP CODE field. RKD instructions cannot set condition codes.

RKD

| OP CODE | CC MASK | CC SEL | POS | $R_d$ | K |
|---|---|---|---|---|---|

Instruction Fields

The OP CODE specifies the operation (e.g. Double Precision Floating-Point Add, Integer Subtract, Single Precision Floating-Point Multiply) to be performed by the instruction.

The CC MASK, in combination with the Condition Code selected by the CC SEL field, decides if the data and/or Condition Code result of an instruction is to be written to the specified destination register and/or Condition Code. The details of the logical evaluation leading to this decision, termed "conditional execution," are provided later.

For the RRR and RKR formats, the SET bit, when true, specifies that the Condition Code specified by $R_d$ is to be updated with the Condition Code resulting from the instruction, if enabled by the conditional execution decision.

The WRT bit, when true, specifies that the Register specified by $R_d$ is to be updated with the datum resulting from the instruction execution, if enabled by the conditional execution decision.

The SET bit is replaced by the $IR_a$ bit in the LOAD, LOAD INDEXED, STORE, and STORE INDEXED forms of the RRR and RKR format instructions. The $IR_a$ bit specifies that the address register specified by $R_a$ is to be updated with the address calculated by adding the two source operands together.

In the RKD format instructions, the POS field specifies one of four positions for the 16-bit constant source to be placed within the 64-bits.

INSTRUCTION OPERATION

NOOP INSTRUCTION—The NOOP instruction is used to fill instruction slots when there is nothing useful to be done. The NOOP is a RRR format instruction with all fields other than the OP CODE zeroed. The NOOP instruction can be used in any of the 6 instruction slots within a packet.

LOAD CONSTANT INSTRUCTION—The RKD format LOAD CONSTANT instruction, LCON/h, adds an implied source of 64 zero bits to the 16-bits from the instruction, positioned as specified by the /h-modifier which is encoded into the POS field as follows:

0—specifies bits 0–15
1—specifies bits 16–31
2—specifies bits 32–47
3—specifies bits 48–63

The result of the add is conditionally written to register $R_d$. The LCON/h instruction cannot modify condition codes. This instruction can be executed by any functional unit.

LOAD ADDRESS INSTRUCTION—The RKD format LOAD ADDRESS instruction, LADS/h, adds the value obtained from $R_d$ to the 16-bits from the instruction, positioned as specified by the /h-modifier which is encoded into the POS field as follows:

0—specifies bits 0–15
1—specifies bits 16–31
2—specifies bits 32–47
3—specifies bits 48–63

The result of the add is conditionally written to register $R_d$. The LADS/h instruction cannot modify condition codes. This instruction can be executed by any functional unit. Since this instruction uses $R_d$ as both source and destination, it is limited to registers dedicated to the functional unit executing the instruction.

LOAD ADDRESS REGISTER—The RRR and RKR format LOAD ADDRESS REGISTER instruction, LDAR/g, is a special form of the ADD INTEGER instruction executed only by LSB Units and typically used to load an address register. The LDAR/g adds the contents of $R_a$ and $R_b$ or the contents of $R_a$ and the 6-bit K-field, sign extended to 32 or 64 bits. The data length is specified by the /g-modifier (encoded into the Op Code):

S—specifies 32 bits
D—specifies 64 bits

The result is written to the Register specified by $R_d$, when enabled by the conditional execution decision. The LOAD ADDRESS REGISTER instruction cannot modify condition codes. The LOAD ADDRESS REGISTER instruction can only be executed by a LOAD/STORE/BRANCH unit.

LOAD INSTRUCTION—The RRR and RKR format LOAD instruction, LOAD/f, calculates a memory address by adding the 64-bit contents of registers $R_a$ and $R_b$ or the contents of $R_a$ and the sign extended K-field. If the $IR_a$-bit is set and the conditional execution decision enables, the resulting memory address is saved in $R_a$, which must be an Address Register. The calculated memory address is used to access data memory and the accessed datum is conditionally written to $R_d$, which must be a General Register, not an Address Register. Memory addresses are on the basis of 8-bit bytes.

The /f-modifier, encoded into the OP CODE, selects the number of bits moved from the selected memory location to register $R_d$ as follows:

S—specifies 32 bits, loaded into bits 0–31 of $R_d$
D—specifies 64 bits, loaded into $R_d$
T—specifies 64 bits, 32-bits to $R_d$ and 32-bits to $R_d+1$, bits 32–63 are zeroed.
Q—specifies 128 bits, 64-bits to $R_d$ and 64-bits to $R_d+1$ The Q and T options require that $R_d$ be a even numbered register. The /f-modifier also specifies the number of low-order address bits to be ignored; 2 for S, 3 for D, 3 for T, and 4 for Q. That is, the calculated address is forced to the proper byte boundary.

The LOAD instruction can only be executed by a LOAD/STORE/BRANCH unit and cannot modify Condition Codes.

LOAD INDEXED INSTRUCTION—The RRR and RKR format LOAD INDEXED instruction, LDIn/f, calculates a memory address by adding the 64-bit contents of $R_a$ to the left shifted contents of $R_b$ or the contents of $R_a$ and the left shifted sign extended K-field. If the $IR_a$-bit is set and the conditional execution decision enables, the resulting memory address is saved in $R_a$, which must be an Address Register. Either the original $R_a$ contents or the calculated memory address is used to access data memory, as determined by the n-modifier, and the accessed datum is conditionally written to $R_d$, which must be a General Register, not an Address Register. Memory addresses are on the basis of 8-bit bytes.

The n-modifier specifies whether the indexing operation takes place before or after the address is used as the memory address:

A—Apply Index after using $R_a$ as address
B—Apply Index before using $R_a$ as address The default for LDIN/f is to apply the index before using $R_a$ as the address. Note that the software produced for this machine would normally create a Last-in-First-Out (LIFO) Stack in main memory by assigning (by convention) an Address Register to always be the Stack Pointer. Information can be "Pushed" onto the Stack and "Popped" off the Stack. A PUSH is accomplished via a STORE INDEXED instruction (with $R_a$=Stack Pointer, a positive index, the n-modifier=before, and $I_{RA}$: STIB/D Rx,RStack,1,IRA) and a POP is a LOAD INDEXED instruction (with $R_a$=Stack Pointer, a negative index, the n-modifier=after, and $I_{RA}$: LDIA/D Rx,RStack,−1,IRA).

The /f-modifier, encoded into the OP CODE, selects the number of bit positions that $R_b$ or the K-field is shifted and selects the number of bits moved from the selected memory location to register $R_d$ as follows:

S—specifies 32 bits, loaded into bits 0–31 of $R_d$, bits 32–63 are zeroed ($R_b$ or K-field shift count=2).

D—specifies 64 bits, loaded into $R_d$ ($R_b$ or K-field shift count=3)

T—specifies 64 bits, 32-bits to $R_d$ and 32-bits to $R_d+1$, bits 32–63 are zeroed ($R_b$ or K-field shift count=3).

Q—specifies 128 bits, 64-bits to $R_d$ and 64-bits to $R_d+1$ ($R_b$ or K-field shift count=4)

The T and Q options require that $R_d$ be a even numbered register. The /f-modifier also specifies the number of low-order address bits to be ignored; 2 for S, 3 for D and T, and 4 for Q. That is, the calculated address is forced to the proper byte boundary.

The LOAD INDEXED instruction can only be executed by a LOAD/STORE/BRANCH unit and cannot modify condition codes.

STORE INSTRUCTION—The RRR and RKR format STORE instruction, STOR/f, calculates a memory address by adding the 64-bit contents of registers $R_a$ and $R_b$, or the contents of $R_a$ and the sign extended K-field. If the $IR_a$-bit is set and the conditional execution decision enables, the resulting memory address is saved in $R_a$, which must be an Address Register. The calculated memory address is used to access data memory and register $R_d$ is conditionally written to the accessed memory location. Memory addressing is on the basis of 8-bit bytes.

The /f-modifier, encoded into the OP CODE, selects the number of bits moved to the selected memory location as follows:

S—specifies 32 bits from bits 0–31 of $R_d$ are stored

D—specifies 64 bits from $R_d$ are stored

T—specifies 64 bits, bits 0–31 of both $R_d$ and $R_d+1$ are stored

U—specifies 64 bits, bits 0–31 of both $R_d$ and $R_d+8$ are stored

Q—specifies 128 bits, bits 0–63 from registers $R_d$ and $R_d+1$ are stored

W—specifies 128 bits, bits 0–63 of both $R_d$ and $R_d+8$ are stored

The Q and T options require that $R_d$ be a even numbered register. The U and W options require that $R_d$ be a LSB1, ADD1 or MUL1 register. Register $R_d+8$ is the corresponding register in LSB2, ADD2, or MUL2, respectively; thus allowing simultaneous storage of results from two functional units. The /f-modifier also specifies the number of low-order address bits to be ignored; 2 for S; 3 for D, T, and U; and 4 for Q and W. That is, the calculated address is forced to the proper byte boundary.

The STORE instruction can only be executed by a LOAD/STORE/BRANCH unit and cannot modify condition codes. Each packet can contain a maximum of one STORE or STORE INDEXED instruction.

STORE INDEXED INSTRUCTION—The RRR and RKR format STORE INDEXED instruction, STIn/f, calculates a memory address by adding the 64-bit contents of register $R_a$ to the left shifted contents of register $R_b$, or the contents of $R_a$ and the left shifted sign extended K-field. If the $IR_a$-bit is set and the conditional execution decision enables, the resulting memory address is saved in $R_a$, which must be an Address Register. Either the original contents of $R_a$ or the calculated memory address is used to access data memory and the contents of register $R_d$ is conditionally written to that memory location. Memory addressing is on the basis of 8-bit bytes.

The n-modifier specifies whether the indexing operation should take place before the address is used as the memory address or after:

A—Apply Index after using $R_a$ as address

B—Apply Index before using $R_a$ as address

The default for STIN/f is to apply the index before using $R_a$ as the address. See the PUSH and POP discussion under the LOAD INDEXED instruction.

The /f-modifier, encoded into the OP CODE, selects the number of bit positions that $R_b$ or the K-field is shifted and selects the number of bits moved to the selected memory location:

S—specifies 32 bits from bits 0–31 of $R_d$ are stored ($R_b$ or K-field shift count=2)

D—specifies 64 bits from $R_d$ are stored ($R_b$ or K-field shift count=3)

T—specifies 64 bits, bits 0–31 of both $R_d$ and $R_d+1$ are stored ($R_b$ or K-field shift count=3)

U—specifies 64 bits, bits 0–31 of both $R_d$ and $R_d+8$ are stored ($R_b$ or K-field shift count=3)

Q—specifies 128 bits, bits 0–63 from registers $R_d$ and $R_d+1$ are stored ($R_b$ or K-field shift count=4)

W—specifies 128 bits, bits 0–63 of both $R_d$ and $R_d+8$ are stored ($R_b$ or K-field shift count=4)

The T and Q options require that $R_d$ be a even numbered register. The U and W options require that $R_d$ be a LSB1, ADD1 or MUL1 register. Register $R_d+8$ is the corresponding register in LSB2, ADD2, or MUL2, respectively. The /f-modifier also specifies the number of low-order address bits to be ignored; 2 for S; 3 for D, T, and U; and 4 for Q and W. That is, the calculated address is forced to the proper byte boundary.

The STORE INDEXED instruction can only be executed by a LOAD/STORE/BRANCH unit and cannot modify condition codes. Each packet can contain a maximum of one STORE or STORE INDEXED instruction.

GOTO INSTRUCTION—The RKA format GOTO instruction, GOTO, calculates a branch address by adding the contents of $R_a$ to the 12-bit K-field (sign extended). That calculated branch address is placed on the PC_FIFO, if enabled by the conditional execution decision.

As described later in the Program Counter description, the branch action is delayed for three cycles, i.e. the Branch umbra is 3 packets long.

The GOTO instruction can only be executed by a LOAD/STORE/BRANCH unit.

BRANCH AND LINK—The RRR and RKR format BRANCH AND LINK instruction, BAND, calculates a branch address by adding the contents of registers $R_a$ and $R_b$, or the contents of $R_a$ and the sign extended K-field. The current program counter address is saved in the link register $R_d$, which must be a General Register (not an Address Register), and the calculated branch address is placed on the PC_FIFO, if enabled by the conditional execution decision.

As described later in the Program Counter description, the branch action is delayed for three cycles, i.e. the Branch umbra is 3 packets long. Code returning from a call entered via a BRANCH AND LINK should use a GOTO $R_a$,4 instruction, where $R_a$ is the link register. Adding 4 to the link register is necessary to skip the instructions executed in the BRANCH AND LINK umbra, i.e. instructions already executed.

The BRANCH AND LINK instruction can only be executed by a LOAD/STORE/BRANCH unit.

OTHER INSTRUCTIONS—The remainder of the basic instruction set are of the RRR or RKR format. These instructions operate on the source operands and produce a result and/or condition code. All are conditionally executable and all can set a condition code.

In these instructions the /g-modifier, encoded in the Op Code field, specifies the size of the operands.

S—specifies 32 bits

D—specifies 64 bits

In most instructions the operands must be the same length; however, the FIX, FLOAT, and FORMAT instructions, which convert among the available numeric formats, have two g-modifiers. The first g-modifier applies to the source and the second /g-modifier applies to the destination. Instructions that use only one source (e.g. MOVE) use the $R_b$ or K field as the source and ignore the $R_a$ field.

GENERAL INSTRUCTIONS

| Instruction | Mnemonic | Functional Units |
|---|---|---|
| MOVE | MOVE/g | ADD, MUL |
| MOVE BYTE | MBYT/b | ADD |

The MOVE instruction moves data from any register (or a constant) to a register dedicated to a ADD or MUL functional unit. The g-modifier specifies the size of the operands:

S—32 bits

D—64 bits

When a 32-bit operand is moved bits 32–63 are zeroed in the destination.

The MOVE BYTE instruction selects the byte from $R_a$ specified by the low-order 3 bits of the second operand ($R_b$ or K) and moves that byte to the byte of $R_d$ specified by the /b-modifier. No other bytes in $R_d$ are changed by the MOVE BYTE instruction.

ARITHMETIC INSTRUCTIONS

| Instruction | Mnemonic | Functional units |
|---|---|---|
| ADD INTEGER | ADDI/g | ADD, MUL |
| ADD FLOATING-POINT | ADDF/g | ADD, MUL |
| COMPARE INTEGER | CMPI/g | ADD, MUL |
| COMPARE FLOATING-POINT | CMPF/g | ADD, MUL |
| SUBTRACT INTEGER | SUBI/g | ADD, MUL |
| SUBTRACT FLOATING-POINT | SUBF/g | ADD, MUL |
| MULTIPLY INTEGER | MULI/g | MUL |
| MULTIPLY FLOATING-POINT | MULF/g | MUL |
| FIX (FP TO INTEGER) | FIXg/g | ADD |
| FLOAT (INTEGER TO FP) | FLTg/g | ADD |
| FORMAT (FP TO FP) | FMTg/g | ADD |
| NORMALIZE | NORM/g | ADD |

The COMPARE and the SUBTRACT are actually the same instruction.

LOGICAL INSTRUCTIONS

| Instruction | Mnemonic | Functional Units |
|---|---|---|
| AND (LOGICAL) | AND_/g | ADD |
| OR | OR_/g | ADD |
| XOR | XOR_/g | ADD |

-continued

LOGICAL INSTRUCTIONS

| Instruction | Mnemonic | Functional Units |
|---|---|---|
| NAND | NAND/g | ADD |
| NOR | NOR_/g | ADD |
| SHIFT LOGICAL | SHFL/g | ADD |
| ROTATE LOGICAL | ROTL/g | ADD |

The count of the SHIFT LOGICAL and ROTATE LOGICAL is a 6 bit sign-extended value from the low-order 6-bits of $R_b$ or from the K field. Thus the range of shifting or rotating is −31 bit to +32 bits, where negative shift counts indicate left shifts or rotates and positive shift counts indicate right shifts or rotates.

CONDITION CODE MANAGEMENT INSTRUCTIONS

| Instruction | Mnemonic | Functional Units |
|---|---|---|
| SAVE CC | SAVE | ADD, MUL |
| RESTORE CC | RESTOR | ADD, MUL |

The RRR format SAVE CC instruction merges the 8 Condition Codes of the target Functional Unit, into a 64-bit word (one CC per byte) and writes that word to $R_d$, if enabled by the conditional execution decision. The $R_a$ and $R_b$ fields should be set to zero.

The RRR format RESTORE CC instruction sources the 64-bits contained in $R_a$ and scatters the individual bytes to the 8 Condition Codes of the target Functional Unit (one CC per byte), if enabled by the conditional execution decision. The $R_b$ and $R_d$ fields should be set to zero.

The Condition Codes

The condition codes, $C_n$, used in the embodiments described here are encoded into 5 bits and the CC MASK field of the instructions is 6 bits (5 bits to test each of the 5 condition code bits plus a bit that inverts the test as detailed later). The $C_n$ bits are $C_4$=Latest, indicates that the latest instruction targeting setting the particular CC successfully updated the CC.

$C_3$=Zero, indicates that the result is zero $C_2$=Negative, indicates that the result is negative $C_1$=Carry, indicates that the operation generated a carry $C_0$=Valid, indicates that the result is a valid number Instructions that specify SET, but which are not completed because of the conditional execution decision, clear the Latest bit, but do not change the other CC bits. Instructions that specify SET and do complete set the Latest bit and modify the other CC bits to indicate the status of the operation.

The conditional execution decision is successful when CC MASK (6 m-bits) and the CC (5 c-bits) produce a true condition from the logical evaluation $$\text{TEST} = ((\text{NOT } m_4) \text{ OR } (m_4 \text{ AND } c_4))$$
$$\text{AND } (m_5 \text{ XOR } ((m_3 \text{ AND } c_3) \text{ OR}$$
$$(m_2 \text{ AND } c_2) \text{ OR}$$
$$(m_1 \text{ AND } c_1) \text{ OR}$$
$$(m_0 \text{ and } c_0) \quad )$$

Note that $m_5$ inverts the test of $c_0$ through $c_3$, not $c_4$, Latest. Some examples of use of the CC MASK are Unconditional execution requires that only $m_5$ be set The test for equal sets $m_3$ The test for not equal sets $m_5$ and $m_3$.

The test for not equal and latest sets $m_5$, $m_4$, and $m_3$

The important point of the invention described is not the encoding of the condition code, but is the use of the conditional execution decision to enable completion of the instruction. That is the instruction is started before the conditional execution decision may be available. Just before the result of the instruction is written to the destination register and/or to the Condition Code, the conditional execution decision is made, i.e. at the latest possible time.

Those skilled in the art will recognize the encoding of the condition code and CC MASK as that of the DEC VAX with the addition of the Latest bit. Other encodings provide similar capabilities, e.g. the 2 bit Condition Code of the IBM 370 along with its 4 bit mask extended to 3 bits and 5 bits by the Latest bit provide a similarly effective solution.

A single predicate bit in place of each multi-bit condition code, where the predicate bit is set by a COMPARE instruction including a specification of the condition necessary for the predicate bit to be true would decrease the generality of the solution, but would still be within the scope of this invention, if that predicate bit were used to control the completion of a conditional instruction. This simplification would be appropriate in embodiments that require limiting the number of bits of condition code storage and that require limiting the instruction width. To avoid the need to pre-clear the predicate bits to be used in compound decisions (see the discussion of the Software Dependency Resolution Embodiment) an embodiment using predicate bits should clear the specified predicate bit on an unsuccessful conditional COMPARE.

Also, in embodiments not needing to accommodate multiple simultaneous threads of control, a single condition code shared by all the functional units would be within the scope of this invention.

Data Memory Addressing—The basic common embodiment is capable of generating addresses up to 64-bits in length. Since a minimal general purpose processor illustrating the embodiments of the present invention is described, the address is limited here to 32-bits.

Memory is byte addressed where a byte is 8-bits. Words are 4 bytes long and double-words are 8 bytes long.

Virtual Memory Addressing—Virtual memory pages are 64K bytes in size. The low order 16 bits of the virtual address map directly to the low order 16-bits of the real address. The high order 16-bits of the virtual address are used to index into the page table, which contains the virtual to real mapping by providing a 16-bit value to replace the high order 16-bits of the virtual address.

A high-speed 64K entry page table provides this direct mapping as shown in FIG. 20. The access of the physical-page portion of the address occurs in parallel with the fetch of cache data, as described below. Associated with each entry in the high-speed page table is a Vacant bit, that when set indicates that the corresponding page is not present in memory.

In FIG. 20 bits 16–31 of the Virtual Address 350 are used to select a Real Page Address from the Page Table 355. That selected Real Page Address is used as bits 16–31 of the Real Address 360, while bits 0–16 of the Virtual Address 350 are directly used as bits 0–16 of the Real Address 360. If the Vacant bit is set in the Page Table entry, a Page Fault is recognized.

Data Cache—The data cache is pipelined and has three ports to permit two reads (LOADs) and one write (STORE) during each cycle. The 256K byte cache contains 4 sets of 4K×16 bytes organized as a direct mapped 4-way set associative cache. When accessed each of the 4 sets supplies the addressed 16 bytes of data along with identifying information and controls. Each 16 bytes of data is called a line.

In FIG. 21, one read port of the Data Cache 300 of FIG. 19 is shown in more detail with 4 major elements:

(1) 32 bit Virtual Address Register 350

(2) Data Cache Memory 525 including the 64K×16 bit High Speed Page Table 355 and 4 Cache Sets 365. Each set 365 includes 4K entries with each entry having 16 bytes (128 bits) of data, the associated Real Page Address, and Control Flags.

(3) LSB Cache Data Register 420 including the Real Address Register 360 and the Cache Line Registers 370 (one for each set).

(4) Check and Align 425 including 4 Real Page Comparators 375, the Line Selector 380, and the Line Shifter 385.

In operation cache access uses the 32 bit Virtual Address 350, which is separated into 3 fields. Direct mapping uses bits 4–15 of the address to access a Line (16 bytes of data, the 16-bit real page address, and controls) from each of four 4K Cache Sets 365. Bits 16–31 of the Virtual Address 350 access a real page address from the Page Table 355 as described for FIG. 20. Bits 0–3, as controlled by the Op Code modifier, are forwarded to the Check and Align 425 for selection of the starting byte within the line at the Line Shifter 385. The Op Code modifier is also used to determine data length:

| Page Address | Cache Line Address | Bytes in Line |
|---|---|---|
| 3 3 2 2 2 2 2 2 2 2 2 2 1 1 1 1 1 1 1 1 1 1 | | |
| 1 0 9 8 7 6 5 4 3 2 1 0 9 8 7 6 5 4 3 2 1 0 9 8 7 6 5 4 3 2 1 0 | | |

In the Cache Data Register section 420, the accessed Real Page Address is clocked into the Real Address Register 360 and the 4 lines accessed are clocked into the Line Registers 370.

In the Check and Align section the Real Page Addresses from the Line Registers 370 are compared via the four Real Page Comparators 375 with the contents of the Real Page Address Register 360 to determine which, if any, of the Cache Line Registers 370 has the matching Real Page Address. If there is no match a Cache Miss is recognized and the data is fetched into the cache from main memory; otherwise, the data from the correct Cache Line Register 370 is selected by the Line Selector 380 and passed to the Line Shifter 385 for alignment based on Virtual Address bits 0–3 and the Op Code modifier (see the LOAD and LOAD INDEXED instruction definition for alignment details).

During Store operations the cache is first accessed, in the same manner as described above, to ensure that the needed line is present, then in a later cycle the data is actually written.

The three ports allow the two LSB pipes to simultaneously access data from the cache while the results of a previous store are being written.

When data is read or written the f-modifier (see the LOAD, LOAD INDEXED, STORE, and STORE INDEXED instructions) specifies the alignment of data and specifies the number of low-order address bits that are ignored, as previously described.

LSB UNITS PIPELINE

The LOAD/STORE/BRANCH units are pipelined as shown in FIG. 22. As shown, each LSB includes the Data Cache Memory 525, the Cache Data Register 420, and the Check and Align 425 of FIG. 21.

In FIG. 22, LSB Input A 390 provides the operand selected by the $R_a$ field of the RRR, RKR, and RKA format instructions or by the $R_d$ field of the LOAD ADDRESS instruction. LSB Input B 395 provides the operand selected by the $R_b$ field of the RRR format instructions or by the K-field of other format instructions.

The LSB In-A Selector 400 chooses either LSB Input A 390 or the local Address Register 335 or 340 specified by the $R_a$ field of the instruction for one operand to the LSB Adder 405. LSB Input B 395 is the other input to the LSB Adder 405, which is used to calculate operands for the BRANCH, BRANCH AND LINK, LOAD, LOAD INDEXED, STORE, STORE INDEXED, and LOAD ADDRESS, LOAD CONSTANT, and LOAD ADDRESS REGISTER instructions.

Operating in parallel with the LSB Adder 405, the LSB Early Conditional Execution Decision 410 evaluates the Condition Code specified by the CC Select field in the instruction against the CC Mask field of the instruction as previously described (see The Condition Code) for the LOAD CONSTANT, LOAD ADDRESS, LOAD ADDRESS REGISTER, GOTO, and BRANCH AND LINK instructions.

The result from a LSB Adder 405 can be passed to a local Address Register 335 or 340 (when enabled by the Early Conditional Execution Decision 410), to a LSB Virtual Address Register 350 for Data Cache access or General Register load, or to the PC_FIFO (when enabled by the Early Conditional Execution Decision 410). An LSB unit can update one of its (local) Address Registers on cycle n and use that updated data on the very next cycle n+1, because of the LSB In-A Selector 400. Note that updating of these Address Registers 335 and 340 is only via the LOAD CONSTANT, LOAD ADDRESS, or LOAD ADDRESS REGISTER instructions or via a Load or Store instruction specifying $IR_a$.

The LSB Virtual Address Register 350 either provides a virtual address to the Data Cache Memory 525, as previously described (see FIG. 21), or to the LSB Pipe Register 445. The LSB Virtual Address Register 350 is provided to the Data Cache Memory 525, as a virtual address, when a Load or Store instruction is being executed. It is provided to the LSB Pipe Register 445 when the operand calculated via the LSB Adder is destined for a General Register 305 or 310 during the execution of a LOAD CONSTANT, LOAD ADDRESS, or LOAD ADDRESS REGISTER instruction.

The LSB Pipe Registers 445 can also, during the execution of a BRANCH AND LINK instruction, receive input from the PC_FIFO.

The LSB Late Conditional Execution Control 430 controls the writing of General Registers 305 and 310 and the Storing of Data to the Data Cache as previously described (see The Condition Code). During Store operations the LSB Store Data Register 435 receives the data to be stored as selected via the crossbar by the $R_d$ field of the instruction.

The LSB Pipe Register 445 and the LSB Check and Align 425 supply inputs to the General Registers 305 or 310. The input to be used, if any, is determined by the Op Code and by the LSB Late Conditional Execution Decision 430. Similarly the contents of the LSB Store Data Register 435 are moved to the Store Data Register 440 when the Op Code is a Store. The Enable bit in the Store Data Register 440 reflects the state of the Late Conditional Execution Control 430. Thus, the STORE and the STORE INDEXED instructions pick up the data to be stored as late as possible; therefore, minimizing latency. For example a LOAD can be followed by a STORE of the loaded data on the very next cycle.

PC GENERATOR AND THE PC FIFO

The PC-value is simply incremented by one when no interruption vector is present and when there is no new PC-value generated by a Branch instruction. Branch instructions can be successful or unsuccessful based on the conditional execution decision. When a Branch is successful the generated Branch Address is used in place of the incremented PC-value. The resulting PC-value is placed on the PC_FIFO which records the sequence of PC-values generated for fetching instructions.

Relative to the PC_FIFO there are four cycles involved in the execution of a Branch: Instruction Fetch Cycle 1, Instruction Fetch Cycle 2, Instruction Issue, and Instruction Execute. Thus a GOTO 200 instruction at location 100 would generate the following sequence of PC_FIFO contents:

| Ftch1 | Ftch2 | Issue | Exec |                          |
|-------|-------|-------|------|--------------------------|
| 103   | 102   | 101   | 100  | Next PC-value = 200      |
| 200   | 103   | 102   | 101  | Next PC-value = +1 (201) |
| 201   | 200   | 103   | 102  | Next PC-value = +1 (202) |
| 202   | 201   | 200   | 103  | Next PC-value = +1 (203) |
| 203   | 202   | 201   | 200  | Next PC-value = +1 (204) |

So that the execution sequence is 100, 101, 102, 103, 200, etc. Note that there are two cycles included for instruction fetch. Reducing this to one cycle would require a more expensive instruction cache, but would reduce the Branch umbra to 2 cycles.

For all embodiments based on the Basic Common Embodiment of the present invention detailed here a Branch umbra of 3 cycles is used. Since a generated address stays in the queue for 3 cycles before it is effective, a knowledge of one PC-value is not sufficient to know what the next 3 addresses will be—it takes 4 addresses to define the PC state at any point in time, the instruction of interest and the next 3 addresses. The need for 4 PC-values to describe the PC state is important for proper interruption handling in the following embodiments.

The 4 register addresses (64–67) provide the 4 PC values needed to describe the PC state when an interruption occurs and Register 68 provides the interruption code. These registers can be sourced only by the LSB units and cannot be the destination of any instruction.

After an interruption is recognized Register 67 contains the address of the next packet to update results (or the address of the interruption causing packet) and Registers 66, 65, and 64 contain the next 3 addresses from the PC FIFO, respectively. The interruption handler should save Registers 64–68 and other registers that might be overwritten (and lost) on the Stack.

Restarting an interrupted program from an interruption involves popping all entries saved on the Stack off the Stack and executing a series of GOTOs with the target address being the saved contents of these registers as described in the detailed embodiments, that follow.

SOFTWARE DEPENDENCY RESOLUTION (STATIC SCHEDULING) EMBODIMENT

The present invention is applied to a VLIW type architecture that relies on software (the compiler) to perform all dependency resolution. This is accomplished by the software through techniques known as static scheduling and trace scheduling. For example, in a static scheduling architecture that needs 4 cycles to perform a LOAD and 2 cycles to perform an ADD the sequential code for X(1)+X(2)+X(3) is

| CODE SEQUENCE | EXECUTION TIMING |
|---|---|
| LOAD X(1) —> R1 | LOAD X(1) |
| LOAD X(2) —> R2 | LOAD X(2) |
| LOAD X(3) —> R3 | LOAD X(3) |
| NOOP | |
| NOOP | |
| ADD R1+R2 —> R4 | ADD |
| NOOP | |
| ADD R3+R4 —> R5 | ADD | to produce the sum in R5. Note that the compiler accounts for all delays and properly places instructions so they are executed only when all needed sources are available. NOOP instructions provide one clock of time fill each. Also, depending on the timings of the various instructions, result availability is not necessarily in the same order as instruction issue, e.g. if a LOAD and an ADD are issued sequentially, the results of the ADD will be available 1 cycle before the result of the LOAD.

The general form of the static scheduling embodiment of the present invention is shown in FIG. 23a which is composed of 5 main elements: (1) Instructions 101 from program memory organized as 6-instruction packets; (2) Instruction Fetch and Issue Unit 440; (3) Connections from the Storage Elements to the Operating Units 103; (4) the Operating Units 104 called Functional Units 110; (5) Connections from the Operating Units to the Storage Elements 105; and (6) the Storage Elements 106 made up of Registers 115.

In operation the Instruction Fetch and Issue Unit 440 issues instructions to the 6 Functional Units 110, where the Registers 115 and the Functional Units 110 are connected as described in Dedicated Result Storage (U.S. patent Ser. No. SNTBD1, COMPUTER Processor with Improved Storage, filed DATETBD1) and the crossbar interconnect is further reduced through Folded Connections (U.S. patent Ser. No. SNTBD2, Computer Processor with Folded Connections, filed DATETBD2).

FIG. 23b shows a performance improved version of FIG. 23a, where the Conditional Execution aspect of the present invention is applied and enhanced via the CC Mask Field, the Set CC Field, Stale CC Handling, and Multiple CCs. Since the condition codes are only 5-bits, the added logic is insignificant, but the performance improvement is substantial, as will become apparent in the following example illustrating the benefits relative to the prior art. The Dedicated Result Storage (U.S. patent Ser. No. SNTBD1, COMPUTER Processor with Improved Storage, filed DATETBD1) and Conditional Execution combine to improve performance primarily because the latency between dependent instructions is reduced:

(1) Conditional instructions can directly follow the instruction setting the condition, rather than waiting for a branch decision.

(2) The number of cycles between an instruction producing a datum and an instruction consuming that datum is reduced by one cycle.

These improvements result in improved code fill and the execution of more instructions per cycle, improving I (INST/CYCLE) of the Performance Capacity box (FIG. 1). Additionally, these improvements combined with the reduced physical size permit the entire data path to be placed on a single VLSI chip (or a small number of chips). The result is much smaller delays between elements and a much improved clock rate, improving C (CYCLES/SECOND) of the Performance Capacity Box (FIG. 1).

FIG. 23c shows the Static Scheduling Embodiment of the present invention, using the Basic Common Configuration and the Common Instructions previously described (see FIG. 19 and its description). No hardware interlocks are provided and all instruction scheduling is performed statically by the compiler. The conditional execution aspect of the present invention, does permit the compiler to schedule instructions that are dynamically conditionally executed based on run-time conditions.

Cache Miss—In this embodiment a mechanism not normally found in Static Scheduling architectures supports a simple Cache Miss strategy. A cache miss causes the entire pipeline to stall until the data can be fetched into cache from the lower speed main memory. Thus this embodiment is not a "pure" Static Scheduling architecture.

Interruptions—The virtual page fault will be used as an example of an interruption to understand the mechanics involved. As shown in FIG. 21 and discussed in the Basic Common Embodiment section, a Page Fault is detected at the Check and Align stage of the LSB unit when the page accessed is not in main memory as known by the Vacant bit from the Page Table.

When the interruption is recognized in the Static Scheduling Embodiment subsequent interruptions are disabled; subsequent writes to registers, CCs and Memory are disabled; and an Interruption Delay period is initiated. When the Interruption Delay is ended, writes are re-enabled and the interruption vector address (address of the interruption handler) is pushed onto the PC_FIFO. The Interruption Delay period must be a sufficient number of clocks to ensure that any instructions in the pipeline are clocked through the entire pipeline (with writes disabled) before writing is re-enabled and the Interruption Handler is entered.

When the interruption is recognized, an Interruption Code is saved in Register 68 and 4 PC-values from the PC FIFO are saved, in order, in Registers 67 through 64. Register 67 contains the address of the packet that caused the interruption. The interruption handler should Push the contents of the address register that will be used in the restore process and Registers 64 through 68, as well as the contents of other resources that the interruption handler needs to use, onto the Stack (see the Basic Common Embodiment, LOAD INDEXED description).

Note that when the Page Fault interruption is recognized, some of the instructions in the packet that caused the interruption and in the next packet can have updated result resources before further writes are inhibited. The process that restores the state of the interrupted program must analyze the two packets pointed to by the contents of Registers 67 and 66 to determine how to properly restore the state. Normally the restore process will involve building copies of those two packets (called Copy 67 and Copy 66) replacing instructions that have already written their results with NOOPs. The Stack contents for R67 and R66 should be replaced with addresses pointing to the new Copy 67 and Copy 66 packets. After restoring the interrupted machine state up to that point, the restore routine should execute the following sequence of instructions to reenter the interrupted program:

| LSB1 | LSB2 | |
| --- | --- | --- |
| | POP → Rgoto | (discard interruption code) |
| | POP → Rgoto | (67 available in 4 cycles) |
| | POP → Rgoto | (66) |
| | POP → Rgoto | (65) |
| | POP → Rgoto | (64) |
| GOTO Rgoto (67) | POP → Rgoto | (restore addrs reg) |
| GOTO Rgoto (66) | | |
| GOTO Rgoto (65) | | |
| GOTO Rgoto (64) | | |

Note that the series of four GOTOs define the 4 packets that immediately follow in execution the restore routine.

Those skilled in the art will recognize that the static scheduling embodiment can be modified in many ways within the scope of the present invention. For example, virtual memory support could be eliminated, simplifying the interruption process. Any statically scheduled architecture that uses Conditional Execution, described here, is within the scope of this invention.

Advantages and Benefits for Software Dependency Resolution— Branch Intensive Code The advantages, benefits, and operation of the present invention are shown here via an example of Branch Intensive code that has been selected from the Livermore FORTRAN Kernels (LFK's). The complete set of 24 LFK's represent the best and worst of actual FORTRAN code taken from diverse real scientific applications. The harmonic mean of the set's performance is used to characterize the overall performance of a computer because that gives a true indication of the time needed to get results. A simple average provides very misleading and optimistic projections.

LFK 16, Monte Carlo Search Loop must be run in scalar mode on vector machines like the Cray. This loop, along with a few others, limits the harmonic mean of the 24 loops for those machines. The harmonic mean of prior art VLIW machines is not as severely impacted by LFK 16's performance because some use of parallel instruction issue is possible.

The FORTRAN source code for LFK 16 is shown below. Note the use of the arithmetic GOTO where the goto-label is selected by the arithmetic evaluation following the IF; less than zero, zero, and greater than zero choose the first, second, and third goto-label, respectively.

LFK 16 - MONTE CARLO SEARCH LOOP

```
FORTRAN SOURCE
    II= n/3
    LB = II + II
    k2 = 0
    k3 = 0
    DO 485           L = 1,Loop
                     m = 1
405                  i1 = m
410                  j2 = (n + n)*(m − 1) + 1
        DO 470       k = 1,n
                     k2 = k2 + 1
```

-continued

LFK 16 - MONTE CARLO SEARCH LOOP

|     |          |                         |                  |
|-----|----------|-------------------------|------------------|
|     |          | j4 = j2 + k + k         |                  |
|     |          | j5 = ZONE(j4)           |                  |
|     |          | IF ( j5−n               | ) 420,475,450    |
| 415 |          | IF ( j5−n+II            | ) 430,425,425    |
| 420 |          | IF ( j5−n+LB            | ) 435,415,415    |
| 425 |          | IF ( PLAN(j5) −         | R) 445,480,440   |
| 430 |          | IF ( PLAN(j5) −         | S) 445,480,440   |
| 435 |          | IF ( PLAN(j5) −         | T) 445,480,440   |
| 440 |          | IF ( ZONE(j4−1)         | ) 455,485,470    |
| 445 |          | IF ( ZONE(j4−1)         | ) 470,485,455    |
| 450 |          | k3 = k3 + 1             |                  |
|     |          | IF ( D(j5)−(D(j5−1)     | *(T−D(j5−2))**2  |
|     |          |                         | +(S−D(j5−3))**2  |
|     |          |                         | +(R−D(j5−4))**2  |
|     |          |                         | 445,480,440      |
| 455 |          | m = m + 1               |                  |
|     |          | IF ( m − ZONE(1)        | ) 465,465,460    |
| 460 |          | m = 1                   |                  |
| 465 |          | IF ( i1 − m             | ) 410,480,410    |
| 470 | CONTINUE |                         |                  |
| 475 | CONTINUE |                         |                  |
| 480 | CONTINUE |                         |                  |
| 485 | CONTINUE |                         |                  |

The examples here illustrate the mapping of this source code to a theoretical prior art VLIW machine (FIG. 6b) and to the embodiment of this invention (FIG. 23c). A basic comparison of these two machines is provided by Table 1. The theoretical prior art machine is unlike real prior art machines in the following ways:

(1) The clock rate is assumed to be as fast as the present invention, i.e. aggressive segmentation of the Functional Units is assumed. As previously discussed, real prior art VLIW machines have very slow clock rates.

(2) The 6 Functional Units included are the same as the embodiment of the present invention.

(3) Register Data is fully sharable across all Functional Units.

(4) The memory latency is the same as the embodiment of the present invention.

(5) Delayed Branching is included with the same Branch Umbra as the embodiment of the present invention.

(6) The same instruction set is included, with difference as noted below.

The performance improvements of the Static Scheduling Embodiment of the present invention over the theoretical prior art are provided by the following aspects of the present invention:

Dedicated Result Storage

Conditional Execution

CC Mask Field

Set CC Field

Stale Condition Code Handling

Multiple CCs

Because the Static Scheduling Embodiment uses static scheduling, the CC Reservation Stations element of the present invention does not apply.

The application of those elements of the present invention that are used follow Table 1.

TABLE 1

Invention Compared to Theoretical Prior Art with Static Scheduling Embodiment

| Characteristic | Theoretical Prior Art VLIW Machine | Present Invention Static Scheduling Embodiment |
|---|---|---|
| Instruction Issue | 6 In Parallel | 6 In Parallel |
| Functional Units | 2 LOAD/STORE/BRANCH<br>2 ADD<br>2 MUL | 2 LOAD/STORE/BRANCH<br>2 ADD<br>2 MUL |
| Registers | General Register File with Multi-ports | Registers at Functional Unit Outputs |
| Setting Status Bits | COMPARE sets/resets single predicate bit in predicate array | Any logical or arithmetic instruction can set one of the 5 bit (see text) Condition Code Registers at the Functional Unit's output |
| Conditional Use of | All instructions | All instructions can |

TABLE 1-continued

Invention Compared to Theoretical Prior Art
with Static Scheduling Embodiment

| Characteristic | Theoretical Prior Art VLIW Machine | Present Invention Static Scheduling Embodiment |
| --- | --- | --- |
| Status Bits | (including BRANCHs) can be conditionally issued only if the selected predicate bit is true | conditionally complete. Completion occurs if the selected condition code and the mask field in the instruction permit |
| GOTO Umbra | 3 cycles | 3 cycles (same as VLIW) |
| LCON Results Latency | 2 cycles | 1 cycle (1 less than VLIW due to less interconnect stages) |
| LOAD, LDIN Results Latency | 5 cycles | 4 cycles (1 less than VLIW due to less interconnect stages) |
| ADD, SUB, and MOVE Results Latency | 3 cycles | 2 cycles (1 less than VLIW due to less interconnect stages) |
| MUL Results Latency | 5 cycles | 4 cycles (1 less than VLIW due to less interconnect stages) |
| Status Latency | 3 cycles | 1 cycle (see text) |

Dedicated Result Storage—The latency to results is one cycle faster than for the theoretical prior art VLIW machine, because Dedicated Result Storage Ser. (No. SNTBD1, COMPUTER Processor with Improved Storage, filed DATETBD1) eliminates the extra crossbar selection stage between the Functional Unit outputs and the General Register File.

Conditional Execution—The condition codes in the present invention control the commitment of results rather than the issuing of instructions. The benefit is that status set by an instruction can be used on the very next cycle by a dependent instruction (already being executed) in the present invention. The theoretical prior art machine must wait for status to be available, by completion of the first instruction, before the decision can be made on issuing the dependent instruction.

With an adder that takes one cycle to perform the SUBTRACT needed for a COMPARE, or to do an ADD, the prior art machine needs 6 cycles to perform a two instruction sequence where a COMPARE sets a predicate that conditions an ADD.

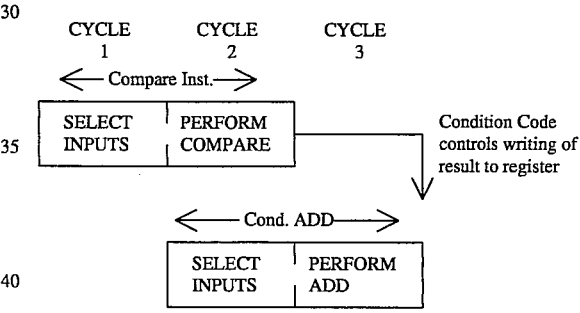

CC Mask Field—The condition codes of the present invention combined with flexible masking in the instructions permit multiple decisions to be made from a single generated condition code. The theoretical prior art machine's predicate bits must be set individually for a particular test by a COMPARE instruction. Conditional issuing and branching are only successful if the selected predicate bit is true, i.e. no

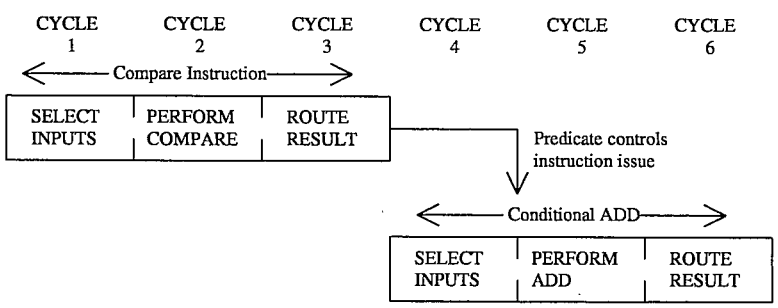

The present invention, in a similar situation requires only 3 cycles instruction can be conditioned on a predicate bit being false.

Set CC Field—Status, in the form of 5 bit condition codes, can be set by any arithmetic or logical instruction in the present invention, while in the theoretical prior art machine single-bit predicates are set or reset by COMPARE instructions.

Stale Condition Code Handling—The present invention's use of the LATEST bit in the condition code, e.g.

COMP/I RA,RB SET CC1

COMP/I RA,RC SET CC2 IF CC1 .LE.

ADD__/I RA,RA,RE IF CC2 .GE. & LATEST permits a chain of decisions to be conditionally executed correctly without branching. The theoretical prior art machine's equivalent sequence of

COMP/I RA,RB SET P1 IF (RA<=RB)

COMP/I RA,RC SET P2 IF (RA>=RC) & P1

ADD__/I RA,RA,RE IF P2 functions correctly only if P2 is pre-cleared; otherwise, the state of P2 is indeterminate upon arrival at the ADD instruction.

Multiple CCs—In this example, both the theoretical prior art VLIW machine and the Static Scheduling Embodiment have multiple condition codes. The difference is that those condition codes are more powerful and more manageable in the present invention. The LFK16 sequential code needed for the theoretical prior art VLIW machine is shown below. This code is organized to support executing the code from line 450 to 440/445 (see LFK16—Monte Carlo Search Loop, FORTRAN Source) in parallel with the code from 420 through 415/425/430/435 to 440/445 and to support executing the code at 440 in parallel with the code at 445. In any pass of the loop only one of the two parallel code paths actually executes. Note that where any conditional operation is required only the true predicate bit is usable as set by a specific previous COMPARE. This leads to the series of COMPAREs shown.

The performance critical loop or "main loop" is Instruction #23 through Instruction #87.

LFK 16 SEQUENTIAL CODE FOR THE THEORETICAL PRIOR ART VLIW MACHINE

Constants R, S, and T pre-loaded into registers RR, RS, and RT

```
Setup for the loop
 1            LCON/0   RLOOP,250
 2            LCON/0   RN,468
 3            LCON/0   R2N,936                 setup for L410+1 (n+n)
 4            LCON/0   RZONE,ZONE_ADRS
 5            LCON/0   RZONEM1,ZONE_ADRS-(1*4) setup for L440&L445
                                                32-bit integer data
 6            LCON/0   RPLAN,PLAN_ADRS
 7            LCON/0   RD,D_ADRS
 8            LDIN/S   RZONE1,RZONE,1          setup for L455+1
End setup
 9            LCON/0   RII,156                 n/3
10            LCON/0   RLB,312                 II+II
11            LCON/0   Rk2,0
12            LCON/0   RK3,0
13  DO485     LCON/0   RL,0
14  C485      ADDI/S   RL,RL,1
15            CMPI/S   RLOOP,RL SET P1 IF <    (set predicate 1 if LOOP<L)
16            RETURN   IF P1
17            MOVE/S   RM,1
18  L405      MOVE/S   RI1,1
19  L410      SUBI/S   RMM1,RM,1
20            MULI/S   RTEMP,R2N,RMM1
21            ADDI/S   RJ2,RTEMP,1
22  DO470     MOVE/S   RK,0                    k = 1,n
23  C470      ADDI/S   RK,RK,1
24            CMPI/S   RN,RK SET P2 IF <
25            GOTO     C485 IF P2
26            ADDI/S   RK2,RK2,1
27            ADDI/S   RJ4T,RK,RK              k+k
28            ADDI/S   RJ4,RJ4T,RJ2            +J2
29            LDIN/S   RJ5,RZONE,RJ4
30            CMPI/S   RJ5,RN SET P3 IF <      (P3 controls 420 execute)
31            CMPI/S   RJ5,RN SET P4 IF ==     (P4 controls 475 execute)
32            CMPI/S   RJ5,RN SET P5 IF >      (P5 controls 450 execute)
33            CLEAR    P6
34            CLEAR    P7
35            CLEAR    P8
36            CLEAR    P9
37            CLEAR    P10
38            CLEAR    P11
39            CLEAR    P12
40            CLEAR    P13
41            CLEAR    P14
42            CLEAR    P15
43            CLEAR    P16
44            CLEAR    P17
45            CLEAR    P18
46            GOTO     C485 IF P4
47  L450      ADDI/S   RK3,RK3,1 IF P5
48            LDIN/D   RDJ5,RD,RJ5,IRA         (these instructions need
49            LDIN/D   RDJ5M4,RD,-4            not be conditionally
```

-continued

| | | | |
|---|---|---|---|
| 50 | | LDIN/D | RDJ5M3,RD,−3 | executed, in fact they |
| 51 | | LDIN/D | RDJ5M2,RD,−2 | can be executed any |
| 52 | | LDIN/D | RDJ5M1,RD,−1 | time after inst#30 |
| 53 | | SUBF/D | RRMD,RR,RDJ5M4 | without damage) |
| 54 | | SUBF/D | RSMD,RS,RDJ5M3 | |
| 55 | | SUBF/D | RTMD,RT,RDJ5M2 | |
| 56 | | MULF/D | RRSQ,RRMD,RRMD | |
| 57 | | MULF/D | RSSQ,RSMD,RSMD | |
| 58 | | MULF/D | RTSQ,RTMD,RTMD | |
| 59 | | MULF/D | RDTIMES,RW5M1,RTSQ | |
| 60 | | ADDF/D | RSUM1,RRSQ,RSSQ | |
| 61 | | ADDF/D | RSUM2,RDTIMES,RSUM1 | |
| 62 | | CMPF/D | RDJ5,RSUM2 SET P6 IF <    & P5 (P6 controls 445) | |
| 63 | | CMPF/D | RDJ5,RSUM2 SET P7 IF =  & P5 (P7 loops to C485) | |
| 64 | | CMPF/D | RDJ5,RSUM2 SET P8 IF >    & P5 (P8 controls 440) | |
| 65 | L420 | SUBI/S | RJ5MN,RJ5,N | |
| 66 | | ADDI/S | RTEST1,RJ5MN,RLB | |
| 67 | | CMPI/S | RTEST1,0 SET P9  IF <    & P3 ( P9 controls 43) | |
| 68 | | CMPI/S | RTEST1,0 SET P10 IF >= & P3 (P10 controls 415) | |
| 69 | L435 | MOVE/D | RCOMMON,RT IF P9 | |
| 70 | L415 | ADDI/S | RTEST2,RJ5MN,RII | |
| 71 | | CMPI/S | RTEST2,0 SET P11 IF <    & P10 | |
| 72 | | CHPI/S | RTEST2,0 SET P12 IF >= & P10 | |
| 73 | | MOVE/D | RCOMMON,RS IF P11 | |
| 74 | | MOVE/S | RCOMMON,RR IF P12 | |
| 75 | LCOM | LDIN/D | RPLANJ5,RPLAN,RJ5 | |
| 76 | | CMPF/D | RPLANJ5,RCOMMON SET       P6 IF <    & P3 | |
| | | | (P6 controls 445) | |
| 77 | | CMPF/D | RPLANJ5,RCOMMON SET       P7 IF =  & P3 | |
| | | | (P7 controls loop to C485) | |
| 78 | | CMPF/D | RPLANJ5,RCOMMON SET       P8 IF >    & P3 | |
| | | | (p8 controls 440) | |
| 79 | | GOTO | C485 IF P7 | |
| 80 | L440 | LDIN/S | RZJ4M1,RZONEM1,RJ4 | |
| 81 | | CMPI/S | RZJ4M1,0 SET P13 IF >    & P8 (P13 controls 470) | |
| 82 | | CMPI/S | RZJ4M1,0 SET P14 IF =  & P8 (P14 controls 455) | |
| 83 | | CMPI/S | RZJ4M1,0 SET P15 IF <    & P8 (P15 controls 455) | |
| 84 | L445 | CMPI/S | RZJ4M1,0 SET P13 IF <    & P6 | |
| 85 | | CMPI/S | RZJ4M1,0 SET P14 IF =  & P6 | |
| 86 | | CMPI/S | RZJ4M1,0 SET P15 IF >    & P6 | |
| 87 | | GOTO | C470 IF P13 | |
| 88 | | GOTO | C485 IF P14 | |
| 89 | L455 | ADDI/S | RM,RM,1 IF P15 | |
| 90 | | CMPI/S | RM,RZONE1 SET P16 IF > | |
| 91 | L460 | MOVE/S | RM,R0,1 IF P16 | |
| 92 | L465 | CMPI/S | RI1,RM SET P17 IF = | |
| 93 | | CMPI/S | RI1,RM SET P18 IF <> | |
| 94 | | GOTO | C485 IF P17 | |
| 95 | | GOTO | L410 IF P18 | |

FIG. 24 shows the mapping of this sequential code into 6 instruction packets for the theoretical prior art VLIW machine. Connecting lines between instruction numbers indicate dependencies. Instructions 15A and 24A must be added to produce the inverse of predicates P1 and P2, respectively, for use by instructions in the umbra of the Branch instructions 16 and 25. The circles indicate those instructions made to conditionally execute on the predicates set by 15A and 24A.

Instruction 87's branch target has been changed from the packet containing instruction 23 to that packet+3. Instructions 23L, 33L, 34L, 35L, 36L, and 37L duplicate instructions 23, 33, 34, 35, 36, and 37, but are conditionally executed based on predicate P13 which is set if the instruction is going to branch back into the loop.

The main loop of LFK16, from instruction 23 through instruction 87, maps into packets 21 through 74 of FIG. 24.

Since each packet requires one clock time for execution, 54 cycles are needed to execute the main loop. It can be easily seen, however, that the number of cycles required would increase dramatically if instruction issue were limited to only one instruction per cycle— the case for the scalar mode of most vector processors. In fact, the Cray-XMP needs about 130 cycles to execute this main loop.

The LFK16 sequential code needed for the present invention embodiment of FIG. 23c is shown below. The code is organized like the code for the theoretical prior art VLIW machine, but condition codes are used instead of predicates.

LFK16 SEQUENTIAL CODE FOR THE STATIC SCHEDULING EMBODIMENT OF THE PRESENT INVENTION

Constants R, S, and T pre-loaded into registers RR, RS, and RT

```
Setup for the loop
 1              LCON/0    RLOOP,250
 2              LCON/0    RN,468
 3              LCON/0    R2N,936                         setup for L410+1
 4              LCON/0    RZONE,ZONE_ADRS
 5              LCON/0    RZONEM1,ZONE_ADRS-(1*4)         setup for L440&L445
 6              LCON/0    RPLAN,PLAN_ADRS
 7              LCON/0    RD,D_ADRS
 8              LDIN/S    RZONE1,RZONE,1                  setup for L455+1
End setup
 9              LCON/0    RII,156
10              LCON/0    RLB,312
11              LCON/0    Rk2,0
12              LCON/0    RK3,0
13    DO485     LCON/0    RL,0
14    C485      ADDI/S    RL,RL,1
15              CMPI/S    RLOOP,RL SET C1
16              RETURN    IF C1 <
17              MOVE/S    RM,1
18    L405      MOVE/S    RI1,1
19    L410      SUBI/S    RMM1,RM,1
20              MULI/S    RTEMP,R2N,RMM1
21              ADDI/S    RJ2,RTEMP,1
22    DO470     LCON/0    RK,0
23    C470      ADDI/S    RK,RK,1
24              CMPI/S    RN,RK SET C2
25              GOTO      C485 IF C2 <
26              ADDI/S    RK2,RK2,1
27              ADDI/S    RJ4T,RK,RK
28              ADDI/S    RJ4,RJ4T,RJ2
29              LDIN/S    RJ5,RZONE,RJ4
30              SUBI/S    RJ5MN,RJ5,RN SET C3   (C3 records J5-N test)
31              GOTO      C485 IF C3 ==
32    L450      ADDI/S    RK3,RK3,1 IF C3 >
33              LDIN/D    RDJ5,RD,RJ5,IRA             (these instructions need
34              LDIN/D    RW5M4,RD,-4                 not be conditionally
35              LDIN/D    RW5M3,RD,-3                 executed, in fact they
36              LDIN/D    RDJ5M2,RD,-2                can be executed any
37              LDIN/D    RDJ5M1,RD,-1                time after inst#29
38              SUBF/D    RRMD,RR,RDJ5M4              without damage)
39              SUBF/D    RSMD,RS,RDJ5M3
40              SUBF/D    RTMD,RT,RDJ5M2
41              MULF/D    RRSQ,RRMD,RRMD
42              MULF/D    RSSQ,RSMD,RSMD
43              MULF/D    RTSQ,RTMD,RTMD
44              MULF/D    RDTIMES,RDJ5M1,RTSQ
45              ADDF/D    RSUM1,RRSQ,RSSQ
46              ADDF/D    RSUM2,RDTIMES,RSUM1
47              CMPF/D    RDJ5,RSUM2 SET C4 IF C3 >
48    L420      ADDI/S    NULL,RJ5MN,RLB SET C5 IF C3 <   (C5 records
                                                          J5-N+LB test)
49    L435      MOVE/S    RCOMMON,RT IF C5 < & LATEST
50    L415      ADDI/S    NULL,RJ5MN,RII SET C6 IF C5 >= & LATEST
51              MOVE/S    RCOMMON,RS IF C6 <    & LATEST
52              MOVE/S    RCOMMON,RR IF C6 >= & LATEST
53    LCOM      LDIN/D    RPLANJ5,RPLAN,RJ5
54              CMPF/D    RPLANJ5,RCOMMON SET C4 IF C3 <
55              GOTO      C485 IF C4 ==
56    L440&     LDIN/S    RZJ4M1,RZONEM1,RJ4
57    L445      CMPI/S    RZJ4M1,0 SET C7 IF C4 <
58              CMPI/S    0,RZJ4M1 SET C7 IF C4 >
59              GOTO      C470 IF C7 <
60              GOTO      C485 IF C7 ==
61    L455      ADDI/S    RM,RM,1
62              CMPI/S    RM,RZONE1 SET C8
63    L460      MOVE/S    RM,1 IF C8 >
64    L465      C14PI/S   RI1,RM SET C9
65              GOTO      C485 IF C9 ==
66              GOTO      L410 IF C9 <>
```

The mapping of the above sequential code to 6 instruction packets for the embodiment of FIG. 23c is shown in FIG. 25. Note that the sequential source instructions 61–63 must be modified as shown below to allow their placement in the umbra of branches 59 and 60 (61 is actually placed in the

```
61  L455    ADDI/S RM,RM,1 IF C7 >
62          CMPI/S RM,RZONE1 SET C8 IF C7 >
63  L460    MOVE/S RM,1 IF C8 > & LATEST
```

Instruction 59's branch target has been changed from packet 12 containing instruction 23 to packet 18. Instructions 23L, 24L, 27L, and 28L in the umbra of Branch instructions 59 and 60 duplicate instructions 23, 24, 27, and 28, but are conditionally executed based on C7, if instruction 59 is going to branch back to the loop.

The main loop, instructions 23 through 59, is contained in packets 18 through 47 or 30 cycles. Compared to the 54 cycles needed by the theoretical prior art VLIW machine, the present invention demonstrates a significant architectural performance advantage. That 2X performance advantage is amplified by the ability of the present invention to fit in a single chip or a small set of chips, as discussed below. Those skilled in the art will recognize that further software optimizations are possible for both the theoretical prior art VLIW machine and the static scheduling embodiment of the present invention. Those optimizations are not included here to avoid additional complexity.

HARDWARE DEPENDENCY RESOLUTION (DYNAMIC SCHEDULING) EMBODIMENT

Performing dynamic instruction scheduling, at run time, requires added hardware; however it promises performance improvements not possible with static scheduling alone [Smit1]. Dynamic scheduling also has several attributes that make it a more general solution, especially for the general purpose microprocessor market:

(1) The compiler does not have to place instructions in their worst case relationship and does not have to worry about the variable memory delays present in a multiprocessor system. Multiprocessor systems, with shared memory, are especially attractive for multi-user environments like On Line Transaction Processing.

(2) NOOPs to provide time-fill are not necessary. As long as the code is placed in natural program order, the hardware will resolve the timing. The result is much better code fill and much less required code storage.

(3) The need, in certain markets, to produce a faster version of an existing architecture that provided hardware interlocks requires a dynamic scheduling mechanism, because, by definition, the code is not recompiled. Examples of these existing architectures that could benefit are IBM 370, Intel 80386/486, and Cray-YMP.

As previously discussed, dynamic scheduling executes instructions out-of-order causing difficulty when an interruption, such as a virtual memory page fault, must save the machine state, later restore that state, and continue program execution as if the interruption had never occurred. Since virtual memory is considered mandatory in many applications, a clean mechanism to reorder out-of-order instructions is highly desirable.

The RUU processor of FIGS. 9a and 9b is used as the best prior art dynamic scheduling solution. FIG. 26a shows the generalized dynamic scheduling embodiment of the present invention without Conditional Execution.

FIG. 26b shows the generalized embodiment of FIG. 26a with the Conditional Execution and all five of its enhancements added, for significantly increased performance in typical branch intensive code.

FIGS. 26a and 26b are composed of 9 important sections:

(1) Instruction Issue Unit 102 capable of issuing multiple Instructions 101 to the multiple Operating Units 104

(2) Results to Operating Units Connections composed of Storage to Operating Units Connections 103 (the Register to Functional Unit Crossbar 460) and the Results Crossbar 480

(3) Operating Units 104 made up of Reservation Stations 470, Functional Units 110, and Condition Code Reservation Stations 500 (FIG. 26b)

(4) Connections, Operating Units to Storage 105

(5) Virtual Registers 245

(6) Real Registers 250, which hold the permanent state of the machine (7) Crossbar Input Selectors 605 composed of Copy Selectors 695 and Last Write Selectors 755

(8) Result FIFOs 185 between the Virtual Registers 245 and the Real Registers 250 and obtaining results provided by the Last Write Selectors 755 (the same information that is provided to the Results Crossbar 480)

(9) Multiple Commit Paths 495

In operation the Instruction Issue Unit 102 issues Instructions 101 to the Reservation Stations 470 of the 6 Functional Units 110. During issue the needed Register operands are obtained, if available, via the Storage to Operating Units Connection 103. The Copy Selectors 695 choose either the Virtual Register 245 or the Real Register 250 copy, as appropriate. After issue, while instructions wait for the needed operands to become available, they monitor the Virtual Registers 245 via the Results Crossbar 480 for those needed operands, which are supplied to the Results Crossbar 480 via the Last Write Selectors 755. When all needed operands are available, the instruction is executed via the Functional Unit 110 and the result is written to the destination Virtual Register 245. The contents of the Virtual Register 245 selected by the Last Write Selector 755 are forwarded to the Result FIFO 185 in the original program order, as well as to the Results Crossbar 480 for capture by the Reservation Stations 470. The Result FIFOs 185 have Multiple Commit Paths 495 to the Real Registers 250, which hold the permanent state of the machine.

In FIG. 26b the Reservation Stations 470 of FIG. 26a are expanded by the addition of the CC Reservation Stations 500, to hold the Condition Code specified by the CC Select field of the instruction; however, unavailability of that needed Condition Code does not inhibit instruction execution. While the instruction is being executed in the pipeline of the Functional Unit 110, the CC Reservation Stations 500 capture the needed Condition Code as soon as it becomes available. When the results of the instruction are ready to write to the Virtual Registers 245, the progress of the instruction is stopped, if necessary, until the needed Condition Code is available. The evaluation of the Condition Code determines if the results are stored to the Virtual Registers 245.

While FIGS. 26a and 26b show a generalized dynamic scheduling architecture, FIG. 27a illustrates the dynamic scheduling embodiment based on the common configuration of FIG. 19 and instruction set described previously. The remainder of the dynamic scheduling embodiment description is for the configuration of FIG. 27a, which utilizes all the elements of the present invention:

Conditional Execution

Cc Mask Field

Set CC Field

Stale CC Handling

Multiple CCs

CC Reservation Stations

The additions and expansions to the Basic Common Configuration of FIG. 19 for the Dynamic Scheduling Embodiment of FIG. 27a are:

(1) PC FIFO 345 expanded to include the Commit FIFO 180

(2) Packet Issue Decision Logic 530.

(3) Tag Memory 535.

(4) Reservation Stations 470 at the inputs to the Functional Units.

(5) CC Reservation Stations 500 and Conditional Execution Decision Logic 580, not shown, see FIG. 27d (6) Store Data Reservation Stations 1105, not shown, see FIG. 27e (7) Result Crossbar 480 inputs to the Reservation Stations 470 from the Crossbar Input Selectors 605.

(8) Execution Decision Logic 540 between the Reservation Stations 470 and the Functional Units.

(9) Real Registers 490 and Virtual Registers 485

(10) Real CCs 595 and Virtual CCs 585.

(11) Result FIFOs 185 between the Crossbar Input Selectors 605 and the Real Registers 490 and Real CCs 595.

The dynamic scheduling embodiment described here, defines three states of instruction execution:

Issued—The instruction has been issued and is somewhere in the execution pipeline.

Completed—The virtual results are available to subsequent instructions via the virtual registers and virtual CCs.

Committed—The permanent state of the machine, memory, and committed registers and CCs has been altered with real results. The real results and virtual results of an instruction are identical, but available at different times.

The expansions to the common configuration operate as follows:

PC FIFO 345—Program Addresses are placed on the PC_FIFO 345. The entries on the PC_FIFO are used to fetch instruction packets and to correctly update the permanent state of the machine (Real Registers 490 and Real CCs 595)

Commit FIFO 180—Indicators are placed on the Commit FIFO 180 for each issued non-NOOP instruction in a packet. These indicators are used to control commitment, i.e. update of the permanent state of the machine, with results from the Result FIFO's 185.

Packet Issue Decision Logic 530—Instruction Issue can be stopped if there is no free Reservation Station 470 in a Functional Unit targeted by a non-NOOP in the packet. Complete packets are issued in their program order.

Tag Memory 535—At issue a packet is assigned a unique tag, acquires the tag given the most recently previous instruction modifying a needed resource, and has its tag recorded in the Tag Memory 535 as OWNER of any resource to be modified. Tag Memory also includes the information needed at instruction issue time to provide Sequential Coherency Memory Tagging.

Reservation Stations 470—Each Functional Unit has dedicated input Reservation Stations 470 where instructions dynamically obtain needed resources. Once a needed datum is captured in the Reservation Station 470, that source register can be freely overwritten with subsequent results.

Execution Decision 540—Execution waits until all needed source data has been obtained, i.e. the instruction is not passed forward from the Reservation Station to the Functional Unit until all needed source data has been obtained.

Execution Order—Within a Functional Unit instructions can be executed out-of-order, i.e. in an order different from the issue order. However, instructions that target the same destination register or condition code cannot be executed out-of-order. In this description, for simplicity, all instructions are executed in FIFO order within each Functional Unit. Load and Store instructions, which can execute in different LSB Functional Units, are further controlled via Main Memory Tagging (discussed later).

Condition Code Reservation Stations 500—Additional Reservation Stations are provided at the execution stages of the pipeline to obtain needed condition code information when it becomes available. The last CC Reservation Station 500 is just before the results update registers or CCs.

Conditional Execution Logic 580—Just before the results of an operation are to be written to a virtual register or CC, the CC Mask Field of tile instruction and the Condition Code from the appropriate CC Reservation Station 500 are logically combined to determine if the instruction is successful (actually writes results) or unsuccessful (does not write results).

Store Data Reservation Stations 1105—Additional Reservation Stations, not shown in FIG. 27a (see FIG. 27e) are provided at the execution stages of the LSB pipelines to obtain needed Store data when it becomes available. The last Store Reservation Station is just before the results update memory (cache).

Virtual Results—Results (data 485 and condition codes 585) that are available early, i.e. before they update the permanent state of the machine.

Result FIFO 185—Virtual results are placed, in the order of instruction issue, by each Functional Unit on its dedicated Result FIFO 185. Note that if execution within the Functional Unit were out-of-order, a reorder unit rather than a FIFO would be required.

Indicator Based High Bandpass Commit—When one or more packets, as indicated by the indicator bits on the Commit FIFO 180 and corresponding results available from the indicated Result FIFO's 185, are completed, that packet or packets can be committed to update the permanent state of the machine. Allowing multiple packets to commit can make up for incurred pipeline delays.

The PC FIFO and the Commit FIFO

The Program Counter addresses the Program Memory on packet granularity. That is, PC=1 addresses the first packet of 6 instructions, PC=2 addresses the second packet, etc.

When enabled the PC is updated from one of four sources:

(1) Interruption vector address (2) Calculated Branch address from LSB 1

(3) Calculated Branch address from LSB 2

(4) Pc+1

Generated PC-values are placed on the PC_FIFO, which is controlled by the following pointers (also associated with the COMMIT_FIFO) which are modulo-n counters:

CF_PTR, the location where the next valid PC is to be placed; incremented after an entry is placed (written).

CF_TOP, the location containing the PC associated with the next packet to be issued; incremented after use.

CF_BOT, the location containing the PC associated with the next Packet to commit; incremented after use.

NXT_GO, the location containing the next Branch (GOTO or GOLINK) to be executed or, if there is no Branch to be executed NXT_GO contains zeros.

After a Branch is executed NXT_GO is adjusted to point to the next nearest Branch between the current NXT_GO and CF_TOP-1; if there is no Branch in that range NXT_GO is set to zero until a Branch is issued. Note that NXT_GO can only point to issued packets—it is unknown whether packets that have PC_FIFO entries between CF_TOP-1 and CF_PTR are Branches.

The control of the PC_FIFO ensures that the Branch-Umbra is 3 packets.

The PC_FIFO and the COMMIT_FIFO are actually one structure where each element has two fields of the form:

(1) PC_Field, the PC-value of the associated packet (2) Commit_Flags, 9 Boolean bits Bit position 0 indicates, when true, that the packet was fetched via an interruption. Bit 0 is called an Interruption Indicator (II). The use of the II-bit is discussed in Interruptions, later.

Bit positions 1 through 6 indicate a non-NOOP or a NOOP instruction in the associated functional unit when TRUE or FALSE, respectively.

Bit 1 corresponds to LSB1
Bit 2 corresponds to LSB2
Bit 3 corresponds to ADD1
Bit 4 corresponds to ADD2
Bit 5 corresponds to MUL1
Bit 6 corresponds to MUL2

Bit positions 7 and 8 indicate a Branch or non-Branch for the LSB1 and LSB2, respectively. A TRUE indicates a Branch for that LSB and a FALSE indicates a non-Branch.

The maximum size of the Commit FIFO is fixed, within a particular implementation, and that size is known via CF_LMT.

Startup: The pointers, CF_PTR, CF_TOP, and CF_BOT, are initialized to 1. All wrap back to 1 when the incremented value exceeds the CF_LMT. The pointer NXT_GO is initialized to zero and is controlled as described above.

During the startup period the PC is simply incremented. The governing rule is:

IF (NXT_GO==0 && (CF_PTR−CF_TOP<=3)) THEN
Place the incremented PC on the PC_FIFO Thus up to 4 PC-values are available to "prime the pipe."

Subsequent Operation: During the execution of code sequences that do not have Branches, the PC_FIFO structure is as shown below:

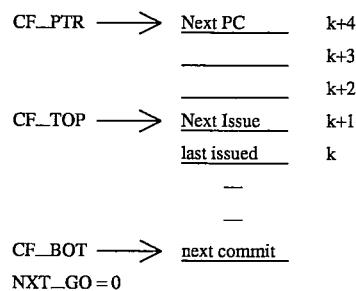

As long as NXT_GO is zero, up to 4 new incremented PC-values can be placed on the PC_FIFO in positions CF_TOP to CF_PTR. The governing rule is as stated for startup (above):

IF (NXT_GO==0 && (CF_PTR−CF_TOP<=3)) THEN
Place the incremented PC on the PC_FIFO Branching: When a packet is issued two actions associated with Branching occur:

(1) Branch indicator bits are placed in the Commit_FIFO Commit Flag field, bits 7 and 8 (0 means no Branch and 1 means Branch).

(2) If NXT_GO==0 and either LSB instruction is a Branch, then NXT_GO is set to the value of CF_TOP (before CF_TOP is incremented), thus pointing to the packet with the Branch.

As previously explained, if NXT_GO points to a previously issued Branch packet, it is updated when that Branch executes.

When NXT_GO does not equal 0, up to 3 new incremented PC-values are placed on the PC_FIFO in the positions after NXT_GO to CF_PTR. The 4th new PC following the Branch must be the resolved Branch PC; whether the Branch is successful or unsuccessful. The governing rules are IF (NXT_GO!=0 && (CF_PTR−NXT_GO<=3)) THEN
Place the incremented PC on the PC_FIFO ELSEIF (NXT_GO!=0 && (CF_PTR−NXT_GO==4)) THEN
Place the resolved Branch PC onto the PC_FIFO The resolved Branch PC will be the Branch target address if the Branch is successful or the incremented PC-value if the Branch is unsuccessful.

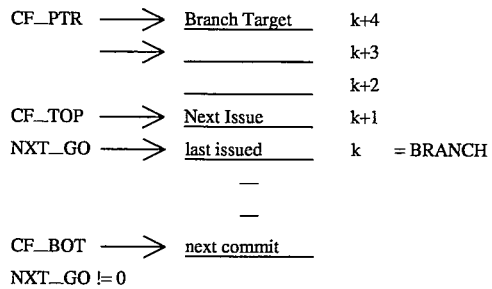

All Branches indicated by the Commit_FIFO must arrive at the LSB Functional Unit and the pipeline must indicate that forwarding will occur, before the PC can be updated. That is, if there are two branches in a packet they must both reach the point of execution before the PC can be updated. If one arrives before the other, it waits. If only one Branch is indicated by the Commit_FIFO, then the PC cannot be updated until that Branch is executed.

When the Branch(es) at NXT_GO are executed, NXT_GO is adjusted to point to the next PC_FIFO entry between NXT_GO and CF_TOP-1 that contains a Branch indicator in the Commit_FIFO field. If there is no entry in that range containing a Branch indicator, NXT_GO is set to zero.

While the PC_FIFO awaits the necessary Branches to be executed, those PC entries already on the PC_FIFO continue to feed the pipe with instruction packets.

Interruptions—Interruptions are recognized at the Commit Stage when an instruction indicates that it has detected an interruption condition or when an external interruption condition is present (see "Indicator Based High Bandpass In-order Commit—Dynamic Scheduling Embodiment"). When an interruption is recognized at the Commit Stage, the Interrupt In Progress (IIP) flag is set and an interruption Vector address and an II (Commit Flags bit 0) is pushed onto the PC_FIFO. The arrival of a complete packet, with the II-bit set (the first packet of the interruption handler), for commitment at the Commit Stage resets the IIP flag. While the IIP flag is set all packets ready to commit are discarded, i.e. the Result FIFO contents are not written to the Real Registers, Real CCs, or Main Memory (Cache), for those instructions that were in the pipeline when the interruption was recognized.

When the IIP flag becomes set, an Interruption Code is saved in Register 68 and 4 PC-values from the PC FIFO are saved, in order, in Registers 67 through 64. Register 67 contains the address of the packet that caused the interruption or the packet boundary where the interruption was recognized.

The interruption handler should Push the contents of the address register that will be used in the restore process and Registers 64 through 68, as well as the contents of other resources that the interruption handler needs to use, onto the Stack (see the Basic Common Embodiment, LOAD INDEXED INSTRUCTION description).

After restoring the interrupted machine state up to the point of having one address register being used for GOTO targets, the restore routine should execute the following sequence of instructions to reenter the interrupted program:

| LSB1 | LSB2 | | |
|---|---|---|---|
| | | POP → Rgoto | (discard the saved R68) |
| | | POP → Rgoto | (get the saved R67) |
| GOTO | Rgoto | POP → Rgoto | (goto R67 and get R66) |
| GOTO | Rgoto | POP → Rgoto | (goto R66 and get R65) |
| GOTO | Rgoto | POP → Rgoto | (goto R65 and get R64) |
| GOTO | Rgoto | POP → Rgoto | (goto R64, restore adrs reg) |

Conditionally executing instructions which are unsuccessful never indicate an interruption condition.

Commit FIFO—Dynamic Scheduling Embodiment

Positional indicators are placed on the Commit FIFO for each issued non-NOOP instruction in a packet, as described above. These indicators are used to control commitment, i.e. update of the permanent state of the machine, with results from the Functional Units' Result FIFO's. In this discussion entries are placed on the top of the FIFO and removed from the bottom of the FIFO.

The Functional Units place their results on their Result FIFO in the issue order; therefore, when all the Functional Units indicated by the entry at the bottom of the Commit FIFO have Result FIFO entries available, they constitute the complete packet needed for commit. If one or more instructions indicate an interruption, an interruption is recognized, the Interruption In Progress (IIP) Flag is set, and no instructions in the packet commit. Otherwise, the full packet commits (see "Indicator Based High Bandpass In-order Commit—Dynamic Scheduling Embodiment").

While the IIP flag is set, following the recognition of an interruption, the Commit FIFO and Result FIFOs continue to be sequenced as they normally are, but the results are not stored to the real resources.

Additionally, to enhance performance the Result FIFO's have dual outputs. The two entries at the bottom of the Commit FIFO control those outputs so that two packets can commit simultaneously. If the first packet is available for commit before the second, the first commits and a new set of two packets is considered. When two packets are committed together and instructions within both packets modify the same register, the second packet modification takes priority, i.e. its result is the one written to the Real Registers/CC.

Issue Logic—Dynamic Scheduling Embodiment

Complete packets are issued in their program order when

The addressed packet is available from the program memory.

All non-NOOP instructions have a free Reservation Station in their target Functional Unit.

The Commit FIFO is not full.

Any of these inhibitors will cause the issue logic to do nothing during the current cycle.

In FIG. 27b, NOOP instructions in the packet are discarded, i.e. they are not issued to the Functional Units. During the issue cycle the instruction is expanded and the contents of the needed source Registers and CC are unconditionally selected, via the Register Crossbar, and passed to the Reservation Stations of the target Functional Unit. The CC Owner Tag Selector 545 chooses the Tag Memory location associated with the CC Select field of the instruction. The Register Owner Tag Selectors 550 choose the Tag Memory locations associated with the $R_a$ and $R_b$ fields of the instruction.

The CC Select field of the instruction also directs the CC Select Multiplexer to choose the appropriate CC input to the Register Crossbar 460. The $R_a$ and $R_b$ fields select the A and B sources via the Register Crossbar 460.

The actual Reservation Station receiving the information is dynamically determined as described below (see "Reservation Stations—Dynamic Scheduling Embodiment"). Note that during the issue cycle, if the source is a constant, if the source is unused, or if the selected resource has a tag that matches the Owner Tag obtained from the Tag Memory, the source valid bit (CV, AV, or BV) is set in the expanded instruction. The Compare logic 565 shown in FIG. 27b does not exist as a single unit. Since the instruction can be assigned to any Reservation Station, each Reservation Station has Compare Logic at the input to the various Valid bits shown in FIG. 27c.

Tagging Registers and CCs—Dynamic Scheduling Embodiment

The Tag Memory 535 is used to ensure that each instruction obtains the logically latest valid copy of the source data and condition code it requires. At issue a packet is assigned a unique tag from the Tag Generator 560, instructions acquire the tag given the most recently previous instruction modifying a needed resource, and the packet's tag is recorded in the tag memory as OWNER of any resource to be modified by any instruction in the packet.

The sources needed by each instruction are selected and when that source has a tag matching the OWNER-tag obtained at issue time, the instruction captures that source data or CC, as described in the Reservation Station description below. When the instruction completes execution, the tag obtained at issue is written to the tag-field of the destination virtual resource. Tags are not carried forward beyond the inputs to the Result FIFOs—the tags associated with the Real Resources are implicitly all zeros.

When conditional execution causes a result to not be written to a destination, the tag of the unsuccessful instruction is written to the tag field of that Virtual Register or Virtual CC, to ensure that subsequent instructions get the correct data, in this case the unmodified contents of the Virtual Register or Virtual CC. Additionally, if the instruction specifies SET and the instruction is unsuccessful the Latest bit in the Virtual Condition Code is cleared, but the other bits in the condition code are not changed.

The Tag Generator 560 generates tags via a 6-bit binary counter, which is initialized to and wraps to the value $01_{16}$. Each packet is assigned the current tag value before the counter is incremented. When the counter increments, if any tag memory location contains a value equal to the new counter value, that tag memory location is cleared to all zeros. This condition occurs when the register or CC has not been updated within 62 (64 minus the all zeros count and the incremented counter value) packets and the counter wraps. If unaccounted for in the design, this condition could lead to a subsequent instruction obtaining an old and incorrect copy of the resource.

To account for this condition and to simplify interruption handling each Tag Memory location has an additional bit— the Copy Select (CS) bit, which controls the source to the Register Crossbar— Real when CS is cleared (zero) and Virtual when CS is set (one). The tag memory is initialized to all zeros, indicating that the Real Registers and CCs are OWNERs. Real Registers and Real CCs do not have tag storage associated with them—when they are sourced they always provide an all zeros tag.

When all zeros are written into a tag memory location, the Real Register or CC is selected as input to the Register Crossbar. When instruction completion writes to the associated Virtual Register or Virtual CC and the associated Tag Memory location is non-zero, the associated CS bit is set, causing the Virtual Resource to be selected as source to the Register Crossbar.

Note that the tag generator counter must be sufficiently large to accommodate the largest number of cycles an instruction can take from issue to commit, or on wrap-around the Real resource will be selected before the correct copy has been written.

During an interruption, all tag memory locations (except those associated with Main Memory, see Main Memory Tagging—Dynamic Scheduling Embodiment) are cleared to all zeros, automatically selecting the Real Resources as sources. Since the Virtual Results in the pipeline are flushed during an interruption, the use of the Real Resources is exactly what we want to occur. Residual instructions in the pipeline may write the virtual resource, but those results are not selected by any instruction issued after the interruption is recognized, i.e. in each of the following cases Interruption Handler Instructions (IHIs) produce the correct results:

An IHI, that sources a resource, issued before an IHI that modifies that resource gets the real copy because the all zeros entry in tag memory prevents any setting of CS.

IHIs that source a resource, issued after an IHI that is to modify that resource, wait for the Owner to write the resource as known by the tag match.

After a result and its tag are written to a Virtual Register or CC, that result and tag are available via the Register Crossbar to be captured by instructions as they are issued. When the needed results are not in the register or CC when an instruction is issued, the Result Crossbar provides results dynamically to the Reservation Stations as they are written. Each result and tag written to a Virtual Register or CC is available via the Result Crossbar for one, and only one, cycle following its being written. This ensures that no result will be missed and that no stale tag values will ever be incorrectly used.

Reservation Stations—Dynamic Scheduling Embodiment

Each Functional Unit has dedicated input Reservation Stations where instructions dynamically obtain needed resources. Once a needed datum is captured in the Reservation Station, that source register can be freely overwritten. Execution waits until all needed source data has been obtained.

The logical structure of a set of three Reservation Stations for the ADD and MUL Functional Units is shown in FIG. 27c. The Reservation Stations for the LSB units operate in a similar fashion, but are wider, e.g. to include Store data. During the issue cycle the sources ($R_a$, $R_b$, and CC SEL) specified by the instruction are selected, as described previously, and loaded into a Reservation Station.

The Reservation Station is dynamically selected by the state of the RS Control logic at each Reservation Station. This logic evaluates the state of subsequent pipeline stages, subsequent Reservation Stations, of its Reservation Station, of the previous Reservation Station, and of the issue logic to determine what action to take.

The Reservation Stations are treated, in this embodiment, as a FIFO. RS0 always provides the inputs to the Functional Unit. Although the embodiment shows FIFO ordering, those skilled in the art will understand that execution out-of-order can easily be accomplished as long as (1) instructions that modify the same resource remain in order and (2) results are properly reordered in the equivalent of the Result FIFO. Additionally, those skilled in the art will recognize that the number of Reservation Stations can be easily expanded.

In FIG. 27c the RS Source Selectors 570 choose the inputs to most of the Reservation Station fields. If the V-bit in the previous stage is true this selector passes the previous Reservation Station contents, otherwise the input from the Issue logic is passed. The V-bit in the non-existent Station previous to RS2 is considered to be zero; therefore, no selector is needed for input to RS2. The V-bit indicates the presence of valid data in the Station. The change from V-bit on in Station n to V-bit off in Station n+1 indicates the top of the FIFO.

Each stage in the pipeline, including the Reservation Stations, must determine if the pipeline will move forward on the next clock. When the pipeline is more than a few stages, this evaluation cannot be done as a ripple through each stage, but must be done in parallel. The approach used here is to use the well known technique of Carry Lookahead. This technique is used in adders to allow the carry-in to a section of the adder to be generated in fewer logic levels than are needed for a ripple carry. When applied to the pipeline, each stage (or Station) generates two signals:

Generate—indicates, when a logic one, that the stage can unconditionally accept a new instruction Propagate—indicates, when a logic one, that the stage will be available to accept a new instruction if it can propagate its current instruction to the next stage.

These signals are used by upstream pipeline stages to determine if their portion of the pipeline will move forward. The resulting signal, called "Forward," is equivalent to the Carry-In of adders.

Loading Reservation Stations—A Reservation Station (all fields except the Source and Source Valid fields as described below) is loaded with the selected input and the V-bit is set when (1) the previous Station has its V-bit set and Forward is true (2) OR the previous Station does not have its V-bit set AND this Station has its V-bit set AND an instruction is being Issued AND Forward is true (3) OR this Station does not have its V-bit set AND the next Station has its V-bit set AND an instruction is being Issued AND Forward is false These conditions represent (1) an instruction being loaded from the previous Station, (2) an instruction being loaded from issue to the top of the FIFO when the pipeline is moving forward, and (3) an instruction being loaded to the next top of the FIFO from issue when the pipeline is not moving forward, respectively.

Resetting the V-bit—The V-bit of the Reservation Stations is reset (cleared to zero) when the previous Station does not have its V-bit set AND no instruction is being Issued AND Forward is true OR during the initial clear operation.

Thus the V-bit is cleared when the Station's contents are gone and there is no valid instruction available.

Source Selects—In FIG. 27c SRC C, SRC A, and SRC B have RS Source Field Selectors 575 that choose either data from the general selector (described above), from the Last Write Selector specified by the CC SEL, RA, or RB fields in the Station, or from the Last Write Selector specified by the CC SEL, RA, or RB fields in the previous Station. The individual SRC C, SRC A, and SRC B fields have valid bits, CV, AV, and BV, respectively. The following rules are stated for the A-source; the B-source and CC-source rules are identical:

If the following is true, choose the general selector input, load SRC A, and set the AV-bit if the selected input has the AV-bit equal one. Reset the AV-bit if the selected input has the AV-bit equal zero.

(1) Forward is true AND the previous Station has its V-bit set AND its AV-bit set (2) OR the previous Station does not have its V-bit set AND this Station has its V-bit set AND an instruction is being Issued AND Forward is true (3) OR this Station does not have its V-bit set AND the next Station has its V-bit set AND an instruction is being Issued AND Forward is false If conditions 1, 2, or 3 above are not true (4) Choose and load the Result input selected by the RA field in the previous Station if Forward is true AND the previous Station's AV-bit is zero and its V-bit is set. If the selected Result has a tag equal RA_OWN in the previous Station, set the AV-bit in this Station.

(5) Choose and load the Result input selected by the RA field in this Station if Forward is false AND this Station's AV-bit is zero and its V-bit is set. If the selected Result has a tag equal RA_OWN in this Station, set the AV-bit in this Station.

Conditions 1, 2, and 3 are the same as the general selection of inputs described previously, except condition 1 has the added requirement that the AV-bit be set, i.e. the previous Station has already captured the needed resource. Condition 4 represents capturing a needed Result using the previous Station's controls to load a Station as the FIFO is forwarded. Condition 5 represents capturing a needed Result when the FIFO is not forwarding.

All valid bits, including the CV, AV, and BV-bits are cleared as part of any general reset operation.

Execution Decision—Dynamic Scheduling Embodiment

RS0, the input to the Functional Unit, provides SRC A as the A-operand and SRC B as the B operand directly to the Functional Unit. Execution of the function (OP CODE) is only permitted when the AV-bit, the BV-bit, and the V-bit are all ones and when the pipeline can be forwarded, as shown in FIG. 27d.

CC Reservation Stations—Dynamic Scheduling Embodiment

Additional Reservation Stations are provided at the execution stages of the pipeline to obtain needed condition code information when it becomes available. The last CC Reservation Station is just before the results update registers.

In FIG. 27d, the Functional Unit has a single pipeline stage for execution. For Functional Units with multiple pipeline execution stages, the CC Reservation Stations must be replicated for each of those stages. The Conditional Execution Decision Input Selector 580 inhibits the Propagate signal when the needed input CC is unavailable. Additionally, when it becomes available, the Conditional Execution Decision 160 uses it and the CC MASK to determine if the result of the operation should be written to the Virtual Registers 485 and/or Virtual CCs 585 as specified in the instruction via $R_d$, the WRT-bit, and the SET-bit. Note that when conditional execution is unsuccessful the tag associated with the virtual resource is written but the Virtual Register 485 or CC 585 contents are not changed, with the exception of the Virtual CCs Latest-bit, which is cleared.

The Copy Selectors 695 provide the inputs to the Register Crossbar that selects registers during the issue cycle. The Copy Selectors 695 choose between the Virtual Registers 485 and the Real Registers 490 and between the Virtual CCs 585 and the Real CCs 595 based on the Copy Select bit in the associated Tag Memory location.

The virtual resources specified by $R_d$ and selected by the Last Write Selectors 755 are the sources for Results into the Result Crossbar (inputs to the Reservation Stations) and the sources for writing to the Result FIFO 185. In FIG. 27d, pipeline stages downstream of RS0 require fewer fields to be carried forward as shown. By the time an instruction reaches the Result FIFO 185 only the SET, WRT, and RD-fields are needed from the original instruction, with the addition of the Result Data, the Result CC, and the Interruption Condition (IC) bit. A non-zero IC indicates that the instruction has produced the interruption condition.

When an entry is written to the Result FIFO, the FIFO top pointer is incremented. The commit logic determines if Result FIFO Bottom and Next are valid by subtracting the Bottom pointer value from the Top pointer value, modulo-n arithmetic.

Store Data Reservation Stations—Dynamic Scheduling Embodiment

Additional Reservation Stations are provided at the execution stages of the LSB pipelines to obtain needed Store data when it becomes available. The Store Reservation Stations 1105 are shown in FIG. 27e, which is described in the next section. The last Store Reservation Station 1105 is just before the results enter the Store Data FIFO 1100 to be written to cache 525. These Store Data Reservation Stations function in a manner similar to the Reservation Stations described above, i.e. the correct data is obtained from the Registers specified by $R_d$ and the Op Code field by matching the associated tags. The use of the data from the Store Reservation Stations is described in the following section.

Main Memory Tagging—Dynamic Scheduling

Sequential Coherency Memory Tagging (U.S. patent Ser. No. SNTBD1, COMPUTER Processor with Improved Storage, filed DATETBD1) is used in the Dynamic Scheduling Embodiment to coordinate accesses to main memory via the Data Cache. Main memory is considered to be two resources, a Load resource and a Store resource. Memory reference instructions adhere to the following rules to ensure sequential coherency, i.e. to ensure that the results of parallel and out-of-order execution are the same as they would have been if the program were executed sequentially:

Loads must wait for previous Stores, but Loads can be executed out-of-order relative to other Loads in the other functional unit.

Stores must wait for previous Loads and previous Stores.

FIG. 27e is composed of 7 major sections:

(1) Tag Generator 560, Issue for LSB1 1150, and Issue for LSB2 1155

(2) Tag Memory 535 with three locations associated with Main Memory—Load Owner 1 1060, Load Owner 2 1070, and Store Owner 1065

(3) Reservation Stations 470, Store Data Reservation Stations 1105, LSB1 Instruction FIFO 1110, and LSB2 Instruction FIFO 1115

(4) Execute Stage 1 1075 including the Address Adders 405 and the Virtual Address Registers 350

(5) Execute Stage 2 1080 including Cache Memory 525, Cache Line Registers 420, Stage 2 Forward Pipe Controls 1090, Load 1 Tag 1120, Store Tag 1125, and Load 2 Tag 1130

(6) Execute Stage 3 1085 including Check and Align 475 and Stage 3 Forward Pipe Controls 1095

(7) Store FIFO 1100

FIG. 27e, in operation, enforces the rules listed above by three Tag Memory locations associated with the Main Memory:

Store Owner 1065—When a Store is issued its tag is recorded as Store Owner in the tag memory.

Load Owner 1 1060—When a Load is issued to LSB1 its tag is recorded as Load Owner 1 in the tag memory.

Load Owner 2 1070—When a Load is issued to LSB2 its tag is recorded as Load Owner 2 in the tag memory.

When issuing a Load instruction, the Issue Logic 1150 and 1155 acquires the previous Store Owner tag 1065 from Tag Memory 535 and, when issuing a Store instruction, acquires both previous Load Owner tags 1060 and 1070 from Tag Memory 535 and inserts them into the expanded instruction that is forwarded to a LSB Reservation Station. When a Load or Store reaches the Virtual Address Register 350 in Execute Stage 1 1075, that previous Load Owner tags or Store Owner tag must have been written to the corresponding Load Tags 1120 and 1130 or the Store Tag 1125, respectively, in Execute Stage 2 1080 (as monitored via the Result Crossbar). If no tag match has occurred, the Stage 2 Forward Pipe Control 1090 prevents the pipeline from forwarding and the instruction waits in the pipeline registers at the input to Execute Stage 2 until the proper tags appear via the Result Crossbar.

The tag compares that occur in the Reservation Stations 470 are not shown in FIG. 27e. The Load Tags 1120 and 1130 and the Store Tag 1125 are accessed via the Register Crossbar during the issue cycle and compared to the acquired Owner Tags. While in the Reservation Stations 470 instructions, which have not yet successfully found the needed tag, continue to monitor those tags via the Result Crossbar. Like other tags, the Load Tags 1120 and 1130 and the Store Tag 1125 are available via the Result Crossbar for only one cycle to eliminate the possibility of obtaining a stale tag value.

In parallel with the tag compares, the instruction accesses the Data Cache Memory 525 using the virtual address. If the Busy-flag is set in the addressed cache line, the Stage 2 Forward Pipe Control 1090 prevents the pipeline from forwarding and the instruction waits until the Busy-flag is reset. While the instruction waits, it repeatedly (every clock cycle) looks for needed tag compares and for the Busy-bit to be zero. Thus, to proceed further and complete the cache access, all tags must have matched and the Busy-flag for the accessed cache lines must be zero. As described previously in the basic common embodiment, the Store operation involves reading the cache to ensure that the needed line is present and then later storing the results of the Store in that line. During the read portion of the Store, the Busy Flag is set in the addressed cache line in all 4 sets, to ensure sequential coherency, i.e. to ensure that a subsequent Load does not read stale data and to ensure that a subsequent Store does not write out-of-order. When the Store completes, the Busy Flag is cleared.

On access, if all tags have compared and if the Busy-flag is a zero, the access proceeds and the appropriate Load Tag 1120 and 1130 or Store Tag 1125 is written with the instruction's unique tag, thus recording that it has accessed the cache and the subsequent instructions that are waiting on those tags may proceed.

When a Store completes Execute Stage 2, the Busy-bit is set for the accessed lines and subsequent accesses to those lines will stall until the Store clears the Busy-bits. Thus, in this embodiment, tagging provides coordination up to the point of cache access. Subsequently, coordination is on the fine-grain basis of a cache address—the rules of sequential coherency are enforced within the parallel execution environment.

Following the successful access of the lines of cache data to the Cache Line Register 420, i.e. the needed tag matching occurred and the line was not marked as Busy (a Store immediately marks the line as Busy), the Check and Align 475 compares the virtual and real addresses as described in the Data Cache discussion of the Basic Common Embodiment. A cache hit for a Load instruction proceeds as previously described.

A Cache Miss on either a Load or a Store causes the Stage 3 Forward Pipe Control 1095 to inhibit pipeline forwarding until the needed data is fetched from main memory. Note that this data line is provided directly to the Check and Align 475 from main memory and is also written to the appropriate cache location.

For a Store instruction the needed Store Data must also be available from the Store Data Reservation Stations 1105 or the Stage 3 Forward Control will inhibit forwarding the pipeline until that needed Store Data is available. When available, the Store Data is aligned and merged with the correct cache line via the Check and Align 475 and written to the Store FIFO 1100 along with a bit indicating the state of the conditional execution decision. At the point of committing the entire packet that contained the Store, the Busy-flag is cleared in the addressed cache line and, if the conditional execution decision indicated success, the data is written to the cache from the Store FIFO 1100. Note that when the IIP (Interruption In Progress) is set Store entries on the Store FIFO must clear the Busy-bit (see "Indicator Based High Bandpass In-order Commit—Dynamic Scheduling Embodiment"), even though they do not alter the data.

As with other Tag Memory locations, each Tag Memory location has an additional bit—the Copy Select (CS) bit. When CS is a zero an all zeros tag is selected for comparison. The tag memory is initialized to all zeros, indicating that the first instructions issued after initialization will always be successful in their tag compare.

When an instruction is issued and causes the Load Owner 1 1060, Load Owner 2 1070, or Store Owner 1065 to be updated, the CS bit (in the associated Tag Memory location) is not affected. Subsequent instructions are supplied that tag from Tag Memory for comparison. While CS is zero, those instructions receive a zero tag via the Result Crossbar until CS is set to one; therefore, until that occurs those instructions will wait. When an instruction actually updates the L1 Tag 1120, the L2 Tag 1130, or the Store Tag 1125 the CS bit is set, allowing issued instructions to obtain the associated tag value.

Each packet is assigned the current tag value from the Tag Generator before it is incremented. When the counter increments, if any tag memory location (including Main Memory tags) contains a value equal to the new counter value, that tag memory location is cleared to all zeros. This condition occurs when the register, CC, Load Owner, or Store Owner tags has not been updated within 62 packets and the counter wraps.

During an interruption, all tag memory locations, except those associated with Main Memory, are cleared to all zeros. While the interruption is in progress Loads and Stores continue to be sequenced in their proper order, the results are not committed, and Stores clear the associated cache line Busy-flags.

Note that the tag generator counter must be sufficiently large to accommodate the largest number of cycles a Load or Store instruction can take from issue to cache access, or on wrap-around dependent Loads and Stores may violate the rules of sequential coherency.

The Result Crossbar provides results dynamically to the Reservation Stations as they are written. Each update written to the Store Tag 1125 or to a Load Tag 1120 or 1130 is available via the Result Crossbar for one, and only one, cycle following its being written. This ensures that no stale tag values will ever be incorrectly used.

Execution Order—Scheduling Embodiment

The Functional Units of the embodiment described here execute instructions in their issue order, i.e. first-in-first-out, to simplify the description. Those skilled in the art will recognize that within a Functional Unit instructions can be executed out-of-order. i.e. in an order different from the issue order, as source operands become available to instructions waiting in Reservation Stations. However, results must be reordered in the equivalent of the Result FIFO and instructions that target main memory, the same destination register, or the same destination condition code cannot be executed out-of-order.

Virtual Results—Dynamic Scheduling Embodiment

Results (data and condition codes) that are available early. i.e. before they update the permanent state of the machine, are termed "virtual." These virtual results are available via the Results Crossbar from the Virtual Registers 485 and Virtual CCs 585 shown in FIG. 27*d*.

Needed source data or condition codes are captured by the appropriate Reservation Station as early as possible. This allows subsequent instructions to overwrite those registers or condition codes without concern that previous instructions will fail to obtain their correct copy of the data or condition code. That is, an instruction being executed never has to stop and wait for a logically previous instruction to use the contents. As long as instructions are placed in their natural program order, the compiler is guaranteed by this Dynamic Scheduling mechanism that the results will be logically correct.

Result FIFO—Dynamic Scheduling Embodiment

Virtual results are placed, in the order in which instructions were issued, by each Functional Unit on its dedicated Result FIFO 185, as shown in FIG. 27*d*. The control of the pointers used to access the Result FIFO and the use of the information in the Result FIFO are described below.

Indicator Based High Bandpass In-order
Commit—Dynamic Scheduling Embodiment

When the Result FIFO's 185 for all Functional Units indicated by bits on the Commit FIFO 180 have valid results, that packet or packets can be committed to update the permanent state of the machine, as shown in FIG. 27*f*. The Result FIFO has valid results at Bottom when the Result FIFO Top 225 and the Result FIFO Bottom 230 pointers indicate that there is at least one entry and has valid results at Result FIFO Next 235 when the pointers indicate that there are at least two entries. The Packet Commit Decision 590 logic determines one of 5 states:

(1) All CF_BOT 215 Commit Flags are zero. This is the case where an all-zero Commit FIFO entry overrides the simultaneous commit logic by forcing a full commit cycle (with nothing really committed) for that single Commit FIFO entry, because the all zeros Commit Flags entry was created when an all NOOPs packet was issued.

(2) All CF_BOT Commit Flags do not have a corresponding valid Result FIFO Bottom entry.

(3) All CF_BOT Commit Flags have a corresponding valid Result FIFO Bottom entry and one or more of those Result FIFO Bottom entries have IC set.

(4) All CF_BOT Commit Flags have a corresponding valid Result FIFO Bottom entry, none of those Result FIFO's have IC set, and all CF_NXT Commit Flags do not have a corresponding valid Result FIFO Next entry.

(5) All CF_BOT Commit Flags have a corresponding valid Result FIFO Bottom entry, none of those Result FIFO's have IC set, all Next Commit Flags have a corresponding valid Result FIFO Next entry, and one or more of those Result FIFO Next entries have IC set.

(6) All CF_BOT Commit Flags have a corresponding valid Result FIFO Bottom entry, none of those Result FIFO's have IC set, all Next Commit Flags have a corresponding valid Result FIFO Next entry, and none of those Result FIFO Next entries have IC set.

These states result in the following actions:

| State | Commit | Interrupt | Generate |
|---|---|---|---|
| 1 | None | No | 1 |
| 2 | None | No | 0 |
| 3 | None | Yes | 1 |
| 4 | 1 Pkt | No | 1 |
| 5 | 1 Pkt | Yes | 1 |
| 6 | 2 Pkt | No | 1 |

For example, state 5 indicates that the second packet is to produce an interruption. The first packet is committed, an interruption condition is generated, and the pipeline is allowed to forward. When an interruption is recognized in this manner at the Commit Stage, the Interrupt In Progress (IIP) flag is set and an interruption Vector address and an II (Commit Flags bit 0) is pushed onto the PC_FIFO. The arrival of a complete packet, with the II-bit set, i.e. the first packet of the interruption handler, for commitment at the Commit Stage resets the IIP flag. While the IIP flag is set all packets ready to commit are discarded, i.e. the Result FIFO contents are not written to the Real Registers and the Real CCs; additionally, Store data is not written to the cache, but the cache line Busy-flag is cleared.

Condition Code Management Instructions

The two CC Management instructions described in the Basic Common Embodiment require correct implementation to operate properly in the Dynamic Scheduling Embodiment.

The STORE CC instruction must select the outputs of the Copy Selectors as the inputs to the merge function, which merges all 8 CCs into a particular register. The RESTORE CC instruction must become Owner (in Tag Memory) of all 8 CCs and at completion must write the scattered register contents to the virtual CCs and to $R_d$ (the instruction must include an appropriate $R_d$ register number). At commit the contents of $R_d$ must be scattered to all 8 Real CCs.

The details of the Tagging logic, the Result FIFO, and the Commit logic for the special CC Management instructions is not included here.

VECTOR INSTRUCTION EMBODIMENT

An embodiment of the present invention with Vector instructions that support a powerful set of vector chaining operations is described here. In this type of architecture the present invention provides significant benefits, as will become apparent in the example illustrating the benefits relative to the prior art.

Vector mode can improve the efficiency of a processor for repetitive code sequences by performing the loop count decrementation and looping branch without needing specific instructions, thus permitting operation at maximum speed with less compiler optimization, and decreasing the needed code space.

The vector embodiment of the present invention, shown in FIG. 28, is an extension of the dynamic scheduling embodiment of FIG. 27a, previously described. The Vector Embodiment of FIG. 28 utilizes all the elements of the present invention:

Conditional Execution
CC Mask Field
Set CC Field
Stale CC Handling
Multiple CCs
CC Reservation Stations In addition to the functionality of the dynamic scheduling embodiment, the vector embodiment uses three address registers in the first LOAD/STORE/BRANCH unit (LSB1) to control the vector loops:

R48 Register 48 contains an integer count, LOOP_CNT, that is used to determine the number of times the loop is executed. R48 is decremented under program control, as described below. R48 has an associated condition code (CC48), added to assist vector mode operations as discussed below.

R49 Register 49 contains an address, LOOP_END, that is used to determine when to effect a branch back to the top or beginning of the loop. The value in LOOP_END is compared to the current PC-value as part of the PC update process.

R50 Register 50 contains an address, LOOP_BGN, that replaces the PC to effect a Branch back to the top of the loop.

These registers, after being initialized by the program as part of setup for the vector loop, are managed without specific instructions to perform the looping branch. Additionally, the decrementing of the count is controlled via a normally unused bit in the LSB instructions; thus, allowing all six instructions in every packet to be directed at the operations inside the loop, rather than needing subtract instructions to decrement the count and branch instructions to perform the loop branching. The decrement of R48 and setting the associated CC48 is controlled by the program within the loop via the DEC/SET bit in the first LOAD/STORE/BRANCH unit. This bit can appear in any normal LSB1 instruction within the limitations cited below.

The LOAD/STORE/BRANCH unit instructions do not use the WRT-bit in the RRR and RKR formats; therefore, that bit is redefined in this embodiment for LSB1 to be the DEC/SET bit. LOOP_CNT (R48) is decremented and condition code CC48 is updated when DEC/SET is specified for LSB1. The following rules apply:

(1) Normally, one and only one packet within the loop should specify DEC/SET.

(2) The instruction specifying DEC/SET must be a valid LSB1 RRR or RKR format instruction with the DEC/SET bit equal one. The instruction can be made the equivalent of a NOOP by zeroing the MASK field thus limiting its action to the DEC/SET function. Otherwise it may be any LSB RRR or RKR format instruction, except as listed below.

(3) An instruction with the DEC/SET bit equal one indicates to the issue hardware that the instruction should become OWNER of R48 and CC48. It also indicates that the instruction should decrement R48 and set CC48 based on the result. This mechanism allows any subsequent instruction to properly use R48 or CC48 as a source.

(4) The instruction that specifies DEC/SET cannot be a

LOAD ADDRESS or a LOAD CONSTANT instruction because of conflicts with the POS field in the RKD format. Additionally, DEC/SET cannot be specified in a LOAD ADDRESS REGISTER instruction and the LOAD, LOAD INDEXED, STORE, and STORE INDEXED instructions cannot specify $IR_a$, because updating the Address Registers from two sources in one instruction would require additional paths.

When in vector mode the normally incremented PC-value is replaced with the value in LOOP_BGN when the current PC-value equals LOOP_END and the LOOP_CNT is greater than zero. This action occurs under hardware control in LSB1 at the point of placing the PC onto the PC_FIFO; therefore, there is no "branch umbra," i.e. instruction addresses greater than the LOOP_END address are not placed on the PC_FIFO when vector looping occurs. When the current-PC-value becomes greater than LOOP_END, vector mode is exited. Loops as short as one packet can be constructed. For a one packet loop both LOOP_END and LOOP_BGN are initialized to the same address, causing every PC-value placed on the PC_FIFO to be the same, until vector mode is exited when LOOP_CNT becomes less than or equal to zero.

Vector mode is entered via special forms of the branch instruction, the LOOP instruction and the LOOP AND LINK instruction, executed in the first LOAD/STORE/BRANCH unit:

The RKA format LOOP instruction, LOOP, calculates a branch address by adding the contents of $R_a$ to the 12-bit K-field (sign extended). The vector mode flag is set (indicating that the compare and replace operations described in the previous paragraph are enabled) and the calculated branch address is placed on the PC_FIFO, if enabled by the conditional execution decision. The LOOP instruction's action is delayed by three cycles, i.e. the Branch umbra is 3 packets long. The LOOP instruction can only be executed by the first LOAD/STORE/BRANCH unit.

The RRR or RKR format LOOP AND LINK instruction, LAND, calculates a branch address by adding the contents of $R_a$ and $R_b$, or the contents of $R_a$ and the 6-bit K-field (sign extended). The vector mode flag is set, the current program counter address is saved in register $R_d$, and the calculated branch address is placed on the PC_FIFO, if enabled by the conditional execution decision.

The LAND instruction's action is delayed for three cycles, i.e. the Branch umbra is 3 packets long. Code returning from a call entered via a LAND should use a GOTO $R_a$,4 instruction, where $R_a$ is the link register. Adding 4 to the link register is necessary to skip the instructions executed in the LOOP AND LINK umbra, i.e. instructions already executed. The LAND instruction can only be executed by the first LOAD/STORE/BRANCH unit.

The LOOP or LAND instruction will normally, but not necessarily, point to the first packet of the vector mode loop. The target of the LOOP or LAND instruction determines only the first pass starting point; subsequent iterations use LOOP_BGN which can point elsewhere. The iterated loop consists of those packets beginning at LOOP_BGN through LOOP_END. Previous instructions, e.g. those in the LOOP or LAND branch umbra, and those from the branch target to LOOP_BGN, can be used for setup or other non-iterative operations.

If the vector loop is not a subroutine and there are no non-iterative operations to be performed, the vector mode loop can be placed immediately following the LOOP instruction (part of the loop is in the umbra). In this case, LOOP_BGN would point to the packet immediately following the packet containing the LOOP instruction, and the LOOP would target LOOP_BGN≠to account for execution within the umbra on the first pass. Other similar variations are possible.

Interruptions during vector mode can occur at any packet boundary. The interruption handler can use the flexibility of the LOOP instruction to properly restart the vector operation at the necessary packet.

The vector mode flag, which is associated with the PC, is cleared when the PC-value is greater than LOOP_END. This permits exits from the loop when LOOP_CNT reaches zero (falling through) or when an explicit branch instruction within the loop causes an exit. Note that backward branching or branching inside the loop does not clear vector mode. This facilitates nested loops and complex loops.

All loops must recognize that LOOP_CNT and the associated CC are updated when the instruction specifying DEC/SET is executed, while PC replacement occurs at the input to the PC_FIFO. These events are 3 packets apart in time. When the loop consists of four or more packets, the effect of this difference is as follows:

(1) When DEC/SET is in a packet before the last three packets in the loop, a LOOP_CNT of n results in n iterations.

(2) When DEC/SET is in one of the last three packets in the loop, a LOOP_CNT of n results in n+1 iterations.

Thus, based on the placement of the DEC/SET in LSB1, the starting LOOP_CNT value may have to be adjusted by −1 to achieve the desired loop iterations.

Loops consisting of less than 4 packets are affected as follows:

Three-packet loops must always pre-adjust LOOP_CNT by −1 to achieve the desired loop iterations. The DEC/SET may appear in any of the three packets.

Two-packet loops must pre-adjust LOOP_CNT by either −1 or −2, based on the placement of the DEC/SET within the packets:

| DEC/SET PLACEMENT | LOOP_CNT | ITERATIONS |
| --- | --- | --- |
| Either packet | 0 | 1 |
| First packet | 1 | 2 |
| Second packet | 1 | 3 |
| First packet | 2 | 3 |
| Second packet | 2 | 4 |
| First packet | N | N+1 |
| Second packet | N | N+2 |

One-packet loops must pre-adjust LOOP_CNT by −3 to account for the fact that the packet's address will be in 3 sequential PC_FIFO locations when the packet executes the first time. FIG. 29 shows the pipeline timing for a one-packet loop that stores a constant to 6 sequential memory locations. Because a loop count of zero always yields a single pass of the loop, one-packet loops with loop counts less than 4 should be unrolled and executed in scalar mode.

Since all instructions and facilities operate identically in scalar and vector modes, with the simple extension and restrictions described above, very tight and fast programs that mix vector mode with scalar mode are easily constructed. Additionally, because vector mode uses the dynamic scheduling and conditional execution and can take advantage of the low latency feedback, code that the prior art could not vectorize is now easily vectorized. This will become even more evident from the example of intensely data dependent code, that follows.

Those skilled in the art will understand that the particular register assignments, the method of controlling vector mode, and the operation of vector mode presented in this embodiment do not limit this invention. Any vector mode architecture that improves data latency by placing registers directly at the output of functional units;

that reduces the size of the interconnect through data folding;

that uses reservation station scheduling;

that uses a condition code, condition codes, status, predicates, or the equivalent to control the conditional completion of instructions;

that reorders instructions executed out-of-order across multiple functional units using indicators;

that provides higher bandpass at the point of commit than at the point of issue; or that ensures sequential coherency of memory operations that can execute out of order via tagging is within the scope of the present invention.

The vector mode techniques described here for a dynamically scheduled machine that depend on hardware dependency resolution are also directly applicable to the software dependency embodiment previously described. That is, an embodiment of the present invention that uses static scheduling and has a vector mode is obtained by simply applying the above described mechanisms to the static scheduling embodiment of FIG. 23c.

Vector Advantages and Benefits—Intense Data Dependency Example

The advantages, benefits, and operation of the present invention are shown here through LFK24, an example of intense data dependency code from the Livermore FORTRAN Kernels (LFK's.)

LFK 24, Find Location of First Minimum In Array, is not vectorized by the compiler for any known vector processor, because recursive data and control dependencies cannot be handled by the hardware of those machines. Of all the 24 LFK's this kernel produces the lowest MegaFLOPS rating for vector machines, including all Cray models, CDC 7600, and the NEC SX-2. Thus this loop along with a few others determines the harmonic mean of the 24 loops, i.e. the overall performance across all 24 Kernels is the harmonic mean of them and that harmonic mean is dominated by a few Kernels, one of which is LFK 24.

The FORTRAN source code for LFK 24 is shown below. The kernel begins by setting the X-array location halfway through the array to a very large negative value. On entry to the inner loop, where the kernel spends the majority of its time, m is set to 1, so that the initial X(m) fetched will be X(1). With k starting at 2 the initial X(k) reference is X(2). As long as X(k) is not less than X(m), k is incremented and each X(k) is compared to the X(m) value. When an X(k) is found that is less than X(m), the X(m) comparison value is replaced by that X(k) value (the data) and the k-value (the index) is copied into the variable m. The only important variables when the loop completes are L, k, and m, where L=Loop (50), k=n which is the last array index (1001), and m is the first minimum index (500). The benchmark data is organized so that every other array element is a new minimum until it reaches the −10,000,000,000 value at element 500. On entry to LFK 24, Loop and n are 50 and 1001, respectively.

LFK 24—FIND LOCATION OF FIRST MINIMUM IN ARRAY

FORTRAN SOURCE
```
    X(n/2) = −1.0E + 10
    DO 24 L = 1, Loop
        m = 1
        DO 24 k = 2, n
            IF( X(k) .LT. X(m)) m = k
    CONTINUE
```

The sequential code needed for the embodiment of this invention is shown below. The associative nature of the problem is used to divide the problem into four problems that find the first minimum in the X(1) through X(250) range, the X(251) through X(500) range, the X(501) through X(750) range, and the X(751) through X(1000) range. The final code finds the first minimum among the four minimums found and X(1001). LOOP_CNT (R48) starts with a value of 250 (1000/4), because that decremented count is needed to calculate m when X(k).LT.X(m). Since each pass of the loop in each of the four ranges evaluates two X(k)'s, two DEC/SETs are used for each pass.

Each of the four problems compares two X-array elements to the latest first minimum, using the LDIN/Q instruction to load two double-precision floating-point numbers on each reference. When a new minimum is found the m value is calculated by subtracting the current value in LOOP_CNT from a constant.

```
Setup for the loop
           LCON/0    RLOOP,50
           LCON/0    RL,1
           LCON/0    RMIN,(0f,−1.0e10)
           LADS/1    RMIN,(1f,−1.0e10)
           LADS/2    RMIN,(2f,−1.0e10)      build DP FP number
           LADS/3    RMIN,(3f,−1.0e10)
           LCON/0    RXMID,X_ADRS+(499*8)   addrs of storing −1e10
           STIN/D    RMIN,RXMID,0           store it at X(n/2)
           LCON/0    RV249,249              Use to adjust m from
           LCON/0    RV250,250              R48
           LCON/0    R49,V24END
           LCON/0    R50,V24STRT
L24LOOP    LCON/0    R48,250                R48 = 250
           LCON/0    RS1X,X_ADRS−(  2*8)    addrs of 1st block
           LCON/0    RS2X,X_ADRS+(248*8)    addrs of 2nd
```

-continued

| | | | |
|---|---|---|---|
| LCON/0 | RS3X,X_ADRS+(498*8) | | addrs of 3rd |
| LCON/0 | RS4X,X_ADRS+(748*8) | | addrs of 4th |
| LDIB/D | RS1KM,RS1X,2 | | preload min for seg 1 |
| MOVE/S | RS1M,1 | | m = 1 |
| LDIB/D | RS2KM,RS2X,2 | | preload min for seg 2 |
| MOVE/S | RS2M,1 | | |
| LDIB/D | RS3KM,RS3X,2 | | preload min for seg 3 |
| MOVE/S | RS3M,1 | | |
| LDIB/D | RS4KM,RS4X,2 | | preload min for seg 4 |
| MOVE/S | RS4M,1 | | |
| LAND | RRTN,V24STRT | | DO THE VECTOR LOOP |

Find the min from the 4 segments and X(1001)

| | | | | | |
|---|---|---|---|---|---|
| RRTN | CMPF/D | RS2KM,RS1KM | SET CC6 | | post processing |
| | MOVE/D | RS1KM,RS2KM | IF CC6 .LT. | | on rtn from |
| | LCON/0 | R250,250 | | | vector loop |
| | ADDI/S | RS1M,RS2M,R250 | IF CC6 .LT. | | |
| | CMPF/D | RS3KM,RS1KM | SET CC6 | | |
| | MOVE/D | RS1KM,RS3KM | IF CC6 .LT. | | |
| | LCON/0 | R500,500 | | | |
| | ADDI/S | RS1M,RS3M,R500 | IF CC6 .LT. | | |
| | CMPF/D | RS4KM,RS1KM | SET CC6 | | |
| | MOVE/D | RS1KM,RS4KM | IF CC6 .LT. | | |
| | LCON/0 | R750,750 | | | |
| | ADDI/S | RS1M,RS4M,R750 | IF CC6 .LT. | | |
| | LDIB/D | RS5XK,RS4X,0 | | | RSX4 has addrs of |
| | CMPF/D | RS5XK,RS1KM | SET CC6 | | X(1001) |
| | LCON/0 | R1001,1001 | | | |
| | MOVE/S | RS1M,R1001 | IF CC6 .LT. | | |

Min INDEX is in register RS1M (potential values of RS1M=1 to 1001)

Now do outer loop

| | | |
|---|---|---|
| ADDI/S | RL,RL,1 | |
| CMPI/S | RL,RLOOP | SET CC5 |

-continued

| | | | |
|---|---|---|---|
| GOTO | L24LOOP | IF CC5 .LE. | |
| GOTO | "Exit" | IF CC5 .GT. | 4 NOT ADDED IN SEQ CODE |

The vector portion of the inner loop

| | | | | | |
|---|---|---|---|---|---|
| 1 | V24STRT | DEC/SET | | | do 2 DEC/SETs at |
| 2 | | DEC/SET | | | loop top R48(250->248) |
| 3 | | LDIB/Q | RS1XK1 & RS1XK2,RS1X,2,IRA | | |
| 4 | | CMPF/D | RS1XK1,RS1KM | SET CC1 | |
| 5 | | MOVE/D | RS1KM,RS1XK1 | IF CC1 .LT. | |
| 6 | | SUBI/S | RS1M,RV249,R48 | IF CC1 .LT. | RS1M = 249 − R48 |
| 7 | | CMPF/D | RS1XK2,RS1KM | SET CC1 | |
| 8 | | MOVE/D | RS1KM,RS1XK2 | IF CC1 .LT. | |
| 9 | | SUBI/S | RS1M,RV250,R48 | IF CC1 .LT. | RS1M = 250 − R48 |
| 10 | | LDIB/Q | RS2XK1 & RS2XK2,RS2X,2,IRA | | |
| 11 | | CMPF/D | RS2XK1,RS2KM | SET CC2 | |
| 12 | | MOVE/D | RS2KM,RS2XK1 | IF CC2 .LT. | |
| 13 | | SUBI/S | RS2M,RV249,R48 | IF CC2 .LT. | |
| 14 | | CMPF/D | RS2XK2,RS2KM | SET CC2 | |
| 15 | | MOVE/D | RS2KM,RS2XK2 | IF CC2 .LT. | |
| 16 | | SUBI/S | RS2M,RV250,R48 | IF CC2 .LT. | |
| 17 | | LDIB/Q | RS3XK1 & RS3XK2,RS3X,2,IRA | | |
| 18 | | CMPF/D | RS3XK1,RS3KM | SET CC3 | |
| 19 | | MOVE/D | RS3KM,RS3XK1 | IF CC3 .LT. | |
| 20 | | SUBI/S | RS3M,RV249,R48 | IF CC3 .LT. | |
| 21 | | CMPF/D | RS3XK2,RS3KM | SET CC3 | |
| 22 | | MOVE/D | RS3KM,RS3XK2 | IF CC3 .LT. | |
| 23 | | SUBI/S | RS3M,RV250,R48 | IF CC3 .LT. | |
| 24 | | LDIB/Q | RS4XK1 & RS4XK2,RS4X,2,IRA | | |
| 25 | | CMPF/D | RS4XK1,RS4KM | SET CC4 | |
| 26 | | MOVE/D | RS4KM,RS4XK1 | IF CC4 .LT. | |
| 27 | | SUBI/S | RS4M,RV249,R48 | IF CC4 .LT. | |

-continued

| | | | | |
|---|---|---|---|---|
| 28 | CMPF/D | RS4XK2,RS4XK | SET CC4 | |
| 29 | MOVE/D | RS4KM,RS4XK2 | IF CC4 .LT. | |
| 30 | SUBI/S | RS4M,RV250,R48 | IF CC4 .LT. | |
| V24END | CONTINUE | (FLAG FOR OPTIMIZER, NOT A REAL INSTRUCTION) | | |
| | GOTO RRTN | 4 NOT ADDED IN SEQ CODE | | |

The mapping of the vector loop (V24STRT through V24END) is shown in FIG. 30. The LDIB instructions are aggressively scheduled so that the data needed in pass n+1 is loaded during pass n. These LDIB instructions are executed conditionally based on CC48, so that they do not complete on the final pass. Because of this aggressive scheduling, the initial LDIB instructions are done outside the loop.

In this benchmark the vector embodiment of the present invention produces 8 "results" every 6 cycles. The 50 MHz CMOS VLSI implementation will thus achieve 67 MFLOPS for LFK24. The Cray-3, a faster version of the Cray-2, is expected, when available, to operate at 500 MHz, but to achieve only 5.1 MFLOPS for LFK24. The present invention will produce 10 times the performance at 1/10th the clock rate or, if implemented in the Cray-3's 500 MHz GaAs technology, will produce over 100 times the performance of the Cray-3.

Dynamic Scheduling Embodiment For an Existing Architecture— Application To a Prior Art CISC Machine This section illustrates the use of the aspects of the present invention to improve a well known existing Complex Instruction Set Computer (CISC) architecture the IBM 370 Extended Architecture (370-XA)-[IBM–1] CISC architectures can significantly improve the N (OPERATIONS/INSTRUCTION) dimension of the Performance Capacity box, but I (INSTRUCTIONS/CYCLE) and C (CYCLES/SECOND) typically suffer. The 370-XA definition is extensive, but the basic parameters are:

8-bit bytes, 16-bit half-words, 32-bit words, and 64-bit double-words

Data operands addressable on any byte boundary 31-bit addressing is provided with a 24-bit mode for running old programs.

Virtual memory is provided and memory protection is via a storage-key on 4K byte blocks.

The program-status word (PSW) includes the instruction address, condition code, and other state and control information The condition code is encoded into 2-bits.

Instructions are included for processing binary numbers, fixed-length floating point numbers, variable length decimal numbers, and fixed or variable length logical information.

Three sizes of instructions; 16-bit, 32-bit and 48-bit. The first 2-bits of the instruction specify length and instruction format,
  00—16 bits, RR format
  01—32 bits, RX format
  10—32 bits, RRE, RS, RX, S, or SI format
  11—48 bits, SS or SSE format Instructions must be on half-word boundaries Most arithmetic and logical instructions set the condition code (there is no programmable enable).

Conditional Branch instructions branch if any true bit in the 4-bit mask field matches the decode of the 2-bit condition code.

Sixteen 32-bit general registers

Four 64-bit floating-point registers can be used for single-precision (32-bits) or double-precision (64-bits) operands. Even/odd pairs combined for 128-bit (extended) floating-point operands.

An extensive I/O architecture, not discussed here.

Bits are numbered left to right, starting at 0 (least significant).

The instruction formats are

RR=register-and-register operations

RRE=register-and-register operations with a 16 bit op code field

RX=register-and-indexed storage operation

RS=register-and-storage operation

SI=storage-and-immediate operation

S=implied operand and storage operation with a 16 bit op code field

SS=storage-and-storage operation

SSE=storage-and-storage operation with a 16 bit op code field

Note that the IBM 370 architecture differs from the IBM 360 architecture described by Tomasulo. In particular the 370 supports virtual memory, while the 360 did not; therefore, Tomasulo's performance improvement methods[Tomas1] do not directly apply.

The embodiment description does not attempt to teach how to build a IBM 370-XA machine, but to show those skilled in the art how the aspects of the present invention can be used to significant advantage within the 370-XA architecture. Those skilled in the art will recognize that many deletions, additions, and modifications are possible within the scope of this invention. They will also recognize that the application of the present invention to previous commercial architectures is not limited to the IBM 370XA. Other existing architectures that would benefit from one or more of the aspects of the present invention include, but are not limited to, the DEC VAX, the Intel 80x86, the Motorola 680xx, the Motorola 88000, the Sun Sparc, the MIPS R2000/3000, the AMD 29000, the IBM System 36, the Cray-1, Cray-XMP/YMP, and Cray-2, and the Intergraph Clipper.

Embodiment of IBM 370-XA

The embodiment used is based on the generalized Dynamic Scheduling architecture of FIG. 26b, adapted to the 370-XA instruction set requirements as shown in FIG. 31a. The embodiment of FIG. 31a utilizes all the elements of the present invention:

Conditional Execution

CC Mask Field

Set CC Field

Stale CC Handling

Multiple CCs

CC Reservation Stations

In this embodiment, described here, complete architectural compatibility with the 370-XA architecture is provided; any program written to operate on an IBM 370-XA gives identical results provided that the program follows the compatibility rules defined by IBM[IBM_1].

FIG. 31a is composed of:

Program Memory 255 and Branch Predict Memory 620

Branch Predict Logic 615, Instruction Place and Issue 610, and Tag Memory 535

PC FIFO 345 and Commit FIFO 180

Reservation Stations 470 and CC Reservation Stations 500 between the Instruction Place and Issue 610 and the Functional Units 7 Functional Units—the Branch Functional Unit (BRFU) 625, General Functional Unit 1 (GFU 1) 630, GFU 2 635, GFU 3 640, the Storage-and-Storage Functional Unit (SSFU) 645, the Floating Point Functional Unit (FPFU) 650, and the I/O Functional Unit (IOFU) 655

Multiple sets of Virtual General Registers 660 and Virtual CCs 665 plus one set of Virtual Floating Point Registers 670

Result Buffers 475 between the Functional Unit outputs and the Result FIFOs 185

A common set of Real General Registers 675, two Real CCs (the 370-defined CC and a Path CC) 680, a set of Real Floating Point Registers 685, and a set of Real Control Registers 690

The Register to Functional Units Crossbar 460 and the Result Buffers to Functional Units Crossbar 480

In operation (FIG. 31a), multiple instructions are fetched from program memory 255 in parallel as a frame of 32 bytes; from which one to five instructions are issued during each cycle by the Instruction Place and Issue 610 in a variable length packet. The actual number depends on the lengths of the instructions in the frame and their dependencies. An average of 2.5 instructions/cycle is predicted for the workload detailed later. The 7 Functional Units provide the following functionality:

BRANCH FUNCTIONAL UNIT (BRFU) 625—as detailed in FIG. 31c, executes all instructions that can modify the normal sequential update of the program counter (including the EXECUTE instruction), all control instructions except SS-format and I/O instructions, and all RRE format instructions except the floating-point RRE format instructions. It includes the 16 control registers and the 16 general registers, since several branch instructions can modify registers, e.g. BRANCH ON COUNT and BRANCH AND LINK.

GENERAL FUNCTION UNIT #1 (GFU#1) 630—as detailed in FIG. 31d, is capable of executing all RR, RX, RS, SI, and S instructions except those that require the Branch Functional Unit, SS Functional Unit, the FP Functional Unit, or the I/O Functional Unit. The internal organization of General Functional Unit #1 as shown includes 16 general registers.

GENERAL FUNCTIONAL UNIT #2 (GFU#2) 635—is capable of executing the same set of instructions as General Functional Unit #1, with the exception of the multiply and divide instructions, i.e. it has no multiplier. General Functional Unit #2 includes 16 general registers.

GENERAL FUNCTIONAL UNIT #3 (GFU#3) 640—is capable of executing the same set of instructions as General Functional Unit #1, with the exception of the multiply and divide instructions, i.e. it has no multiplier. General Functional Unit #3 includes 16 general registers.

STORAGE-AND-STORAGE (SS) FUNCTIONAL UNIT (SSFU) 645—detailed in FIG. 31e, executes all SS and all noncontrol SSE instructions. It includes 16 general registers, because instructions like MOVE LONG update registers and set the condition code during their execution.

FLOATING-POINT FUNCTIONAL UNIT (FPFU) 650—detailed in FIG. 31f, executes all Floating-Point instructions. The floating-point registers are included with this Functional Unit.

I/O) FUNCTIONAL UNIT (IOFU) 655—executes all I/O instructions. The details of this unit are not discussed here, since its construction is not pertinent to the present invention.

These Functional Units are generally more complex than those described for other embodiments because of the complexity of the 370-XA instruction set. All registers and data paths, except those in the Floating Point Functional Unit, are 32-bits wide. The Virtual General Registers 660 and the Virtual CCs 665 are duplicated across all Functional Units that can modify them. The register that contains the logically most recent data is known via the tagging mechanism described below.

To conform to the architecture, instructions are issued in separate packets when any data or condition code dependency is involved. Instructions are placed in the packet for parallel issue until one of the following conditions is encountered (see "Instruction Issue Details—370-XA" for the logic that evaluates these conditions):

An instruction targeted at the Branch Functional Unit has been placed.

An instruction needs a Functional Unit assigned to an instruction already in the packet.

An instruction has a true data or condition code dependency on an instruction already placed in the packet.

A serialization instruction is encountered.

A STORE MULTIPLE, specifying that more than 2 registers are to be stored, is encountered.

An EXECUTE target has been placed. The target may be predicted or real.

Instructions are issued before their needed source data or condition code may be available, i.e. the issue decision does not include their availability. At issue all instructions are tagged with a unique tag. Those that need source operands or condition code obtain from Tag Memory 535 the OWNER tag, which identifies, by tag number and register set, the most recently issued instruction modifying that resource. Those that will modify a resource are made current OWNER by writing their tag and target functional unit number to the tag memory 535 location corresponding to that resource. The initial state of the tag memory 535 is all zeros, indicating that the Real General Register 675, Floating Point Register 685, or CC 680 is the OWNER. Interruptions initialize the tag memory.

All instructions are also expanded at issue to include a conditional execution mask (the Predicate Mask), as described later. If multiple instructions, which update the same resource (condition code or register), are placed, the logically latest instruction in the packet actually performs the update.

When instruction packets are issued commit flags are placed on the Commit_FIFO 180 and the PC-value pointing to the location of the first instruction in the packet is placed on the PC_FIFO 345.

The commit flags are expanded to include information about the original program order and instruction lengths.

As the instruction is passed to a Reservation Station of the appropriate Functional Unit the expanded source information selects the recorded register set and the designated register within that set via the Register Crossbar. A compare of the tag in the register and the recorded owner tag determines if the needed data is available yet. If the needed data is available, the selected data is acquired by the instruction as it moves to a reservation station. Otherwise, the instruction moves to a reservation station without the data. Instructions in reservation stations monitor the Result Buffer output (input to the Result FIFO) of the owner functional unit for each of its required inputs for the matching tag to appear. When the needed tag appears, the corresponding data is acquired by the instruction. Because the Reservation Stations need only monitor the Result Buffer outputs rather than the registers, not only are those needed results usable earlier, but also the number of inputs to the Reservation Station input selectors is small. Thus the Reservation Stations are relatively inexpensive.

There are 16 Virtual General Registers (except the FPFU) and a Virtual CC at the output of each functional unit, but relative to any instruction only one of those copies is the valid virtual copy, as identified by its tag. Therefore, any instruction that is conditionally executed (see "The CC and the Predicate"), i.e. that may be successful and modify its destination or may be unsuccessful and not modify its destination, must obtain (source) the current valid copy of that resource and, if unsuccessful, write that copy to its destination, so that subsequent instructions get the correct copy. For General Registers this generally occurs automatically, because the instruction set specifies two operands, where one operand is both a source and the destination. The Conditional Execution Decision selects the result of the operation or that previous valid copy of the resource to write to the destination with the tag of the instruction. This ensures that a subsequent instruction sourcing that resource will get both a tag match and the correct copy.

When an instruction has acquired all needed source operands it is ready for execution. Unavailable condition codes and/or store data do not pause instruction execution until the latest possible point in the functional unit pipeline, i.e. just before the instruction is completed.

During execution instructions within the same Functional Unit execute in order, but instructions across different Functional Units can complete in any order. The virtual results of all completed instructions, available in the virtual registers can be freely used by subsequent instructions. The virtual results (instruction completed) and the real results (instruction committed) of an instruction are exactly the same, but are available at different times.

Sequential coherency is accomplished via the Sequential Coherency Memory Tagging (U.S. patent Ser. No. SNTBD1, COMPUTER Processor with Improved Storage, filed DATETBD1). The form of tagging used is unique identifiers for writes and instance counts for reads. The tag and instance counters enforce sequential coherency up to the point of accessing the memory; beyond that point a Busy-flag associated with the address provides fine-grain enforcement. Memory updates cannot actually occur until the instruction is committed, i.e. if an instruction causes an interruption, a logically subsequent instruction cannot have already altered memory. Thus all instructions execute using only internal working storage for results destined for memory and upon commit those results are permitted to be written.

Sequential coherency among instructions in the same packet, requires that in certain cases portions of the packet be committed separately, e.g. a Memory Update instruction that sets a Busy-flag interlocking a Memory Reference instruction that is logically subsequent, but in the same packet, must commit, update the memory, and release the Busy-flag before the dependent Memory Reference can proceed.

The flags on the Commit_FIFO 180 control commitment. As shown in FIG. 31a, each Result FIFO 185 has two outputs to the real registers. This permits those instructions that are ready to commit, from one instruction up to two consecutive packets to be committed simultaneously and recovers from holes introduced into the pipeline by dependencies. Instructions that encounter interruption conditions, e.g. page fault, are flagged during execution. When they arrive for commitment the interruption is recognized, only those logically previous instructions in the packet are committed, the PC stored as the old PSW is adjusted to point to the interruption causing instruction, other instructions in the pipeline are NOOP'ed, and the Tag Memory, except for the Memory Coherency Tags, is cleared to all zero's. A zero tag causes subsequent reads of that resource to get the corresponding Real Register or CC via Storage Copy Selection (U.S. patent Ser. No. SNTBD1, COMPUTER Processor with Improved Storage, filed DATETBD1)

The necessary mechanics of interruptions are described later (see Interruptions); however, the details of each interruption causing condition, e.g. the operation of Program Event Recording, are not detailed here, because (1) it is extensive and (2) it is not necessary to showing the application and advantages of the present invention.

Certain instructions must, by the 370-XA architectural definition, cause serialization before and/or after their execution. Those instructions cause the instruction fetch to stop at the appropriate times until all issued instructions complete. Then instruction fetch is resumed at the current PSW address.

Instruction Issue Details, 370-XA

Instruction issue is controlled by the logic shown in FIG. 31b, which is composed of the following elements:

Address Selectors 730 and four double-word banks of Program Memory—Bank 0 710, Bank 1 715, Bank 2 720, and Bank 3 725—which provide a 32 byte frame of instructions Instruction Locate and Select Logic 735 which selects up to 5 instructions from the frame, as detailed below.

Five Instruction Decode Units 740 and the Issue Rules Logic 745

Instruction Position, Expand, and Issue 750 and Tag Memory 535

PC FIFO 345 and Commit FIFO 180

Register Crossbar 460

The address used to fetch the instructions issued is provided by the Branch Prediction Logic 615, as shown and information about the issued instructions is provided to the Commit FIFO 180 as detailed below. In operation the fetch address, supplied by the Branch Prediction Logic, is used to obtain four sequential double-words from program memory (cache). In the worst case, those 32 bytes contain 26 usable bytes, which is more than sufficient for the five instructions needed.

The high-order two bits of the five instructions are used by the Locate and Select Logic 735 to find and select the five needed instructions from the 32 bytes fetched. For example if the half words beginning at the first instruction address contain in their high-order two bits (xx means "don't care")

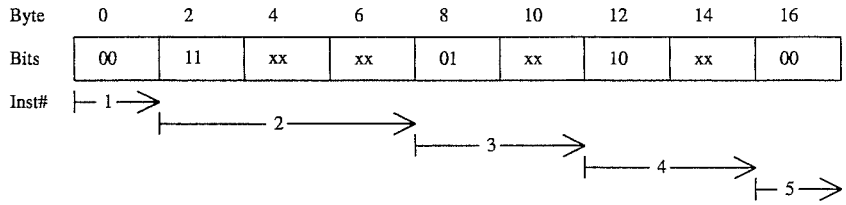

the 5 instructions are 2, 6, 4, 4, and 2 bytes long, respectively. The located instructions are selected and supplied to the Instruction Decodes 740 (one for each of the five instructions). Each Instruction Decode 740 generates the following information about the instruction:

Needed Functional Unit—BRFU, GFU1, any GFU, SSFU, or FPFU.

Reference—indicates that the instruction will reference storage.

Store—indicates that the instruction will modify storage.

Pre-Serialize—Serialization is required before the instruction is executed.

Post-Serialization—Serialization is required after the instruction is executed.

Source register bit map—a bit indicator for each register that the instruction will source.

Destination register bit map—a bit indicator for each register that the instruction will modify.

CC set—indicates that the instruction is to set the program visible condition code.

Branch—indicates that Branch prediction is to be used, that the Predicate (see The CC and the Predicate) should be set by this instruction, that this instruction should be made OWNER of the Predicate, and that all instructions up to and including the next Branch should conditionally complete based on that Predicate.

Store Multiple—indicates that the instruction is a STORE MULTIPLE, which requires special issue handling as described later.

The entire collection of Instruction Decode 740 information and internal State information is used by the Issue Rules Logic 745 to Position, Expand, and Issue 750 the Instructions; to acquire the needed source and destination Owner tags; to Generate the Tag Updates; and to construct the entry for the PC FIFO and the Commit FIFO. Assignment of instructions to particular Functional Units is done on a best fit basis, e.g. a LOAD followed by a MULTIPLY will be assigned to GFU2 and GFU1, respectively.

Each instruction that the Position, Expand, and Issue 750 issues contains the original instruction fields plus:

Source Owner Tags obtained from the Tag Memory (see "Tagging and Ownership")

Main Memory Coherency Tags and Instance Counts obtained from the Tag Memory or Instruction Place and Issue Logic (see "Main Memory Tagging, 370-XA")

The unique Tag to be used with the results of the instruction to identify those results Predicate Mask field to control the execution of predicted Branch paths (see "The CC and the Predicate")

During the issue cycle the needed sources (registers, predicate, and condition code) are selected via the Register Crossbar and if the associated tag matches the needed tag that copy of the data is saved in the Reservation Station.

While an instruction waits in a Reservation Station it monitors needed resources or events (e.g. Memory Accesses) for which a tag match has not yet occurred via the Results Crossbar. The Results Crossbar only has sources from the Result Buffers, so the selectors have fewer inputs than the Register Crossbar.

PC FIFO and Commit FIFO, 370-XA

When a packet is issued the information relative to the Program Address and instruction commit is placed on the PC FIFO 345 and the Commit FIFO 180 which is treated as one structure where entries are placed on the top of the FIFO and removed from the bottom of the FIFO:

(1) PC-field, the 32 bit PC-value pointing to the logically first instruction in the packet;

(2) 8 OR-bits, which are all zeros unless an EXECUTE instruction is in the packet (see EXECUTE description, later);

(3) the Interruption Indicator bit (II) indicates when true that the packet was fetched via an interruption or pseudo interruption as discussed in Interruptions, later;

(4) the No Outside Interruption bit (NO) indicates when true that the packet cannot be nullified by an outside interruption (see Interruptions). This bit is used in the execution of some STORE MULTIPLE instructions (see LOAD MULTIPLE and STORE MULTIPLE)

(5) 5 Modified bits (M-bits) indicate when set that the memory location of the corresponding instruction within the packet was modified while that instruction was being executed (see "Self-Modifying Code")

(6) 7 indicator bytes indexed by the Functional Unit number and describing the relationships of the instructions in the packet
Byte 0 corresponds to BRFU
Byte 1 corresponds to GFU1
Byte 2 corresponds to GFU2
Byte 3 corresponds to GFU3
Byte 4 corresponds to SSFU
Byte 5 corresponds to FPFU
Byte 6 corresponds to IOFU Within each byte the bits are defined as follows:
Bit 0 indicates, when true, that an instruction targeted for the corresponding functional unit is included in the packet
Bits 1–3 indicate, when bit 0 is true, the instruction's original order relative to the other instructions in the packet (the logically first instruction in the packet has a value $000_2$ in this field, the second has a value of $001_2$, the fifth has a value of $100_2$)

Bits 4 and 5 provide the Instruction Length Code (ILC)[IBM-1] for the instruction assigned to this functional unit.

Bit 6 indicates, when one, that an interruption condition has been detected, during execution, for the corresponding instruction.

Bit 7 indicates, when one, that the results of the instruction are not to be committed. When bit 7 is a 0, the results are committed. Bit 7 permits the results of an interruption causing instruction to be committed, when necessary as defined by the IBM 370-XA architecture[IBM-1] (IBM defines this as instruction completion versus suppression or termination). Bit 7 can only be set if bit 6 is also set.

Bits 6 and 7 are set to zero when the packet is issued. During execution a functional unit sets Bit 6 when an interruption condition is detected and also sets Bit 7 when the results are not to be committed. Whenever an interruption condition is indicated by bit 6, the normal Result FIFO entry contains the results of the instruction and the next Result FIFO entry contains the interruption information (e.g. interruption class and interruption code).

When the Functional Units complete an instruction, they place their results (the new results if the conditional execution was successful or the previous data if the conditional execution was unsuccessful) on their Result FIFO 185 in the issue order; therefore, when all the Functional Units indicated by the entry at the bottom of the Commit FIFO have Result FIFO entries available, they constitute the complete packet. If one or more instructions indicate an interruption, then the instructions that logically precede that instruction are allowed to commit. Additionally, the interruption causing instruction's results are allowed to commit, if Bit 7 of that Functional Unit's Indicator Byte (on the Commit FIFO) is zero. In the normal case, no instructions in the packet indicate interruption conditions and the full packet commits.

Interruptions that are not generated in the process of executing an instruction, e.g. timer interruptions and I/O interruptions, are called "outside interruptions" here (not an IBM term). Outside interruptions are routed to the commit logic and when a packet is ready for commit, the outside interruption is recognized according to the IBM 370-XA interruption definitions. The packet does not commit and the Real PC reflects the start of that packet.

The No Outside Interruption bit (NO) on the Commit FIFO indicates when true that the packet cannot be nullified by an outside interruption. This bit is used in the execution of some STORE MULTIPLE instructions (see LOAD MULTIPLE and STORE MULTIPLE).

Other commit strategies are possible, but the important point is that if a Branch instruction is committed, the PC that is committed must reflect the resolved branch address, whether a branch actually occurs or the branch falls-through to the next instruction.

Additionally, to enhance performance, High Bandpass Commit (U.S. patent Ser. No. SNTBD3, Computer Processor with Improved Commit, filed DATETBD3) is included, i.e. the Result FIFO's 185 have dual outputs, as shown in FIG. 31a. The two entries at the bottom of the Commit FIFO control those outputs so that two packets can commit simultaneously. If the first packet is available for commit before the second, the first commits and a new set of two packets is considered. When two packets are committed together and instructions within both packets modify the same register, the second packet modification takes priority, i.e. its result is the one written to the Real Registers/CC.

Branch Functional Unit, 370-XA

In FIG. 31c the BRFU is shown in detail (pipeline segment registers are not shown) and is composed of the following elements (where the pipeline segments are not shown to reduce drawing clutter):

The Branch Instruction FIFO and Control 760

The BRANCH ON COUNT (BCT) R1Decrementer 765, the R1 Plus R3 Adder 770, the Branch Address Generator 775, and the Index Compare 780

The Field Extractor 785, used for the EXECUTE instruction

The Branch Conditional Execution Decision 795, the Branch Address Selector 800, and the Branch Address Compare 835.

The BRFU Working Registers 815

The BRFU CC Selector 870, the BRFU General Register Input Selector 825, and the BRFU Store Selector 830

Interfaces to the 370-XA Cache 700, shown here to aid understanding, although it is not part of the BRFU.

The PC FIFO 345 and the Branch Predict 615 are closely associated with the operation of the BRFU, but are not considered part of the BRFU. They are shown in FIG. 31c as an aid to understanding the overall operation of the BRFU.

In operation Branches are, as described in the Issue section above, issued in sequence (no two branches are issued simultaneously) and Branch paths are predicted. Instructions in the predicted path are issued and conditionally executed until Branch resolution occurs. Branches set a special condition code, the Predicate, when resolution occurs. When prediction is correct, instructions are executed at the maximum possible rate. Incorrect prediction simply uses the resolved Branch address as the new PC-value and continues issue at that point. Those instructions already issued in the incorrect path are automatically converted to NOOPs by the conditional execution. Use of the Predicate Mask along with the Predicate permits a predicted thread involving multiple Branches to be in execution before the resolution of those Branches is known (see the section "The CC and the Predicate").

The Branch prediction algorithm used in this embodiment is based on the non-uniform history retention prediction mechanics of Lee and Smith[Lee-1]. The detailed structure of the branch prediction algorithm is not included here, because it is not important to understanding the application and advantages of using the present invention. The section "The CC and the Predicate" explains how the Branch Prediction logic controls the execution of predicted paths.

The Branch Unit also executes all control instructions, privileged and semi-privileged instructions except SS-format (done by the SSFU) and I/O instructions (IOFU). The Branch Unit contains the PSW, all Control Registers, and the time-of-day clock, the Prefix Register, the CPU timer, and the multiprocessing facilities (not detailed here).

BRFU Executed Branch Instructions—The BRFU, as shown in block diagram form in FIG. 31c, executes a variety of Branch instructions:

The RR-format Branch instructions replace the PSW address with the contents of R2. The BCR does this conditionally based on the logical AND of the decoded Condition Code and the M1 field (4-bits). The BCTR does this if the result of decrementing the contents of R1 by 1 is non-zero and always updates R1 with the decremented value. The BALR, BASR and BASSM save the PSW address in R1 before modifying the PSW.

The RX-format BC, BCT, BAL, and BAS are like the BCR, BCTR, BALR, and BASR except the calculated second operand address (X2+B2+D2) is used in place of the R2 contents to update the PSW.

The RS-format BXH and BXLE update R1 with R1+R3, compare the result with the contents of Register (R3+1), and if greater-than or less-than-or-equal, respectively, replace the PSW address with the calculated second operand address (B2+D2).

The RX-format EXECUTE instruction uses the BRFU along with other machine resources as detailed later.

There are 16 Virtual General Registers (except the FPFU) and a Virtual CC at the output of each functional unit, but relative to any instruction only one of those copies is the valid virtual copy, as identified by its tag. Therefore, any instruction that is conditionally executed (see "The CC and the Predicate"), i.e. that may be successful and modify its destination or may be unsuccessful and not modify its destination, must obtain (source) the current valid copy of that resource and, if unsuccessful, write that copy to its destination, so that subsequent instructions get the correct copy. For General Registers this generally occurs automatically, because the instruction set specifies two operands, where one operand is both a source and the destination. The Conditional Execution Decision selects the result of the operation or that previous valid copy of the resource to write to the destination with the tag of the instruction. This ensures that a subsequent instruction sourcing that resource will get both a tag match and the correct copy.

BRFU Executed Control Instructions—The BRFU also executes a number of control instructions and all RRE format instructions except DIVIDE (FPFU). The details of these instructions are not significant to the performance of the embodiment or the application of the various aspects of the present invention. These control instructions are listed below:

| | | |
|---|---|---|
| RRE | EPAR | EXTRACT PRIMARY ASN |
| RRE | ESAR | EXTRACT SECONDARY ASN |
| RRE | IAC | INSERT ADDRESS SPACE CONTROL |
| RRE | IPM | INSERT PROGRAM MASK* |
| RRE | IPTE | INVALIDATE PAGE TABLE ENTRY |
| RRE | ISKE | INSERT STORAGE KEY EXTENDED |
| RRE | IVSK | INSERT VIRTUAL STORAGE KEY |
| RRE | PT | PROGRAM TRANSFER |
| RRE | RRBE | RESET REFERENCE BIT EXTENDED |
| RRE | SSAR | SET SECONDARY ASN |
| RRE | SSKE | SET STORAGE KEY EXTENDED |
| RRE | TB | TEST BLOCK |
| RX | LRA | LOAD REAL ADDRESS |
| RS | LCTL | LOAD CONTROL |
| RS | SIGP | SIGNAL PROCESSOR |
| RS | STCTL | STORE CONTROL |
| RS | TRACE | TRACE |
| S | IPK | INSERT PSW KEY |
| S | LPSW | LOAD PSW |
| S | PC | PROGRAM CALL |
| S | PTLB | PURGE TLB |
| S | SAC | SET ADDRESS SPACE CONTROL |
| S | SCK | SET CLOCK |
| S | SCKC | SET CLOCK COMPARATOR |
| S | SPT | SET CPU TIMER |
| S | SPX | SET PREFIX |
| S | SPKA | SET PSW KEY FROM ADDRESS |
| S | SSM | SET SYSTEM MASK |
| S | STCKC | STORE CLOCK COMPARATOR |
| S | STAP | STORE CPU ADDRESS |
| S | STIDP | STORE CPU ID |
| S | STPT | STORE CPU TIMER |
| S | STPX | STORE PREFIX |
| SI | STNSM | STORE THEN AND SYSTEM MASK |
| SI | STOSM | STORE THEN OR SYSTEM MASK |
| SSE | LASP | LOAD ADDRESS SPACE PARAMETERS |
| SSE | TPROT | TEST PROTECTION |

*Note that the RRE format INSERT PROGRAM MASK instruction is not a Control instruction; it is a General instruction.

General Functional Units, 370-XA

The General Functional Units (GFU) execute all instructions that are not assigned to the more specialized Functional Units. There are 3 General Functional Units, but only GFU1 includes Multiply/Divide hardware. The issue unit assigns instructions from the general set on a rotating basis to avoid overloading any one unit.

The structure of the GFU is shown in FIG. 31d (where the pipeline segments are not shown to reduce drawing clutter). The primary elements are:

The GFU Instruction FIFO and Control 850

The GFU Address Adder 845

Interfaces to the 370-XA Data Cache 700 included here to aid understanding

The GFU ALU/Multiplier 855, the GFU Working Storage 860, and the GFU Divide Seed Table 865

The 370-XA Conditional Execution Decision 910

The GFU CC Selector 870, the GFU General Register Selector 875, and the GFU Store Selector 880

In operation these components provide the following functions:

In the execution of most RR instructions the two source register values are provided to the GFU ALU/MUL (Arithmetic Logic Unit/Multiplier) 855 which performs the operation specified by the OP CODE. The resulting data and CC (if required) are provided to the GFU General Register and CC output selectors 875 and 870.

The second operand input of the RR-format LOAD REGISTER instruction bypasses the GFU ALU/MUL and goes directly to the GFU General Register selector 875.

RX-format instructions are provided to the GFU with 3 components of the operand 2 address: the X2 register, the B2 register, and the D2 field. The Address Adder 845 adds the three values together to form the second operand address. When the X2 or B2 field in the instruction is zero, a zero component is used in that position. Most RX instructions access the second operand from cache 700 via Address Translation 790, Data Cache Memory 805, and Check & Align 810. That second operand and the first operand (the contents of R1) are operated on by the ALU/MUL 855 under control of the OP CODE and the result is supplied to the GFU General Register and CC (if required) output selectors 875 and 870.

The RX-format LOAD instruction supplies the second operand directly to the GFU General Register output selector 875, bypassing the ALU/MUL 855.

Rather than performing an ALU/MUL operation, the

STORE instruction supplies the first operand (R1) to the GFU Store output selector 880 for writing to memory.

The SI instructions access the first operand from memory (address is calculated by B1 plus D1), perform the specified ALU/MUL operation on the first operand and the I2 field, and store the result at the first operand memory location.

The RS instructions executed by the GFU are COMPARE AND SWAP, COMPARE DOUBLE AND SWAP, COMPARE LOGICAL CHARACTERS UNDER MASK, LOAD MULTIPLE, the SHIFT instructions, STORE CHARACTERS UNDER MASK, and STORE MULTIPLE. The Mask input to the ALU/MUL is used in the ". . . UNDER MASK" instructions.

The Working Storage 860 is used for temporary results needed during instruction execution. For example, the Divide Seed Table 865 provides an approximate reciprocal of the denominator, so the divide can be implemented as a series of multiplies[Ande2]. The intermediate results are saved, as needed in the Working Storage.

There are 16 Virtual General Registers (except the FPFU) and a Virtual CC at the output of each functional unit, but relative to any instruction only one of those copies is the valid virtual copy, as identified by its tag. Therefore, any instruction that is conditionally executed (see "The CC and the Predicate"), i.e. that may be successful and modify its destination or may be unsuccessful and not modify its destination, must obtain (source) the current valid copy of that resource and, if unsuccessful, write that copy to its destination, so that subsequent instructions get the correct copy. For General Registers this generally occurs automatically, because the instruction set specifies two operands, where one operand is both a source and the destination. The Conditional Execution Decision selects the result of the operation or that previous valid copy of the resource to write to the destination with the tag of the instruction. This ensures that a subsequent instruction sourcing that resource will get both a tag match and the correct copy.

Storage-and-Storage Functional Unit, 370-XA

The block diagram of the SS Functional Unit is shown in FIG. 31e (where the pipeline segments are not shown to reduce drawing clutter) and is composed of the following elements:

The SSFU Instruction FIFO and Control 885

The SSFU Operand 1 Address Adder and Incrementer 890, the SSFU Operand 2 Address Adder and Incrementer 900, the SSFU Length Counters 895, and the SSFU Overlap Detector 905

Interfaces to the 370-XA Data Cache 700 included here to aid understanding

The SSFU ALU/Multiplier 915, the SSFU Working Storage 920, and the SSFU Divide Seed Table 925

The 370-XA Conditional Execution Decision 910

The SSFU General Register Selector 930 and the CC Selector 935

SS instructions are issued to the SS Functional Unit and execute as vector instructions under control of that unit. Special RR instructions, MOVE LONG and COMPARE LONG, are issued to the SS Functional Unit. These instructions are interruptible, an interruption is permitted after partial completion of the instruction. The general registers associated with the SS Functional Unit are updated by the MOVE LONG and COMPARE LONG instructions via the SSFU GR Selector 930.

In FIG. 31e typical instruction execution requires calculating the first and second operand addresses in the respective Operand Adders 890 and 900, fetching the operands from Data Cache 700 under control of the Length field 895 (or register contents), performing the specified operation in the ALU/MUL 915, and storing the result under control of the Conditional Execution Decision 910 in the first operand location in Data Cache 700. The MOVE CHARACTER simply moves the second operand to the first operand location.

Special detection is provided by the Overlap Detector 905 for overlapped operands. For example, a portion of memory is often initialized by zeroing a byte and then specifying that byte as operand 2 and the next byte location as operand 1. Detection of this case not only produces the correct results, it is also used to accelerate the operation.

The SS instruction set includes the decimal instructions as well as the PACK (convert from unpacked decimal to packed decimal) and UNPACK instructions; therefore, the SS ALU/MUL 915 includes decimal capabilities. The Working Storage 920 is used for temporary results needed during instruction execution. For example, the Divide Seed Table 925 provides an approximate reciprocal of the denominator, so the divide can be implemented as a series of multiplies[Ande2]. The intermediate results are saved, as needed in the Working Storage.

The SSFU also executes the SS format control instructions, MOVE TO PRIMARY, MOVE TO SECONDARY, and MOVE WITH KEY.

There are 16 Virtual General Registers (except the FPFU) and a Virtual CC at the output of each functional unit, but relative to any instruction only one of those copies is the valid virtual copy, as identified by its tag. Therefore, any instruction that is conditionally executed (see "The CC and the Predicate"), i.e. that may be successful and modify its destination or may be unsuccessful and not modify its destination, must obtain (source) the current valid copy of that resource and, if unsuccessful, write that copy to its destination, so that subsequent instructions get the correct copy. For General Registers this generally occurs automatically, because the instruction set specifies two operands, where one operand is both a source and the destination. The Conditional Execution Decision selects the result of the operation or that previous valid copy of the resource to write to the destination with the tag of the instruction. This ensures that a subsequent instruction sourcing that resource will get both a tag match and the correct copy.

Main memory updates are only done as part of Commit (see the previous discussion of FIG. 31a's operation).

Floating-Point Functional Unit, 370-XA

The FPFU, shown in FIG. 31f, is composed of the following elements (where the pipeline segments are not shown to reduce drawing clutter):

The FPFU Instruction FIFO and Control 940

The FPFU Address Adder 945

Interfaces to the 370-XA Data Cache 700 included here to aid understanding

The FP ALU/Multiplier 950, the FP Working Storage 955, and the FP Divide Seed Table 960

The 370-XA Conditional Execution Decision 910

The Floating Point Register Selector 965, the FP Store Selector 970, and the FP CC Selector 972

In operation the Floating-Point Functional Unit is the only unit that can reference or update the floating-point registers. These 4 registers (0, 2, 4 and 6) can each hold either a single-precision or a double-precision number. When used for extended precision they are viewed as 2 registers (0 and 4).

As shown in FIG. 31f, the structure is similar to the GFU, previously described, because, except for the operands being in floating-point format, the instructions are similar. The FPFU never has the general registers as a source or destination operand; but it can use the general registers to form the address of an operand.

There are 16 Virtual General Registers (except the FPFU) and a Virtual CC at the output of each functional unit, but relative to any instruction only one of those copies is the valid virtual copy, as identified by its tag. Therefore, any instruction that is conditionally executed (see "The CC and the Predicate"), i.e. that may be successful and modify its destination or may be unsuccessful and not modify its destination, must obtain (source) the current valid copy of that resource and, if unsuccessful, write that copy to its destination, so that subsequent instructions get the correct copy. For General Registers this generally occurs automatically, because the instruction set specifies two operands, where one operand is both a source and the destination. The Conditional Execution Decision selects the result of the operation or that previous valid copy of the resource to write to the destination with the tag of the instruction. This ensures that a subsequent instruction sourcing that resource will get both a tag match and the correct copy.

The FP ALU/MUL 950 handles double-precision (64-bit) floating-point numbers directly, but sequencing is required for extended precision (128-bit). For example the MXR (RR Multiply, Extended Operands) must perform four 64-bit multiplies and sum the (properly aligned) results using the Working Registers 955 as temporary storage. Sequences are also required for Divide. The Divide Seed Table 960 provides the necessary value as described for the IBM 360/91 [Ande2].

Data Cache, 370-XA

FIG. 31g shows the ports of the 370-XA Data Cache relative to the functional units. In this figure the following elements are involved:

- 6 Functional Units—BRFU 625, GFU1 630, GFU2 635, GFU3 640, SSFU 645, and FPFU 650
- 4 Read Ports—Read Port 1 980, Read Port 2 985, Read Port 3 990, and Read Port 4 995
- One Common Write Port selected with data selected from the 6 inputs by the Store Data Multiplexer 975
- The Store Address FIFO 1020 with input selected by the Store Address Multiplexer 1015
- Port 1 Address Selector 1000, Port 2 Address Selector 1005, and Port 4 Address Selector 1010

In operation the Data Cache, as shown in FIG. 31g, has four read ports and 1 write port. The Functional Units share those ports, as shown. GFU1 has dedicated use of Read Port 3 and a non-shared Store Address input. The SSFU can use both Store Address Inputs 1 and 2, which are shared with the BRFU and the FPFU, respectively.

The cache is organized as a four-way set associative cache with a line size of 8 bytes. References to cache are for up to 4 bytes per reference; multiple references are necessary for more than 4 bytes. Since many operand addresses can begin on any byte boundary, the cache features an address incrementer to fetch and merge the needed data from 2 lines.

Main Memory Tagging, 370-XA

The sequential coherency of memory operations is ensured in this embodiment through the use of Sequential Coherency Memory Tagging (U.S. patent Ser. No. SNTBD1, Computer Processor with Improved Storage, filed DATETBD1) with the following differences:

Instructions vary in length: 2 bytes, 4 bytes, and 6 bytes

Six functional units are available for executing instructions— each functional unit can execute a subset of the full instruction set and the subset may overlap with the subsets of other functional units The actual memory updates occur in-order only when the instruction is committed, i.e. when the permanent machine state is updated.

But this embodiment is the same as FIG. 18 in the following respects:

The program model of instruction execution, i.e. the way the compiler and programmer view the execution of instructions, is sequential. The results obtained are the same as those obtained when each instruction is executed in its sequence before the next instruction is started.

From one to five instructions are issued during each cycle

Certain instructions perform Memory References, certain other instructions perform Memory Updates, certain instructions perform both Memory References and Memory Updates, and some instructions do not reference or update memory

Tagging and OwnerShip, 370-XA

The use of resources as sources and destinations is coordinated among instructions via a tagging mechanism similar to that described for the Dynamic Scheduling Embodiment. The primary difference is that in the 370-XA Embodiment certain resources, e.g. General Registers 0–15 (Virtual Registers) and the Virtual CC, are duplicated across multiple functional units (see FIG. 31a), so the Tag Memory contents explicitly include the identification of the owner Register Set or points to the Real Resource (Register or CC):

| Tag FU Field | Identified Register Set |
|---|---|
| 0 | Real Resource |
| 1 | BRFU |
| 2 | GFU 1 |
| 3 | GFU 2 |
| 4 | GFU 3 |
| 5 | SSFU |
| 6 | FPFU |
| 7 | IOFU |

When an instruction which will modify a register, storage, or CC is issued, the target functional unit and the instruction's tag are recorded as Owner in the tag memory. A subsequent instruction that needs to source that resource obtains, at issue, the tag memory information recorded for that resource. Thus a dependent instruction knows which functional unit will provide the needed source data and what tag identifies that data. If that information is available at issue, as determined by selecting the addressed source from the Register Set indicated by the tag and comparing the Owner-tag to the Resource-tag, it is picked up from the appropriate register or CC; otherwise, it is picked up by the assigned reservation station when available from the result buffer of the indicated functional unit.

The only interlocks that delay instruction execution are the unavailability of needed sources and the enforcement of Memory Sequential Coherency. No destination interlocks exist, except that writes to any common resource must occur in their original program order and the results must occupy the resource and the result buffer (source for the Result Crossbar) for at least one cycle, so that reservation stations waiting to capture that result have at least one cycle to do so.

A tag memory location of all zeros indicates that the Real Resource should be selected and, since all Real Resources have an implicit all zeros tag associated with them, the selected Real Resource will always have a tag match. A tag memory location can be all zeros due to any one of the following conditions:

(1) The entire tag memory is initialized to all zeros.

(2) A recognized interruption causes all tag memory locations, except those associated with Main Memory, to be cleared to all zeros.

(3) If a tag memory location equals a generated tag, that location is cleared to all zeros. This occurs when a resource has not been the destination of an instruction for the full period of the tag generator counter (the counter has wrapped around).

(4) An incorrect Branch prediction has been corrected, causing the Predicate Bit Owner Tag location to be cleared.

The Tag Generator generates tags via a 6-bit binary counter, which is initialized to and wraps to the value $01_{16}$. Each packet is assigned the current tag value before the counter is incremented. When the counter increments, if any tag memory location contains a value equal to the new counter value, that tag memory location is cleared to all zeros (Condition 3 above). If unaccounted for in the design, this condition could lead to a subsequent instruction obtaining an old and incorrect copy of the resource.

To account for this condition and to simplify interruption handling, each Tag Memory location has an additional bit—the Copy Select (CS) bit, which controls the source to the Register Crossbar— Real when CS is cleared (zero) and Virtual when CS is set (one). The tag memory is initialized to all zeros, indicating that the Real Registers and CCs are OWNERs. Real Registers and Real CCs do not have tag storage associated with them—when they are sourced they always provide an all zeros tag.

When all zeros are written into a tag memory location, the Real Resource is selected as input to the Register Crossbar. When instruction completion writes to the associated Virtual Register or Virtual CC and the associated Tag Memory location is non-zero, the associated CS bit is set, causing the Virtual Resource to be selected as source to the Register Crossbar.

Note that the tag generator counter must be sufficiently large to accommodate the largest number of cycles an instruction can take from issue to commit, or on wraparound the Real resource will be selected before the correct copy has been written.

During an interruption, all tag memory locations (except those associated with Main Memory, see Main Memory Tagging, 370-XA) are cleared to all zeros, automatically selecting the Real Resources as sources. Since the Virtual Results in the pipeline are flushed during an interruption, the use of the Real Resources is exactly what we want to occur.

LOAD MULTIPLE and STORE MULTIPLE

The LOAD MULTIPLE and STORE MULTIPLE instructions are defined as one "unit of operation", i.e. if they encounter any exception, e.g. a page fault while accessing the main storage locations involved, the entire instruction is nullified—it does not change any results.

When a LOAD MULTIPLE instruction is encountered by the issue logic, the Instruction Decode identifies all the registers that the instruction will update. The LOAD MULTIPLE becomes the Owner of those registers via Tag Memory, just like other instructions. The instruction is issued to a GFU and obtains the needed address operands. In execution the instruction reads the needed words from main memory (cache) and saves them in Working Storage until all needed words have been read. When all words are successfully read, the Working Storage contents can be written to the virtual registers (and appropriately tagged). If any access fault occurs while reading the words from main memory, then no Working Storage contents are written, and the LOAD MULTIPLE indicates an interruption condition. Normally the LOAD MULTIPLE will be repeated after the interruption has been serviced.

The STORE MULTIPLE instruction is an RS format instruction which stores the contents of the general registers starting with the register specified by the R1 field and ending with the register specified by the R3 field into the storage area beginning at the location designated by the second-operand address and continuing through as many locations as needed. When R1 and R3 are the same only one register is stored. When R1 is one greater than R3 all 16 registers are stored. The registers are stored in the ascending order, beginning with the register specified by R1, of register numbers with register 0 following register 15.

When a STORE MULTIPLE instruction that specifies storing one or two registers is encountered, it is treated as any normal RS instruction and is issued to any GFU.

But when a STORE MULTIPLE specifies storing more than two registers, the packet being issued is terminated and issued without including the STORE MULTIPLE. The single STORE MULTIPLE instruction is expanded into several instructions that are issued as one or two packets, with no other instructions included, as follows:

The STORE MULTIPLE instruction is issued to the BRFU, which interprets the instruction to mean that the first and last register in the R1 to R3 range are to be stored in the appropriate location. As the first instruction of the expansion, if no access violation occurs with the first and last of the range, then none will occur with accesses within that range One to seven instructions with special Op Codes are issued to the GFUs and the BRFU in the same packet with the STM, and in a second packet when necessary. Each of these instructions can store one or two registers. The format is

| OP CODE | R1 | R3 | B2 | D2 |

The number of instructions generated is based on the number of registers to be stored. Rather than expanding the Op Code field beyond the defined 8-bits, the op codes from 69 through 6F and from 79 through 7F are used. These op codes are normally Floating Point instructions executed only by the FPFU. When issued to the BRFU and GFUs they are interpreted differently. The interpretation is as follows:

| | |
|---|---|
| 69 | Store R1 at address B2+D2+4 |
| 6A | Store R1 at address B2+D2+8 |
| 6B | Store R1 at address B2+D2+12 |
| 6C | Store R1 at address B2+D2+16 |
| 6D | Store R1 at address B2+D2+20 |
| 6E | Store R1 at address B2+D2+24 |
| 6F | Store R1 at address B2+D2+28 |
| 79 | Store R1 and R3 (R1+1) at address B2+D2+4 |
| 7A | Store R1 and R3 (R1+1) at address B2+D2+8 |
| 7B | Store R1 and R3 (R1+1) at address B2+D2+12 |
| 7C | Store R1 and R3 (R1+1) at address B2+D2+16 |
| 7D | Store R1 and R3 (R1+1) at address B2+D2+20 |
| 7E | Store R1 and R3 (R1+1) at address B2+D2+24 |
| 7F | Store R1 and R3 (R1+1) at address B2+D2+28 |

Thus all 16 General Registers can be stored by instructions residing in a maximum of 2 contiguous packets.

For example, the STORE MULTIPLE instruction, expressed in assembly language form STM $R_1,R_3,D_2(B_2)$,

STM 2,14,0(1)

is expanded to the following sequence:

| | | |
|---|---|---|
| STM | 2,14,0(1) | Issued to BRFU |
| 79 | 3,4,0(1) | |
| 7A | 5,6,0(1) | |
| 7B | 7,8,0(1) | End of first packet |
| 7C | 9,10,0(1) | Start of 2nd packet |
| 7D | 11,12,0(1) | |
| 6E | 13,13,0(1) | End of 2nd packet |

Like all instructions that update memory, each access will occur in sequence and the actual update is not done until each instruction is Committed. Of these instructions only the first, the STM, can generate an interruption. If it generates an interruption, the PC value stored during the interruption process will point to the instruction following the STM in Program Memory and the Instruction Length Code will be $10_2$, as defined for this case in the 370-XA architecture.

An outside interruption (see Interruptions) cannot be allowed between the two packets; therefore, the PC_FIFO entry associated with the second packet has the NO bit set (see PC FIFO and Commit FIFO).

Both the first and the second (if needed) packets have an associated PC FIFO entry that points to the STORE MULTIPLE instruction as the first instruction in the packet. That instruction has an ILC of $10_2$ but the subsequent instructions in the first packet and all instructions in the second packet have an ILC of $00_2$.

The CC and the Predicate

The embodiment described here utilizes two Condition Codes:

(1) The 370-XA defined 2-bit encoded Condition Code (CC) is set by the instructions as defined for the 370-XA and can be tested via the 4-bit Mask-field in the BRANCH ON CONDITION instruction, where each of the 4 mask bits corresponds to a particular decode of the 2-bit CC. Each functional unit has a dedicated CC at its output, but conceptually there is one CC. The BRFU has multiple CC Reservation Stations to capture the appropriate copy of the CC, as it becomes available, for use in the BRANCH ON CONDITION instruction.

(2) The Predicate is a 1-bit CC which is managed and set by the BRFU under control of the Branch Prediction Logic to ensure that "bad guess" paths do not incorrectly modify resources. There is only one Predicate, in the BRFU, but each Functional Unit has multiple Predicate Reservation Stations to capture the proper copy of the Predicate as it becomes available. The Predicate's default state is zero; it is set to one as described below, when Branch Prediction is incorrect. Like other resources, it has a location in the Tag Memory that maintains the Predicate Owner tag, i.e. the tag used to identify the results of the last instruction issued that targeted the Predicate.

All instructions have an added two-bit Predicate Mask (PM) field that is used for evaluating the Predicate. The two Predicate values (0 and 1) correspond with the two bits of PM: 0 and 1, respectively. The PM is used to evaluate the Predicate as follows:

| PM0 | PM1 | Predicate | Instruction Execution |
|---|---|---|---|
| 0 | 0 | X | Unsuccessful (Unconditional NOOP) |
| 0 | 1 | 0 | Unsuccessful |
| 0 | 1 | 1 | Successful |
| 1 | 0 | 0 | Successful |
| 1 | 0 | 1 | Unsuccessful |
| 1 | 1 | X | Successful (Unconditional Execute) |

The default state of the PM field is $10_2$. It is set to $11_2$ only when a correction is made to an incorrectly predicted branch, as described below. Instructions that are successful update the appropriate destinations, while unsuccessful instructions become NOOPs, by copying the previously valid copy of the resource to the destination resource. The decision is made as late as possible in the execution.

Branch instructions (including the EXECUTE instruction) are assigned as OWNER (in the tag memory) of the Predicate when issued. All subsequent instructions, including branches, in the predicted path are conditioned on the Predicate equaling 0, i.e. their PM is set to $10_2$, so that they only modify destinations when the prediction was correct.

When the Predicate needed by the Branch instruction is 0 and the predicted branch target is correct, the Branch instruction sets the Predicate to 0; otherwise, it sets the Predicate to 1. In either case, the tag of the Branch instruction is stored along with the Predicate for matching by subsequent instructions. Setting the Predicate to 1 causes all subsequent instructions in the predicted path to become NOOPs. When multiple levels of Branch paths have been predicted, instructions are successful up to the incorrectly predicted branch. From that point on, the instructions are unsuccessful.

When a branch is executed (also done conditionally) by the BRFU, it (1) compares its generated branch address against the address predicted by the Branch Prediction logic (see the next section for details) and (2) tests the Predicate (captured using the acquired Owner tag) against the PM, as described above. If the predicted address was correct and the PM test is successful, the Predicate is set to 0; otherwise, the Predicate is set to 1.

Branch Prediction and the PC FIFO

PC FIFO entries are, at issue, placed at the top and are removed, at commit, from the bottom of the PC FIFO, i.e. entries remain valid for the life of an instruction's execution from issue, through completion, to commit. Pointers are used to manage which entry is top and which is bottom and to track certain individual entries needed during instruction execution, as described below.

The Branch Prediction Logic supplies PC-values to the top of the PC FIFO as packets are issued. When a branch is not involved, the PC-value indicates the address of the first instruction in the packet and the updated PC (the start of the next packet) is the PC-value incremented by the length of the packet, which varies depending on the number of and length of the instructions in the packet.

When a Branch is encountered, the packet is terminated, the Branch instruction issued to the BRFU contains a pointer to the next PC FIFO entry (the one following the Branch packet), and the subsequent PC-value is predicted. The predicted PC-value is used to fetch the next sequence of instructions, which are conditionally executed, as described above. That predicted PC-value is placed in the PC FIFO entry that is indicated by the pointer provided to the BRFU in the Branch instruction.

Prediction is based on the branch target address entry and a valid-bit associated with the address of the branch instruction. The valid-bit, when one, indicates that the branch target address is valid and should be used as the predicted address. When the valid-bit is zero the predicted address defaults to the address of the instruction immediately following the branch (the fall through case).

When the BRFU executes a branch the predicted branch address needed for comparison to the actual branch address is obtained from the PC FIFO entry using the pointer in the Branch instruction. If the predicted address was correct, the Predicate set as a result of the Branch is 0. If the prediction was incorrect, the predicate set is 1 and the BRFU supplies the calculated Branch address to the Branch Predict to restart instruction fetch at the proper address.

When an incorrect prediction has occurred, the correct target is fetched and the sequence restarts by issuing the correct target, which is unconditionally executed (PM=$11_2$), and the Predicate Owner location in Tag Memory is cleared. The PM used continues to be $11_2$ until a Branch is issued; then it reverts to $10_2$ and the Branch becomes Owner. The PM is changed to $11_2$ because the Branch that detects an incorrect prediction and restarts the fetch sequence, must set the Predicate to 1 so that already issued subsequent instructions that are dependent on that Branch will be NOOP'ed (their PM is $10_2$).

Instructions in an incorrectly predicted Branch path do not cause interruptions when they get to the commit stage; additionally, since all instructions in such a packet are either successful or unsuccessful, when a packet of unsuccessful instructions is being discarded at commit, no interruption can be recognized, i.e. interruptions can only occur when a packet of successful instructions is ready to commit.

EXECUTE INSTRUCTION

The EXECUTE instruction necessitates an extension to the mechanisms described above that is needed by those skilled in the art to build this embodiment. The EXECUTE instruction, which can severely disrupt pipelining if not handled correctly, is a RX-format instruction that:

(1) specifies the address of the next instruction to be executed, called the "EXECUTE target," via the second operand address (X2+B2+D2) and (2) specifies, in bits 24–31 of the register indicated by the R1 field, 8-bits to be logically OR'ed with bits 8–15 of the target before execution.

The modified target is executed and the subsequent instruction is the one immediately following the EXECUTE instruction unless the target is a successful branching instruction. In that case the next instruction is the branch target.

Embodiment—In the embodiment detailed here the EXECUTE and its target are issued in separate packets. The target is accompanied by no other instructions.

The Branch Predict Logic performs three basic functions that ensure, in most cases that the pipeline will be optimally used during an EXECUTE:

(1) The EXECUTE is issued to the Branch Unit, which will set the Predicate, and the address of the instruction following the EXECUTE (EXECUTE+4) is saved.

(2) The Branch Prediction Logic predicts the target address (P-TARGET) and the OR-bit-pattern (P-OR-BITS); puts the P-TARGET address and the P-OR-BITS on the PC-FIFO; fetches P-TARGET; and the Issue Logic applies the P-OR _BITS and issues the target to the appropriate functional unit. The target indicates that it is to conditionally execute (PM=$10_2$), as all instructions normally do.

(3) The saved EXECUTE+4 is used as the predicted subsequent address.

Thus, except for saving and using the EXECUTE+4 address, applying the P-OR-BITS, and placing the P-OR-BITS on the PC FIFO, all fetching is normal. The details of the functional units' involvement in the complete EXECUTE sequence follow.

EXECUTE—The EXECUTE instruction is issued to the BRFU. It acquires the current Predicate Owner tag from Tag Memory and is recorded as the new Owner. As part of the execution of the instruction, the EXECUTE compares bits 24–31 of the register specified by R1 and the calculated second operand address (X2+B2+D2) to the P-OR-BITS and P-TARGET from the PC FIFO. If the Predicate is zero and the predictions (second operand address and P-OR-BITS) were correct, the Predicate set as a result of the EXECUTE is 0. If the predictions were incorrect, the predicate set is 1 and the BRFU supplies bits 24–31 of the first-operand register (R1) and the calculated second operand address to the Branch Predict to fetch the proper target and to modify bits 8–15 of the target instruction.

When an incorrect prediction has occurred, the correct target is fetched, the correct OR-bits are applied, and the sequence restarts by issuing the correct target, which is not conditionally executed (PM=$11_2$) and the Predicate Owner in Tag Memory is cleared. The PM used continues to be $11_2$ until a Branch is issued; then it reverts to $10_2$ and that Branch becomes Predicate Owner.

P-TARGET—The predicted target (or correct target) is issued to the appropriate functional unit. The functional unit executes the target instruction, as controlled by the conditional execute decision.

A target issued to the BRFU is executed by the BRFU as any other instruction. If the instruction is a Branch, the actions are the same as described above.

Subsequent Instructions—Following the issue of P-TARGET, the EXECUTE+4 address and subsequent instructions in the Predicted Path are issued, as they normally are. Note that, if the PM used was set to $11_2$ by a target correction, that PM continues to be used until a Branch is issued.

INTERRUPTIONS

As previously described, Bit 6 of the Commit FIFO Indicator Byte indicates, when one, that an interruption condition has been detected for the corresponding instruction (Functional Unit). Bit 7 indicates, when one, that the results of the instruction are not to be committed. When bit 7 is a 0, the results are committed. Bit 7 permits the results of an interruption causing instruction to be committed, when necessary as defined by the IBM 370-XA architecture[IBM—1] ( IBM defines this as instruction completion versus suppression or termination).

Bits 6 and 7 are set to zero when the packet is issued. During execution a functional unit sets Bit 6 when an interruption condition is detected and also sets Bit 7 when appropriate. Whenever an interruption condition is indicated by bit 6, the normal Result FIFO entry contains the results of the instruction and the next Result FIFO entry contains the interruption information (e.g. interruption class and interruption code). Note that in certain cases, defined by the 370-XA as instruction termination, the result data or condition code of an instruction may be unpredictable.

The tag memory is initialized to all zeros, including the Functional Unit identifier, indicating that the Real Register and CC's are the sources to the Register crossbar. When an instruction is issued which specifies a destination register or CC, the associated tag memory location is updated. When the Virtual Resource is updated, that Virtual Resource then becomes the source to the Register Crossbar. Note that the Real Resources do not have a tag field, since an all zeros tag is implied.

During an interruption, all tag memory locations, except Memory Coherency Tags and Instance Counts, are cleared to all zeros, automatically selecting the Real Resources as sources. Since the Virtual Results in the pipeline are flushed during an interruption, the use of the Real Resources is exactly what we want to occur.

When all zeros are written into a tag memory location, the Real Resource is selected as input to the Register Crossbar. When instruction completion writes to the associated Virtual Register or Virtual CC and the associated Tag Memory location is non-zero, the associated CS bit is set, causing the Virtual Resource to be selected as source to the Register Crossbar.

When an interruption is recognized at the Commit Stage the Branch Predict Logic is signaled. The Interrupt In Progress (IIP) flag is set and an interruption Vector address and an Interruption Indicator (II) is pushed onto the PC_FIFO by the Branch Predict Logic. The arrival of a complete packet, with the II-bit set, for commitment at the Commit Stage, i.e. the first packet of the Interruption Handler, resets the IIP flag. While the IIP flag is set all packets ready to commit are discarded, i.e. the Result FIFO contents are not written to the Real Registers and CCs.

Interruptions that are not generated in the process of executing an instruction, e.g. timer interruptions and I/O interruptions, are called "outside interruptions" here (not an IBM term). Outside interruptions are routed to the commit logic and when a packet is ready for commit, the outside interruption is recognized according to the IBM 370-XA interruption definitions. The packet does not commit and the Real PC reflects the start of that packet.

The No Outside Interruption bit (NO) on the Commit FIFO indicates when true that the packet cannot be nullified by an outside interruption (see "PC FIFO and Commit FIFO, 370-XA"). This bit is used in the execution of some STORE MULTIPLE instructions (see LOAD MULTIPLE and STORE MULTIPLE).

Other commit strategies are possible, but the important point is that if a Branch instruction is committed, the PC that is committed must reflect the resolved branch address, whether a branch actually occurs or the branch falls-through to the next instruction.

Self-Modifying Code

The 370-XA[IBM—1] allows self-modifying code by defining that "each operation appears to the program to be performed sequentially, with the current instruction being fetched after the preceding operation is completed and before the execution of the current operation is begun. Thus, it is possible for an instruction to modify the next succeeding instruction in storage."

Since instruction execution is highly overlapped in this embodiment, it is necessary to recover from self-modifying code, i.e. to detect the event and reissue instructions that are modified. This is done by comparing the store address at commit to all the PC FIFO entries (bottom to top). If a modification of subsequent instructions in the pipeline is detected, those instructions are marked, in the PC FIFO, as modified via the M-bits. When an instruction marked as modified reaches the commit point, only the logically preceding instructions in the packet are committed and a pseudo interruption occurs.

During a pseudo interruption the Interrupt In Progress (IIP) flag is set, and a new packet starting at the modified instruction is fetched (instead of the interruption vector address that would be used during an interruption). That new packet has the Interrupt Indicator (II) set. The IIP remains set until the packet containing the II reaches the commit point. During that period all packets are discarded, i.e. they do not modify the permanent state of the machine, they do not cause interruptions, and they do not cause pseudo interruptions.

Advantage of the Present Invention in Prior Art CISC (370-XA)

Prior Art CISC—The workload described by MacDougall [MacD1] is used to estimate the performance of a prior art 50 MHz clock rate 370-XA machine and the present embodiment. The prior art machine is the Amdahl design described by MacDougall. Table 2 (reproduced from the referenced work) shows, for that prior art 370-XA, f (instruction frequency), e (instructions base execution cycles), and d (instruction delays) for the most frequently executed 69% of the instructions. Based on that 69% the performance for 100% is extrapolated. Thus the average instruction is estimated to take 2.23 cycles. The 2.23 cycles is composed of 1.22 cycles basic execution time, 0.69 cycles of dependency delay, and 0.32 cycles of cache miss delay. At 50 MHz that converts to 22.4 IBM MIPS.

TABLE 2

| | Workload Execution By Prior Art 370-XA Processor | | | | | | |
|---|---|---|---|---|---|---|---|
| OP CODE | f | e | f*e | d | f*d | e+d | f*(e+d) |
| BC | 0.18532 | 1 | 0.18532 | 1.029 | 0.190694 | 2.029 | 0.376014 |
| L | 0.14447 | 1 | 0.14447 | 0.428 | 0.061833 | 1.428 | 0.206303 |
| TM | 0.06289 | 1 | 0.06289 | 0.408 | 0.025659 | 1.408 | 0.088549 |
| ST | 0.05122 | 1 | 0.05122 | 0.580 | 0.029707 | 1.58 | 0.080927 |
| LR | 0.04864 | 1 | 0.04864 | 0.087 | 0.004231 | 1.087 | 0.052871 |
| LA | 0.04645 | 1 | 0.04645 | 0.313 | 0.014538 | 1.313 | 0.060988 |
| BCR | 0.03035 | 1 | 0.03035 | 1.437 | 0.043612 | 2.437 | 0.073962 |
| LTR | 0.02903 | 1 | 0.02903 | 0.773 | 0.022440 | 1.773 | 0.051470 |
| MVC | 0.02226 | 4.667 | 0.10389 | 0.982 | 0.021859 | 5.649 | 0.125746 |
| IC | 0.01790 | 1 | 0.0179 | 0.802 | 0.014355 | 1.802 | 0.032255 |
| LH | 0.01765 | 1 | 0.01765 | 0.625 | 0.011031 | 1.625 | 0.028681 |
| BALR | 0.01647 | 1 | 0.01647 | 1.601 | 0.026368 | 2.601 | 0.042838 |
| STM | 0.01563 | 5.543 | 0.086637 | 0.559 | 0.008737 | 6.102 | 0.095374 |
| | | | | | | | |
| TOTALS | 0.68828 | | 0.840914 | | 0.475069 | | 1.315984 |
| 100% | 1.0 | | 1.221762 | + | 0.690227 | = | 1.911989 |
| | | | | + | Cache Miss | = | 0.32 |

| | | | |
|---|---|---|---|
| Cycles/Inst | = | 2.231989 | |
| I (INST/CYCLE) | = | 0.448 | |
| MIPS @ 50 MHz | = | 22.4 MIPS | |

Embodiment of the Present Invention—About 25% of the workload is executed by the BRFU (branches), about 60% is executed by any one of the 3 General Functional Units (general instructions), and about 15% is executed by the SSFU and FPFU (SS and Floating-Point instructions). The parallel issue mechanism of the present embodiment is able to issue 2.5 instructions/cycle on average. The following tabulates all possible combinations of instruction sequences that can be placed in a single packet. BR indicates a branch instruction, which terminates a packet. GEN indicates a general instruction and SS indicates a SS (or Floating-Point) instruction. Lower case "gen" or "ss" indicates the packet is terminated because that instruction type cannot be placed. The columns on the right side of the table indicate the probability of the combination at the left. For example, the probability of the first and only instruction in a packet being a BR is 25%; the probability of the two instruction sequence GEN BR is 60% *25%= 15%.

The sums of the individual probabilities in the right 5 columns, called TOTALS, are the probabilities that a packet will contain 1 to 5 instructions. Those five TOTALS sum to 1.0 as a check. The individual TOTALS multiplied by the number of instructions in a packet for that probability result in TOTAL ISSUED. The sum of the five TOTAL ISSUED values is the average number of instructions per packet.

| ORDER OF INSTRUCTIONS | | | | | PKT SIZE & PROBABILITY | | | | |
|---|---|---|---|---|---|---|---|---|---|
| 1 | 2 | 3 | 4 | 5 | 1 | 2 | 3 | 4 | 5 |
| BR | | | | | .25 | | | | |
| GEN | BR | | | | | .15 | | | |
| GEN | GEN | BR | | | | | .09 | | |
| GEN | GEN | GEN | BR | | | | | .054 | |
| GEN | GEN | GEN | gen | | | | | .1296 | |
| GEN | GEN | GEN | SS | BR | | | | | .0081 |
| GEN | GEN | GEN | SS | gen | | | | .01944 | |
| GEN | GEN | GEN | SS | ss | | | | .00486 | |
| GEN | GEN | SS | BR | | | | | .01350 | |
| GEN | GEN | SS | GEN | BR | | | | | .0081 |
| GEN | GEN | SS | GEN | gen | | | | .01944 | |
| GEN | GEN | SS | GEN | ss | | | | .00486 | |
| GEN | SS | BR | | | | | .0225 | | |
| GEN | SS | GEN | BR | | | | | .01350 | |
| GEN | SS | GEN | GEN | BR | | | | | .0081 |
| GEN | SS | GEN | GEN | gen | | | | .01944 | |
| GEN | SS | GEN | GEN | ss | | | | .00486 | |
| SS | BR | | | | | .0375 | | | |
| SS | GEN | BR | | | | | .0225 | | |
| SS | GEN | GEN | BR | | | | | .0135 | |
| SS | GEN | GEN | GEN | BR | | | | | .0081 |
| SS | GEN | GEN | GEN | gen | | | | .01944 | |
| SS | GEN | GEN | GEN | ss | | | | .00486 | |
| SS | ss | | | | .0225 | | | | |
| SS | GEN | ss | | | | | .0135 | | |
| SS | GEN | GEN | ss | | | | | .0081 | |

-continued

| ORDER OF INSTRUCTIONS | | | | | PKT SIZE & PROBABILITY | | | | | |
|---|---|---|---|---|---|---|---|---|---|---|
| 1 | 2 | 3 | 4 | 5 | 1 | 2 | 3 | 4 | 5 | |
| TOTALS | | | | | .2725 | .2145 | .2889 | .1917 | .0324 | = 1.000 |
| | X | | | | 1 | 2 | 3 | 4 | 5 | |
| TOTAL ISSUED | | | | | .2725 | .4290 | .8667 | .7668 | .1620 | = 2.497 |

Thus about 2.5 instructions are issued in the average packet, meaning that the average instruction needs 0.4 cycles to execute. That base execution time is used in Table 3 to estimate the performance in execution of the above described workload. Branch prediction is projected to be incorrect in 5% of the cases. The BC, BCR, and BALR instructions are estimated to cause 4 holes in the pipeline when prediction is wrong, thus the delay included is 0.05*4= 0.2. Other holes, caused by data dependencies are assumed to be recovered via High Bandpass Commit (U.S. patent Ser. No. SNTBD3, Computer Processor with Improved Commit, filed DATETBD3).

The Reduced Dependency Delays are due to (1) the conditional execution aspect of the present invention and its enhancements, which allows instructions in the predicted Branch paths to be safely issued before Branch resolution occurs; (2) Indicator Based Commit (U.S. patent Ser. No. SNTBD3, Computer Processor with Improved Commit, filed DATETBD3) which permits out-of-order execution but supports the required in-order commit; and (3) High Bandpass Commit (U.S. patent Ser. No. SNTBD3, Computer Processor with Improved Commit, filed DATETBD3) which provides the ability to make up for incurred pipeline delays.

TABLE 3

Workload Execution By IBM 370-XA Embodiment

| OP CODE | f | e | f*e | d | f*d | e+d | f*(e+d) |
|---|---|---|---|---|---|---|---|
| BC | 0.18532 | 0.4 | 0.07413 | 0.200 | 0.037064 | 0.600 | 0.111192 |
| L | 0.14447 | 0.4 | 0.05779 | 0.000 | 0.000 | 0.400 | 0.057788 |
| TM | 0.06289 | 0.4 | 0.02516 | 0.000 | 0.000 | 0.400 | 0.025156 |
| ST | 0.05122 | 0.4 | 0.02049 | 0.000 | 0.000 | 0.400 | 0.020488 |
| LR | 0.04864 | 0.4 | 0.01946 | 0.000 | 0.000 | 0.400 | 0.019456 |
| LA | 0.04645 | 0.4 | 0.01858 | 0.000 | 0.000 | 0.400 | 0.01858 |
| BCR | 0.03035 | 0.4 | 0.01214 | 0.200 | 0.00607 | 0.600 | 0.01821 |
| LTR | 0.02903 | 0.4 | 0.01161 | 0.000 | 0.000 | 0.400 | 0.011612 |
| MVC | 0.02226 | 0.4 | 0.00890 | 0.000 | 0.000 | 0.400 | 0.008904 |
| IC | 0.01790 | 0.4 | 0.00716 | 0.000 | 0.000 | 0.400 | 0.00716 |
| LH | 0.01765 | 0.4 | 0.00706 | 0.000 | 0.000 | 0.400 | 0.00706 |
| BALR | 0.01647 | 0.4 | 0.00659 | 0.200 | 0.003294 | 0.600 | 0.009882 |
| STM | 0.01563 | 1.0 | 0.01563 | 0.000 | 0.000 | 1.000 | 0.01563 |
| | 0.68828 | | 0.28469 | | 0.046428 | | 0.331118 |
| | | | 0.41363 | + | 0.067455 | = | 0.481080 |
| | | | | + | Cache Miss | = | 0.32 |
| | | | | Cycles/Inst | | = | 0.801080 |
| | | | | I (INST/CYCLE) | | = | 1.248 |
| | | | | MIPS @ 50 MHz | | = | 62.4 MIPS |

The STORE MULTIPLE execution time of 1 cycle is based on storing 8 registers.

The significant improvement in I (Instructions/Cycle) from 0.45 to 1.248 is due to the improvement in basic execution time and to the reduced dependency delays. These two improvements account for about 60% and 40% of the total improvement, respectively.

The Improved Basic Execution Time is due to the improved described in patent application, U.S. patent Ser. No. SNTBD1, Computer Processor with Improved Storage, filed DATETBD1, where the dedicated output register aspect and its enhancements allows virtual results of out-of-order instructions to be freely used before those results are properly reordered for commit; and where Sequential Memory Coherency Tagging correctly orders main memory references at the maximum possible rate. These advances permit multiple parallel instructions to be issued before their needed data and condition codes may be available and before memory hazards have been detected.

Additional Embodiments

The following examples of use of the present invention to improve existing prior art architectures are provided, but explained in less detail than the preceding 4 embodiments. Those skilled in the art will understand that the preceding detailed embodiments provide sufficient understanding of the various aspects of the present invention to permit their application to these architectures:

Simple RISC (Reduced Instruction Set Computer)

Registered Crossbar Network

Data Synchronized Pipeline Architecture

Queue Based Vector Processor

Systolic Pipelined Network

Simple RISC (Reduced Instruction Set Computer)—Prior art RISC architectures, even those with only one Functional Unit, can benefit substantially from the present invention, as shown in FIG. 32.

FIG. 32 is composed of Instructions 101, the Instruction Issue Unit 102, a single Pipelined Functional Unit 1030, and a single General Register File 1035. The Instruction Issue Unit 102 obtains Instructions 101 and issues them to the Pipelined Functional Unit 1030, which gets the sources determined by the instructions from the General Register File 1035 and supplies results that are written to the General Register File 1035, as determined by the instructions.

The processor of FIG. 32 is pipelined and there are no hardware interlocks, i.e. static scheduling is used. The Functional Unit is minimally capable of performing Loads and Stores between the registers and memory and of performing a set of arithmetic and logic operations on data in the registers. To improve the clock rate delayed branching, with a branch umbra of 2 instructions, is used. Instructions are issued at the maximum rate of one instruction per cycle.

For this type architecture, Conditional Execution permits Branch instructions to be eliminated in many cases by simply placing the target of the Branch in line and executing that instruction conditionally. For example, the FORTRAN statement

*IF (A .EQ. B)C=C+1* or the equivalent C-language statement

*if (a==b) c++;* without and with Conditional Execution produces the code sequences:

| Without Cond. Exec. | With Cond. Exec. |
|---|---|
| COMPARE A,B | COMPARE A,B |
| GOTO CPLUS | ADD_I/S C,C,1 |
| IF .EQ. | IF .EQ. |
| NOOP | NEXT (Next statement) |
| NOOP | |
| NEXT (Next statement) | |
| CPLUS GOTO NEXT | |
| ADDI/S C,C,1 | |

Without Conditional Execution 4 cycles are required when A does not equal B and 7 cycles are required when A does equal B. The two NOOPs after the GOTO . . . IF instruction are for the branch umbra and the GOTO NEXT instruction is placed before the ADDI/S to better utilize the branch umbra.

With Conditional Execution only 2 cycles are required for either case. The ADD instruction simply updates or does not update register C, based on the condition code of the COMPARE. The placement of the ADD instruction directly following the COMPARE is possible because the ADD is issued and begins execution before the condition code from the COMPARE is available. The decision to update C is done just before the register is to be written.

Additionally, in this type of architecture, when Branch instructions are required, Conditional Execution allows the branch umbra to be efficiently used. Conditional Execution improves all three dimensions of the Performance Capacity box (FIG. 1):

N—Operations/Instruction is improved because fewer instructions are needed to perform an operation (ADD).

I—Instructions/Cycle is improved because fewer NOOPs are needed. Note that if hardware interlocks were included the NOOPs would be replaced by hardware generated holes.

C—Cycles/Second is improved because the pipeline can be more aggressively segmented and the clock speeded up since fewer holes or NOOPS are needed.

Specifically five elements of the present invention are directly applicable to the Simple RISC architecture shown:

(1) Conditional Execution (2) CC Mask Field (3) Set CC Field (4) Stale CC Handling (5) Multiple CCs The CC Reservation Station element is not needed in a static scheduling architecture.

Registered Crossbar Network—The prior art Registered Crossbar Network Architecture shown in FIG. 8a is significantly improved through the application of the present invention as shown in FIG. 33. The aspects of the present invention that are applied to the Registered Crossbar Network are Conditional Execution CC Mask Field Set CC Field Stale CC Handling Multiple CCs The CC Reservation Station Scheduling element is not applicable, because the Registered Crossbar architecture is a static scheduling architecture.

FIG. 33 is composed of the following elements:

Instructions 101 and the Instruction Issue Unit 102

The Storage to Operating Units Connection 103, which is a folded crossbar with Folding Logic 121 and Unfolding Logic 122

The Operating Units 104, which comprises multiple Functional Units

The Operating Units to Storage Connections 105, which are direct due to the use of Dedicated Result Storage (U.S. patent Ser. No. SNTBD1, Computer Processor with Improved Storage, filed DATETBD1)

The Storage Elements 106 are composed of a set of register dedicated to the results of a particular Operating Unit 104, available as sources to all Operating Units, and conditionally updated based on the Conditional Execution Decision 160.

The present invention and its enhancements improves all three dimensions of performance capacity (see FIG. 1):

N—Operations/Instruction is improved because fewer instructions are needed to perform an operation.

I—Instructions/Cycle is improved because fewer NOOPs are needed.

C—Cycles/Second is improved because the pipeline can be more aggressively segmented and the clock speeded up since fewer holes or NOOPS are needed.

Figure 10A:
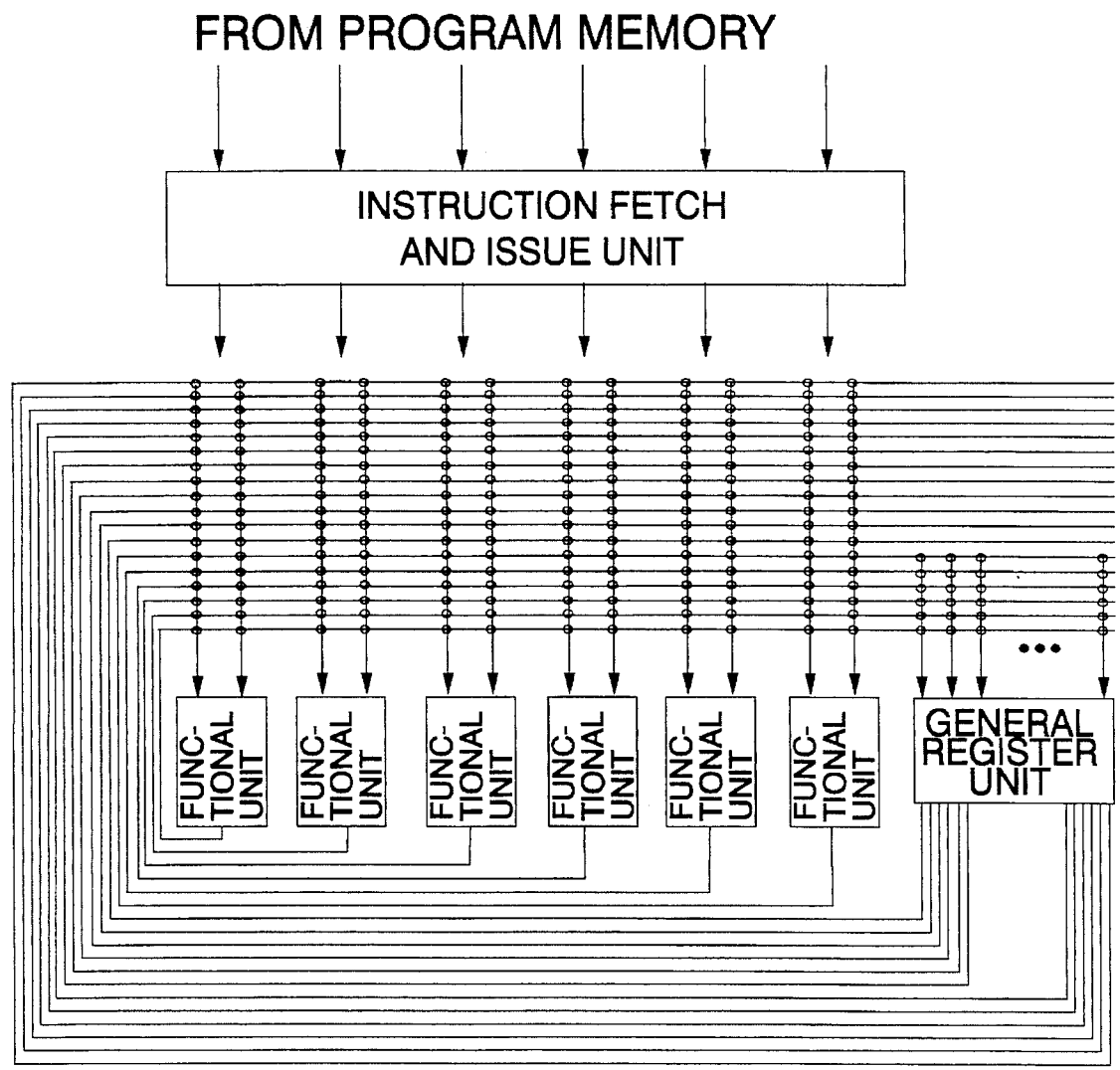
FIGS. 10a and 10b show the block diagram of a Data Synchronized Pipelined Architecture or DSPA (see page 13).
Figure 10B:
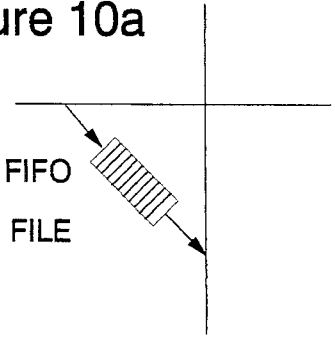

Data Synchronized Pipeline Architecture—The prior art DSPA shown in FIGS. 10a and 10b is a dynamic scheduling architecture where results become sources in a pure one-to-one relationship through a pure FIFO queue at each crosspoint (each row of the crossbar is for results from a particular Functional Unit and each column of the crossbar is a source to a particular Functional Unit). This architecture is significantly improved through the application of the present invention as shown in FIGS. 34a and 34b.

FIG. 34a is composed of the following elements:

Instructions 101 and the Instruction Issue Unit 102

The Storage to Operating Units Connection 103, which is a folded crossbar in this example The Operating Units 104, which comprises multiple Functional Units The Operating Units to Storage Connections 105, which are direct due to the use Dedicated Result Storage (U.S. patent Ser. No. SNTBD1, Computer Processor with Improved Storage, filed DATETBD1).

The Storage Elements 106 are composed of FIFO Register Files 1045, as detailed in FIG. 34*b*.

The aspects of the present invention that are applied to the DSPA are

Conditional Execution

CC Mask Field

Set CC Field

Stale CC Handling

Multiple CCs

The CC Reservation Stations element of the present invention is not applicable.

Conditional Execution and its enhancements are used to benefit when writing to the general registers and on Store operations. It cannot be used in FIFO writes in the DSPA type architecture, as previously detailed, because of the necessary one-to-one correspondence between producer and consumer.

Queue Based Vector Processor—The QVC Architecture of FIG. 11*a* is significantly improved through the application of the present invention as shown in FIGS. 35*a* and 35*b*.

FIG. 35*a* is composed of the following elements:

Instructions 101 and the Instruction Issue Unit 102

The Storage to Operating Units Connection 103, which is a folded crossbar in this example The Operating Units 104, which comprises multiple Functional Units The Operating Units to Storage Connections 105, which are direct due to the use Dedicated Result Storage (U.S. patent Ser. No. SNTBD1, Computer Processor with Improved Storage, filed DATETBD1)

The Storage Elements 106 are composed of a mixture of Registers 115 and Queues 1055, as detailed in FIG. 35*b*. The Registers are conditionally updated based on the Conditional Execution Decision 160, while the Queues are used for linked repetitive operations as described in the QVC section (prior art).

All the aspects of the present invention apply to the QVC.

Conditional execution and its enhancements can be used to significant advantage, when writing to the general registers and on Store operations. These elements are not usable for Queue operations, without modifying the definition of those operations within the QVC architecture.

Systolic Pipelined Network—The prior art Systolic Pipelined Network (see FIG. 12) is significantly improved through the application of the present invention as shown in FIGS. 36*a* and 36*a* is composed of the following elements:

(1) Instructions 101 and the Instruction Issue Unit 102

(2) The Storage to Operating Units Connection 103, which is a folded crossbar in this example (3) The Operating Units 104, which comprises multiple Functional Units (4) The Operating Units to Storage Connections 105, which are directly due to the use of Dedicated Result Storage (U.S. patent Ser. No. SNTBD1, Computer Processor with Improved Storage, filed DATETBD1)

(5) The Storage Elements 106 are composed of Programmable Variable Delay Elements 1050, as detailed in FIG. 36*b*.

(6) The CYCLE Counter 1160 which is a modulo-n binary counter that increments on each cycle.

The aspects of the present invention that are applied to the Systolic Pipelined Network are Conditional Execution CC Mask Field Set CC Field Stale Condition Code Handling Multiple CCs The Systolic Pipelined Network, as described in the prior art, is a Static Scheduling architecture; therefore the CC Reservation Stations element of the present invention is not applicable.

In operation each Functional Unit of the prior art Systolic Pipelined Network can be thought of as receiving results at a predetermined time sent to it by some previous operation, executing the function defined to be done at the current time, and sending results to one or more other functional units for arrival at some predetermined future time specified by delays. The delay to each destination can be different, even for the same result. Delays and routing are configured before execution begins to match the problem.

To understand the improvement offered by the configuration shown in FIG. 36*a*, we need to think of the operation of a Functional Unit as reading (as a source) a result produced by another functional unit at some previous time specified by a delay, executing the function defined to be done at the current time, and providing the result for reading by subsequent operations. The delay associated with each source can be different. That is in FIG. 36*a* the inputs to an operation are defined in terms of sources and delays for those sources, rather than being defined in terms of destinations and delays for those destinations.

Each Functional Unit then has a single set of Dedicated Result Storage Resisters for holding the results of that functional unit. Results are entered into particular locations in that set of registers based on their time of production.

In FIG. 36*a* the value of CYCLE Counter 1180 (a three-bit global binary counter) defines time in term of CYCLE (0–7). A result produced when CYCLE is 0 is written to location 0 of the Dedicated Result Storage Registers, a result produced when CYCLE is 1 is written to location 1 of the Dedicated Result Storage Registers.

An operation to be performed at a Functional Unit is specified in the basic form:

| OP CODE | CC MASK | SRC CC FU# | SRC CC DELAY | SRC A FU# | SRC A DELAY | SRC B FU# | SRC B DELAY |
|---------|---------|------------|--------------|-----------|-------------|-----------|-------------| where the SRC A FU#, SRC B FU#, and SRC CC FU# specify the Dedicated Result Storage Register set and the SRC A DELAY, SRC B DELAY, and the SRC CC DELAY specify the number of cycles previous that the result needed for Source A, Source B, and Source CC was produced, respectively. The index into the Dedicated Result Storage Register set is calculated by subtracting (modulo 8) the DELAY for SRC x from the current value of CYCLE. For example, if the needed source was produced 4 cycles earlier and the current value of CYCLE is 1:

```
 CYCLE = 0 0 1   1
-DELAY = 1 0 0   4
 INDEX = 1 0 1   5
```

That is, a result written at CYCLE=5 is one cycle old at CYCLE=6, two cycles old at CYCLE=7, three cycles old at CYCLE=0, and four cycles old at CYCLE=1.

To further explain the operation of the various aspects of the present invention, the Systolic Pipelined Network (SPN) Embodiment is described below. The SPN Embodiment is based on the Basic Common Embodiment of FIG. 19, with a 3-bit CYCLE count added, and with the Basic Instruction Set modified as follows:

(1) The source fields $R_a$ and $R_b$ specify a Register Set (via a Functional Unit identifier) and a Delay-value used as a relative index into that Register Set (relative to CYCLE).

(2) The destination field $R_d$ specifies a Delay-value or relative index into the Dedicated Result Storage Register Set (relative to CYCLE), i.e. $R_d=0$ means store the result at the location indexed by CYCLE, $R_d=1$ means store the result at CYCLE-1 for CYCLE+7), $R_d=7$ means store the result at CYCLE-7 for CYCLE+1).

(3) The CC Select field specifies a Condition Code Set (via a Functional Unit identifier) and a Delay-value used as a relative index into that Condition Code Set (relative to CYCLE).

4) The IRA bit in the LOAD, LOAD INDEXED, STORE, and STORE INDEXED instructions, when set to one, indicates that the calculated address should be saved in the local Address Registers at the register corresponding with CYCLE on the cycle when the calculated address becomes available.

(4) When a LOAD or a LOAD INDEXED instruction specifies the T or Q /f-modifier (2 registers) the registers are the register selected by $R_d$, as described above, and the next subsequent register.

In all other respects, the SPN Embodiment operates like the Basic Common Embodiment, including Condition Codes, Memory, Cache, Branching, etc.

For the problem of FIG. 12, the operational sequence for the SPN Embodiment for the computational loop is as shown below, for two iterations. Iteration n depends on a previous iteration, not shown and Iteration n+1 depends on Iteration n (the pattern repeats every 4 iterations), The setup and control (e.g. looping branches) of the execution are not shown.

The columns to the right of the instructions detail the dynamic calculation of the source and destination registers based on the current value of CYCLE and the DELAY values specified in the instructions:

RQ—the dynamically acquired value of CYCLE when the input is required

DLS—the Source Delay specified in the instruction

SRC—the dynamically calculated RQ+DLS value, the number of the sourced register

END—the dynamic value of CYCLE when the result is produced

DLD—the Destination Delay specified in the instruction or implicit in the /f-modifier DEST—the dynamically calculated END+DLD value, the number of the destination register For example, the Load of X(k) and X(k+1) by the first instruction in Iteration n is to registers 4 and 5 (specified as a Delay of 0 and an implied Delay of 1 for the second result). The register 4 contents are SRC A to the SUBF/D X(K)-V(K)*X(K-1) executed by ADD1. Register 5 is SRC B to the MULF/D V(k+1)*X(k+1) executed by MUL2 in Iteration n and is SRC B to the MULF/D V(k)*X(k-1) executed by MUL1 in Iteration n+1—the datum that was X(k+1) in Iteration n is X(k-1) in Iteration n+1, after k is incremented by 2.

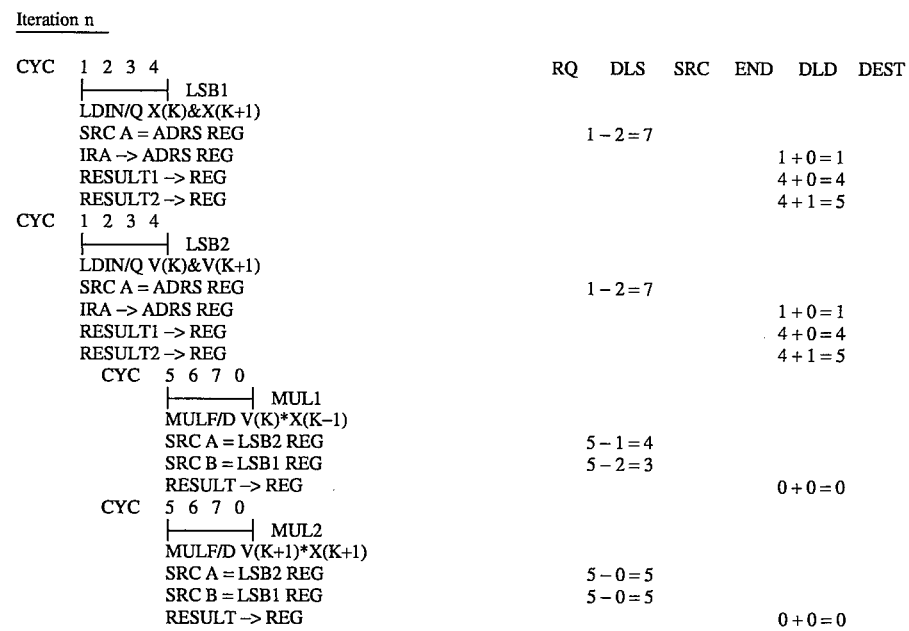

```
Iteration n

CYC  1 2 3 4
     |-------| LSB1
     LDIN/Q X(K)&X(K+1)
     SRC A = ADRS REG                RQ   DLS   SRC   END   DLD   DEST
     IRA -> ADRS REG                 1 - 2 = 7
     RESULT1 -> REG                                          1 + 0 = 1
     RESULT2 -> REG                                          4 + 0 = 4
CYC  1 2 3 4                                                 4 + 1 = 5
     |-------| LSB2
     LDIN/Q V(K)&V(K+1)
     SRC A = ADRS REG                1 - 2 = 7
     IRA -> ADRS REG                                         1 + 0 = 1
     RESULT1 -> REG                                          4 + 0 = 4
     RESULT2 -> REG                                          4 + 1 = 5
     CYC  5 6 7 0
          |-------| MUL1
          MULF/D V(K)*X(K-1)
          SRC A = LSB2 REG           5 - 1 = 4
          SRC B = LSB1 REG           5 - 2 = 3
          RESULT -> REG                                      0 + 0 = 0
     CYC  5 6 7 0
          |-------| MUL2
          MULF/D V(K+1)*X(K+1)
          SRC A = LSB2 REG           5 - 0 = 5
          SRC B = LSB1 REG           5 - 0 = 5
          RESULT -> REG                                      0 + 0 = 0
```

-continued
```
CYC  1 2
     |----| ADD1
          SUBF/D X(K)-V(K)*X(K-1)
          SRC A = LSB1 REG           1 - 5 = 4
          SRC B = MUL1 REG           1 - 1 = 0
          RESULT -> REG                              2 + 0 = 2
  CYC  3 4
       |----| ADD1
            SUBF/D [X(K)-V(K)*X(K-1)]-[V(K+1)*X(K+1)]
            SRC A = ADD1 REG         3 - 1 = 2
            SRC B = MUL2 REG         3 - 3 = 0
            RESULT -> REG                            4 + 0 = 4
CYC  2 3 4 5
     |--------| LSB1
              STIN/D -> X(I)
              SRC A = ADRS REG       2 - 2 = 0
              IRA -> ADRS REG                        2 + 0 = 2
              SRC D = ADD1 REG       5 - 1 = 4
```

Iteration n+1

```
CYC  3 4 5 6                              RQ   DLS   SRC   END   DLD   DEST
     |------| LSB1
            LDIN/Q X(K)&X(K+1)
            SRC A = ADRS REG         3 - 2 = 1
            IRA -> ADRS REG                                3 + 0 = 3
            RESULT1 -> REG                                 6 + 0 = 6
            RESULT2 -> REG                                 6 + 1 = 7
CYC  3 4 5 6
     |------| LSB2
            LDIN/Q V(K)&V(K+1)
            SRC A = ADRS REG         3 - 2 = 1
            IRA -> ADRS REG                                3 + 0 = 3
            RESULT1 -> REG                                 6 + 0 = 6
            RESULT2 -> REG                                 6 + 1 = 7
    CYC  7 0 1 2
         |------| MUL1
                MULF/D V(K)*X(K-1)
                SRC A = LSB2 REG     7 - 1 = 6
                SRC B = LSB1 REG     7 - 2 = 5
                RESULT -> REG                              2 + 0 = 2
    CYC  7 0 1 2
         |------| MUL2
                MULF/D V(K+1)*X(K+1)
                SRC A = LSB2 REG     7 - 0 = 7
                SRC B = LSB1 REG     7 - 0 = 7
                RESULT -> REG                              2 + 0 = 2
      CYC  3 4
           |----| ADD1
                SUBF/D X(K)-V(K)*X(K-1)
                SRC A = LSB1 REG     3 - 5 = 6
                SRC B = MUL1 REG     3 - 1 = 2
                RESULT -> REG                              4 + 0 = 4
       CYC  5 6
            |----| ADD1
                 SUBF/D [X(K)-V(K)*X(K-1)]-[V(K+1)*X(K+1)]
                 SRC A = ADD1 REG    5 - 1 = 4
                 SRC B = MUL2 REG    5 - 3 = 2
                 RESULT -> REG                             6 + 0 = 6
        CYC  4 5 6 7
             |--------| LSB1
                      STIN/D -> X(I)
                      SRC A = ADRS REG   4 - 2 = 2
                      IRA -> ADRS REG                      4 + 0 = 4
                      SRC D = ADD1 REG   7 - 1 = 6
```

Conditional Execution along with the enhancements CC Mask Field, Set CC Field, Stale CC Handling, and Multiple CCs can be directly used by the Systolic Pipelined Network to permit the use of pipeline networking methodology[Hwan1] in problems that involve dynamic decisions, i.e. to a large class of problems that were not previously candidates for Systolic Pipelines.

To show the operation of the SPN Embodiment with an intense data dependency example, LFK24, previously used to illustrate vector mode of the Vector Instruction Embodiment, is used.

LFK 24—FIND LOCATION OF FIRST MINIMUM IN ARRAY

FORTRAN SOURCE
```
       X(n/2) = -1.0E + 10
       DO 24 L = 1, Loop
            m = 1
       DO 24 k = 2, n
            IF( X(k) .LT. X(m)) m = k
       CONTINUE
```

For the inner loop of this kernel the SPN Embodiment code and flow are as shown below for two iterations. Iteration n depends on a previous iteration, not shown, and Iteration n+1 depends on Iteration n. The pattern repeats every 4 iterations. The setup and control (e.g. looping branches) of the execution are not shown.

```
Iteration n
CYC  1 2 3 4                                       RQ      DLS     SRC    END     DLD     DEST
     |-------| LSB1
     LDIN/D  X(K)
     SRC A = ADRS REG                                      1-2=7
     IRA -> ADRS REG                                                              1+0=1
     RESULT -> REG                                                                        4+0=4
        CYC  5 6
             |---| ADD1
             CMPF/D X(K):X(M)
             SRC A = LSB1                                  5-1=4
             SRC B = ADD2                                  5-0=5
             CC -> CC#                                                                    6+0=6
        CYC  5 6
             |---| ADD2
             MOVE/D X(M) -> X(M)
             SRC A = ADD2 REG                              5-0=5
             RESULT-> REG                                                                 6+1=7
           CYC  6 7
                |---| ADD2
                MOVE/D X(K) -> X(M) IF .LT.
                SRC A = LSB1 REG                           6-2=4
                SRC CC= ADD1 CC#                           7-1=6
                RESULT-> REG                                                              7+0=7
     CYC  3 4
          |---| MUL1
          ADDI/S K = K+1
          SRC A = MUL1                                     3-1=2
          SRC B = 1 (CONSTANT)
          RESULT-> REG                                                                    4+0=4
        CYC  5 6
             |---| MUL2
             MOVE/S K -> M
             SRC A = MUL1 REG                              5-1=4
             RESULT-> REG                                                                 6+1=7
           CYC  6 7
                |---| MUL2
                MOVE/S M-> M IF .GE.
                SRC A = MUL2                               6-1=5
                SRC CC= ADD1 CC#                           7-1=6
                RESULT-> REG                                                              7+0=7
Iteration n+1
     CYC  3 4 5 6
          |-------| LSB1
          LDIN/D X(K)
          SRC A = ADRS REG                                 3-2=1
          IRA -> ADRS REG                                                         3+0=3
          RESULT -> REG                                                                   6+0=6
             CYC  7 0
                  |---| ADD1
                  CMPF/D X(K):X(M)
                  SRC A = LSB1 REG                         7-1=6
                  SRC B = ADD2 REG                         7-0=7
                  CC -> CC#                                                               0+0=0
```

```
              -continued
      CYC 7 0
          |---|  ADD2
                 MOVE/D X(M) -> X(M)
                 SRC A = ADD2 REG          7 - 0 = 7
                 RESULT-> REG                              0 + 1 = 1
          CYC 0 1
              |---|  ADD2
                     MOVE/D X(K) -> X(M) IF .LT.
                     SRC A = LSB1 REG      0 - 2 = 6
                     SRC CC= ADD1 CC#      1 - 1 = 0
                     RESULT-> REG                          1 + 0 = 1
      CYC 5 6
          |---|  MUL1
                 ADDI/S K = K+1
                 SRC A = MUL1 REG          5 - 1 = 4
                 SRC B = 1 (CONSTANT)
                 RESULT-> REG                              6 + 0 = 6
      CYC 7 0
          |---|  MUL2
                 MOVE/S K -> M
                 SRC A = MUL1 REG          7 - 1 = 6
                 RESULT-> REG                              0 + 1 = 1
          CYC 0 1
              |---|  MUL2
                     MOVE/S M-> M IF .GE.
                     SRC A = MUL2 REG      0 - 1 = 7
                     SRC CC= ADD1 CC#      1 - 1 = 0
                     RESULT-> REG                          1 + 0 = 1
```

The ability to specify an offset in the destination field allows the last two MOVE's, above, to write to the same register, Since the second of those two MOVE's is conditional either K or the previous value of M becomes the new M-value. Prior art Systolic Pipelined Networks did not have the ability to conditionally write results and did not have the ability for two different operations to write to the same register.

The operation of the SPN Embodiment has been illustrated here via a simple mapping of the problem to the embodiment. For LFK 24 this produces 1 result every 2 cycles. A more complex mapping, using the same principles that were used in the Vector Embodiment mapping of LFK24, produces 4 results every 6 cycles. Note that this is less efficient than the Vector Embodiment's 4 results every 3 cycles, because 3 additional instructions are needed for each iteration: the increment of k, the move of the previous m-value, and the move of the previous X(m) value. The two added moves are needed because in the SPN Embodiment there are no fixed addressable registers, every operand must be pumped through the network in the same relative timing position on every iteration. Those skilled in the art will see clearly that adding fixed addressable registers to the SPN Embodiment would increase its performance potential, but it would then be more properly classified as a Registered Crossbar Network Processor.

Those skilled in the art will understand that the SPN Embodiment has been used to illustrate the use of the various aspects of the present invention in a Systolic Pipelined Network architecture, but many modifications, deletions, and additions are possible within the scope of the present invention. For example, the methods shown for instruction fetch, for obtaining input data, and for sinking results utilize program controlled fetching and storing of information from storage; however, the program and data inputs could be provided by an external mechanism which also accepts results, in the classical systolic manner.

Summary

The foregoing embodiments serve to demonstrate the usefulness of the present invention in a wide variety of computer processor architectures. With Conditional Execution instructions, including but not limited to Branches, are not conditionally issued, they are conditionally executed. They can be issued and proceed through execution before the controlling status is generated. This reduces the latency from condition code generation to condition code use and, thus, reduces the number of holes in the processing pipeline. Additionally, it has been shown that the basic Conditional Execution invention is significantly enhanced by:

(a) CC Mask Field—Conditional Execution is enhanced when all instructions have a condition code mask field that is used along with the selected condition code for the conditional execution decision.

(b) Set CC Field—Conditional Execution is enhanced when most instructions have a field that enables setting a condition code based on the results of the instruction.

(c) Stale CC Handling—Conditional Execution is enhanced when instructions in a chain of conditionally executing decisions can detect any break in that chain that means some subsequent instructions should not execute. That is, information about any break in the decision chain is forwarded via subsequently set condition codes to control instructions later in the chain.

(d) Multiple CCs—Conditional Execution is enhanced when multiple condition codes are available so that multiple instruction sequences, each needing at least one condition code to control its execution, can be in simultaneous or overlapped execution, without competing for a single shared condition code.

(e) CC Reservation Stations—Conditional Execution is enhanced when, in a Dynamic Scheduling architecture, Condition Code Reservation Stations are provided at all pipeline stages leading to the point where the condition code is used as input to the conditional execution decision. These CC Reservation Stations depend on tagging of CC results to identify and acquire needed CCs as soon as they become available and to allow the conditional execution to proceed as far as possible before the CC is needed to complete the instruction.

Specifically, the application of these techniques has been demonstrated in 10 embodiments. Those skilled in the art will recognize that each of these embodiments include a set of architectural features, i.e. the set of features included and excluded determines the architectural type. Many variations other than those shown as representative embodiments are, of course, possible.

Although, in hindsight, this invention may seem obvious, the prior art substantiates that these techniques and the associated benefits have not been used; rather, many sophisticated prior art schemes have been proposed to improve the three axes of performance capacity, but none have the simplicity, low cost, and performance benefits of the present invention.

It will be appreciated from the foregoing that the present invention represents an important and significant advance in the field of computers which use parallelism and/or pipelining.

It will also be appreciated that, although several specific embodiments of the invention have been described, many modifications, deletions, and additions can be made within the scope and spirit of the invention. Accordingly, the invention is only limited by the appended claims.

References

| Label | Source Document | Ref Page |
|---|---|---|
| [Amda1] | Amdahl, G.. "The Validity of the Single-Processor Approach to Achieving Large-Scale Computing Capabilities", Proceedings,AFIPS SpringJointComputerConference, April 1967, pp. 483–485. | p. 14 |
| [Ande1] | Patent 3,553,655, Anderson et al. "Short Forward Conditional Skip Hardware," January 5, 1971. | p. 19 |
| [Ande2] | Anderson, D.. et al, "The IBM System/360 Model 91: Floating-Point Execution Unit", IBMJournal, January, 1967, pp. 34–53. | p. 153<br>154<br>156 |
| [Artz1] | Patent 4,792,894, Artz, R.. et al. "Arithmetic Computation Modifier Based Upon Data Dependent Operations for SIMD Architectures", December 20, 1988. | p. 19 |
| [Ausl1] | Patent 4,589,087, Auslander, M.. et al, "Condition Register Architecture for a Primitive Instruction Machine", May 13, 1986. | p. 20 |
| [Birm1] | Birman, M. et al. "Design of a High-Speed Arithmetic Datapath," Proceedings,1988 InternationalConferenceonComputerDesign, pp. 214–216, October, 1988. | p. 21 |
| [Borc1] | Patent 3,287,702, Borck, W. Jr.. et al, "Computer Control", November 22, 1966. | p. 19 |
| [Borc2] | Patent 3,308,436, Borck, W. Jr.. et al, "Parallel Computer System Control", March 7, 1967. | p. 19 |
| [Borg1] | Patent 4,210,060, Borgerson, B.. et al, "Digital Computer with Overlapped Operation Utilizing Conditional Control to Minimize Time Losses", July 1, 1980. | p. 20 |
| [Cens1] | Censier, L.. Feautrier, P.. "A New Solution to Coherency Problems in Multicache Systems," IEEETransactionsonComputers, December, 1978, pp. 1112–1118. | p. 21 |
| [Char1] | Charlesworth, A.. "An Approach to Scientific Array Processing: The Architectural Design of the AP-120B/FPS-164 Family", Computer, September 1981, pp. 18–27. | p. 9 |
| [Cock1] | Patent 3,577,190, Cocke et al. "Apparatus in a Digital Computer for Allowing the Skipping of Predetermined Instructions in a Sequence of Instructions, In Response to the Occurrence of Certain Conditions," May 4, 1971. | p. 19 |
| [Cray1] | Patent 4,128,480, Cray, Jr.. "Computer Vector Register Processing," December 5, 1978. | p. 7<br>14<br>15 |
| [DeRo1] | DeRosa, J.. Levy, H.. "An Evaluation of Branch Architectures", Proceedingsofthe 14thAnnualInternationalConferenceon ParallelProcessing, August, 1986, pp. 10–16. | p. 19 |
| [Dubo1] | Dubois, M.. Scheurich, C.. Briggs, F.. "Synchronization, Coherence, and Event Ordering in Multiprocessors," Computer, March 1988, pp.9–21. | p. 21<br>23 |
| [Gild1] | Gilder, George.. Microcosm:TheQuantum RevolutioninEconomicsandTechnology, "Excerpt from," ElectronicsBusiness, September 4, 1989, pp. 44–48. | p. 4 |

-continued

References

| Label | Source Document | Ref Page |
|---|---|---|
| [Grun1] | Patent 3,990,052, Gruner, R.. "Central Processing Unit Employing Microprogrammable Control for Use in a Data Processing System" November 2, 1976. | p. 19 |
| [Guen1] | Patent 4,594,660, Guenthner et al, "Collector," June 10, 1986. | p. 21<br>44 |
| [Hao_1] | Patent 4,594,655, Hao et al. "(K)-Instructions-at-a-Time Pipelined Processor for Parallel Execution of Inherently Sequential Instructions," June 10, 1986. | p. 14 |
| [Hase1] | Patent 4,608,660, Hasebe, K., "Data Processing System with Condition Data Setting Function", August 26, 1986. | p. 20 |
| [Hori1] | Patent 3,940,741, Horikoshi et al. "Information Processing Device for Processing Instructions Including Branch Instructions," February 24, 1976. | p. 19 |
| [Hugh1] | Patent 4,200,927, Hughes et al. "Multi-Instruction Stream Branch Processing Mechanism," April 29, 1980. | p. 19 |
| [Hwan1] | Hwang, k.. Xu, Z.. "Multipipelined Networking for Fast Execution of Vector Compound Functions", Proceedingsofthe1986InternationalConferenceonParallelProcessing, August, 1986, pp. 495–502. | p. 18<br>185 |
| [IBM_1] | IBMSystem/370ExtendedArchitecture, PrinciplesofOperation, Publication Number SA22-7085-0, IBM Corporation, March 1983. | p. 137,139<br>147,167 |
| [Iwas1] | Patent 4,773,002, Iwasaki et al., "Microprogram Controller In Which Instruction Following Conditional Branch Is Selectively Converted to a NOP Instruction," September 20, 1988. | p. 19 |
| [Jego1] | Jegou, Y.. Seznec, A.. "Data Synchronized Pipelined Architecture: Pipelining in Multi-processor Environments", Proceedings ofthe1986InternationalConferenceon ParallelProcessing, August 1986, pp 487–494. | p. 12<br>16<br>22 |
| [Jone1] | Patent 4,750,112, Jones et al., "Data Processing Apparatus and Method Employing Instruction Pipelining," June 7, 1988. | p. 19 |
| [Kate1] | Katevenis, M.. ReducedInstructionSet ComputerArchitecturesforVLSI, Report No. UCB/CSD 83/141, University of California, Berkeley, Calif., Oct. 1983. | p. 5 |
| [Kawa1] | Patent 4,172,287, Kawabe et al. "General Purpose Data Processing Apparatus for Processing Vector Instructions," October 23, 1979. | p. 15 |
| [Keef1] | Patent 4,155,120, Keefer et al., "Apparatus and Method for Controlling Microinstruction Sequencing by Selectively Inhibiting Microinstruction Execution," May 15, 1979. | p. 19 |
| [Kim_1] | Patent 4,179,737, Kim, D.. "Means and Methods for Providing Greater Speed and Flexibility of Microinstruction Sequencing," December 18, 1979. | p. 19 |
| [Kimo1] | Patent 4,514,804, Kimoto, M.. "Information Handling Apparatus Having a High Speed Instruction-Executing Function," April 30, 1985. | p. 19 |
| [Lee_1] | Lee, J.. Smith, A. J.. "Branch Prediction Strategies and Branch Target Buffer Design", Computer, January 1984, pp. 6–22. | p. 19<br>149 |
| [Li_1] | Patent 4,783,738, Li et al., "Adaptive Instruction Processing By Array Processor Having Processor Identification and Data Dependent Status Registers in Each Processing Element," November 8, 1988. | p. 20 |
| [Lind1] | Patent 4,373,180, Linde, J., "Microprogrammed Control System Capable of Pipelining Even When Executing a Conditional Branch Instructional, February 8, 1983. | p. 19 |
| [Lori1] | Patent 4,435,758, Lorie, R.. et al, "Method for Conditional Branch Execution in SIMD Vector Processors", March 6, 1984. | p. 19 |
| [MacD1] | MacDougall, M.. "Instruction-Level Program | p. 168 |

-continued

References

| Label | Source Document | Ref Page |
|---|---|---|
| | and Processor Modeling," Computer, July 1984, pp. 14–24. | |
| [McFa1] | McFarling, S.. Hennessy, J.. "Reducing the Cost of Branches", Proceedingsofthe13th InternationalSymposiumonComputerArchitecture, Tokyo, Japan, June 1986, pp.396–403. | p. 19 |
| [McNa1] | McNamara, M.. Schlansker, M.. "The Cydra 5 Computer System Architecture", Proceedings ofthe1988IEEEInternationalConference onComputerDesign(ICCD), October 1988, pp. 302–306. | p. 10 |
| [Mead1] | Patent 4,099,230, Mead, C.. "High Level Control Processor," July 4, 1978. | p. 19 |
| [Mori1] | Patent 4,245,327, Moriya, Y.. et al, "Data Processor Having Two Types of Carry Flags", January 13, 1981. | p. 19 |
| [Mult1] | TechnicalSummary, Multiflow Computer Inc., 1987. | p. 9<br>23 |
| [Naga1] | Patent 4,792,893, Nakagawa et al. "Selectively Recursive Pipelined Parallel Vector Logical Operation System," December 20, 1988. | p. 15 |
| [Olno1] | Patent 4,701,842, Olnowich, H.., "Method and Apparatus for Avoiding Excessive Delay in a Pipelined Processor During the Execution of a Microbranch Instruction," October 20, 1987. | p. 19 |
| [Pack1] | Patent 3,406,630, Packard et al. "Digital Computer Having High Speed Branch Operation," October 29, 1968. | p. 19 |
| [Ples1] | Pleszkun, A.. et al., "WISQ: A Restartable Architecture Using Queues", Proceedingsof the14thAnnualInternationalSymposiumon ComputerArchitecture, June, 1987, pp. 290–299. | p. 6 |
| [Ples2] | Pleszkun, A.. Sohi, G.. "The Performance Potential of Multiple Functional Unit Processors", Proceedingsofthe15thInternationalSymposiumonComputerArchitecture, May 1988, pp. 37–44. | p. 12<br>44 |
| [Prey1] | Patent 4,212,060, Prey, G.. "Method and Apparatus for Controlling the Sequence of Instructions in Stored-Program Computers," July 8, 1980. | p. 19 |
| [Rama1] | Ramarakrishna, R.. Yen, D.. Yen, W.. Towle, R.. "The Cydra 5 Departmental Supercomputer: Design, Philosophies, Decisions, and Trade-offs", Computer, January 1988, pp. 12–35. | p. 10 |
| [Rau1] | Patent 4,553,203, Rau et al. "Easily Schedulable Horizontal Computer", November, 12, 1985. | p. 10 |
| [Scho1] | Patent 3,234,519, Scholten et al. "Conditionally Operating Electronic Data Processing System," February 8, 1966. | p. 19 |
| [Serl1] | Serlin, O.. "The Serlin Report on Parallel Processing," Issue No. 7, December 4, 1987, pp. 1–9. | p. 23 |
| [Shim1] | Patent 4,298,933, Shimokawa et al., "Data-Processing Means to Suppress the Execution of Unnecessary Instructions," November 3, 1981. | p. 19 |
| [Smit1] | Smith, J. E., "Dynamic Instruction Scheduling and the Astronautics ZS-1", Computer, July 1989, pp 21–35. | p. 14<br>22<br>105 |
| [Sohi1] | Sohi, G.. Vajapeyam, S.. "Instruction Issue Logic for High Performance Interruptable Pipeline Processors", Proceedingsofthe 14thInternationalSymposiumonComputer Architecture, June 1987, pp. 27–34. | p. 8,<br>12 |
| [Ster1] | Patent 4,301,443, Sternberg et al. "Bit Enable Circuitry for an Image Analyzer System," November 17, 1981. | p. 19 |
| [Stok1] | Patent 4,101,960, Stokes, R.. et al, "Scientific Processor", July 18, 1978. | p. 19 |
| [Tana1] | Patent 4,270,181, Tanakura, Y.. Uchida, K.. "Data Processing System Having a High Speed Pipeline Processing Architecture", May 26, 1981. | p. 15 |
| [Tere1] | Patent 4,633,386, Terepin, "Digital Signal Processor," December 30, 1986. | p. 21 |
| [Thor1] | Patent 3,346,851, Thornton, J.. et al, "Simultaneous Multiprocessing System", | p. 8 |

-continued

References

| Label | Source Document | Ref Page |
|---|---|---|
| [Toma1] | October 10, 1967. Patent 3,462,744, Tomasulo, R.. et al, "Execution Unit with a Common Operand and Resulting Bussing System", Aug. 19, 1969. | p. 8, 138 |
| [Uht_1] | Uht, A.. Wedig, R., "Hardware Extraction of Low-Level Concurrency From Serial Instruction Streams", Proceedingsofthe1986 ConferenceonParallelProcessing, August 1986, pp. 729–736. | p. 14 22 |
| [Weis1] | Weiss, S.. Smith, J. E.. "Instruction Issue Logic in Pipelined Supercomputers", IEEE TransactionsonComputers, Vol. C-33, No. 11, November 1984, pp. 1013–1022. | p. 7, 8, 17 |
| [Youn1] | Young, H.. "Evaluation of a Decoupled Computer Architecture and the Design of a Vector Extension", Ph.D. Thesis, University of Wisconsin-Madison, May 1985. | p. 16 23 |
| [Youn2] | Young, H.. Goodman, J.. "The Design of a Queue-Based Vector Supercomputer", Proceedingsofthe1986InternationalConference onParallelProcessing, August 1986, pp.483–486. | p. 16 |

I claim:

1. A method of executing instructions in a pipelined processor comprising:

a conditional execution decision logic pipeline stage and a least one instruction execution pipeline stage prior to said conditional execution decision logic pipeline stage;

at least one condition code;

said instructions including branch instructions and non-branch instructions and each instruction including opcodes specifying operations, operand specifiers specifying operands, and conditional execution specifiers;

said pipelined processor further including at least one write pipeline stage for writing the result(s) of each instruction to specified destination(s);

at least one of the instructions including a means for specifying writing said condition code with a condition code result;

the conditional execution decision logic pipeline stage performing a boolean algebraic evaluation of the condition code and said conditional execution specifier and producing an enable-write with at least two states, true and false; and said enable-write when true enabling and when those disabling the writing of instruction results at said write pipeline stage;

said method further comprising the steps of:

fetching source operands specified by said operand specifiers;

performing the operation specified by said opcode;

fetching the condition code, when specified by the conditional execution specifier, at the pipeline stage immediately preceding the conditional execution decision logic pipeline stage;

operating the conditional execution decision logic pipeline stage, when specified by the conditional execution specifier, to determine the enable-write using the boolean algebraic evaluation;

writing said non-branch instruction results to a destination specified by the operand specifiers of the executing instruction and writing condition code results to the condition code when specified by the operand specifiers of the executing instruction, if the enable-write is true; and discarding or not writing the non-branch instruction results and discarding or not writing the condition code, if the enable-write is false.

2. The method as claimed in claim 1, wherein the conditional execution specifier includes a mask field;

each bit of said mask field selecting a corresponding bit in the condition code for inclusion in the boolean algebraic evaluation.

3. The method as claimed in claim 1, wherein the instructions include a set condition code flag with two states:

a set-state for enabling the writing of the condition code, when also enabled by the true enable-write; and a no-set-state for disabling writing to the condition code.

4. The method as claimed in claim 1, wherein:

the condition code includes a good-or-stale indicator;

the conditional execution specifier includes a good-or-stale specifier;

the boolean algebraic evaluation further including both said good-or-stale indicator and said good-or-stale specifier the good-or-stale indicator having two states:

a good-state set by an instruction which specifies writing to the condition code and which is enabled by the true enable-write; and a stale-state set by an instruction which specifies writing to the condition code and which is disabled by the false enable-write;

the conditional execution specifier choosing from a group comprising:

the boolean algebraic includes the good-or-stale indicator and excludes additional condition code bits;

the boolean algebraic evaluation includes the good-or-stale indicator and includes with at least one additional condition code bit; and the boolean algebraic evaluation excludes the good-or-stale indicator.

5. The method as claimed in claim 1, wherein there is a plurality of condition codes and the instructions include condition code specifiers for selecting one of the condition codes for use in the conditional execution decision.

6. The method as claimed in claim 1, wherein fetching of the condition code is done in a plurality of pipeline positions as a condition code copy;

said condition code copy is held until needed by the conditional execution decision logic; and after the condition code copy is fetched, the condition code is freed for use by other instructions.

7. A pipelined processor for executing instructions comprising:

a conditional execution decision logic pipeline stage, a least one instruction execution pipeline stage prior to said conditional execution decision logic pipeline stage;

at least one condition code;

said instructions including branch instructions and non-branch instructions and including opcodes specifying operations, operand specifiers specifying operands, and conditional execution specifiers;

the pipelined processor further including at least one write pipeline stage for writing the result(s) of each instruction to specified destination(s);

at least one of the instructions including a means for specifying writing said condition code with a condition code result;

the conditional execution decision logic pipeline stage performing a boolean algebraic evaluation of the condition code and said conditional execution specifier and producing an enable-write with at least two states, true and false;

said enable-write when true enabling and when false disabling the writing of instruction results at said write pipeline stage;

fetching means for fetching source operands specified by said operand specifiers;

operating means for performing the operation specified by said opcode;

condition code fetching means for fetching the condition code, when specified by the conditional execution specifier, at the pipeline stage immediately preceding the conditional execution decision logic;

the conditional execution decision logic pipeline stage, when specified by the conditional execution specifier, determining the enable-write using the boolean algebraic evaluation;

writing means for writing said non-branch instruction results to a destination specified by the operand specifiers and writing to the condition code when specified, if enable-write is true; and said writing means further for discarding or not writing the non-branch instruction results and discarding or not writing the condition code, if enable-write is false.

8. The pipelined processor as claimed in claim 7, wherein the conditional execution specifier includes a mask field;

each bit of said mask field selecting a corresponding bit in the condition code for inclusion in the boolean algebraic evaluation.

9. The pipelined processor as claimed in claim 7, wherein the instructions include a set condition code flag with two states:

a set-state for enabling the writing of the condition code, when also enabled by the true enable-write; and a no-set-state for disabling writing to the condition code.

10. The pipelined processor as claimed in claim 7, wherein:

the condition code includes a good-or-stale indicator;

the conditional execution specifier includes a good-or-stale specifier;

the boolean algebraic evaluation further including both said good-or-stale indicator and said good-or-stale specifier the good-or-stale indicator having two states:

a good-state set by an instruction which specifies writing to the condition code and which is enabled by the true enable-write; and a stale-state set by an instruction which specifies writing to the condition code and which is disabled by the false enable-write;

the conditional execution specifier choosing from a group comprising:

the boolean algebraic includes the good-or-stale indicator and excludes additional condition code bits;

the boolean algebraic evaluation includes the good-or-stale indicator and includes with at least one additional condition code bit; and the boolean algebraic evaluation excludes the good-or-stale indicator.

11. The pipelined processor as claimed in claim 7, wherein there is a plurality of condition codes and the instructions include condition code specifiers for selecting one of the condition codes for use in the conditional execution decision.

12. The pipelined processor as claimed in claim 7, wherein fetching of the condition code is done in a plurality of pipeline positions as a condition code copy;

said condition code copy is held until needed by the conditional execution decision logic; and after the condition code copy is fetched, the condition code is freed for use by other instructions.

* * * * *